(12) United States Patent
Takahashi et al.

(10) Patent No.: US 6,330,909 B1
(45) Date of Patent: Dec. 18, 2001

(54) VEHICLE AIR CONDITIONING SYSTEM

(75) Inventors: Koji Takahashi, Kariya; Yuichi Shirota, Anjo; Koichi Ban, Tokai; Hikaru Sugi, Nagoya; Yasuhiko Niimi, Handa; Hiroshi Kishita, Anjo; Yasushi Yamanaka, Nakashima; Masayoshi Naka, Okazaki, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/421,959

(22) Filed: Oct. 20, 1999

(30) Foreign Application Priority Data

| Oct. 23, 1998 | (JP) | 10-302848 |
| Nov. 4, 1998 | (JP) | 10-313714 |
| Nov. 4, 1998 | (JP) | 10-313715 |
| Nov. 18, 1998 | (JP) | 10-328537 |
| Nov. 24, 1998 | (JP) | 10-333060 |
| Dec. 10, 1998 | (JP) | 10-351512 |
| Jan. 18, 1999 | (JP) | 11-009663 |
| Feb. 17, 1999 | (JP) | 11-039236 |
| Mar. 19, 1999 | (JP) | 11-076562 |
| Jul. 2, 1999 | (JP) | 11-189412 |
| Sep. 14, 1999 | (JP) | 11-260605 |
| Dec. 16, 1999 | (JP) | 10-358154 |

(51) Int. Cl.$^7$ ............... B60H 1/00; B60H 1/32
(52) U.S. Cl. ............... 165/202; 62/59; 62/133; 62/212; 62/406; 165/236
(58) Field of Search ............... 62/59, 133, 406, 62/212; 165/202, 236

(56) References Cited

U.S. PATENT DOCUMENTS

| 4,116,651 | * | 9/1978 | Rickert | 62/59 |
| 4,326,386 | | 4/1982 | Tamura | 62/180 |
| 4,385,503 | | 5/1983 | Okura | 62/150 |
| 4,604,873 | | 8/1986 | Ohashi et al. | 62/158 |
| 4,856,293 | | 8/1989 | Takahashi | 62/228.3 |
| 4,878,358 | | 11/1989 | Fujii | 62/227 |
| 4,909,043 | | 3/1990 | Masauji et al. | 62/158 |
| 5,005,368 | * | 4/1991 | MacCracken | 62/59 X |
| 5,441,122 | | 8/1995 | Yoshida | 180/65.2 |
| 5,493,870 | | 2/1996 | Kodama et al. | 62/155 |
| 5,644,929 | | 7/1997 | Tanaka et al. | 62/406 |
| 5,685,162 | | 11/1997 | Iritani et al. | 62/156 |

FOREIGN PATENT DOCUMENTS

| 195 17 336 A1 | 11/1995 | (DE) . |
| 0 396 017 A2 | 11/1990 | (EP) . |
| 0 656 273 A1 | 6/1995 | (EP) . |
| 0 730 989 A1 | 9/1996 | (EP) . |
| A 56063509 | 5/1981 | (JP) . |
| A-57-80916 | 5/1982 | (JP) . |
| A-60-113040 | 6/1985 | (JP) . |
| A-2-68214 | 3/1990 | (JP) . |
| U2-114511 | 9/1990 | (JP) . |
| 197 51 702 A1 | 6/1998 | (JP) . |

OTHER PUBLICATIONS

European Search Report dated Jan. 25, 2001.

* cited by examiner

*Primary Examiner*—William Wayner
(74) *Attorney, Agent, or Firm*—Harness, Dickey & Pierce, PLC

(57) ABSTRACT

In a vehicle air-conditioning system, an evaporator is disposed in an air-conditioning case to form a bypass passage through which air bypasses the evaporator, and an opening degree of the bypass passage is adjusted by a bypass door. When a vehicle engine operates, the system performs a cold-storing mode where cold quantity stored in condensed water on the evaporator is increased. On the other hand, when operation of the vehicle engine is stopped, the system performs a cold-releasing mode where air passing through the evaporator is cooled by cold released from frozen condensed water. During the cold-storing mode and the cold-releasing mode, temperature of air blown into a passenger compartment can be adjusted by adjusting the opening degree of the bypass passage. Thus, in the vehicle air-conditioning system, cold-storing quantity in the evaporator can be improved while power-saving effect of the vehicle engine is improved.

77 Claims, 66 Drawing Sheets

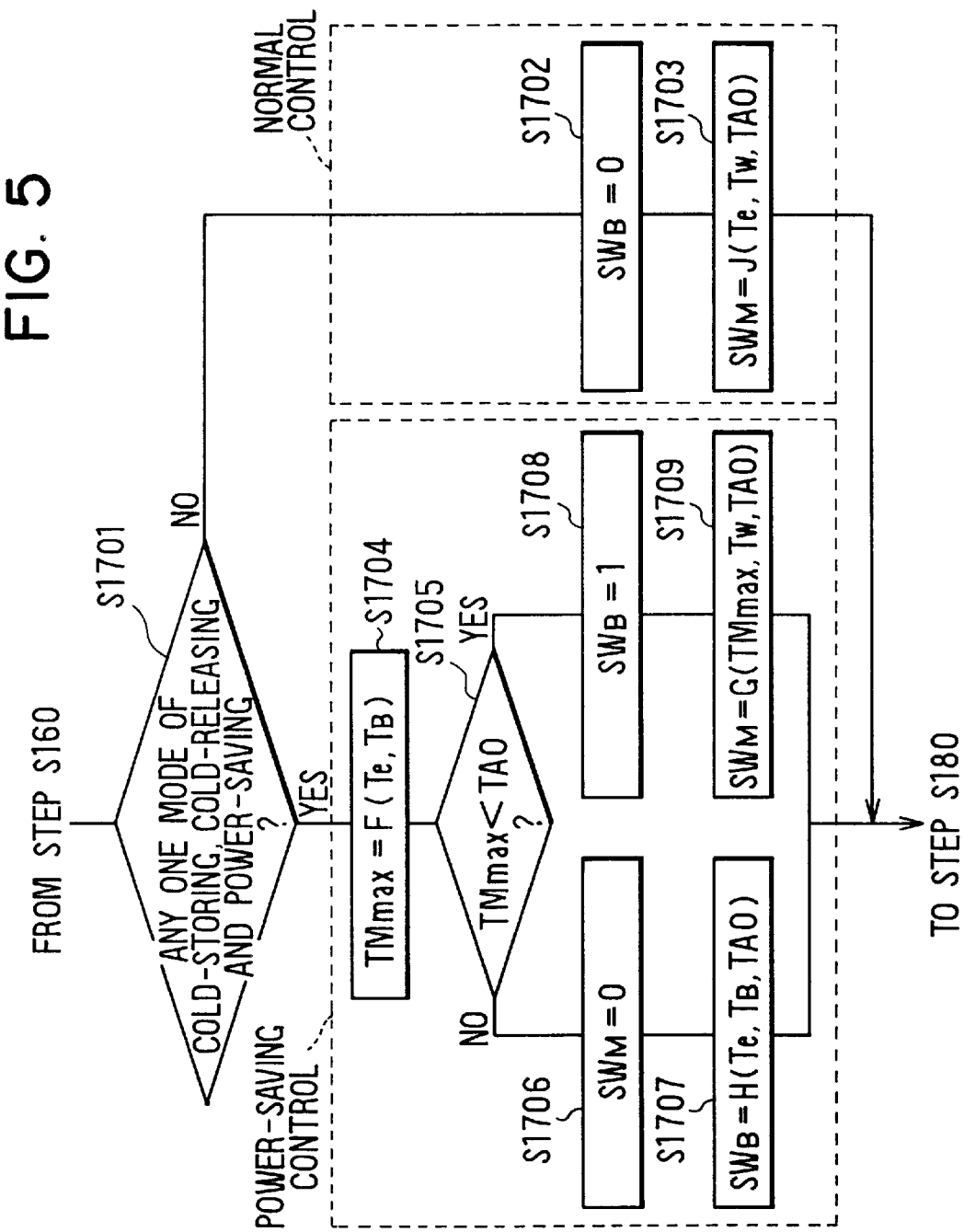

| CLOSED HEIGHT (mm) | BYPASS AIR FLOW RATIO (%) | DECREASED RATIO IN OVERALL AIR FLOW AMOUNT (%) | MIXED AIR TEMPERATURE (°C) |
|---|---|---|---|
| 50 | 33 | 2 | 8.3 |
| 100 | 41 | 4 | 10.3 |
| 150 | 49 | 8 | 12.3 |

VEHICLE AIR CONDITIONING SYSTEM

CROSS-REFERENCE TO RELATED APPLICATION

This application is related to and claims priority from Japanese Patent Applications No. Hei. 10-302848 filed on Oct. 23, 1998, No. Hei. 10-313714 filed on Nov. 4, 1998, No. Hei. 10-313715 filed on Nov. 4, 1998, No. Hei. 10-328537 filed on Nov. 18, 1998, No. Hei. 10-333060 filed on Nov. 24, 1998, No. Hei. 10-351512 filed on Dec. 10, 1998, No. Hei. 10-358154 filed on Dec. 16, 1998, No. Hei. 11-9663 filed on Jan. 18, 1999, No. Hei. 11-39236 filed on Feb. 17, 1999, No. Hei. 11-76562 filed on Mar. 19, 1999, No. Hei. 11-189412 filed on Jul. 2, 1999, and No. Hei. 11-260605 filed on Sep. 14, 1999, the contents of which are hereby incorporated by reference.

BACKGROUND OF THE INVENTION

1. Field of the Invention

The present invention relates to a vehicle air-conditioning system having a compressor of a refrigerant cycle, driven by a vehicle engine or an auxiliary driving unit such as an electrical motor. The vehicle air-conditioning system improves cooling performance even when operation of the compressor is forcibly temporarily stopped.

2. Description of Related Art

In recent years, for protecting the environment, a vehicle such as an eco-run vehicle or a hybrid vehicle, where a vehicle engine automatically stops when the vehicle is halted for example at a traffic signal, is practically used.

However, in a vehicle air-conditioning system, a compressor of a refrigerant cycle is driven by the vehicle engine. Therefore, when the vehicle engine is stopped when the vehicle is halted for example at a traffic signal, temperature of air blown from an evaporator is increased with the compressor stoppage, and temperature of air blown into a passenger compartment is increased.

A Further, even when the vehicle engine operates, the operation of the compressor may be forcibly temporarily stopped by a request from a vehicle engine side. For example, when the vehicle is accelerated, the operation of the compressor is forcibly temporarily stopped so that accelerating performance of the vehicle is improved. In this case, when the operation of the compressor is forcibly temporarily stopped, the temperature of air blown into the passenger compartment is increased, and cooling performance for a passenger in the passenger compartment is deteriorated.

In a conventional compressor control system described in JP-U-2-114511, when a vehicle is decelerated, the compressor is forcibly operated, and an evaporator is forcibly frosted. Therefore, during the vehicle decelerating, cold is stored in the evaporator as latent heat. When the vehicle is stopped after the vehicle decelerating, air passing through the evaporator can be cooled using the cold stored in the evaporator while the compressor is stopped. However, in the conventional system, because cold-storing is only performed within a short time during the vehicle decelerating, cold is not always stored in the evaporator. As a result, the cooling performance for the passenger is deteriorated when the operation of the compressor is forcibly temporarily stopped based on a request of the engine side.

SUMMARY OF THE INVENTION

In view of the foregoing problems, it is an object of the present invention to provide an air-conditioning system which prevents cooling performance from being deteriorated when a compressor of a refrigerant cycle is forcibly temporarily stopped.

It is an another object of the present invention to provide a vehicle air-conditioning system having a compressor driven by a vehicle engine, which prevents cooling performance from being deteriorated when a vehicle engine is temporarily stopped.

It is a further another object of the present invention to provide a vehicle air-conditioning system which improves both cool-storing effect in an evaporator and power-saving effect in a compressor.

According to the present invention, an air-conditioning system for a vehicle includes an evaporator for cooling air to be blown into a passenger compartment of the vehicle, a compressor driven by a vehicle engine for compressing and discharging refrigerant having passed through the evaporator, and a control unit for controlling air-conditioning state of the passenger compartment. When the engine operates, the control unit performs a cold-storing mode where cold quantity stored in condensed water on the evaporator is increased. On the other hand, when the engine stops, the control unit performs a cold-releasing mode where air is cooled by cold released from the condensed water on the evaporator. Thus, in the air-conditioning system, a sufficient cold quantity can be stored during the cold-storing mode, while it can prevent cooling performance from being deteriorated when the engine stops.

Further, the evaporator is disposed in the air-conditioning case to form a bypass passage through which air bypasses the evaporator, an opening degree of the bypass passage is adjusted by a bypass door, and during the cold-storing mode the control unit adjusts temperature of air blown into the passenger compartment by adjusting the opening degree of the bypass passage by using the bypass door. Therefore, even when evaporator temperature is decreased to increase the cold-storing quantity in the condensed water of the evaporator during the cold-storing mode, it is possible to control temperature of air blown into the passenger compartment by mixing air passing through the evaporator and air passing through the bypass passage, and it is possible to reduce air flow amount passing through the evaporator by the air flow amount passing through the bypass passage. Thus, by reducing the air flow amount passing through the evaporator, power consumed in the compressor can be effectively reduced. As a result, the air-conditioning system improves both cool-storing effect in the evaporator and power-saving effect in the compressor.

According to the present invention, in an air-conditioning system for a vehicle, when the compressor operates, a control unit performs a cold-storing mode in which cold quantity stored in condensed water on the evaporator is increased. Further, the control unit includes a prohibiting determining unit for determining a prohibiting condition of the cold-storing mode, and the control unit stops the cold-storing mode when the prohibiting condition of the cold-storing mode is determined while the compressor operates. Thus, when no the prohibiting condition of the cold-storing mode is determined, the cold-storing mode is continuously performed during the compressor operating, and a sufficient cold quantity can be stored in the condensed water of the evaporator. As a result, when air is cooled by cold released from the condensed water of the evaporator, sufficient cooling can be provided for a passenger in the passenger compartment.

According to the present invention, an air-conditioning system for a vehicle includes a temperature adjustment unit for adjusting temperature of air to be blown into the passenger compartment at a target temperature, and a control unit for controlling air-conditioning state of the passenger compartment. When the compressor operates, the control unit sets a cold-storing mode where cold stored in condensed water on the evaporator is increased. On the other hand, when the compressor is forcibly stopped based on a request from the engine, the control unit sets a cold-releasing mode where air passing through the evaporator is cooled by cold released from condensed water of the evaporator. The control unit includes a correction unit for correcting the target temperature of air blown into the passenger compartment to a low temperature side based on an increase of humidity of the passenger compartment. Thus, when the humidity of the passenger compartment increases as temperature of evaporator increases during the cold-releasing mode, the target temperature of air blown into the passenger compartment is corrected to a low temperature side so that temperature of air blown into the passenger compartment is lowered. As a result, a humidity sensing level of a passenger can be moved to a high-temperature side relative to the evaporator temperature. Accordingly, a time for which sufficient cooling is performed during the cold-releasing mode can extend.

Preferably, the correction unit corrects the target temperature of air blown into the passenger compartment based on both a correction due to the humidity of the passenger compartment and a correction due to a humidity changing rate of the passenger compartment. Therefore, the humidity sensing level of the passenger is further moved to a high-temperature side relative to the evaporator temperature.

According to the present invention, a control unit of an air-conditioning system includes a cooling degree detecting unit for detecting cooling degree of the evaporator, a compressor operation control unit for controlling operation of the compressor based on the cooling degree detected by the cooling degree detecting unit, and an estimating unit for estimating a next cooling degree of the evaporator after the compressor is forcibly stopped based on the request of the engine, during the compressor operating. When the cold-storing mode is performed during the compressor operating, the control unit controls cold quantity stored in condensed water of the evaporator based on the next cooling degree estimated from the estimating unit. Thus, cold quantity stored in the condensed water of the evaporator, corresponding to the next cooling degree after the vehicle stops can be beforehand accurately secured. As a result, even when the compressor is forcibly stopped from a request of the engine, cooling is maintained using cold released from the condensed water, so that temperature of air blown into the passenger compartment is prevented from being increased during the cold-releasing mode.

Preferably, the control unit controls cold quantity stored in condensed water of the evaporator, by correcting a target valve of the cooling degree of the evaporator based on the next cooling degree estimated from the estimating unit. Therefore, when it is estimated that the next cooling degree after the compressor stops increases, cold stored in the condensed water is increased during the compressor operating so that it prevents cooling performance after the compressor stops from being deteriorated.

According to the present invention, when the compressor operates, a control unit of an air-conditioning system performs a cold-storing mode where cold quantity stored in condensed water of the evaporator is increased. During a predetermined time after a refrigerant cycle starts, the control unit sets an outside air main mode where only outside air is introduced or outside air is mainly introduced into the air-conditioning case. On the other hand, during a forcibly stopping mode of the compressor, where the compressor is forcibly stopped from a request of the engine, the control unit sets an inside air main mode where only inside air is introduced or inside air is mainly introduced into the air-conditioning case. Thus, by forcibly introducing outside air after the refrigerant cycle starts, condensed water can be quickly gathered on the evaporator, cold-storing in the condensed water is facilitated. Further, by forcibly introducing inside air when the compressor is forcibly stopped, cooling time due to cold released from the condensed water can be extended.

Further, the control unit includes an inside/outside air introducing control unit for setting an outside air main mode where only outside air is introduced or outside air is mainly introduced into the air-conditioning case during a predetermined time after the refrigerant cycle starts, and an air flow control unit for setting a first target air flow blown into the evaporator during a forcibly stopping mode of the compressor, where the compressor is forcibly stopped from a request of the engine. In this case, the first target air flow is equal to or smaller than a second target air flow blown into the evaporator at an immediately before the forcibly stopping mode of the compressor. Thus, during the forcibly stopping mode of the compressor, air flow amount passing through the evaporator is reduced, and cooling time for which cooling is performed by cold released from the condensed water can be extended.

According to the present invention, a control unit of an air-conditioning system includes a first estimating unit for estimating cold quantity stored in the condensed water of the evaporator during the compressor operating, and a second estimating unit for estimating a stop possible time of the compressor based on the cold quantity estimated by the first estimating unit. In the forcibly stopping mode of the compressor, the compressor is stopped during the stop possible time, and control unit outputs a signal for requesting operation of the compressor to a driving unit of the compressor after the stop possible time passes. Thus, it can effectively prevent cooling performance of the passenger compartment from being deteriorated in the forcibly stopping mode of the compressor. Further, by increasing the cold quantity stored in the condensed water, a time for which the compressor is forcibly stopped is set to be longer.

According to the present invention, a control unit of an air-conditioning system includes a first estimating unit for estimating a drying-finishing time of the condensed water of the evaporator in the forcibly stopping mode, during the compressor operating, and a second estimating unit for estimating a stop possible time of the compressor based on the drying finishing time. In the forcibly stopping mode of the compressor, the compressor is stopped during the stop possible time, and the control unit outputs a signal for requesting operation of the compressor to the driving unit after the stop possible time passes. Thus, by restarting the operation of the compressor before the condensed water of the evaporator is dried, it prevents smelling from being caused from the evaporator.

On the other hand, a control unit of an air-conditioning system includes a first estimating unit for estimating an operation time for which cooling degree of the evaporator is changed to a predetermined level in the forcibly stopping mode, during the compressor operating, and a second estimating unit for estimating a stop possible time of the compressor based on the operation time. In the forcibly stopping mode, the compressor is stopped during the stop possible time, and the control unit outputs a signal for requesting restarting of the compressor to the driving unit after the stop possible time passes. Thus, cooling performance can be secured when the compressor is forcibly stopped.

According to the present invention, a control unit of an air-conditioning system includes a cooling degree calculating unit for calculating a limit value of cooling degree of the evaporator in forcibly stopping mode, during the compressor operating. Only when cooling degree of the evaporator is lower than the limit value during the forcibly stopping mode, the compressor is stopped. On the other hand, when the cooling degree of the evaporator is higher than the limit value during the forcibly stopping mode, the control unit outputs a signal for requesting operation of the compressor to the driving unit. Thus, the cold-releasing mode is performed while cooling degree of the evaporator is increased to the limit value. As a result, before unpleasant feeling is given to the passenger, the compressor is operated so that cooling performance can be improved during the cold-releasing mode.

Further, the control unit includes a dehumidification determining unit for determining whether or not it is necessary to dehumidify air in the passenger compartment. Even during the forcibly stopping mode of the compressor, when the dehumidification determining unit determines that it is necessary to dehumidify air in the passenger compartment, the control unit outputs a signal for requesting operation of the compressor to the driving unit. Thus, when air in the passenger compartment is need to dehumidify, that is, when a windshield of the vehicle is readily fogged, the operation of the compressor is restarted to perform air-conditioning in the passenger compartment. As a result, evaporator temperature is lowered, dehumidifying capacity of evaporator is improved, and defrosting performance of the windshield improved.

According to the present invention, a control unit of an air-conditioning system performs a cold-storing mode where cold quantity stored in condensed water of the evaporator is increased when the compressor operates, the control unit performs a cold-releasing mode where air is cooled by cold released from condensed water of the evaporator during a forcibly stopping mode where the compressor is forcibly stopped from a request of the engine, and the control unit includes a vehicle stop determining unit for estimating and determining whether or not the vehicle is to be stopped. When the vehicle stop determining unit determines that vehicle is to be stopped during the cold-storing mode, the control unit performs a forcibly operation mode where operation of the compressor is forcibly performed so that cooling degree of the evaporator is increased. Thus, it is compared with a case where the cold-releasing mode is started when the vehicle is stopped with the compressor stoppage so that the evaporator temperature is increased, cold-releasing time for which the cold-releasing mode is performed is extended.

According to the present invention, a vehicle air-conditioning system includes an evaporator disposed in the air-conditioning case to form a bypass passage through which air bypasses the evaporator, a bypass door for adjusting an opening degree of the bypass passage, a compressor for compressing and discharging refrigerant having passed through the evaporator, and a control unit for controlling air-conditioning state of the passenger compartment. When the compressor operates, the control unit performs a cold-storing mode where cold stored in condensed water on the evaporator is increased. On the other hand, during a forcibly stopping mode where the compressor is forcibly stopped from a request of the engine, the control unit performs a cold-releasing mode where air is cooled by cold released from condensed water of the evaporator. In the air-conditioning system, the bypass door opens the bypass passage during the cold-storing mode, and the bypass door is operated to close a part of an air passage of the evaporator so than an air flow resistance is increased in the evaporator when the bypass door opens the bypass passage. Thus, by adjusting the opening degree of the bypass passage when the compressor operates, air passing through the bypass passage and air passing through the evaporator are mixed so that temperature of air blown into the passenger compartment can be controlled. Further, because the air flow resistance of the air passage in the evaporator is increased when the bypass door opens the bypass passage, an arrangement space of the bypass passage and the bypass door is reduced, and sufficient temperature adjusting effect can be obtained without increasing the size of the air-conditioning system. On the other hand, by increasing the air amount passing through the bypass passage, power consumption effect of the compressor is improved while a reheating air quantity in a heating heat exchanger at a downstream air side of the evaporator is reduced.

According to the present invention, a refrigerant cycle system includes an evaporator for cooling air passing therethrough, a compressor for compressing and discharging refrigerant having passed through the evaporator, a press-reducing unit for reducing pressure of refrigerant supplying into the evaporator, and a control unit for selectively setting a cooling mode where a cooling temperature of the evaporator is higher than a predetermined temperature and a cold-storing mode where the cooling temperature of the evaporator is lower than the predetermined temperature. In the refrigerant cycle system, during the cold-storing mode, the press-reducing unit increases a throttle amount as compared with a cooling mode. Thus, during the cold-storing mode, evaporation pressure of refrigerant in the evaporator is forcibly reduced by increasing the throttle amount of the press-reducing unit, and evaporator temperature is lowered to the freezing point at least at a refrigerant inlet side so that cold-storing effect is improved.

Further, according to the present invention, in a vehicle air-conditioning system, a control unit performs a cold-storing mode where condensed water of the evaporator is frozen and cold quantity stored in condensed water of the evaporator is increased when the compressor operates. The control unit includes a first time determining unit for determining cold-storing possible time, based on cooling degree of the evaporator and air state sucked into the evaporator, for which the cold-storing mode is continuously performed. When a time for which the cold-storing mode is performed elapses the cold-storing possible time, the control unit stops the cold-storing mode and performs a defrosting mode for defrosting the evaporator. Thus, during the cold-storing mode, it prevents air flow amount passing through the evaporator from being decreased due to the frosting of the evaporator, so that cooling performance for the passenger compartment can be improved. Because the cold-quantity of the condensed water of the evaporator is mainly relative to the cooling degree of the evaporator and the air state sucked into the evaporator, frosting amount on the evaporator is accurately controlled by setting the cold-storing possible time. As a result, air flow decrease due to the frosting of the evaporator is restricted to within a predetermined range.

Preferably, the control unit includes a second time determining unit for determining a necessary defrosting time, based on cooling degree of the evaporator and air state sucked into the evaporator, for which the defrosting mode is continuously performed. When a time for which the defrosting mode is performed elapses the necessary defrosting time, the control unit stops the defrosting mode for defrosting the evaporator. During the defrosting mode of the evaporator, because a melting speed of frozen condensed water is mainly relative to the cooling degree of the evaporator and the air state sucked into the evaporator, the defrosting of the evaporator can be accurately controlled by setting the necessary defrosting time. Therefore, both air flow decrease due to insufficient defrosting and insufficient cold-storing due to over-defrosting are prevented.

BRIEF DESCRIPTION OF THE DRAWINGS

Additional objects and advantages of the present invention will be more readily apparent from the following detailed description of preferred embodiments when taken together with the accompanying drawings, in which:

FIG. 5 is a detail flow diagram of a main step in FIG. 2;

DETAILED DESCRIPTION OF THE PREFERRED EMBODIMENTS

First Preferred Embodiment

Figure 1:
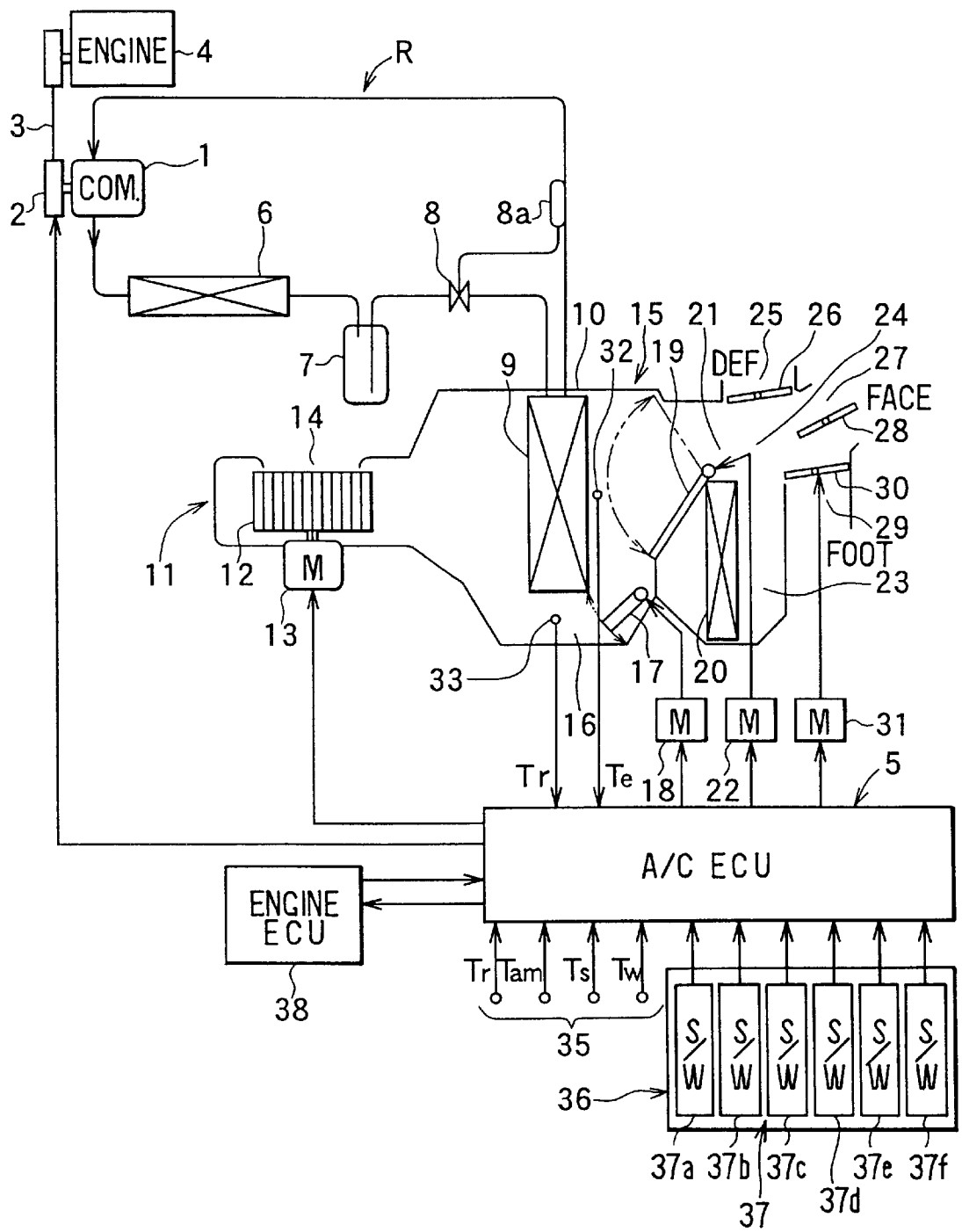
FIG. 1 is a schematic diagram showing a vehicle air-conditioning system according to a first preferred embodiment of the present invention.

FIG. 1 is a schematic view of the construction of a vehicle air-conditioning system according to a first preferred embodiment of the present invention. A refrigerant cycle R of the air-conditioning system has a compressor 1 for taking in, compressing and discharging refrigerant. The compressor 1 has an electromagnetic clutch 2 for power switching, and power from a vehicle engine 4 is transmitted to the compressor 1 via the electromagnetic clutch 2 and a belt 3.

Electric current supplying to the electromagnetic clutch 2 is switched by an air-conditioning electronic control unit (ECU) 5. When electrical current is passed through the electromagnetic clutch 2, the electromagnetic clutch 2 is turned on to drive the compressor 1. Conversely, when electrical current supplying to the electromagnetic clutch 2 is cut off, the electromagnetic clutch 2 is tuned off to stop the operation of the compressor 1.

High-temperature high-pressure superheated gas refrigerant discharged by the compressor 1 flows into a condenser 6, and the refrigerant is heat-exchanged with outside air blown by a cooling fan (not shown) in the condenser 6 to be cooled and condensed. Refrigerant condensed in the condenser 6 then flows into a receiver 7, and is separated into gas refrigerant and liquid refrigerant within the receiver 7 while excess refrigerant (liquid refrigerant) of the refrigerant cycle R is stored in the receiver 7.

Liquid refrigerant from the receiver 7 is reduced in pressure to a low pressure by an expansion valve (pressure-reducing unit) 8, and becomes in a low-pressure gas/liquid two-phase state. Low-pressure refrigerant from the expansion valve 8 flows into an evaporator (i.e., heat exchanger for cooling) 9. The evaporator 9 is disposed inside an air-conditioning case 10 of the vehicle air-conditioning system, and low-pressure refrigerant flowing into the evaporator 9 absorbs heat from air inside the air-conditioning case 10 and evaporates.

The expansion valve 8 is a thermal type expansion valve having a temperature-sensing part 8a for sensing the temperature of refrigerant at an outlet of the evaporator 9, and adjusts its valve opening degree (refrigerant flow) so that a degree of superheating of the refrigerant at the outlet of the evaporator 9 is maintained at a predetermined value. The refrigerant outlet of the evaporator 9 is connected to an intake side of the compressor 1, so that the constituent parts of the cycle mentioned above form a closed circuit.

In the air-conditioning case 10 a blower 11 is disposed on an upstream air side of the evaporator 9, and the blower 11 has a centrifugal blower fan 12 and a driving motor 13. Air from inside the passenger compartment (inside air) and/or air from outside the passenger compartment (outside air) is introduced into a suction port 14 of the centrifugal blower fan 12 through an inside/outside air switching box (not shown).

In the first embodiment, an air-conditioning unit 15 disposed on the downstream air side of the blower 11 is normally mounted behind a dash board at a front side of the passenger compartment, in an approximate central position in a width direction of the vehicle. The blower 11 is disposed to be shifted to a front passenger seat side with respect to the air-conditioning unit 15.

Inside the air-conditioning case 10, the evaporator 9 is disposed so as to extend in a vertical direction (i.e., up-down direction), and a first bypass passage 16 through which air bypasses the evaporator 9 is formed below the evaporator 9. A bypass door (parallel bypass door) 17 for adjusting an opening degree of the first bypass passage 16 is disposed, in the example shown in FIG. 1, on a downstream air side of and below the evaporator 9. The bypass door 17 is a rotational plate-like door and is driven by an electric driving device 18 such as a servo motor.

Still inside the air-conditioning case 10, an air-mixing door 19 is disposed on a downstream air side of the evaporator 9. A hot (warm) water type heater core (heat exchanger for heating) 20 for heating air passing therethrough with hot water (cooling water) from the vehicle engine 4 as a heating source is disposed on a downstream air side of the air-mixing door 19. A second bypass passage 21 is formed above the hot water type heater core 20. The second bypass passage 21 is for allowing air to bypass the hot water type heater core 20.

The air-mixing door 19 is a rotatable plate-like door and is driven by an electric driving device 22 such as a servo motor. The air-mixing door 19 adjusts the flow proportions of air passing through the hot water type heater core 20 and air passing through the second bypass passage 21. By adjustment of the flow proportions of air passing through the heater core 20 and air passing through the second bypass passage 21, temperature of air blown into the passenger compartment can be controlled. That is, in the first embodiment, the air-mixing door 19 constitutes temperature adjusting means, and the bypass door 17 performs the role of temperature adjusting means auxiliary to the air-mixing door 19.

A warm air passage 23 curving upward from the lower side of the heater core 20 is formed on a downstream air side of the heater core 20, and warm air from the warm air passage 23 and cool air from the second bypass passage 21 can be mixed in an air-mixing part 24 so that conditioned air having a desired temperature can be obtained.

Inside the air-conditioning case 10, an air outlet mode switching part is provided on a downstream air side of the air-mixing part 24. That is, a defroster opening 25 is formed on an upper surface of the air-conditioning case 10, and the defroster opening 25 directs air through a defroster duct (not shown) toward a front windshield of the vehicle. The defroster opening 25 is opened and closed by a rotatable plate-like defroster door 26.

A face opening 27 is formed rearward of the defroster opening 25 in the upper surface of the air-conditioning case 10, and the face opening 27 directs air through a face duct (not shown) toward the upper body of a passenger in a passenger compartment. The face opening 27 is opened and closed by a rotatable plate-like face door 28.

A foot opening 29 is formed below the face opening 27 in the air-conditioning case 10, and the foot opening 29 directs air through a foot duct (not shown) toward the feet area of the passenger in the passenger compartment. The foot opening 29 is opened and closed by a pivoting (rotatable) plate-like foot door 30.

The air outlet mode doors 26, 28, 30 are connected to a common link mechanism (not shown), and are driven via the link mechanism by an electric driving device 31 such as a servo motor.

The electronic control of the air-conditioning system according to the first embodiment will now be described briefly. Inside the air-conditioning case 10, an evaporator air temperature sensor (i.e., evaporator cooling detection means) 32 composed of a thermistor is disposed immediately behind an air outlet of the evaporator 9 and detects an evaporator air-outlet temperature Te. Also, a bypass air temperature sensor 33 consisting of a thermistor is disposed in the first bypass passage 16 and detects a temperature TB of air bypassing the evaporator 9.

Detection signals from the above-mentioned sensors 32 and 33 are inputted into the air-conditioning (A/C) ECU 5. Further, signals from a sensor group 35 for air-conditioning are also input into the air-conditioning ECU 5. For example, the sensor group 35 detects an inside air temperature Tr, an outside air temperature Tam, a solar radiation Ts, and a hot water temperature Tw. Also, a set of control switches 37 manually operated by a passenger is provided in an air-conditioning control panel 36 mounted in the dash board, and signals from these control switches 37 are also inputted into the air-conditioning ECU 5.

These control switches (S/W) 37 include a temperature setting switch 37a for setting a temperature Tset of the passenger compartment, a cold-storing switch 37b for setting a cold-storing mode, an air flow switch 37c for setting an air flow amount, an air outlet mode switch 37d for setting an air outlet mode, an inside/outside air switching switch 37e for generating an inside/outside air switching signal, and an air-conditioning switch 37f for setting an on/off operation position of the compressor 1.

Also, the air-conditioning ECU 5 is connected to a vehicle engine ECU 38, and signals such as a rotation speed signal of the vehicle engine 4 and a vehicle speed signal are inputted into the air-conditioning ECU 5 from the vehicle engine ECU 38.

The vehicle engine ECU 38 performs overall control of fuel injection quantity to the vehicle engine 4 and ignition timing and the like based on signals from a sensor group (not shown) detecting operating conditions of the vehicle engine 4. Also, in an eco-run vehicle or hybrid vehicle to which the invention can be preferably applied, when determining on the basis of the speed signal of the vehicle engine 4, the vehicle signal and a brake signal or the like that the vehicle is stationary, the vehicle engine ECU 38 automatically stops the vehicle engine 4 by stopping fuel injection, for example.

When the vehicle shifts from a stationary state to an advancing state by a driving operation of a driver, the vehicle engine ECU 38 determines the advancing state of the vehicle on the basis of an accelerator signal or the like and automatically causes the vehicle engine 4 to start. The air-conditioning ECU 5 estimates an amount of cold stored in water condensed on the evaporator 9 during running of the vehicle engine 4 or the evaporator air outlet temperature Te when the vehicle engine has been stopped, and outputs a signal permitting or prohibiting stoppage of the vehicle engine 4 based on the results of the estimation, or outputs a signal requesting restarting of the vehicle engine 4 based on a rise in the evaporator air outlet temperature Te after the vehicle engine 4 has been stopped.

The air-conditioning ECU 5 and the vehicle engine ECU 38 are made up of ordinary microcomputers each composed of a CPU, a ROM, a RAM and peripheral circuits thereof. The air-conditioning ECU 5 has a vehicle engine control signal output part for outputting vehicle engine control signals as described above, a compressor control part for controlling the compressor 1 through the electromagnetic clutch 2, an inside/outside air suction control part for controlling an inside/outside air switching door, a flow control part for controlling the blower 11, a temperature control part for controlling the bypass door 17 and the air-mixing door 19, and an air outlet mode control part for switching the openings 25, 27 and 29.

Figure 2:
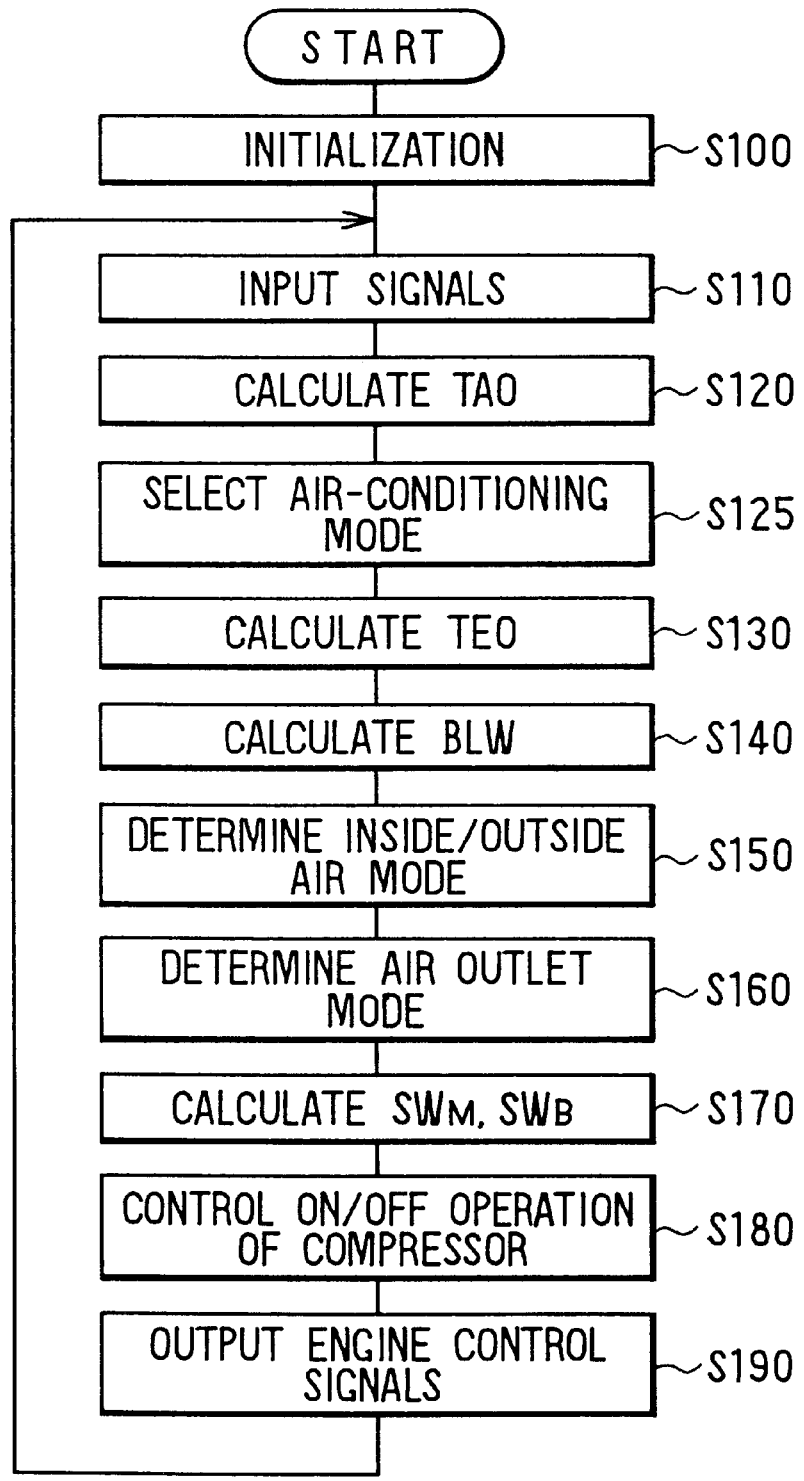
FIG. 2 is a flow diagram showing an operation control according to the first embodiment.

The operation of the vehicle air-conditioning system according to the first embodiment will now be described. The flow diagram of FIG. 2 schematically shows control processing performed by the microcomputer of the air-conditioning ECU 5. The control routine of FIG. 2 starts, when the air flow switch 37c (or an AUTO switch) among the control switches 37 of the air-conditioning control panel 36 is turned on when an ignition switch of the vehicle engine 4 is turned on and power is supplied to the air-conditioning ECU 5.

First, at step S100, initialization of flags and timers and so on is carried out. Then, at step S110, detection signals from the sensors 32 and 33 and the sensor group 35, operation signals from the control switches 37, and vehicle running. signals from the vehicle engine ECU 38 are input.

Next, at step S120, on the basis of the following expression Exp. 1, a target outlet temperature (TAO) of an air-conditioning air to be blown into the passenger compartment is calculated. The target outlet temperature (TAO) is temperature needed to maintain the passenger compartment at a set temperature Tset set by the temperature setting switch 37a.

$$TAO = K_{set} \times T_{set} - K_r \times T_r - K_{am} \times T_{am} - K_s \times T_s + C \qquad \text{Exp. 1}$$

where

"Tr" is inside air temperature detected by an inside air temperature sensor of the sensor group 35;

"Tam" is outside air temperature detected by an outside air temperature sensor of the sensor group 35;

"Ts" is solar radiation detected by a solar radiation sensor of the sensor group 35;

"Kset", "Kri", "Kam" and "Ks" are control gains; and

"C" is constant for correction.

Next, at step S125, an air-conditioning mode is selected to be one of a cold-storing mode, a cold-releasing mode, or a normal mode. In the first embodiment, when the cold-storing switch 37b is turned on during running of the engine 4 (and the compressor 1), the cold-storing mode is selected, and when the cold-storing switch 37b is not turned on during running of the engine 4 (and the compressor 1), the normal mode is selected. When the engine 4 has been stopped and the compressor 1 is consequently stopped during air-conditioning operation (operation of the blower 11), the cold-releasing mode is selected.

Then, at step S130, a target evaporator air outlet temperature TEO is calculated. The target evaporator air outlet temperature TEO is calculated on the basis of a first target evaporator air outlet temperature TEO1, a second target evaporator air outlet temperature TEO2, and a third target evaporator air outlet temperature TEO3, which will be discussed next.

Figure 3:
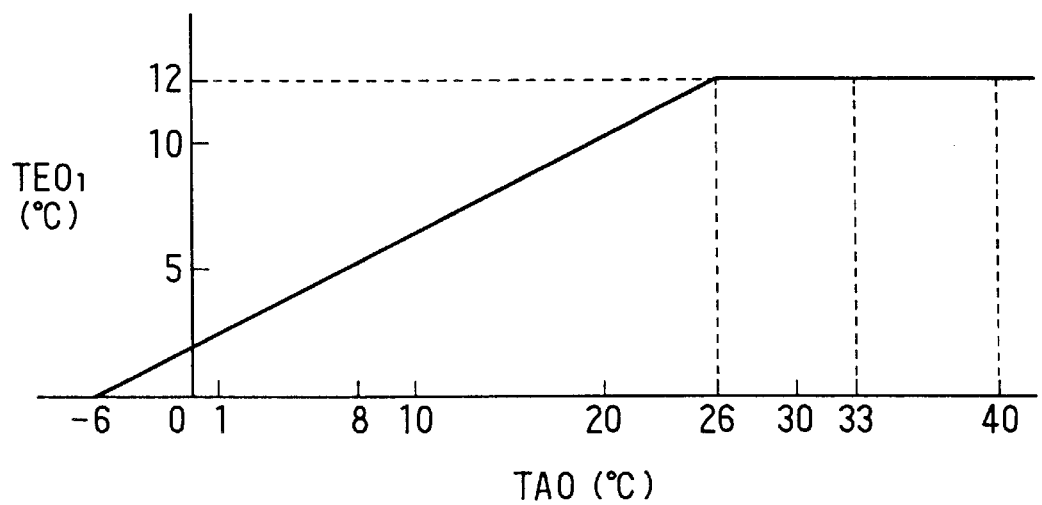
FIG. 3 is a graph showing the relationship between a first target evaporator air outlet temperature TEO1 and a target outlet temperature TAO of air blown into a passenger compartment, according to the first embodiment.

First, the method for determining the first target evaporator air outlet temperature TEO1 will be described. FIG. 3 is a preset map stored in the ROM of the microcomputer. The first target evaporator air outlet temperature TEO1 is determined based on the map of FIG. 3 so that the TEO1 becomes higher as the TAO is higher. Thus, it can be written that TEO1=f(TAO). In the first embodiment of the present invention, TEO1 has an upper limit of 12° C., for example.

Figure 4:
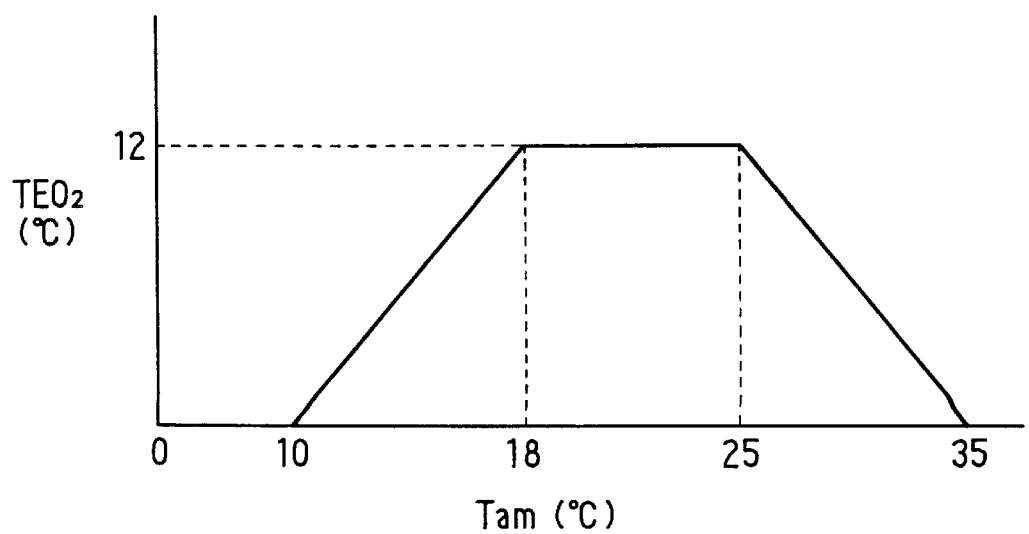
FIG. 4 is a graph showing the relationship between a second target evaporator air outlet temperature TEO2 and an outside air temperature Tam, according to the first embodiment.

The second target evaporator air outlet temperature TEO2 also is determined on the basis of a preset map, shown in FIG. 4, stored in the ROM of the microcomputer. The second target evaporator air outlet temperature TEO2 is determined in accordance with the outside air temperature Tam. As shown in FIG. 4, because the need for cooling and dehumidification diminishes in a medium temperature region of the outside air temperature Tam (e.g., 18° C.–25° C.), the second target evaporator air outlet temperature TEO2 is set to be higher (e.g., 12° C.), so that the operation rate of the compressor 1 is reduced and consumption power on the engine 4 is reduced.

On the other hand, when the outside air temperature Tam exceeds 25° C. in summer, the second target evaporator air outlet temperature TEO2 is reduced in inverse proportion to rising of the outside air temperature Tam, so that cooling capacity for the passenger compartment can be secured. Further, when the outside air temperature Tam is lower than 18° C., to secure dehumidifying capacity for preventing fogging of the windows, the second target evaporator air outlet temperature TEO2 is reduced with decreasing of the outside air temperature Tam. And when the outside air temperature Tam becomes below 10° C., the second target evaporator air outlet temperature TEO2 becomes 0° C. Thus, $TEO_2$ can be expressed as f(Tam).

The third target evaporator air outlet temperature TEO3 is set to a predetermined value below freezing point Tf (e.g., −2° C.) when the cold-storing switch 37b is turned on.

In the normal mode (not the cold-storing mode) during operation of the vehicle engine, on the basis of the first and second target evaporator air outlet temperatures TEO1, TEO2, a target evaporator air outlet temperature TEO is finally determined in accordance with the following expression Exp. 2.

$$TEO=MIN\{f(TAO),f(Tam)\} \quad \text{Exp. 2}$$

That is, among the first target evaporator air outlet temperature TEO1=f(TAO) and the second target evaporator air outlet temperature TEO2=f(Tam), the lower temperature is finally set as the target evaporator air outlet temperature TEO. On the other hand, in the cold-storing mode when the cold-storing switch 37b is turned on, the target evaporator air outlet temperature TEO is forcibly lowered to the predetermined value below freezing point Tf.

Then, at step S140 in FIG. 2, a target air-blowing amount BLW blown by the blower 11 is calculated based on the above-mentioned TAO. That is, on the high-temperature side (maximum heating side) and the low-temperature side (maximum cooling side) of the above-mentioned TAO, the target air-blowing amount BLW is made large. On the other hand, in a medium temperature area of TAO, the target air-blowing amount BLW is made small. The rotation speed of the driving motor 13 of the blower 11 is controlled by an output of the air-conditioning ECU 5 so that the target air-blowing amount BLW is obtained.

Then, at step S150, an inside/outside air mode is determined in correspondence with TAO. The inside/outside air mode is switched from an entire inside air mode to an inside/outside air mixing mode and then to an entire outside air mode as TAO rises from a low temperature side to a high temperature side. The position of an inside/outside air door (not shown) is controlled by an output of the air-conditioning ECU 5 so that an inside/outside air mode corresponding to the target air temperature TAO is obtained.

Then, at step S160, an air outlet mode is determined in accordance with the calculated TAO. The air outlet mode is switched in a known fashion from a face mode to a bi-level mode and then to a foot mode as TAO rises from the low temperature side to the high temperature side. The positions of the air outlet mode doors 26, 28, 30 are controlled by an output of the air-conditioning ECU 5 through the electric driving device 31 so that an air outlet mode corresponding to the TAO is obtained.

At step S170, a target opening degree (target aperture) $SW_M$ of the air-mixing door 19 and a target opening degree (target aperture) $SW_B$ of the bypass door 17 are calculated, and rotation positions of the air-mixing door 19 and the bypass door 17 are determined. The step S170 will be discussed later in detail with reference to FIG. 5.

Then, at step S180, the target evaporator air outlet temperature TEO and the actual evaporator air outlet temperature Te are compared, and on/off operation control of the compressor is performed. That is, when the detected evaporator air outlet temperature Te becomes lower than the target evaporator air outlet temperature TEO, the air-conditioning ECU 5 interrupts electrical current supplying to the electromagnetic clutch 2 and thereby stops the operation of the compressor 1. Conversely, when the evaporator air outlet temperature Te rises above the target evaporator air outlet temperature TEO, the air-conditioning ECU 5 supplies current to the electromagnetic clutch 2 and thereby operates the compressor 1. In the way, the evaporator air outlet temperature Te is kept at the target evaporator air outlet temperature TEO. During normal control, by the evaporator air outlet temperature Te being controlled in accordance with TAO and the outside air temperature Tam, frosting of the evaporator 9 is prevented, cooling and dehumidifying capacity are secured, and the power consumption of the vehicle engine 4 can be reduced by reducing the compressor operation rate.

In the cold-storing mode, by the target evaporator air outlet temperature TEO being lowered to the predetermined value below freezing point Tf, condensed water in the evaporator 9 is made to freeze, and an increased amount of cold is thereby stored in the condensed water on the evaporator 9.

Next, at step S190, vehicle engine control signals such as the signals of the above-mentioned stoppage permission or stoppage prohibition of the engine 4 and the signal of a restart request after stoppage of the engine 4 are outputted based on the air-conditioning conditions.

FIG. 5 shows the details of step S170 in FIG. 2. First, at step S1701, it is determined whether or not the system is in the cold-storing mode, the cold-releasing mode or a power-saving mode. Here, the cold-storing mode, as mentioned above, is a state wherein the cold-storing switch 37b is turned on and the target evaporator air outlet temperature TEO is lowered to the predetermined value below freezing point Tf. The cold-releasing mode is a state wherein while the cold-storing switch 37b is turned on, the vehicle has halted for example at a traffic signal, a signal requesting stoppage of the engine 4 has been outputted from the vehicle engine ECU 38, and the engine 4 (and hence the compressor 1) has consequently stopped. That is, during the cold-releasing mode, the compressor 1 has stopped but air is cooled in the evaporator 9 by a cold-releasing action of stored cold in condensed water on the evaporator 9.

The power-saving mode is a state wherein the high-temperature side target temperature of 12° C. set for the medium-temperature region of outside air temperature Tam= 18° C.–25° C. shown in the characteristic chart in FIG. 4 is set as the target evaporator air outlet temperature TEO.

When the system is in neither the cold-storing mode, the cold-releasing mode nor the power-saving mode (i.e. when it is in the normal mode), processing proceeds to step S1702 and sets the target opening degree $SW_B$ of the bypass door 17 to zero and thereby operates the bypass door 17 to the position in which it fully closes the first bypass passage 16. Processing then proceeds to step S1703 and calculates the target opening degree $SW_M$ of the air-mixing door 19 using the following expression Exp. 3.

$$SW_M = J(Te, Tw, TAO) \hspace{2cm} \text{Exp. 3}$$

That is, $SW_M$ is calculated as a function of the evaporator air outlet temperature Te, the hot water temperature Tw of the heater core 20, and the target outlet temperature TAO. Therefore, a target opening degree $SW_M$ for obtaining the target outlet temperature TAO is calculated. Here, the target opening degree $SW_M$ is calculated as a percentage. That is, the maximum cooling position in which the air passage of the heater core 20 is fully closed is set to 0%, and the maximum heating position in which the second bypass passage 21 is fully closed is set to 100%.

The temperature control of the above-mentioned steps S1702 and S1703 is normal control. During the normal control, after the entire blown-air passes through the evaporator 9 and is cooled by the evaporator 9, the flow proportions of air passing through the heater core 20 and air passing through the second bypass passage 21 are adjusted by the opening degree of the air-mixing door 19 so that the temperature of air flowing into the passenger compartment approaches the target outlet temperature TAO. In the first embodiment, a third control mode of the present invention is constituted by the steps S1702 and S1703.

Next, when at step S1701 it is determined that the system is in the cold-storing mode, processing proceeds to step S1704 and calculates a maximum temperature of mixed air TMmax made up of air passing through the evaporator 9 and air passing through the first bypass passage 16, based on the temperature TB of bypass air (non-cooled) passing through the first bypass passage 16 and the exit air temperature Te of the evaporator 9. That is, TMmax is calculated according to the following expression Exp. 4.

$$TM_{max} = F(Te, TB) \hspace{2cm} \text{Exp. 4}$$

Then, at step S1705, the maximum temperature TMmax of mixed air and the target outlet temperature TAO are compared. When TMmax is higher than the target outlet temperature TAO, because heating by means of the heater core 20 is unnecessary, processing proceeds to step S1706 and sets the target opening degree $SW_M$ of the air-mixing door 19 to 0 (%), and thereby the air-mixing door 19 is operated to the maximum cooling position (the position shown by the solid line in FIG. 1).

Then, at step S1707, a target opening degree $SW_B$ of the bypass door 17 is calculated based on the following expression Exp. 5.

$$SW_B = H(Te, TB, TAO) \hspace{2cm} \text{Exp. 5}$$

That is, $SW_B$ is calculated as a function of the evaporator air outlet temperature Te, the bypass air temperature TB of air passing through the first bypass passage 16, and the target outlet temperature TAO. Further, the bypass door 17 is operated to the position of a target opening degree $SW_B$ for obtaining the target outlet temperature TAO. Here, the target opening degree $SW_B$ is calculated as a percentage. That is, the fully closed position of the first bypass passage 16 is set to 0% and the fully open position of the first bypass passage 16 is set to 100%.

In the way, when control is carried out in accordance with steps S1706 and S1707, the air-mixing door 19 is fixed in its maximum cooling position and the bypass door 17 is operated to a target opening degree $SW_B$, so that the temperature of air blown into the passenger compartment can be controlled. As a result, an effect of increasing the cold-storing amount in condensed water of the evaporator 9 during the cold-storing mode and an effect of lightening the compressor driving power load (a power-saving effect) can be achieved at the same time.

Figure 6A:
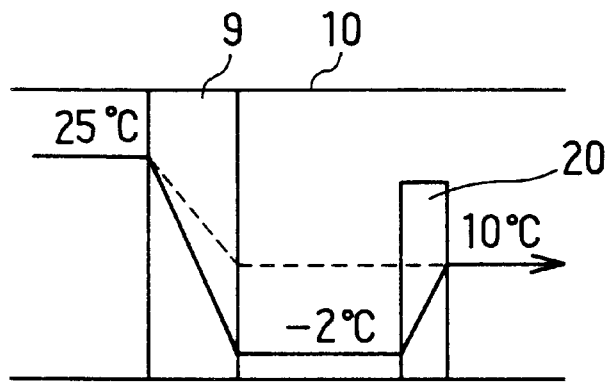
FIGS. 6A, 6B are views for explaining the relationships between an increase of cold-storing amount of condensed water and power-saving effect, according to the first embodiment.
Figure 6B:
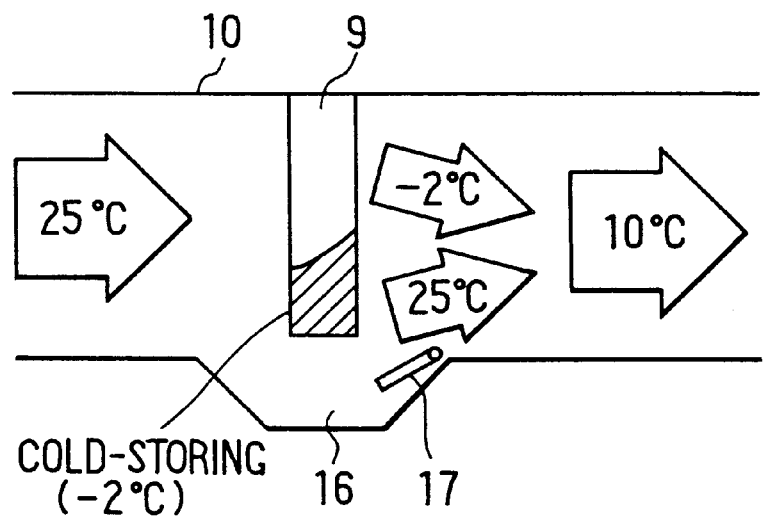

FIGS. 6A and 6B are views illustrating the power-saving effect of the preferred embodiment. FIG. 6A is a schematic view illustrating control of the temperature of air blown into the passenger compartment when a cold-storing mode is combined with an ordinary series air-mixing configuration. That is, in FIG. 6A, after the entire amount of air taken in at 25° C. is cooled by the evaporator 9 to −2° C. for cold-storing, air at 10° C. is produced by the air being reheated by the heater core 20. Therefore, it is compared to a case wherein the evaporator air outlet temperature is controlled to 10° C. by power-saving control from the start, as shown by the dashed line in FIG. 6A, it is necessary for the cooling capacity of the evaporator 9 to be increased. Therefore, the compressor operation rate arising from on/off control of the compressor 1 becomes higher, and there is a consequent increase in the compressor driving power load.

FIG. 6B, on the other hand, is a schematic view illustrating control of the temperature of air blown into the passenger compartment with the parallel air-mixing configuration of the first embodiment. Here, air at 10° C. blown into the passenger compartment is produced by mixing non-cooled air at 25° C. passing through the first bypass passage 16 and cool air at −2° C. passing through the evaporator 9.

In the first embodiment of the present invention, because the air amount passing through the evaporator 9 decreases by the amount of the bypass air passing through the first bypass passage 16, compared to the configuration shown in FIG. 6A, the cooling capacity of the evaporator 9 necessary for cooling the evaporator air outlet temperature Te of the evaporator 9 to the target evaporator air outlet temperature TEO (Tf=−2° C.) can be reduced by an air amount corresponding to the decrease in flow. As a result, the compressor operation rate arising from on/off control of the compressor 1 can be reduced and power can be saved. Therefore, compared to the case shown in FIG. 6A, it is possible to achieve both improvements in cold-storing effect and in power-saving effect at the same time.

In the first embodiment, the first control mode of the invention is constituted by the steps S1706 and S1707.

Next, when the target outlet temperature TAO of air blown into the passenger compartment is higher than the maximum temperature TMmax of mixed air at step S1705, the reheating operation by the heater core 20 is necessary, and processing proceeds to step S1708. At step S1708, the target opening degree $SW_B$ of the bypass door 17 is set to 100 (%), and the bypass door 17 is operated to the fully-opening position at which it fully opens the first bypass passage 16. Then, at step S1709, a target opening degree $SW_M$ of the air-mixing door 19 is calculated based on the following expression Exp. 6.

$$SW_M = G(TM_{max}, Tw, TAO) \qquad \text{Exp. 6}$$

That is, because the mixed air at the maximum temperature $TM_{max}$ is divided by the air-mixing door 19 between the heater core 20 and the second bypass passage 21, SWM is calculated as a function of the maximum temperature TMmax of the mixed air on the immediately downstream side of the evaporator 9, the hot water temperature Tw of the heater core 20 and the target outlet temperature TAO. Further, the air-mixing door 19 is operated to the position of the target opening degree $SW_M$ for obtaining the target outlet temperature TAO.

In the control at steps S1708, S1709, the bypass door 17 is operated to fully open the first bypass passage 16 and to reduce the flow amount of air passing through the evaporator 9, so that the power-saving effect is also obtained.

In the first embodiment, the second control mode of the invention is constituted by the above-mentioned steps S1708 and S1709.

The temperature control of steps S1704 through S1709 described above is also performed when the system is determined to be in the cold-releasing mode at step S1701, i.e. when the vehicle is halted and the vehicle engine (and hence the compressor) is stopped and air is being cooled by cold-releasing of cold stored in the condensed water on the evaporator 9. Even in the cold-releasing mode, because the flow amount of air passing through the evaporator 9 is reduced by increasing air passing through the first bypass passage 16, it is possible to extend the time over which cold stored in the condensed water on the evaporator 9 is released, compared to the case shown in FIG. 6A.

Therefore, the cooling feeling obtained during vehicle engine stoppages at traffic signals and so on can be maintained well for a long time with the cold-storing amount in the condensed-water on the evaporator 9. Further, when the system is determined to be in the power-saving mode at step S1701, the temperature control of steps S1704 through S1709 described above is also carried out. In the power-saving mode also, power-saving is achieved by a reduction in the flow amount of air passing through the evaporator 9.

Modifications to First Preferred Embodiment

The first embodiment can be modified in various ways. For example, in the first embodiment described above, a cold-storing switch 37b for generating a cold-storing mode signal is provided as one of the control switches 37 on the air-conditioning control panel 36, and the cold-storing mode is set by turning on the cold-storing switch 37b. However, the invention is not limited to the control method, and the cold-storing mode can be set automatically on the basis of air-conditioning operation conditions. For example, the cold-storing mode could be set automatically on the basis of variation in the target outlet temperature TAO. The target outlet temperature TAO is calculated to be a very low temperature such as −20° C. or below at times such as during initial cool-down of the passenger compartment immediately after the start of cooling or in a case where the cooling load is high. Therefore, when the target outlet temperature TAO is extremely low, normal control may be carried out instead of the cold-storing mode, to obtain the maximum cooling capacity for the passenger compartment.

On the other hand, when the target outlet temperature TAO rises to a predetermined level (for example over −20° C.), it may be inferred that the system is shifted to a normal cooling load state, and the cold-storing mode may be automatically set. Further, the cold-storing mode may be generally set when the engine 4 (specifically, the compressor 1) is running, and then normal control (the normal control mode) is set during running of the engine 4 (the compressor 1) only when it is determined that a condition for prohibiting the cold-storing mode is established.

In intermediate seasons such as the spring and the autumn, under conditions of a high dehumidifying capacity (for example, when with the system in the inside air mode there are a large number of passengers in the vehicle), the target evaporator air outlet temperature TEO is set to a relatively low temperature to raise the dehumidifying (i.e. cooling) capacity of the evaporator 9, and the target outlet temperature TAO is increased to control the temperature inside the passenger compartment. Under the conditions where a particularly high dehumidifying capacity is requested, even if the system is in the cold-storing mode or the cold-releasing mode, the bypass door 17 may be fixed to the fully closed position, and control of the air temperature blown into the passenger compartment may be performed by adjusting the amount of air passing through the heater core 20 by using the air-mixing door 19.

Although in the first embodiment of the present invention, during the cold-storing mode, the target evaporator air outlet temperature TEO is lowered to a low temperature below freezing point such as −2° C. to achieve an improvement in cold-storing effect, alternatively, in the cold-storing mode, the target evaporator air outlet temperature TEO may be lowered to a temperature lower than its minimum temperature at times of normal control (for example 3° C.) but higher than 0° C. (for example 1° C.) to achieve an improvement in cold-storing effect.

In the first embodiment of the present invention, the first bypass passage 16 and the bypass door 17 are disposed on the lower side of the evaporator 9. However, the first bypass passage 16 and the bypass door 17 can alternatively be disposed on either or both of the right and left sides or on the upper side of the evaporator 9. Also, the bypass door 17 can be disposed on the downstream air side of the evaporator 9, and can alternatively be disposed on the upstream air side of the evaporator 9.

Second Preferred Embodiment

The following second preferred embodiment relates to a detecting unit for detecting the evaporator cooling degree.

Experimental studies carried out by the present inventors have shown that when water condensed on the evaporator 9 is made to freeze in order to store cold during the cold-storing mode, the formation of ice on the surface on the evaporator 9 tends for various reasons to be nonuniform. Consequently, on the air outlet side of the evaporator 9, because the flow of air is obstructed by the ice in places where there is ice, the air temperature is lower than that in places where there is no ice.

Therefore, when the evaporator cooling degree is detected by the evaporator air temperature sensor 32 which is normally used, large differences arise in the detected temperature among different detections on the air outlet side of the evaporator 9, and the frosting more than necessary is performed on the evaporator 9.

Figure 7A:
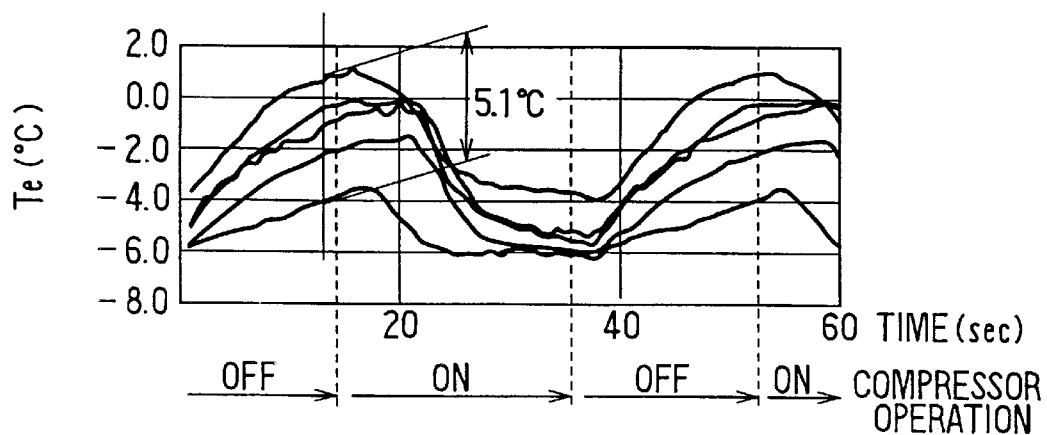
FIGS. 7A, 7B, 7C are graphs showing temperature differences of detected evaporator temperatures with an on/off operation of a compressor, according to a second preferred embodiment of the present invention.
Figure 7B:
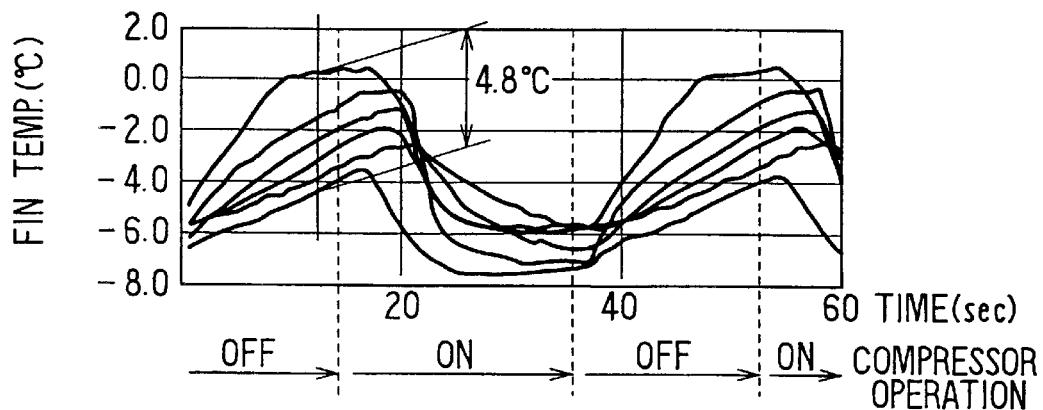
Figure 7C:
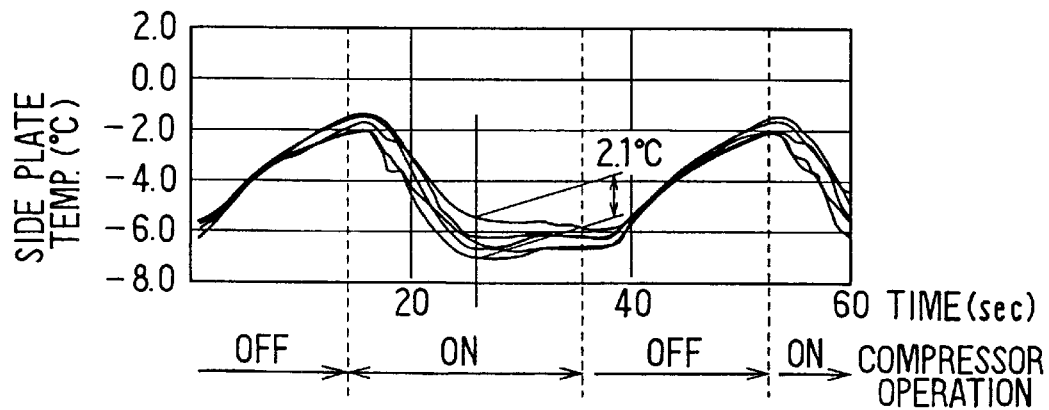

FIGS. 7A–7C are views of experimental data showing behavior of evaporator temperature with on/off operation of the compressor 1. In FIGS. 7A–7C, the horizontal axis indicates on/off operation of the compressor 1, and time (sec) for performing the on/off operation of the compressor 1. As shown in FIG. 7A, when the evaporator air outlet temperature Te is detected, a maximum detected temperature difference of 5.1° C. arises among five different detection sites.

Further, as shown in FIG. 7B, when the evaporator fin temperature is detected, a maximum detected temperature difference of 4.8° C. arises among six different detection sites.

On the other hand, when the evaporator refrigerant temperature (temperature on a surface of the side plate) is detected, as shown in FIG. 7C, it is found that the maximum detected temperature difference among four detection sites can be kept to not more than 2.1° C.

Figure 8:
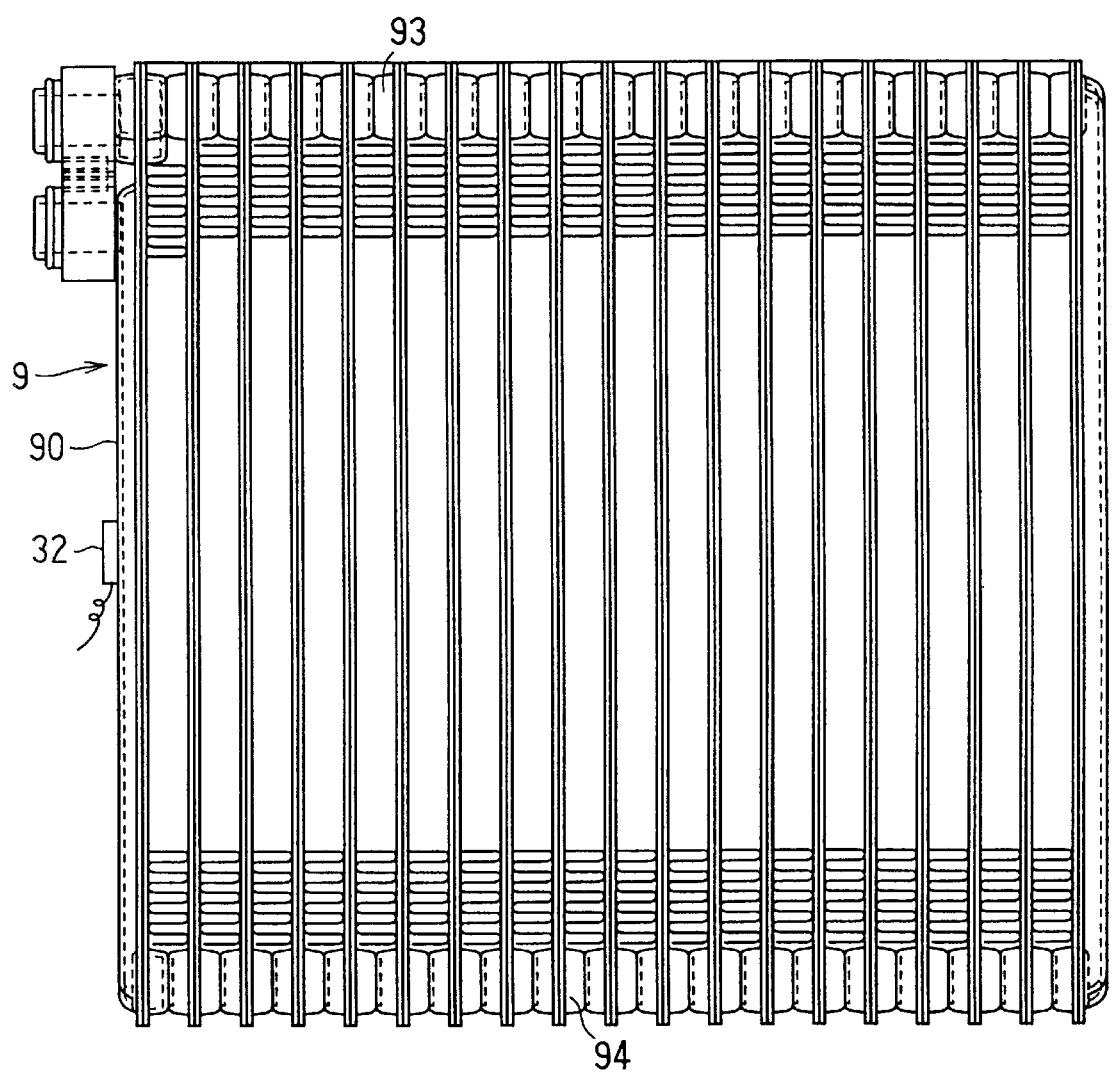
FIG. 8 is a schematic front view of an evaporator, for explaining an arrangement position of a temperature sensor according to the second embodiment.

Thus, in the second embodiment of the present invention, a temperature sensor 32 is disposed in contact with a side plate 90 forming a side refrigerant passage of the evaporator 9, as shown in FIG. 8. Because the side plate 90 is made of a metal such as aluminum having a sufficient thermal conductivity, the evaporator refrigerant temperature can be detected effectively by the temperature sensor 32 through the wall of the side plate 90.

Figure 9:
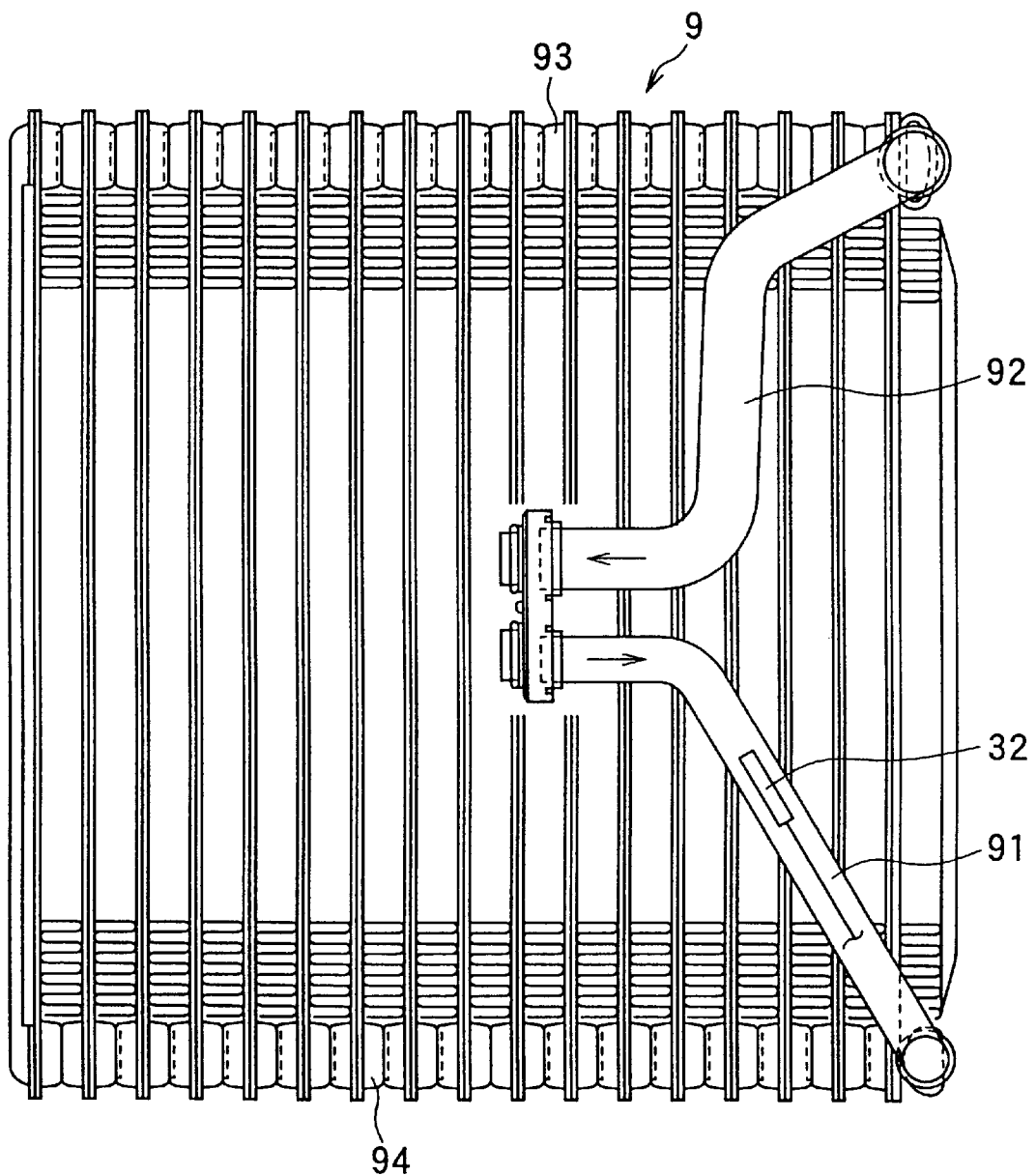
FIG. 9 is a schematic front view of an evaporator, for explaining an another arrangement position of a temperature sensor according to the second embodiment.

FIG. 9 shows an example wherein the temperature sensor 32 is mounted in contact with a refrigerant inlet pipe 91 of the evaporator 9 to detect the evaporator refrigerant temperature. Here, the temperature sensor 32 may alternatively be mounted on a refrigerant outlet pipe 92, or on a tank part 93 or 94, of the evaporator 9. In short, it is sufficient if the temperature sensor is mounted in a location where it can directly detect the evaporator refrigerant temperature. cl Third Preferred Embodiment The following third preferred embodiment has the object of making the control described in the first preferred embodiment more specific and showing how the mixed air temperature TM between air having passed through the evaporator 9 and air having passed through the bypass passage 16 can be calculated accurately and how simultaneously an increase in the precision of control of the temperature of air blown into the passenger compartment can be achieved. The overall construction of the third preferred embodiment and the overall flow of control therein are the same as those of the first preferred embodiment shown in FIG. 1 and FIG. 2 and therefore will not be described again here.

Figure 10:
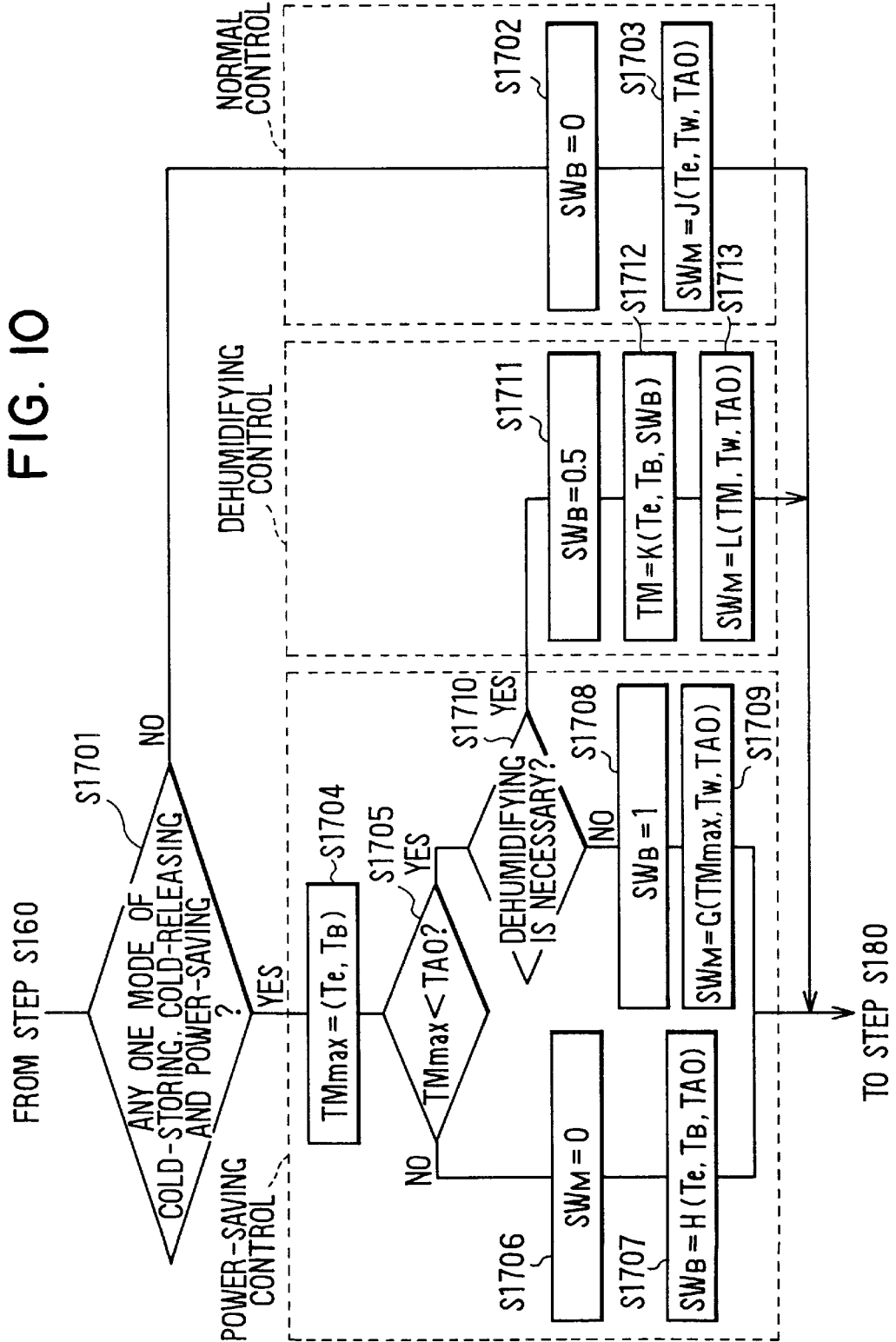
FIG. 10 is a flow diagram showing a main operation control according to a third preferred embodiment of the present invention.

FIG. 10 is a flow diagram showing a characteristic feature of the third preferred embodiment, and corresponds to FIG. 5 of the above-described first embodiment. Here, the calculations of the target opening degree $SW_M$ of the air-mixing door 19 and the target opening degree $SW_B$ of the bypass door 17 carried out at step S170 in the third preferred embodiment will be described in detail based on the flow diagram shown in FIG. 10.

First, formulas for calculating the target opening degree $SW_M$ of the air-mixing door 19 and the target opening degree $SW_B$ of the bypass door 17 will be discussed. The target opening degree $SW_M$ of the air-mixing door 19 is calculated using the following Exp. 7.

$$SW_M = (TAO - TM)/(Tw - TM) \qquad \text{Exp. 7}$$

where, TAO is the target outlet temperature of air blown into the passenger compartment, TM is temperature of mixture of air from the evaporator 9 and air from the bypass passage 16, and Tw is temperature of hot water flowing into the heater core 20.

The target opening degree $SW_M$ of the air-mixing door 9 is calculated as a percentage. That is, at the maximum cooling position in which the air passage of the heater core 20 is fully closed, the target opening degree $SW_M$ of the air-mixing door 9 is set to 0%. Further, at the maximum heating position in which the second bypass passage 21 is fully closed, the target opening degree $SW_M$ of the air-mixing door 9 is set to 100%. For the calculation of the target opening degree $SW_M$ of the air-mixing door 19 using Exp. 7, it is necessary to calculate the mixed air temperature TM.

Next, using the thinking behind the calculation of the target opening degree $SW_M$ of the air-mixing door 19 with Exp. 7, a target opening degree $SW_B$ of the bypass door 17 is calculated using the following expression Exp. 8.

$$SW_B = K(TM - Te)/(T_B - Te) \qquad \text{Exp. 8}$$

where TM is temperature of mixture of air from evaporator 9 and air from bypass passage 16, Te is the evaporator air outlet temperature, $T_B$ is temperature (bypass air temperature) of air passing through the bypass passage 16, and K is constant determined by a shape of the air-conditioning case 10.

Here, the target opening degree $SW_B$ of the bypass door 17 is calculated as a percentage in which the fully let closed position of the first bypass passage 16 is set to 0% and the fully open position of the first bypass passage 16 is set to 100%.

The mixed air temperature TM between air from the evaporator 9 and air from the bypass passage 16 can be calculated using the following expression Exp. 9, which is derived from Exp. 8.

$$TM = Te + [SW_B(T_B - Te)]/K \qquad \text{Exp. 9}$$

where Te is the evaporator air outlet temperature, $T_B$ is the temperature of air passing through the bypass passage 16, $SW_B$ is the target opening degree of the bypass door 17, and K is the constant determined by the shape of the air-conditioning case 10.

The constant K in Exp. 9 determined by the shape of the air-conditioning case 10 is calculated as a constant dependent on the flow amount $V_E$ of air passing through the evaporator 9 and the flow amount $V_B$ of air passing through the bypass passage 16 when the bypass door 17 is fully opened ($SW_B = 1$), using the following expression Exp. 10.

$$K = (V_E + V_B)/V_B \qquad \text{Exp. 10}$$

For example, if the flow amount of air passing through the evaporator 9 is equal to the flow amount of air passing through the bypass passage 16 (VE:VB=1:1) when the bypass door is fully opened, the constant K is equal to 2 (i.e., K=2).

Specific control of the air-conditioning system according to the third embodiment will now be described with reference to FIG. 10. In FIG. 10, steps similar to those in FIG. 5 are indicated with the same step numbers.

First, at step S1701, it is determined whether or not the system is in the cold-storing mode, the cold-releasing mode or a power-saving mode. Here, the cold-storing mode, as mentioned above, is a state wherein the cold-storing switch 37b is turned on and the target evaporator air outlet temperature TEO is lowered to the predetermined value below freezing point Tf. The cold-releasing mode is a state wherein, with the cold-storing switch 37b turned on, the vehicle is halted for example at a traffic signal, a signal requesting stoppage of the engine 4 has been outputted from the vehicle engine ECU 38, and the engine 4 (and hence the compressor 1) is consequently stopped. That is, during the cold-releasing mode, the compressor 1 is stopped but air is cooled in the evaporator 9 by a cold-releasing action of stored cold in condensed water on the evaporator 9.

The power-saving mode is a state wherein the high-temperature side target temperature of 12° C. set for the medium-temperature region of outside air temperature Tam=18° C.–25° C. is set as the target evaporator air outlet temperature TEO.

When the system is in neither the cold-storing mode, the cold-releasing mode nor the power-saving mode (i.e. when it is in the normal mode), processing proceeds to step S1702 and sets the target opening degree $SW_B$ of the bypass door 17 to zero and thereby operates the bypass door 17 to the position in which it fully closes the first bypass passage 16. Processing then proceeds to step S1703 and calculates the target opening degree $SW_M$ of the air-mixing door 19 using the expression Exp. 7 given above.

Because the target opening degree $SW_B$ of the bypass door 17 is zero during the normal control, the mixed air temperature TM between air from the evaporator 9 and air from the bypass passage 16 is equal to the evaporator air outlet temperature Te, and the target opening degree $SW_M$ of the air-mixing door 19 is calculated as a function of the evaporator air outlet temperature Te, the hot water temperature Tw of the heater core 20 and the target outlet temperature TAO using the following expression Exp. 11.

$$SW_M = J(Te, Tw, TAO) \qquad \text{Exp. 11}$$

The temperature control of the above-mentioned steps S1702 and S1703 is normal control, in which after the entire flow amount of blown air passes through and is cooled by the evaporator 9, the flow proportions of air passing through the heater core 20 and air passing through the second bypass passage 21 are adjusted with the opening degree of the air-mixing door 19 so that the temperature of air entering the passenger compartment approaches the target outlet temperature TAO. In the third embodiment, the third control mode of the present invention is constituted by the steps S1702 and S1703 described above.

Next, when at step S1701 it is determined that the system is in the cold-storing mode, processing proceeds to step S1704 and calculates a maximum temperature TMmax of mixed air made up of air passing through the evaporator 9 and air passing through the first bypass passage 16, based on the temperature TB of bypass air (non-cooled air) passing through the first bypass passage 16 and the air temperature Te passing through the evaporator 9.

At this time, the target opening degree $SW_B$ of the bypass door 17 is set to 1 (the fully open position of the bypass door 17), and TMmax is calculated using the following expression Exp. 12.

$$TMmax = F(Te, TB) \qquad \text{Exp. 12}$$

Then, at step S1705, the maximum temperature TMmax of mixed air and the target outlet temperature TAO of air blown into the passenger compartment are compared. When TMmax is higher than the target outlet temperature TAO, because reheating by means of the heater core 20 is unnecessary, processing proceeds to step S1706 and sets the target opening degree $SW_M$ of the air-mixing door 19 to 0 (%), and thereby fixes the air-mixing door 19 at its maximum cooling position (the position in which it is shown with solid lines in FIG. 1).

Then, at step S1707, a target opening degree $SW_B$ of the bypass door 17 is calculated based on the following expression Exp. 13.

$$SW_B = H(Te, TB, TAO) \qquad \text{Exp. 13}$$

That is, $SW_B$ is calculated as a function of the evaporator air outlet temperature Te, the bypass air temperature TB of air passing through the first bypass passage 16, and the target outlet temperature TAO of air blown into the passenger compartment. Further, the bypass door 17 is operated to the position of a target opening degree $SW_B$ for obtaining the target outlet temperature TAO.

In the way, when control is carried out in accordance with steps S1706 and S1707, the temperature of air blown into the passenger compartment can be controlled by the air-mixing door 19 being fixed in its maximum cooling position and the bypass door 17 being operated to a target opening degree $SW_B$. As a result, an effect of increasing the amount of cold stored in condensed water on the evaporator 9 during the cold-storing mode and an effect of lightening the compressor driving power load (a power-saving effect) can be achieved at the same time.

In the third embodiment, the first control mode of the present invention is constituted by the above-mentioned steps S1706 and S1707.

Next, at step S1705, when the target outlet temperature TAO is determined to be higher than the maximum temperature TMmax of mixed air between air from the evaporator 9 and air from the first bypass passage 16, heating operation due to the heater core 20 is necessary.

In this case, processing firstly proceeds to step S1710 and it is determined whether or not dehumidifying control for preventing fogging of the windows or the like is necessary. Specifically, dehumidifying control is carried out when the air outlet mode is the defroster mode. Further, even when the air outlet mode is not the defroster mode, because it may be determined that dehumidification is necessary if conditions are such that fogging of the windows is liable to occur or the humidity is high, it is also determined that dehumidification is necessary when for example the outside air temperature Tam is below a predetermined temperature (for example 10° C.).

When it is determined that dehumidification is unnecessary at step S1701, processing proceeds to step S1708 and sets the target opening degree $SW_B$ of the bypass door 17 to 100 (%) and fixes the bypass door 17 in the position in which it fully opens the first bypass passage 16. Then, at step S1709, a target opening degree $SW_M$ of the air-mixing door 19 is calculated using the following expression Exp. 14. At the time, because $SW_B=1$ (i.e., 100%), TM=TMmax.

$$SW_M = G(TMmax, Tw, TAO) \qquad \text{Exp. 14}$$

That is, in this case, because the mixed air at the maximum temperature TMmax is distributed by the air-mixing door 19 between the heater core 20 and the second bypass passage 21, $SW_M$ is calculated as a function of the maximum temperature TMmax of the mixed air, the hot water temperature Tw of the heater core 20 and the target outlet temperature TAO of air blown into the passenger compartment. Further, the air-mixing door 19 is operated to the position of the target opening degree $SW_M$ for obtaining the target outlet temperature TAO.

In the control described at steps S1708, S1709 in FIG. 10, the bypass door 17 is operated to fully open the first bypass passage 16 and to reduce the flow amount of air passing through the evaporator 9, so that the power-saving effect is also obtained.

In the third embodiment, the second control mode of the present invention is constituted by the above-mentioned steps S1708 and S1709.

On the other hand, when it is determined at step S1710 that dehumidification is necessary, the following dehumidification control (S1711 through S1713) is carried out. That is, essentially to obtain a power-saving effect, it is necessary to fully open the bypass door 17 as in the second control mode (S1709, S1710) described above. However, in a case where fogging of the windows is liable to occur and the passenger compartment is humid and consequently uncomfortable for a passenger, air bypassing the evaporator 9 while passing through the first bypass passage 16, which is not dehumidified, lowers the dehumidifying effect undesirably.

To avoid this, in the dehumidifying control described below, the bypass door 17 is closed slightly ($SW_B$ is reduced) to increase the flow amount of air passing through the evaporator 9, so that power-saving and a dehumidifying effect can be obtained at the same time. In the third embodiment, the fourth control mode of the present invention is constituted by steps S1711 through S1713.

That is, during the dehumidifying mode, processing proceeds to step S1711 and sets the target opening degree $SW_B$ to for example $SW_B=0.5$ (50%), to fix the bypass door 17 in a position where it half-opens the first bypass passage 16.

Then, at step S1712, a mixed air temperature TM of a mixture of air from the evaporator 9 and air from the bypass passage 16 is calculated using the above expression Exp. 9. The mixed air temperature TM can be calculated as a function of the evaporator air outlet temperature Te and the bypass air temperature TB according to the following expression Exp. 15, using the target opening degree $SW_B$ determined at step S1711.

$$TM=K(Te, T_B, SW_B) \quad \text{Exp. 15}$$

Processing then proceeds to step S1713 and calculates a target opening degree $SW_M$ of the air-mixing door 19 on the basis of the above expression Exp. 7. That is, $SW_M$ is calculated according to the following expression Exp. 16 using the mixed air temperature TM calculated at step S1712, the temperature Tw of hot water flowing into the heater core 20 and the target outlet temperature TAO.

$$SW_M=L(TM, T_w, TAO) \quad \text{Exp. 16}$$

Also, at step S1701, when the system is determined to be in the cold-releasing mode, the temperature control of steps S1704 through S1713 described above in FIG. 10 is carried out. In the cold-releasing mode also, because the flow amount of air passing through the evaporator 9 is reduced and air passes through the first bypass passage 16, it is possible to extend the time over which cold stored in condensed water on the evaporator is released.

And also when at step S1701 the system is determined to be in the power-saving mode, the temperature control of steps S1704 through S1713 described above in FIG. 10 is carried out. And in the power-saving mode also, because the flow amount of air passing through the evaporator 9 is reduced, power-saving can be effectively achieved.

Thus, in a vehicle air-conditioning system having the first bypass passage 16 through which air bypasses the evaporator 9, by calculating the mixed air temperature TM as a function of the evaporator air outlet temperature Te, the bypass air temperature TB and the target opening degree $SW_B$ and using the mixed air temperature TM, it is possible to calculate the target opening degree $SW_M$ of the air-mixing door 19 precisely. Further, it is possible to obtain the target outlet temperature TAO without changing the content of the target outlet temperature control, which constitutes the basis of the temperature control of the vehicle air-conditioning system.

Modifications to Third Preferred Embodiment

In the third preferred embodiment described above, the present invention is applied to an air-conditioning system mounted on a vehicle whose engine 4 is stopped at times when engine power is not required, such as when the vehicle is halted at a traffic signal. However, the invention is not limited to the vehicle and can be broadly applied to any vehicle air-conditioning system having the first bypass passage 16 through which air bypasses the evaporator 9, even if the vehicle air-conditioning system does not carry out air-conditioning during engine stoppages.

In the above-described third preferred embodiment, the bypass air temperature sensor 33 consisting of a thermistor is provided in the first bypass passage 16 and the mixed air temperature TM is calculated using a bypass air temperature TB detected by the bypass air temperature sensor 33. However, in the third embodiment of the present invention, it is possible to dispense with the bypass air temperature sensor 33. In the case, the outside air temperature Tam is used instead of the bypass air temperature TB during the outside air mode, and the inside air temperature Tr is used instead of the bypass air temperature TB during the inside air mode, to calculate the mixed air temperature TM in the same way as when the bypass air temperature TB is used.

Also, when an outside air temperature sensor and an inside air temperature sensor are not provided, the mixed air temperature TM can be calculated by setting the bypass air temperature TB to a fixed value, for example TB=25[° C.].

Although in the third preferred embodiment described above, at step S1710 (dehumidification determining means) dehumidification is determined to be necessary when the air outlet mode is the defroster mode or when the outside air temperature Tam is below a predetermined temperature (for example 10° C.), it may be determined that dehumidification of the passenger compartment is necessary if conditions are such that fogging of the windows is likely or the humidity inside the passenger compartment is high.

For example, when the air outlet mode is not the defroster mode but rather a foot mode or a foot/defroster mode, because air in a fixed proportion is blown from the defroster outlet, the necessity or otherwise of dehumidification of the passenger compartment may be determined on the basis of whether either of these modes has been selected. Alternatively, a humidity sensor for detecting the humidity inside the passenger compartment may be provided, and dehumidification may be determined to be necessary when the passenger compartment humidity detected by the humidity sensor is above a predetermined level.

Alternatively, a glass temperature sensor for detecting the temperature of the window glass may be provided, and dehumidification may be determined to be necessary when the temperature of the window glass is below a predetermined temperature. Because the window glass is more likely to fog up in the case of the inside air mode in which inside air is recirculated, than in the outside air mode in which outside air is introduced, it may be determined that dehumidification of the passenger compartment is necessary when air-conditioning is being carried out in the inside air mode.

The conditions mentioned above may be freely combined, so that for example dehumidification of the passenger compartment is determined to be necessary when the outside air temperature Tam is below a predetermined temperature (for example 10° C.) and furthermore the passenger compartment humidity is above a predetermined level.

In the third preferred embodiment described above, at step S1711, a fixed value of for example $SW_B=0.5$ is used as the target opening degree $SW_B$ of the bypass door 17, the bypass door opening degree $SW_B$ may alternatively be variably controlled in correspondence with the degree of necessity of dehumidification (the degree of humidity or the like).

That is, when the humidity is high, the necessity of dehumidification is high, and the bypass door opening degree $SW_B$ may be made smaller so that more air passes through the evaporator 9 and priority is given to dehumidification rather than power-saving. And when the humidity is not so high, the bypass door opening degree $SW_B$ may be made larger so that more air passes through the first bypass passage 16 and priority is given to power-saving rather than dehumidification.

In the third preferred embodiment of the present invention, the mixed air temperature TM of a mixture of air from the evaporator 9 and air from the first bypass passage 16 is used to calculate the target opening degree $SW_M$ of the air-mixing door 19. However, in a vehicle air-conditioning system which has a hot water valve for adjusting the hot water flow entering the heater core 20 and adjusts the temperature of air blown into the passenger compartment by adjusting the hot water flow using the hot water valve, a target hot water flow may be calculated using the mixed air temperature TM.

Fourth Preferred Embodiment

Because stopping of a vehicle at traffic signals and so on occurs frequently in travel within city areas and the like, engine stoppage (and compressor stoppage) is also repeated frequently. Repeated compressor stoppage and restarting causes the cooling and dehumidifying action of the evaporator 9 to stop and start also, and along with the passenger compartment humidity varies widely. Explaining the more specifically, during engine running, when the cold-storing mode is executed wherein the target temperature (TEO) of evaporator temperature is lowered to a temperature below freezing point such as −3° C. or −4° C. to cause freezing of water condensed on the evaporator 9, compared to times of normal control when the target temperature (TEO) is about +3° C. or +4° C., the temperature difference between the evaporator temperature and the air temperature sucked into the evaporator 9 is greater and more dehumidification is performed in the evaporator 9. Therefore, in the cold-storing mode, the humidity inside the passenger compartment is amply reduced.

On the other hand, when the vehicle halts for example at a traffic signal, the vehicle engine 4 (and hence the compressor 1) is stopped. Therefore, in this case, air is cooled by utilizing cold stored in water condensed on the evaporator 9.

In the cold-releasing mode state, because condensed water that had been frozen melts and air is humidified by the melting water, and also because the passenger compartment humidity is extremely low immediately before setting to the cold-releasing mode, a phenomenon of the humidity in the passenger compartment rising suddenly (humidity rise rate: large) occurs.

As a result, during the cold-releasing mode, the passenger in the passenger compartment undergo the affect not only of a temperature rise but also of a sudden rise in the passenger compartment humidity, and consequently in the sense of humidity (mugginess due to humidity) aspect the cooling feeling deteriorates markedly. Further, because of the deterioration in the cooling feeling caused by a sense of humidity, the time for which the cold-releasing mode is continued must be shortened.

Consequently, to maintain a good cooling feeling, the engine stoppage time must be shortened and the engine must be restarted, which from an environmental point of view is undesirable.

In view of the above-described problems, the following fourth preferred embodiment has an object of suppressing deterioration of the cooling feeling caused by the humidity in the cold-releasing mode during an engine stoppage (compressor stoppage).

The fourth preferred embodiment also has an another object of extending the time for which it is possible to maintain a good cooling feeling in the cold-releasing mode during an engine stoppage (compressor stoppage).

Figure 11:
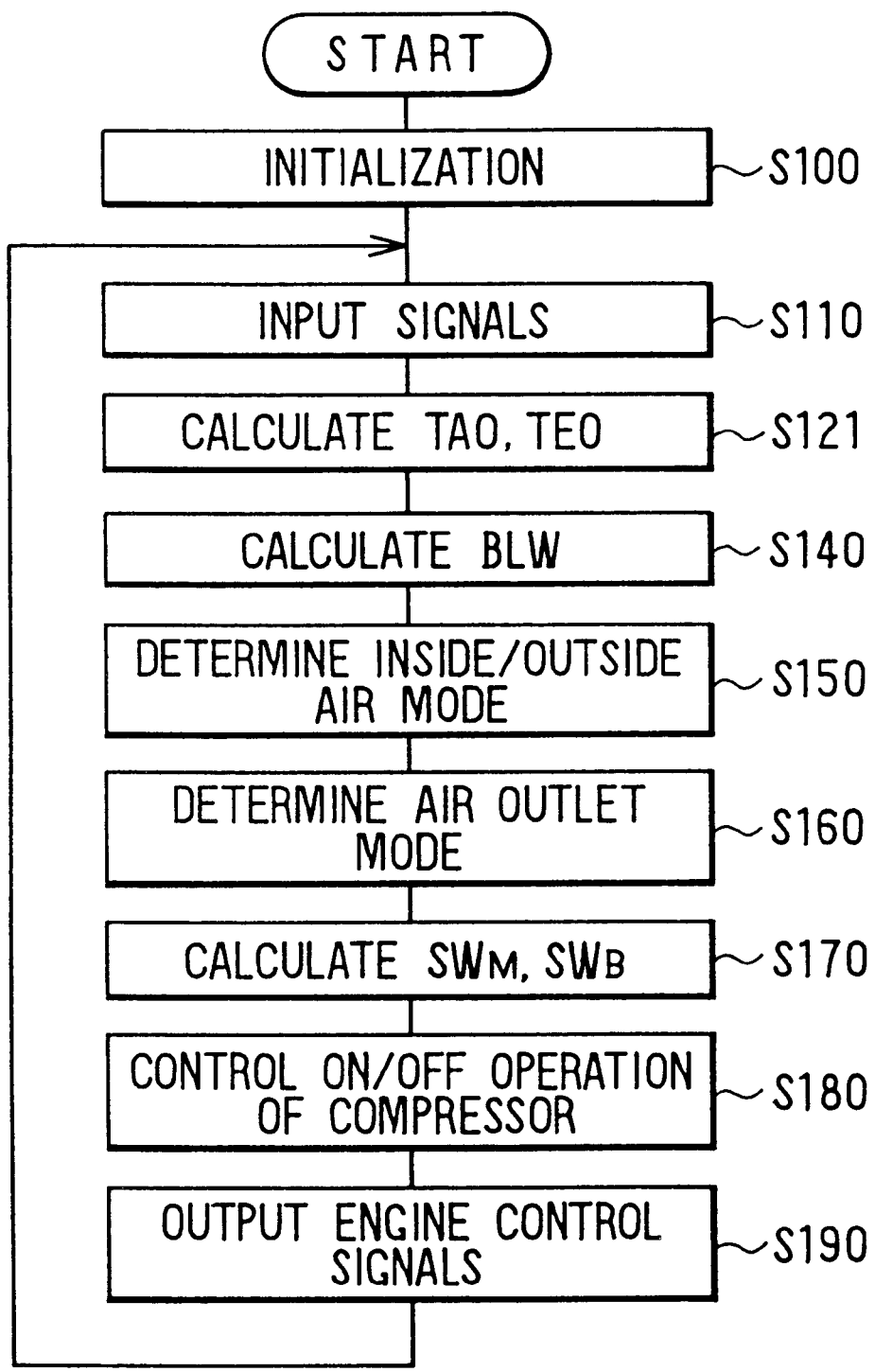
FIG. 11 is a flow diagram showing a schematic operation control according to a fourth preferred embodiment of the present invention.
Figure 12:
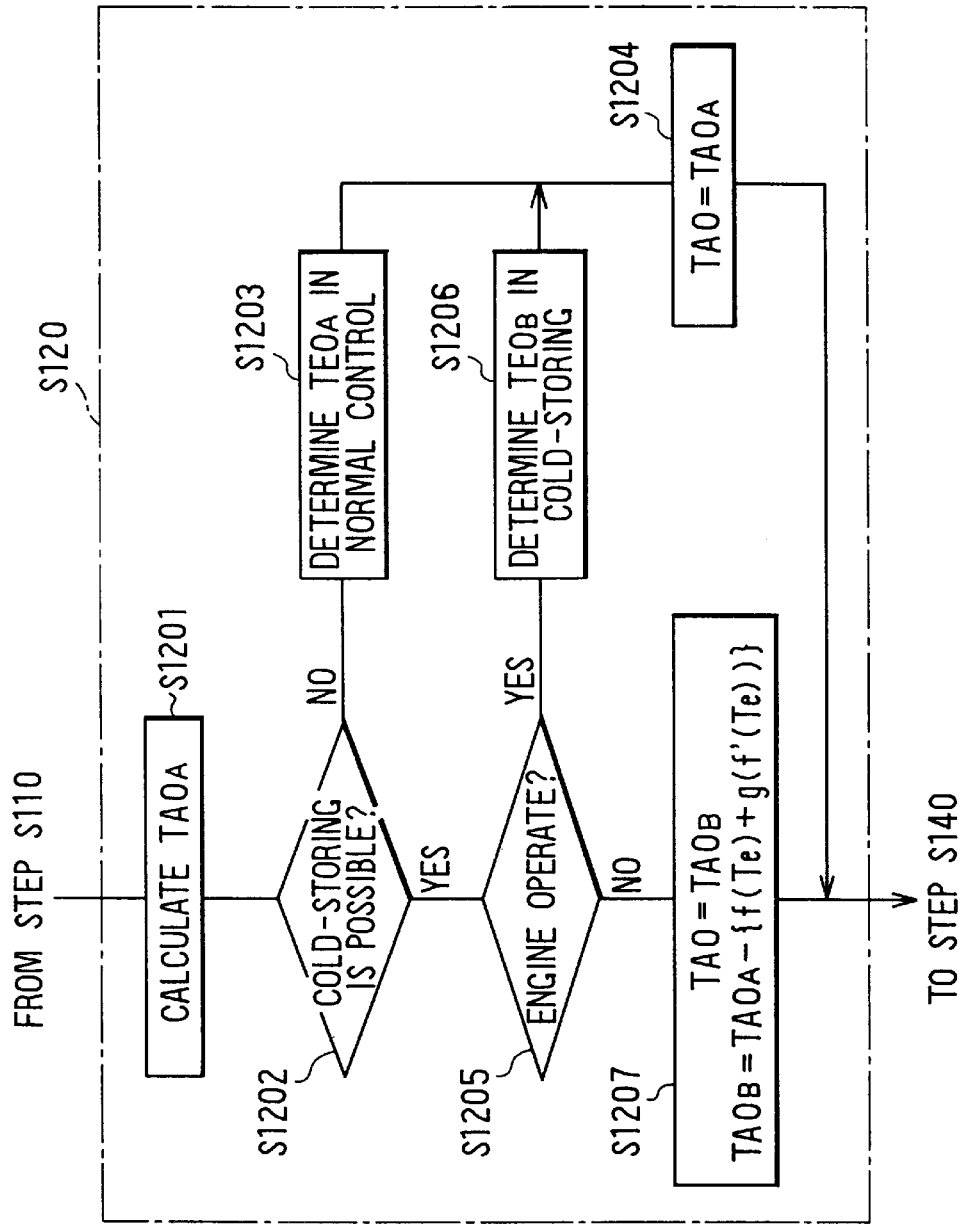
FIG. 12 is a detail flow diagram of a main step in FIG. 11.

The overall construction of the fourth preferred embodiment is the same as that of the first preferred embodiment shown in FIG. 1 and therefore will not be described here. The overall flow of control in the fourth preferred embodiment, as shown in FIG. 11, also is substantially similar to that of the first preferred embodiment shown in FIG. 2, with step S121 of FIG. 11 performing a role equivalent to that of steps S120 and S130 in FIG. 2. FIG. 12 shows details of the step S121 of FIG. 11.

Next, the operation of a vehicle air-conditioning system according to the fourth preferred embodiment will be described. Referring to FIG. 11, at step S121, a target outlet temperature TAO of conditioned air to be blown into the passenger compartment and a target evaporator air outlet temperature TEO are calculated. FIG. 12 shows the details of the step S121 in FIG. 11. First, at step S1201, a reference target outlet temperature $TAO_A$ is calculated. The reference target outlet temperature $TAO_A$ is an air temperature necessary to maintain the passenger compartment at the set temperature Tset of the temperature setting switch 37a, and can be calculated on the basis of the heat load conditions of the passenger compartment using the foregoing expression Exp. 1.

Then, at step S1202, it is determined whether or not conditions allow the execution of the cold-storing mode during engine operation (during vehicle travel). That is, it is determined whether or not the cold-storing mode is possible, at step S1202. Specifically, the determination can be carried out on the basis of the above-mentioned reference target outlet temperature $TAO_A$. That is, the reference target outlet temperature $TAO_A$ is in a low region such as below −20° C. at times such as during cool-down of the passenger compartment immediately after the start of cooling, when the passenger compartment temperature must be lowered rapidly toward the set temperature Tset, or when the cooling load is high like when the outside air temperature is high and furthermore there are many passengers in the vehicle. In this case, when $TAO_A$ is in a low region below the predetermined value, to give priority to cooling performance, the execution of the cold-storing mode is prohibited and the normal mode is performed.

When the cold-storing mode is prohibited at step S1202, processing proceeds to step S1203 and calculates the target evaporator air outlet temperature $TEO_A$ in the normal control mode. The target evaporator air outlet temperature $TEO_A$ during the normal mode is calculated on the basis of a first target evaporator air outlet temperature $TEO_{A1}$ and a second target evaporator air outlet temperature $TEO_{A2}$, which will be discussed next.

Figure 13:
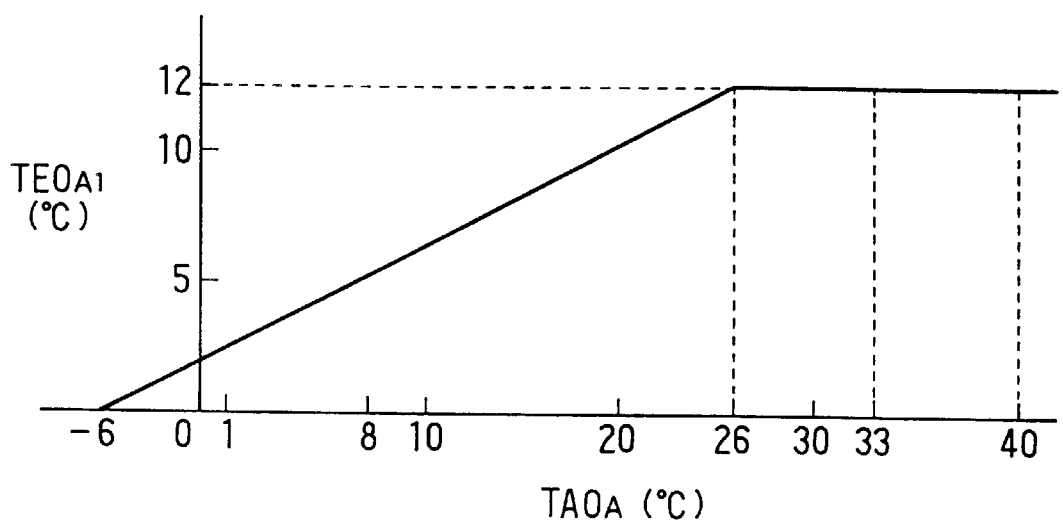
FIG. 13 is a graph showing the relationship between a first target evaporator air outlet temperature TEOA1 and a target outlet temperature TAOA of air blown into the passenger compartment, according to the fourth embodiment.
Figure 14:
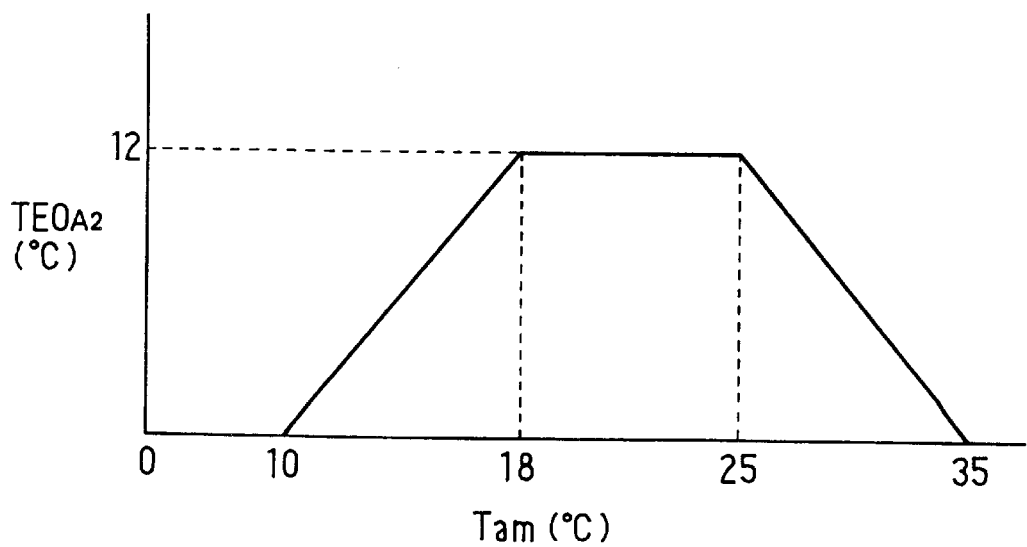
FIG. 14 is a graph showing the relationship between a second target evaporator air outlet temperature TEOA2 and an outside air temperature Tam, according to the fourth embodiment.

First, the first target evaporator air outlet temperature $TEO_{A1}$ is determined on the basis of the map shown in FIG. 13 (the same characteristic as that of FIG. 3). Then, the second target evaporator air outlet temperature $TEO_{A2}$ is determined on the basis of the map shown in FIG. 14 (the same characteristic as that of FIG. 4).

Then, in the normal mode (not the cold-storing mode) during engine running, the target evaporator air outlet temperature $TEO_A$ is finally determined based on the first and second target evaporator air outlet temperatures $TEO_{A1}$, $TEO_{A2}$.

That is, among the first target evaporator air outlet temperature $TEO_{A1}=f(TAO_A)$ and the second target evaporator air outlet temperature $TEO_{A2}=f(Tam)$, the lower temperature is finally set as the target evaporator air outlet temperature $TEO_A$.

Processing then proceeds from step S1203 to step S1204, and sets the target outlet temperature TAO of air blown into the passenger compartment to the reference target outlet temperature $TAO_A$.

On the other hand, the reference target outlet temperature $TAO_A$ is higher than a predetermined value (for example, −20° C.) at step S1202, it is inferred that the cooling load is steady-state and it is determined that the cold-storing mode can be executed. Accordingly, processing proceeds to step S1205 and determines whether or not the vehicle engine 4 is running. The determination can be performed on the basis of whether or not the vehicle speed signal or the engine speed signal inputted from the vehicle engine ECU 38 is above a predetermined value.

When the engine 4 is operated at step S1205, because the cold-storing mode can be executed, processing proceeds to step S1206 and determines a target evaporator air outlet temperature $TEO_B$ for the cold storing mode. The target evaporator air outlet temperature $TEO_B$ during the cold storing mode is a predetermined temperature below freezing point Tf (for example, −2° C. to −1° C.). Therefore, the condensed water on the evaporator 9 can be cooled to the temperature below freezing point $T_f$ and thus frozen, whereby the cold-storing mode is performed. In the cold-storing mode also, the target outlet temperature TAO is set to the reference target outlet temperature $TAO_A$ at step S1204.

At step S1205, when the engine has been stopped, the system is in the cold-releasing mode, and processing proceeds to step S1207. At step S1207, humidity correction control for the cold-releasing mode is performed. That is, the target outlet temperature TAO is set to a cold-releasing $TAO_B$. The cold-releasing $TAO_B$ is calculated using the following expression Exp. 17.

$$TAO_B=TAO_A-\{f(Te)+g(f'(Te))\} \qquad \text{Exp. 17}$$

Figure 15:
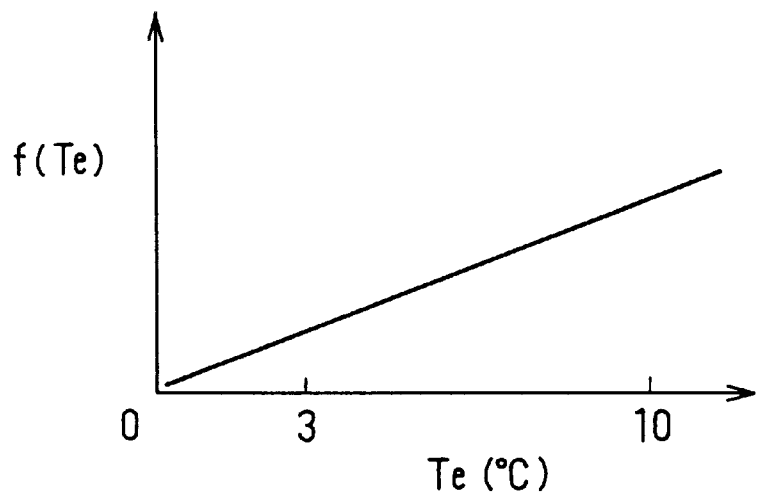
FIG. 15 is a characteristic view of a humidity correction of a target outlet temperature of air blown into the passenger compartment during a cold-releasing mode, according to the fourth embodiment.

Here, Te is the actual evaporator air outlet temperature detected by the evaporator air outlet temperature sensor 32, and the term f(Te) in Exp. 17 is a correction component dependent on the passenger compartment humidity (relative humidity). That is, because there is a correlation between the passenger compartment humidity and the evaporator air outlet temperature Te, the passenger compartment humidity can be estimated based on Te. Specifically, because the passenger compartment humidity rises with Te, the correction component $f(T_e)$ dependent on the passenger compartment humidity can be expressed by a relationship wherein it increases as Te rises, as shown in FIG. 15.

Figure 16:
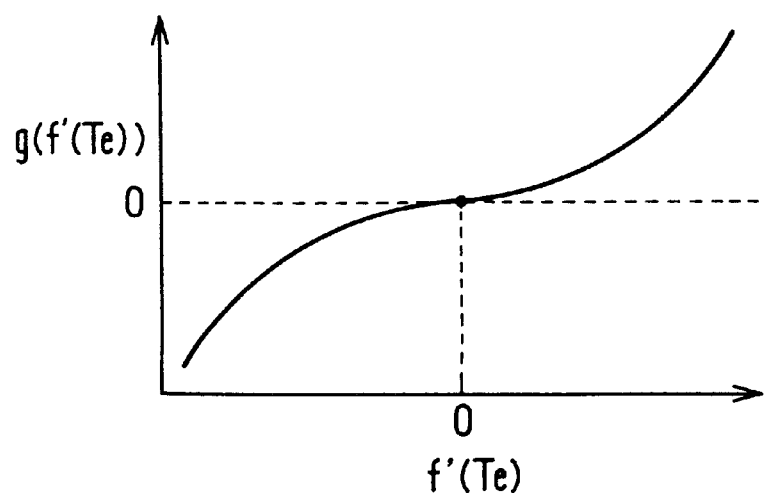
FIG. 16 is a characteristic view of a humidity changing rate correction of the target outlet temperature of air blown into the passenger compartment during the cold-releasing mode, according to the fourth embodiment.

The term g(f'(Te)) in Exp. 17 is a correction component dependent on the rate of change (rate of increase) of the passenger compartment humidity (relative humidity), and can be set for example as shown in FIG. 16. The f'(Te) on the horizontal axis of FIG. 16 is the rate of change of the passenger compartment humidity estimated by differentiation with respect to time of the evaporator air outlet temperature Te, and the correction component g(f'(Te)) dependent on the rate of change of the passenger compartment humidity increases in correspondence with increasing of the term f'(Te).

Figure 17:
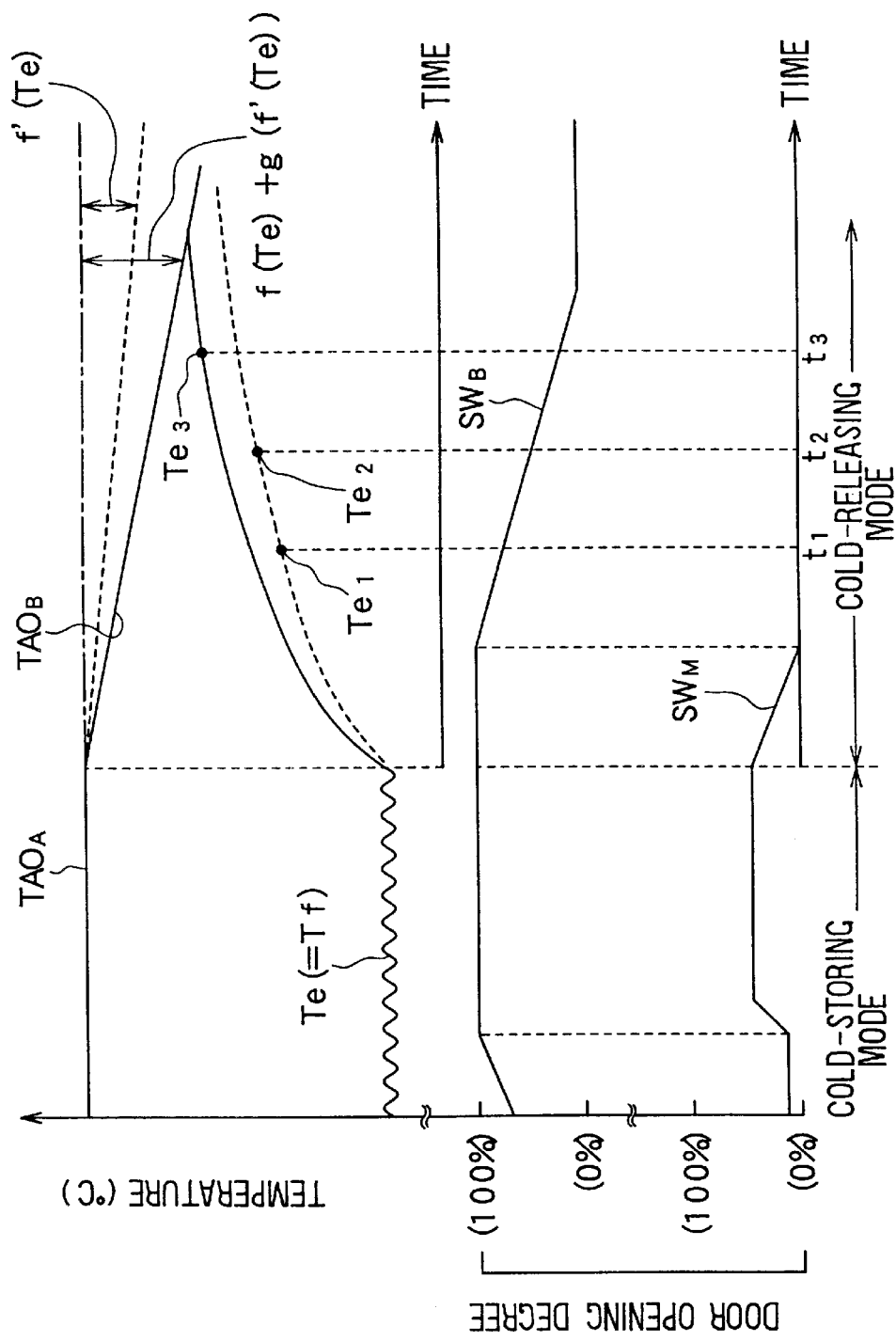
FIG. 17 is a view for explaining correction effect of the target outlet temperature of air blown into the passenger compartment during the cold-releasing mode, according to the fourth embodiment.

In the way, as shown by the upper part of FIG. 17, with respect to the reference target outlet temperature $TAO_A$, the $TAO_b$ in the cold-releasing mode is corrected to the low-temperature side on the basis of rising of the humidity in the passenger compartment, by using the correction component f(Te) dependent on the passenger compartment humidity and the correction component g(f'(Te)) dependent on the rate of change of the passenger compartment humidity (relative humidity). In the fourth embodiment, step S1207 constitutes correcting means during the cold-releasing mode.

After the calculation of TAO and TEO at step S121 in FIG. 11 is finished, processing proceeds through steps S140, S150 and S160 to step S170, calculates the target opening degree $SW_M$ of the air-mixing door 19 and the target opening degree $SW_B$ of the bypass door 17, and implements these opening degrees of the air-mixing door 19 and the bypass door 17. The target opening degree $SW_M$ of the air-mixing door 19 is expressed as a percentage in which the maximum cooling position of the air-mixing door 19 (the position in which it is shown with solid lines in FIG. 1) is set to 0% and the maximum heating position of the air-mixing door 19 (the position in which it is shown with dashed lines in FIG. 1) is set to 100%. Similarly, the target opening degree $SW_B$ is expressed as a percentage in which the fully closed position of the first bypass passage 16 is set to 0% and the fully open position of the first bypass passage 16 is set to 100%.

Here, the calculation of the target opening degree $SW_M$ and the target opening degree $SW_B$ is carried out differently for each of the normal mode, the cold-storing mode and the cold-releasing mode.

In the normal mode executed when engine operates, to secure cooling and dehumidifying capacity, the target opening degree $SW_B$ of the bypass door 17 is set to 0% (the fully closed position of the first bypass passage 16). Further, the target opening degree $SW_M$ of the air-mixing door 19 is determined so that the temperature of air blown into the passenger compartment approaches the TAO (=$TAO_A$).

Specifically, the target opening degree $SW_M$ can be determined based on the target outlet temperature TAO, the evaporator air outlet temperature Te, and the hot water temperature Tw of the heater core 20. The calculation of the target opening degree $SW_M$ of the air-mixing door 19 in the normal mode is the same as the above-described first embodiment during the normal mode.

In the cold-storing mode executed when the engine 4 operates, when the target outlet temperature TAO can be obtained with a mixture of air from the first bypass passage 16 and air from the evaporator 9, the target opening degree $SW_M$ of the air-mixing door 19 is fixed at 0% (the maximum cooling position shown with solid lines in FIG. 1), and the temperature of air blown into the passenger compartment is adjusted by adjustment of the opening degree of the bypass door 17. That is, the target opening degree $SW_B$ of the bypass door 17 is determined on the basis of the bypass air temperature $T_B$, the evaporator air outlet temperature $T_e$, and TAO (=$TAO_A$).

In the cold-storing mode, when the temperature of air blown into the passenger compartment is lower than the target outlet temperature TAO even when the bypass door 17 is fully opened, the temperature of air blown into the passenger compartment is adjusted by opening degree adjustment of the air-mixing door 19 (that is, adjustment of the amount of heating contributed by the heater core 20). The target opening degree $SW_M$ of the air-mixing door 19 is determined based on the temperature of the mixture between the air from the first bypass passage 16 and the air from the evaporator 9, the hot water temperature Tw of the heater core 20, and the target outlet temperature TAO.

In the cold-releasing mode, the target outlet temperature $TAO_B$ of air blown into the passenger compartment is corrected to the low-temperature side with respect to the reference target outlet temperature $TAO_A$ on the basis of rising of the humidity in the passenger compartment as shown by the upper part of FIG. 17 using the correction component f(Te) due to the passenger compartment humidity and the correction component g(f(Te)) due to the rate of change of the passenger compartment humidity (relative humidity).

The target opening degree $SW_B$ of the bypass door 17 and the target opening degree $SW_M$ of the air-mixing door 19 are, specifically, determined as shown in the lower part of FIG. 17. The method by which $SW_B$ and $SW_M$ are determined for the cold-releasing mode will now be described in detail. As shown in FIG. 17, immediately after the start of the cold-releasing mode (immediately after stopping of the vehicle engine 4), because the evaporator air outlet temperature Te is at the low temperature below freezing point Tf (=−3° C. to −4° C.) of the cold-storing mode, the target opening degree $SW_B$ of the bypass door 17 is set to the fully open position (opening degree=100%) of the first bypass passage 16.

At the time, the temperature of air blown into the passenger compartment may be lower than $TAO_B$ merely as a result of the non-cooled air from the first bypass passage 16 mixing with the air (cool air) having been passed through the evaporator 9. In the case, the target opening degree $SW_M$ of the air-mixing door 19 is set to a predetermined opening degree and the temperature of air blown into the passenger compartment is controlled to $TAO_B$ using reheating effected by the heater core 20.

As time elapses in the cold-releasing mode, to reduce the amount of reheating contributed by the heater core 20 as the evaporator air outlet temperature Te rises, the target opening degree $SW_M$ of the air-mixing door 19 decreases. Further, when the target opening degree $SW_M$ of the air-mixing door 19 has reached 0% (the maximum cooling position), the target opening degree $SW_B$ of the bypass door 17 is gradually decreased from the fully open position (opening degree=100%) to control the temperature of air blown into the passenger compartment to $TAO_B$.

As will be understood from the foregoing explanation, in the cold-releasing mode, to control the air temperature blown into the passenger compartment to the target outlet temperature $TAO_b$ corrected to the low-temperature side, with respect to the elapsing of time t from the start of the cold-releasing mode, it is only necessary to bring forward the timing with which the target opening degree $SW_M$ of the air-mixing door 19 is corrected to the 0% (maximum cooling position) side and bring forward the timing with which the target opening degree $SW_B$ of the bypass door 17 is corrected from the fully open position (opening degree=100%) in the direction in which the opening degree decreases.

In the cold-releasing mode, the evaporator air outlet temperature Te is the low temperature below freezing point Tf (=−2° C. to −1° C.) of the cold-storing mode at a start time of the cold-releasing mode. Therefore, with respect to elapsing of time t from the start of the cold-releasing mode, the rate of change of Te increases and the rate of increase of the passenger compartment humidity accompanying the rising of Te also increases. Consequently, during the cold-releasing mode, the passenger is liable to feel uncomfortable due to a sense of humidity (mugginess) caused by the humidity rise.

However, according to the fourth embodiment of the present invention, the target outlet temperature $TAO_B$ during the cold-releasing mode is corrected to the low-temperature side with respect to the reference target outlet temperature $TAO_A$ using both the correction component f(Te) dependent on the passenger compartment humidity and the correction component g(f(Te)) dependent on the rate of change of the passenger compartment humidity. Therefore, with respect to rising of the evaporator air outlet temperature Te, it is possible to raise up for the perception level at which discomfort due to humidity is felt to the temperature level Te3 in the upper part of FIG. 17. In other words, after the start of the cold-releasing mode, the time at which the passenger feels discomfort due to humidity is the time t3, and the cooling feeling provided by the cold-releasing mode can be kept good until the time t3 elapses.

On the other hand, as a comparison example, when no correction of the target outlet temperature TAO to the low-temperature side is carried out whatsoever in the cold-releasing mode, and the target outlet temperature TAO is set at the reference target outlet temperature $TAO_A$, the passenger feels discomfort due to a sense of humidity at the temperature level Te1 in the upper part of FIG. 17 with respect to the evaporator air outlet temperature Te, because the temperature of air blown into the passenger compartment becomes a somewhat high temperature not allowing for a sense of humidity. That is, the perception level at which discomfort due to a sense of humidity is felt becomes the temperature Te1 lower than the temperature level Te3, with respect to the evaporator air outlet temperature Te. As a result, the time for which the cooling feeling provided by the cold-releasing mode can be kept good becomes the short time t1.

When only the correction component f(Te) dependent on the passenger compartment humidity is considered as correction of the target outlet temperature $TAO_B$ in the cold-releasing mode, the perception level at which discomfort due to a sense of humidity is felt by the passenger becomes the temperature Te2 in the upper part of FIG. 17. As a result, the time for which the cooling feeling provided by the cold-releasing mode can be kept suitably becomes the time t2 between the above-mentioned times t1 and t3.

Therefore, to maintain a sufficient cooling feeling in the presence of rising humidity in the passenger compartment during the cold-releasing mode, it is most preferable to correct the target outlet temperature $TAO_B$ to the low-temperature side using both the correction component f(Te)

dependent on the passenger compartment humidity and the correction component g(f(Te)) dependent on the rate of change of the passenger compartment humidity.

The foregoing is an explanation of step S170 of FIG. 11. After the step S170, at step S180 in FIG. 11, the target evaporator air outlet temperature TEO (TEO$_A$ or TEO$_B$) is compared with the actual evaporator air outlet temperature Te, and on/off control of the compressor 1 is carried out. That is, when the evaporator air outlet temperature Te is lowered below the target evaporator air outlet temperature TEO, the air-conditioning ECU 5 stops the compressor 1 by cutting off current to the electromagnetic clutch 2. Conversely, when the evaporator air outlet temperature Te rises above the target evaporator air outlet temperature TEO, the air-conditioning ECU 5 supplies current to the electromagnetic clutch 2 and thereby restarts the compressor 1. Thus, the evaporator air outlet temperature Te is kept at the target evaporator air outlet temperature TEO. In the cold-storing mode, the target evaporator air outlet temperature TEO is lowered to TEO$_B$ (the predetermined value below freezing point Tf) to cause water condensing on the evaporator 9 to freeze, so that the amount of cold stored in the condensed water on the evaporator 9 is increased.

Processing then proceeds to step S180, and outputs engine control signals of the above-mentioned stoppage permission or stoppage prohibition of the engine 4 and of a restart request after stoppage of the engine 4 based on air-conditioning side conditions.

Modifications of Fourth Preferred Embodiment

The fourth preferred embodiment can be modified in various ways. For example, in the fourth embodiment described above, whether or not to execute the cold-storing mode is determined at step S1202 in FIG. 12 based on the target outlet temperature TAO; however, alternatively, a cold-storing switch for generating a cold-storing mode signal may be provided as one of the control switches 37 of the air-conditioning control panel 36, so that the cold-storing mode is set by turning on the cold-storing switch. In the case, execution of the cold-storing mode can be decided based on the position of the cold-storing switch.

Further, the cold-storing mode may be generally set at all times when the engine 4 (specifically, the compressor 1) is operated, and then normal control (the normal control mode) is set during the operation of the engine 4 (the compressor 1) only when it has been determined that a condition for prohibiting the cold-storing mode is determined.

In intermediate seasons, under conditions calling for a high dehumidifying capacity (for example, when with the system in the inside air mode there are many passengers in the vehicle), the target evaporator air outlet temperature TEO can be set to a relatively low temperature to raise the dehumidifying (i.e. cooling) capacity of the evaporator 9, and the target outlet temperature TAO can be raised to control the temperature inside the passenger compartment. That is, when a particularly high dehumidifying capacity is requested even if the system is in the cold-storing mode or the cold-releasing mode, the bypass door 17 may be fixed in the fully closed position and control of the air temperature can be performed by the amount of reheating effected by the heater core 20 being adjusted by the air-mixing door 19, in the same way as the normal control (steps S1702, S1703).

In the fourth preferred embodiment, during the cold-storing mode, the target evaporator air outlet temperature TEO is lowered to a low temperature below freezing point such as −2° C. to achieve an improvement in cold-storing effect. However, during the cold-storing mode, the target evaporator air outlet temperature TEO may be lowered to a temperature lower than its minimum temperature in the normal control (for example 3° C.) but higher than 0° C. (for example 1° C.) to achieve an improvement in cold-storing effect.

Also, the bypass door 17 does not have to be disposed on the downstream air side of the evaporator 9 and can alternatively be disposed on its upstream air side.

The above-described fourth embodiment can also be applied to a vehicle air-conditioning system wherein the first bypass passage 16 and the bypass door 17 are dispensed with and only reheat amount adjusting means (e.g., air-mixing door 19 or a hot water valve) for adjusting the reheating amount effected by the heater core 20 is provided for adjusting the temperature of air blown into the passenger compartment.

Fifth Preferred Embodiment

Figure 18:
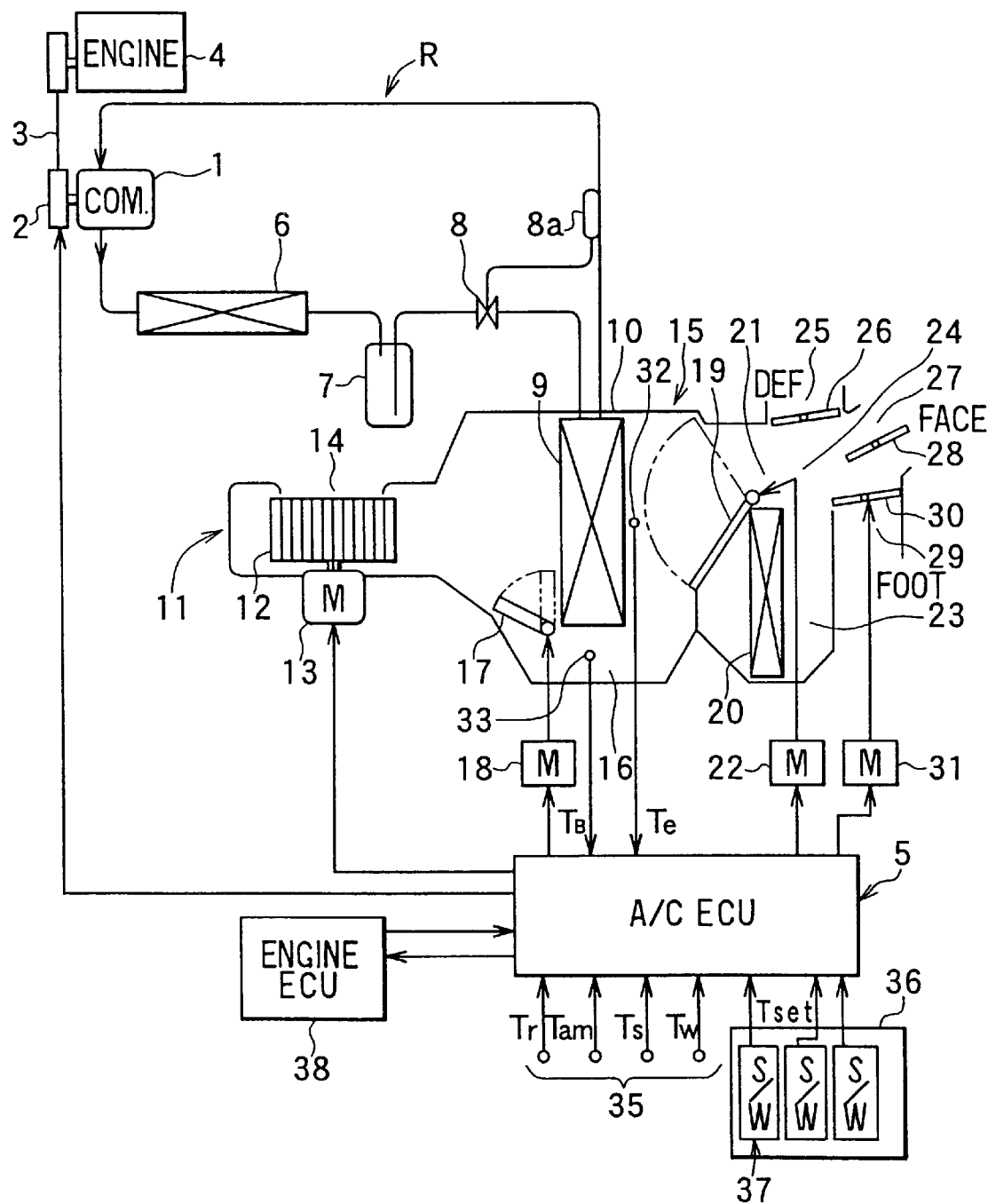
FIG. 18 is a schematic diagram showing a vehicle air-conditioning system according to a fifth preferred embodiment of the present invention.
Figure 19:
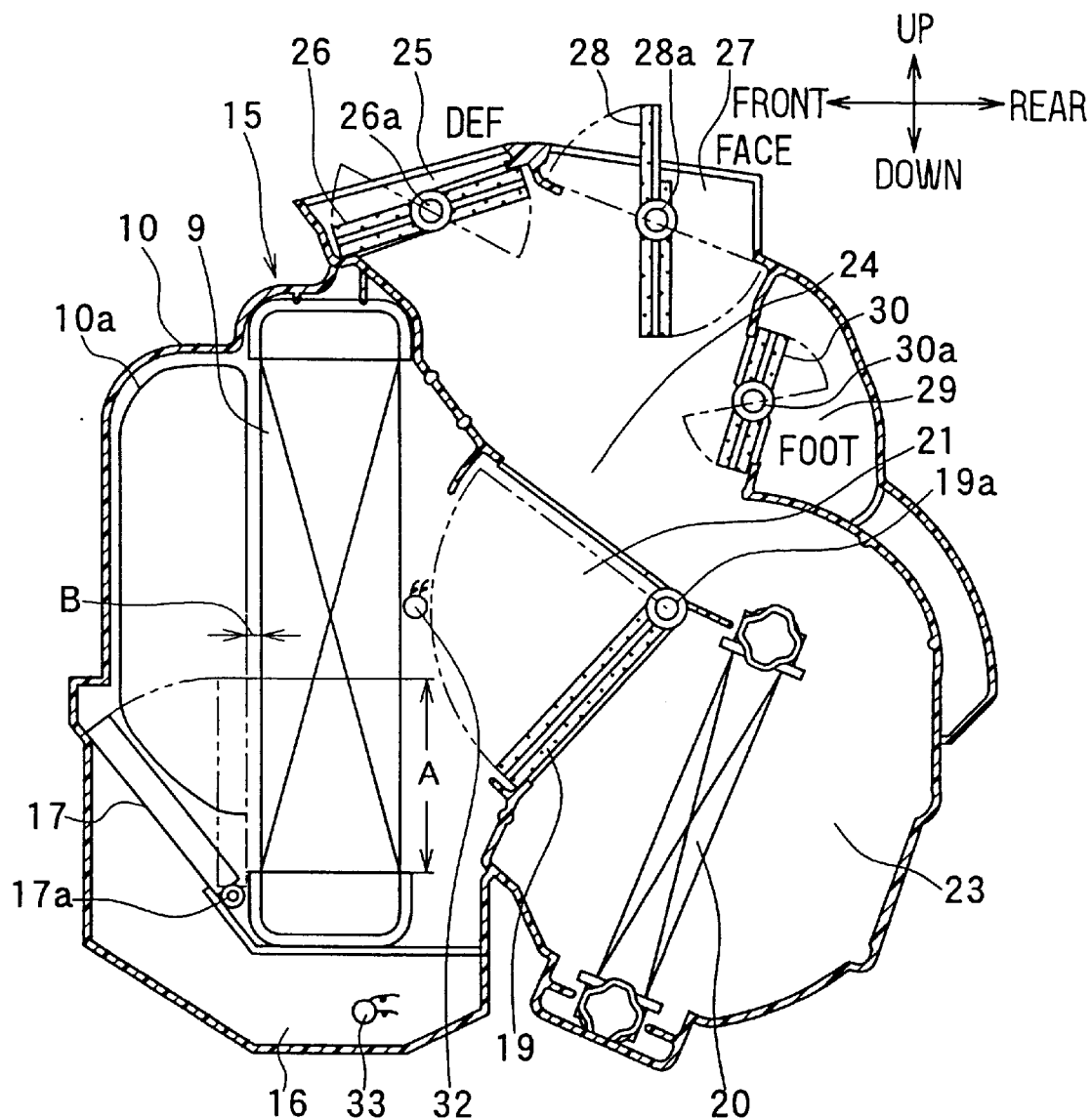
FIG. 19 is a schematic sectional view of an air-conditioning unit during a normal state, according to the fifth embodiment.

FIG. 18 is a schematic view of the construction of a vehicle air-conditioning system according to a fifth preferred embodiment of the present invention, and FIG. 19 is a sectional view showing an air-conditioning unit 15 on the downstream air side of the blower 11 in the ventilation system of the air-conditioning system. Parts the same as parts in FIG. 1 have been given the same reference numerals as in FIG. 1 and will not be described again here.

The air-conditioning unit 15 is normally mounted behind a dash board at the front of the passenger compartment, in a central position in the width direction of the vehicle. In the case, the air-conditioning unit 15 is disposed as shown in FIG. 19 with respect to the front-rear direction of the vehicle and the vertical direction (up-down direction), and the blower 11 is disposed to be shifted to the front passenger seat side with respect to the air-conditioning unit 15.

An air inlet 10a is formed at a most front of the air-conditioning case 10, and air blown by the blower fan 12 flows through the air inlet 10a into an inside space of the air-conditioning case 10, upstream of an evaporator 9.

Within the air-conditioning case 10, the evaporator 9 is disposed so as to extend in the vertical direction, and the first bypass passage 16 through which air bypasses the evaporator 9 is formed below the evaporator 9. A bypass door (parallel bypass door) 17 for adjusting the opening degree of the first bypass passage 16 is disposed on the upstream air side of the evaporator 9, at the lower side thereof.

The bypass door 17 has a rotatable shaft 17a at a lower side of the front face of the evaporator 9 and is a plate-like door rotated around the shaft 17a. Here, an operating position in which the bypass door 17 is rotated to the broken lines in FIGS. 18 and 19 is a position in which it fully opens the first bypass passage 16. Further, in the operating position of the bypass door 17 shown with broken lines, the bypass door 17 also closes a part of the air passage through the evaporator 9 (the lower side area A) in a maximum extent, and thereby increases the flow resistance of the lower side area A.

When the bypass door 17 is in the bypass passage opening position shown with the above-mentioned broken lines, a predetermined small gap "B" is formed between the bypass door 17 and the surface of the heat-exchanging core part of the evaporator 9. The small gap "B" is for example in a range of 2–6 mm, and more specifically about 5 mm is preferable.

Within the air-conditioning case 10, an air-mixing door (series bypass door) 19 is disposed on the downstream air side of the evaporator 9. The hot water type heater core (heat exchanger for heating) 20 for heating air with hot water (cooling water) from the vehicle engine 4 as a heat source is disposed on the downstream air side of the air-mixing door 19. A second bypass passage 21 is formed to one side of (above) the hot water type heater core 20. The second bypass passage 21 is for allowing air to bypass the hot water type heater core 20.

The air-mixing door 19 is a plate-like door rotatable around a pivot shaft 19a, and adjusts the flow proportions of air passing through the hot water type heater core 20 and air passing through the second bypass passage 21. By adjustment of the flow proportions of air passing through the heater core 20 and air passing through the second bypass passage 21, the temperature of air blown into the passenger compartment can be adjusted.

A warm air passage 23 curving upward from the lower side of the heater core 20 is formed on the downstream air side of the heater core 20, and warm air from the warm air passage 23 and cool air from the second bypass passage 21 can be mixed in an air-mixing part 24 to obtain conditioned air having a desired temperature.

Inside the air-conditioning case 10, an air outlet mode switching part is provided on the downstream air side of the air-mixing part 24. That is, a defroster opening 25 is formed in the upper surface of the air-conditioning case 10, and air is blown from the defroster opening 25 through a defroster duct (not shown) toward the inner side of the front windshield of the vehicle. The defroster opening 25 is opened and closed by a plate-like defroster door 26 rotatable around a pivot shaft 26a.

A face opening 27 is formed on a vehicle rear side of the defroster opening 25 in the upper surface of the air-conditioning case 10, and the face opening 27 directs air through a face duct (not shown) toward the upper body of a passenger in the passenger compartment. The face opening 27 is opened and closed by a plate-like face door 28 rotatable around a pivot shaft 28a.

A foot opening 29 is formed below the face opening 27 in the air-conditioning case 10, and the foot opening 29 directs air through a foot duct (not shown) toward the feet area of the passenger in the passenger compartment. The foot opening 29 is opened and closed by a plate-like foot door 30 rotatable around a pivot shaft 30a.

The shafts 26a, 28a and 30a of these air outlet mode doors 26, 28, 30 are connected to a common link mechanism (not shown), and are driven via the link mechanism by an electric driving device 31 consisting of a servo motor.

Next, the operation of the vehicle air-conditioning system according to the fifth embodiment of the present invention will be described. FIGS. 18 and 19 show a normal state wherein the bypass door 17 closes the first bypass passage 16, and FIG. 20 shows an evaporator bypass state wherein the bypass door 17 opens the first bypass passage 16 and closes the lower side of the air passage through which air passes through the evaporator 9.

During the operation of the engine 4, at times such as during rapid cool-down of the passenger compartment for example immediately after the start of cooling, or when the cooling load is high because there are many passengers in the vehicle or the outside temperature is high, to maximize the cooling capacity of the evaporator 9, the normal state shown in FIGS. 18 and 19 (the evaporator-bypass closed state) is set. Further, at times other than during cool-down or when the cooling load is high, that is, in the normal cooling load state, in preparation for the next engine stoppage, it is necessary to set a cold-storing mode for increasing the amount of cold stored in water condensed on the evaporator 9. The evaporator bypass state shown in FIG. 20 is a state of the cold-storing mode.

Figure 20:
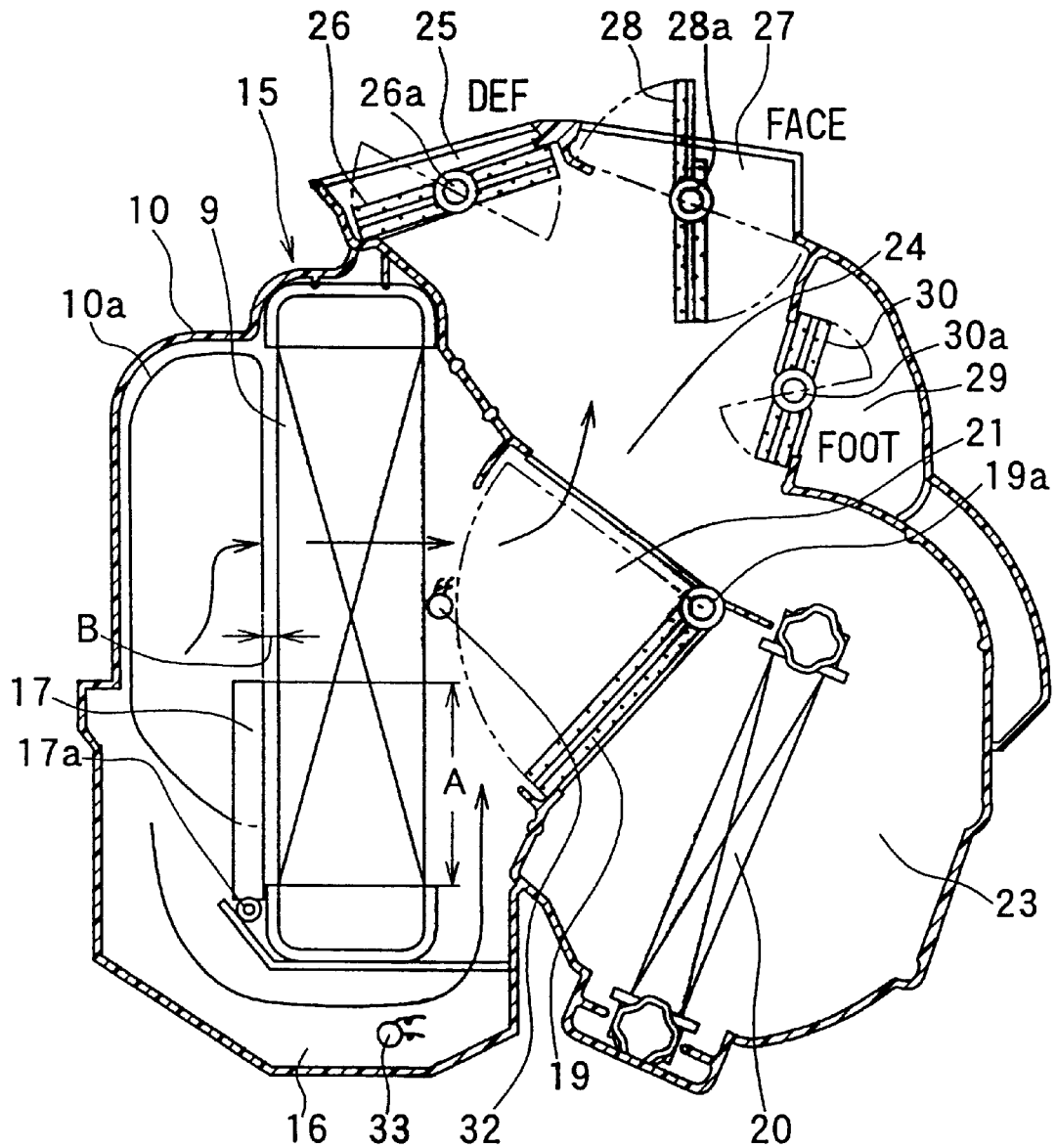
FIG. 20 is a schematic sectional view of the air-conditioning unit during an evaporator-bypassing state, according to the fifth embodiment.

Here, the evaporator bypass state of FIG. 20 may be used not only for the cold-storing mode but also for a power-saving mode for the intermediate seasons of spring and fall, and can also be used for a cold-releasing mode for times of temporary engine stoppage for example when the vehicle is halted at a traffic signal.

The normal state shown in FIGS. 18 and 19 (the evaporator-bypass closed state) and the evaporator bypass state can be switched by the bypass door 17. Opening and closing operations of the bypass door 17 can be determined for example on the basis of a target outlet temperature TAO of conditioned air blown into the passenger compartment.

The target outlet temperature TAO of air blown into the passenger compartment is calculated to be a very low temperature, during the aforementioned cool-down period or when the cooling load is high when the target outlet temperature TAO is in an extremely low temperature. In this case, the bypass door 17 is operated to the normal state shown in FIGS. 18 and 19. Then, when the target outlet temperature TAO is risen to a predetermined level, it is determined that a normal cooling load state has been reached and the bypass door 17 is switched from the normal state shown in FIGS. 18 and 19 to the evaporator bypass state shown in FIG. 20.

Automatic switching of the bypass door 17 based on the target outlet temperature TAO may not be performed, and the switching of the bypass door 17 may be carried out by a manual operation instead. For example, a cold-storing mode switch may be provided as one of the control switches 37 of the air-conditioning control panel 36, and the bypass door 17 may be operated to the evaporator bypass state of FIG. 20 when the cold-storing mode switch is turned on by a passenger.

In the normal state shown in FIGS. 18 and 19, because the bypass door 17 is operated to a position in which as well as closing the first bypass passage 16 it does not obstruct air flowing through the evaporator 9, a maximal flow amount of air can pass through the heat-exchanging core part of the evaporator 9. Therefore, there is no impediment to utilization of the maximum capacity of the evaporator 9. Further, during the maximum cooling, the air-mixing door 19 is operated based on the above-mentioned target outlet temperature TAO to a maximum cooling position in which it is shown with solid lines in FIGS. 18 and 19, so that the air-mixing door 19 fully closes an air passage to the heater core 20 and fully opens the second bypass passage 21. Consequently, cool air cooled by the effect of the latent heat of evaporation of a refrigerant in the evaporator 9 is blown through the face opening 27 into the passenger compartment without being reheated by the heater core 20 and cools the passenger compartment.

In the normal state of FIGS. 18 and 19, when the cooling load decreases and the system shifts from the maximum cooling state into a temperature control region, the air-mixing door 19 opens the air passage toward the heater core 20 and reduces the opening degree of the second bypass passage 21. Thus, the flow proportions of cool air from the second bypass passage 21 and warm air from the heater core 20 can be adjusted so that the air temperature blown into the passenger compartment is controlled.

On the other hand, when the cold-storing mode for increasing the amount of cold stored in the condensed water on the evaporator 9 is to be executed when the engine 4 operates, the bypass door 17 is switched to the evaporator bypass state shown in FIG. 20. In the evaporator bypass state, the bypass door 17 opens the first bypass passage 16 and maximally closes the lower side area "A" of the air passage of the heat-exchanging core part of the evaporator 9.

As a result, a part of air blown by the centrifugal blower fan 12 passes through the first bypass passage 16 while bypassing the evaporator 9 without being cooled. Therefore, by adjusting the opening degree of the first bypass passage 16 by adjustment of the operating position of the bypass door 17, the flow proportions of non-cooled air passing through the first bypass passage 16 and cool air passing through the evaporator 9 can be adjusted, and it is possible to control the air temperature blown into the passenger compartment.

Here, the operating position (opening degree) of the bypass door 17 can be determined on the basis of the temperature TB of the non-cooled air passing through the first bypass passage 16, the evaporator air outlet temperature Te and the target outlet temperature TAO of air blown into the passenger compartment.

Thus, in the cold-storing mode, it is possible to control the air temperature blown into the passenger compartment even when the air-mixing door 19 is fixed in its maximum cooling position, and it is possible to achieve power-saving of the vehicle engine 4 (a reduction in the compressor driving power load).

That is, because a part of the air passage of the heat-exchanging core part of the evaporator 9 is substantially closed and flow resistance of air is raised by the bypass door 17, the flow amount of air passing through the evaporator 9 decreases. Consequently, the cooling capacity needed to decrease the evaporator air outlet temperature Te to a target evaporator air outlet temperature TEO is decreased by an amount corresponding to the decrease in flow, and power-saving can be achieved through a reduction in the compressor operating rate arising from on/off operation control of the compressor 1.

Further, because the bypass door 17 closes a part of the air passage of the heat-exchanging core part of the evaporator 9, there is almost no heat-exchange between refrigerant and air in the closed part of the evaporator 9, and condensed water can be forcibly made to frost (freeze).

As described above with reference to FIGS. 3, 4, 13 and 14, the target evaporator air outlet temperature TEO of the evaporator 9 is normally set in correspondence with the target outlet temperature TAO to rise as the TAO rises, or in correspondence with the outside air temperature Tam to be highest in an intermediate temperature region of spring and fall or to be low in a low-temperature region and a high-temperature region of the outside air temperature Tam. However, in the cold-storing mode, the target evaporator air outlet temperature TEO is lowered to a low temperature below freezing point of for example −2° C. to forcibly freeze condensed water on the evaporator 9 and thereby increase the amount of cold stored there.

Even when the target evaporator air outlet temperature TEO is lowered to a low temperature below freezing point and the temperature Te of air blown from the evaporator 9 becomes below freezing point, because the air temperature blown into the passenger compartment can be adjusted by adjustment of the operating position of the bypass door 17 (the opening degree of the first bypass passage 16), power-saving of the vehicle engine 4 can still be realized in the way described above.

Further, it is possible to obtain an improvement in cold-storing effect and a power-saving effect at the same time, for the reasons explained above with reference to FIGS. 6A and 6B.

Further, in the fifth embodiment of the present invention, the evaporator 9 is disposed so that it extends in the vertical direction (vehicle up-down direction), water condensed on the evaporator 9 collects under its own weight in the lower side of the heat-exchanging core part of the evaporator 9. Consequently, by closing the lower side part of the air passage of the heat-exchanging core part of the evaporator 9 with the bypass door 17, it is possible to increase the amount of cold stored by forcibly freezing condensed water collecting in the lower side of the heat-exchanging core part of the evaporator 9.

If when the bypass door 17 contacts the surface of the heat-exchanging core part of the evaporator 9 when the bypass door 17 is operated to the position shown in FIG. 20 in which the bypass door 17 fully opens the bypass passage 16, there would be a risk of the bypass door 17 freezing integrally to the surface of the heat-exchanging core part and the bypass door 17 consequently becoming inoperable.

However, according the fifth embodiment of the present invention, even when the bypass door 17 is moved to the position in which it maximally closes the lower part of the air passage of the evaporator 9, a predetermined small gap "B" in a range of 2–6 mm is formed between the bypass door 17 and the heat-exchanging core part of the evaporator 9. Therefore, even when the lower side part "A" of the heat-exchanging core part of the evaporator 9 is frozen, the bypass door 17 does not freeze to the surface of the heat-exchanging core part of the evaporator 9. Therefore, immobility of the bypass door 17 due to freezing is prevented.

The evaporator 9 is the largest in size of the compartments mounted inside the air-conditioning case 10. Consequently, due to restrictions on mounting space within the vehicle, it may in practice be difficult to design the first bypass passage 16 having a sufficient cross-sectional area around the evaporator 9. It is thus beneficial in the connection that in the fifth preferred embodiment, when the first bypass passage 16 is opened by the bypass door 17, the lower side part of the air passage of the heat-exchanging core part of the evaporator 9 is closed by the bypass door 17, and the flow resistance of the passage through the evaporator 9 is increased. Thus, the bypass flow amount (i.e., flow amount of non-cooled air) passing through the first bypass passage 16 increases.

According to experimental research carried out by the present inventors, to obtain an air temperature necessary for controlling the temperature of the passenger compartment by mixing a bypass flow amount (non-cooled air flow amount) from the first bypass passage 16 and a cool air flow amount from the evaporator 9, the bypass flow amount must be at least 40% of the overall flow amount.

Figures 21, 22:
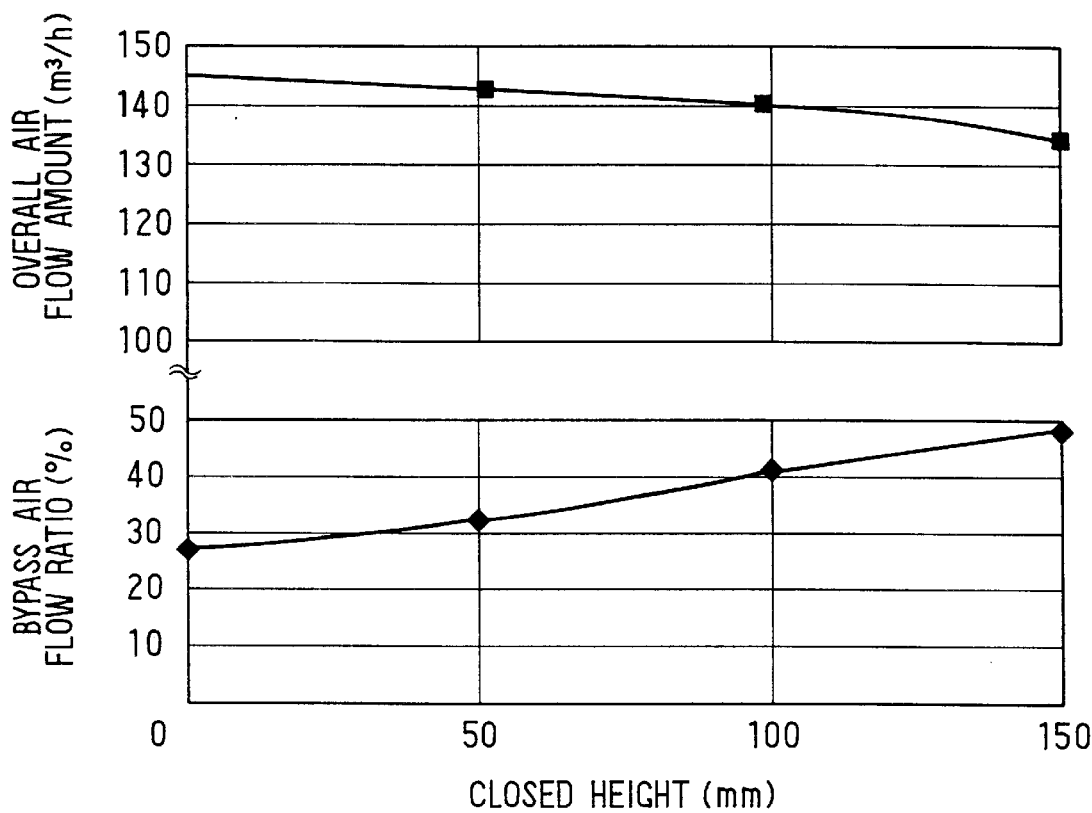
FIG. 21 is a graph showing the relationship between an overall air flow amount, a bypass air flow amount ratio and a closed height of an evaporator, according to the fifth embodiment.
FIG. 22 is a view showing the relationship between the closed height of the evaporator, the bypass air flow amount ratio, a decreased ratio in overall flow amount and a mixed air temperature at a downstream air side of the evaporator, according to the fifth embodiment.

FIGS. 21 and 22 show experimental results obtained by the inventors of the present invention. In FIG. 21, the vertical axis shows the overall air flow amount blown by the centrifugal blower fan 12 and the proportion (%) of the overall air flow amount constituted by the bypass flow amount (i.e., bypass air flow amount ratio %), while the horizontal axis shows the height (i.e., closed height) to which the air passage of the heat-exchanging core part of the evaporator 9 is blocked by the bypass door 17. Here, an entire height of the heat-exchanging core part of the evaporator 9 used in the experiment is 235 mm, the width (left-right direction) of the heat-exchanging core part is 253 mm, and therefore the passage area of the heat-exchanging core part is 59455 mm². Here, the small gap "B" between the bypass door 17 and the surface of the heat-exchanging core part of the evaporator 9 is 5 mm. Further, the passage height of the first bypass passage 16 is 60 mm, the width of the first bypass passage 16 is 233 mm, and therefore the cross-sectional area of the first bypass passage 16 is 13980 m².

As shown in FIG. 21, the bypass air flow amount ratio relative to the overall air flow amount can be increased by increasing the closed height to which the air passage of the heat-exchanging core part of the evaporator 9 is blocked by the bypass door 17, and the bypass air flow amount ratio can be increased to over 40% when the closed height is set to 100 mm or more.

FIG. 22 is a table of experimental results showing the relationship between the closed height of evaporator 9, the bypass air flow amount ratio relative to the overall flow amount, a decreased ratio in overall flow amount, and temperature of mixed air on a downstream air side of evaporator 9. As shown in FIG. 22, when the closed height is 100 mm, the bypass air flow amount ratio can be increased to 41% and the mixed air temperature downstream of the evaporator 9 can be controlled to 10.3° C. Here, the mixed air temperature downstream of the evaporator 9 is the mixed air temperature in a case where the evaporator air outlet temperature Te is 0° C. and the bypass air temperature TB is 25° C. In the case of closed height of 100 mm, the decreased ratio in overall flow amount is 4% and thus has been kept to a relatively small value. Thus, the decreased ratio in overall flow amount does not constitute a problem.

When the vehicle engine 4 is stopped during a temporary stop of the vehicle, for example at a traffic signal, the compressor 1 also inevitably stops, and the cooling action of the evaporator 9 due to the latent heat of evaporation of the refrigerant in the refrigerant cycle R is stopped. However, because water condensed on the evaporator 9 is frozen to increase the amount of cold stored therein while the engine 4 operates, the cold stored in the condensed water on the evaporator 9 (latent heat of melting of water and sensible heat of water) can be utilized to obtain a cooling action of the evaporator 9 after the engine 4 stops.

The time for which vehicles temporarily stop at traffic signals and the like is normally about one minute, and if the time is the short it is possible, utilizing cold stored in water condensed on the evaporator 9, for cooling to continue at a level such that there is no deterioration in cooling feeling.

Because the cooling action during the vehicle halt is effected by cold being released from cold stored in condensed water on the evaporator 9, the vehicle air 15 conditioning system can set a cold-releasing mode during the vehicle halt. In the same way as in the cold-storing mode described above, control of the air temperature blown into the passenger compartment in the cold-releasing mode can be performed by adjusting the operating position (opening degree) of the bypass door 17 while the air-mixing door 19 is fixed in its maximum cooling position.

Sixth Preferred Embodiment

In the above-described fifth embodiment of the present invention, during the cold-releasing mode, when the bypass door 17 fully opens the first bypass passage 16 and maximally closes the lower side area A of the air passage of the heat-exchanging core part of the evaporator 9 as shown in FIG. 20, air flowing through the air passage of the evaporator 9 at the lower side area "A" becomes almost nil and the heat exchange at the lower side area "A" becomes almost nil. Therefore, a large difference generates in the melting time of frozen condensed water between the upper and lower sides of the evaporator 9.

As a result, there is a large upper/lower temperature difference in air blown from the evaporator 9 during the cold-releasing mode. Therefore, with a single temperature sensor 32 it is difficult to detect the evaporator air outlet temperature Te accurately, and consequently the temperature of air blown into the passenger compartment cannot be controlled accurately in the cold-releasing mode.

The following sixth preferred embodiment of the present invention addresses the point and reduces the temperature differences in air blown from the evaporator 9 during the cold-releasing mode. In the sixth embodiment, even if the target outlet temperature TAO of air blown into the passenger compartment is high, the bypass door 17 is operated to a position in which it opens the lower side area A of the air passage of the evaporator 9 to a predetermined opening degree from the start of the cold-releasing mode.

Figures 23A, 23B, 23C, 23D:
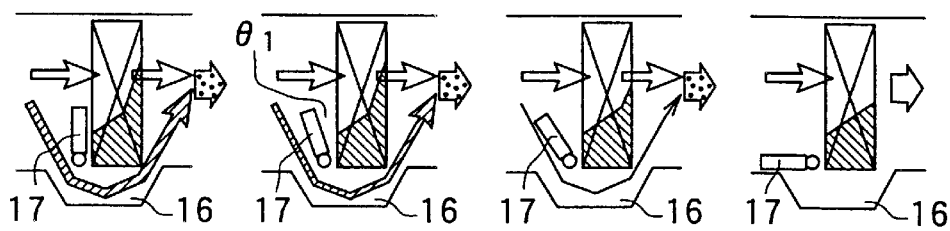
FIG. 23A is a view for explaining a state of a cold-storing mode.
FIGS. 23B, 23C, 23D are views for explaining states of a cold-releasing mode.
Figure 23E:
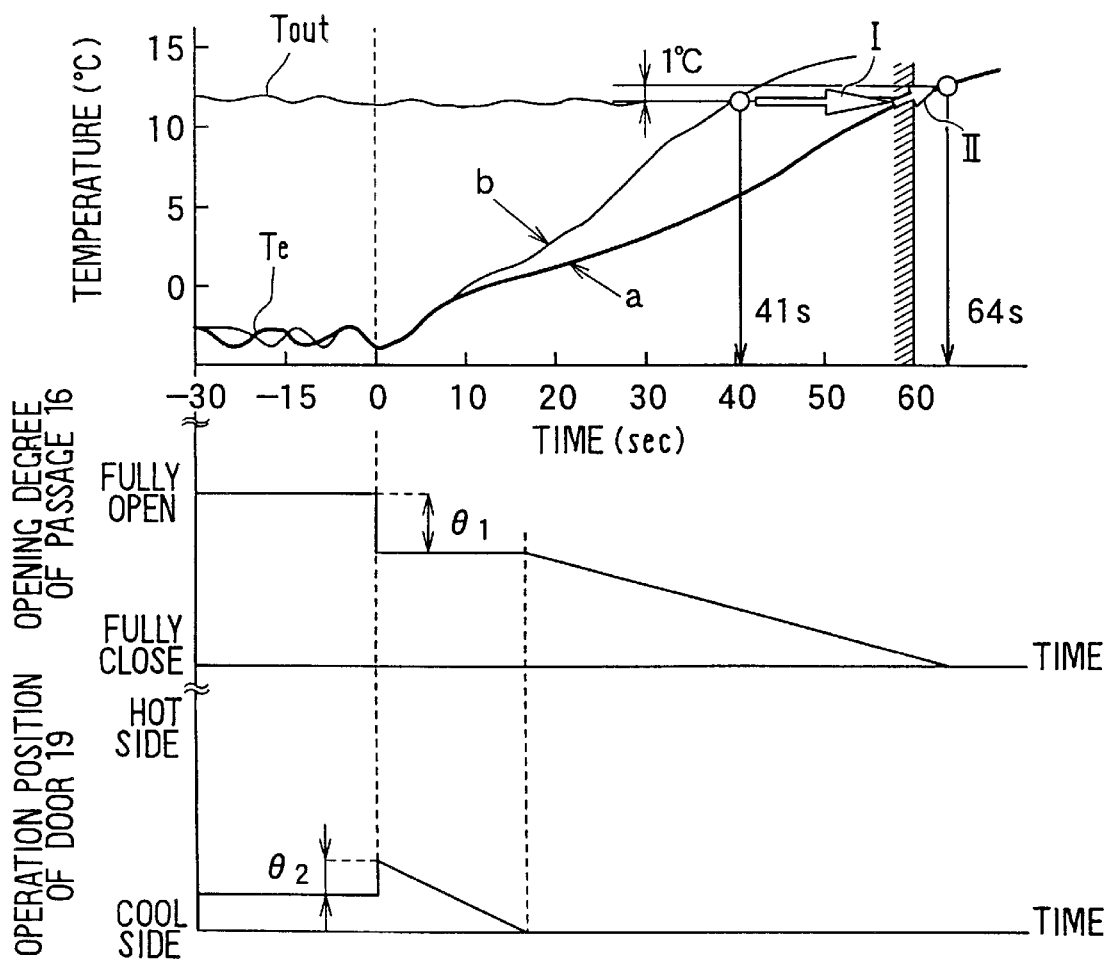
FIG. 23E is a view for explaining experimental results in the states of FIGS. 23A–23D, according to a sixth preferred embodiment of the present invention.

The operation control of the bypass door 17 according to the sixth preferred embodiment will now be explained specifically. The horizontal axis of FIG. 23E shows elapsed operating time of the air-conditioning system. Here, the time, at which the engine 4 is stopped and the cold-releasing mode is started after the cold-storing mode is executed during operation of the vehicle engine 4, is set to zero, the elapsed time of the cold-releasing mode is shown as time on the plus side, and the elapsed time of the cold-storing mode is shown as time on the minus side. FIG. 23A shows the cold-storing mode executed during operation of the vehicle engine 4, and FIGS. 23B, 23C, 23D show the cold-releasing mode when the opening degree of the first bypass passage 16 is reduced by the bypass door 17 in this order of FIGS. 23B, 23C, 23D along the elapses time increase of the cold-releasing mode.

From the start of the cold-releasing mode (elapsed time= 0), irrespective of the target outlet temperature TAO, the bypass door 17 is operated to a position in which it opens the lower side area A of the air passage of the evaporator 9 by a predetermined angle θ1, as shown in FIGS. 23B, 23E. As seen from the side of the first bypass passage 16, the opening degree of the first bypass passage 16 is decreased by the bypass door 17, and the amount of air passing through the first bypass passage 16 is decreased. Therefore, the air temperature blown into the passenger compartment is decreased.

Thus, to maintain the air temperature Tout blown into the passenger compartment at the temperature from before the start of the cold-releasing mode (from the cold-storing mode), it is necessary to compensate for the amount by which air passing through the first bypass passage 16 is decreased, with reheating of the heater core 20. To the end, after the start of the cold-releasing mode, with respect to before the start of the cold-releasing mode, the operating position of the air-mixing door 19 is temporarily moved by a predetermined angle θ2 toward its maximum heating position side (i.e., hot side in FIG. 23E). However, thereafter, the air-mixing door 19 is gradually moved back toward its maximum cooling position side (i.e., cool side in FIG. 23E) to maintain the air temperature (Tout) blown into the passenger compartment at the target outlet temperature TAO.

Because the bypass door 17 is operated to the position in which it opens the lower side area A of the air passage of the evaporator 9 by the predetermined angle θ1 from the start of the cold-releasing mode, a certain flow amount of air can be introduced into the lower side area A also. Consequently, from the start of the cold-releasing mode, not only ice in the upper side of the air passage of the evaporator 9 but also ice in the lower side area A can be melted. Thus, it is possible to markedly reduce the temperature differences (make even the temperature distribution) of the air temperature from the evaporator 9 in the vertical direction. As a result, the evaporator air outlet temperature Te can be accurately detected with a single temperature sensor 32 mounted directly downstream the evaporator 9. Here, the arrangement position of the temperature sensor 32 should be a position immediately behind the air outlet of the evaporator 9 and slightly above the bypass door 17 in a substantially central position in the vertical direction of the heat-exchanging core part of the evaporator 9.

In FIG. 23E, the evaporator air outlet temperature shown by graph "a" pertains to the sixth preferred embodiment, and the evaporator air outlet temperature shown by graph "b" pertains to a comparison example of an ordinary air-conditioning system (shown in FIG. 6A) not having the first bypass passage 16 or the bypass door 17. In the case of the comparison example, because all of air blown from the blower 11 passes through the evaporator 9, the flow amount of air passing through the evaporator 9 is large. Consequently, the melting rate of the ice is high and the rate of increase of the evaporator air outlet temperature Te is rapid as shown by graph "b" in FIG. 23E.

As a result, in the case of the comparison example, as shown by graph "b" in FIG. 23E, because the evaporator air outlet temperature Te reaches the temperature Tout of air blown into the passenger compartment, in 41 seconds from the start of the cold-releasing mode, the time for which the cold-releasing mode can be continued is short.

On the other hand, according to the sixth embodiment of the present invention, the bypass door 17 opens the first bypass passage 16 in the cold-releasing mode, so that the amount of air flowing through the evaporator 9 is decreased, the melting of ice on the evaporator 9 is thereby retarded and the rate of increase of the evaporator air outlet temperature Te can thus be reduced as shown by graph "a" in FIG. 23E. Thus, it is possible to extend the time taken for the evaporator air outlet temperature Te to reach the above-mentioned air temperature Tout blown into the passenger compartment to 60 seconds from the start of the cold-releasing mode, as shown by the arrow "I" in FIG. 23E.

In the case of the comparison example, since the amount of air flowing through the evaporator 9 is large, the melting rate of the ice is high and the proportion of water which evaporates into air is large. Therefore, the passenger liable to feel discomfort caused by a sudden rise in the passenger compartment humidity. However, in the sixth preferred embodiment, because the amount of air flowing through the evaporator 9 is reduced and the melting of the ice is retarded, the proportion of water evaporating into air can be made small. Consequently, it is possible to reduce the rate of increase of the passenger compartment humidity and suppress discomfort arising from a sense of humidity (mugginess due to humidity).

In the way, the limit evaporator air outlet temperature Teo at which passengers of the passenger compartment feel uncomfortable can be made 1° C. higher than in the case of the comparison example, as shown by the arrow "II" in FIG. 23E. As a result, the time for which the cold-releasing mode can be continued can be further extended by about four seconds.

As experimental conditions of FIGS. 23A–23E, the size of the heat-exchanging core part (passage part) of the evaporator 9 is: height=215 mm, width=253 mm, and thickness (front-rear dimension)=58 mm. The amount of water held in the evaporator 9 (the amount of condensed water) is 100 g, the length of the bypass door 17 is 90 mm, and the air amount flowing into the air-conditioning case 10 is 200 m³/h. The initial evaporator passage opening degree of the bypass door 17 (i.e., the evaporator passage opening degree at the start of the cold-releasing mode) is ¼, when the state of FIG. 23D is taken as fully open.

Figure 24:
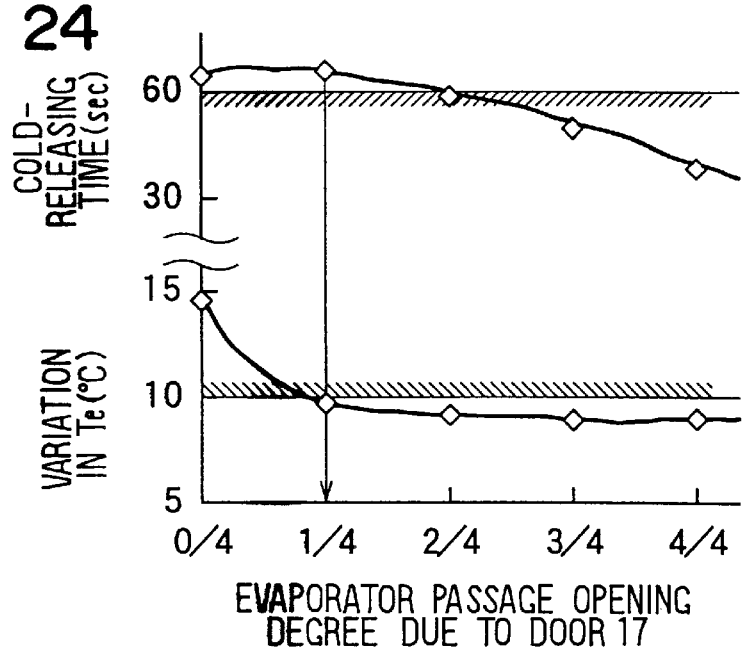
FIG. 24 is a graph showing experimental data according to the sixth embodiment.

Next, FIG. 24 shows experimental data showing the relationship between the evaporator passage opening degree of the bypass door 17 in the cold-releasing mode, the time (i.e., cold-releasing time in FIG. 24) for which the cold-releasing mode can be continued, and variation in the evaporator air outlet temperature Te. The experimental conditions are the same as those for FIGS. 23A–23E.

The horizontal axis of FIG. 24 shows initial evaporator passage opening degree (the evaporator passage opening degree at the start of the cold-releasing mode) due to the bypass door 17, and the vertical axis shows time for which the cold-releasing mode can be continued and the variation in the evaporator air outlet temperature Te. The time for which the cold-releasing mode can be continued is the time taken for the evaporator air outlet temperature Te to rise to the limit evaporator air outlet temperature Teo explained above with reference to FIGS. 23A–23E. The variation in the evaporator air outlet temperature Te is the difference between the maximum and minimum values of the evaporator air outlet temperature Te.

As shown in FIG. 24, until the initial evaporator passage opening degrees due to the bypass door 17 is increased to around ¼, the amount of air flowing through the evaporator 9 is small and the melting of the ice is retarded. Therefore, in this case, the possible cold-releasing mode duration can be kept at the same level as when the initial evaporator passage opening degree of the bypass door is ¾ (fully closing the lower side of the evaporator 9). On the other hand, it is found that it is possible to keep the variation in the evaporator air outlet temperature Te to be below 10° C. by increasing the initial evaporator passage opening degree due to the bypass door 17 to at least ¼.

Thus, by setting the initial evaporator passage opening degree due to the bypass door 17 to about ¼, it is possible to maintain the possible cold-releasing mode duration and to suppress the variation in the evaporator air outlet temperature Te at the same time.

Figure 25A:
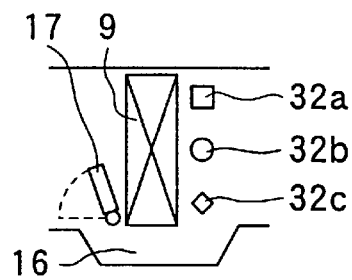
FIGS. 25A, 25B are views showing experimental date, for explaining a temperature difference between an evaporator air outlet temperature Te and a mean temperature blown from the evaporator, with a different arrangement of a temperature sensor, according to the sixth embodiment.
Figure 25B:
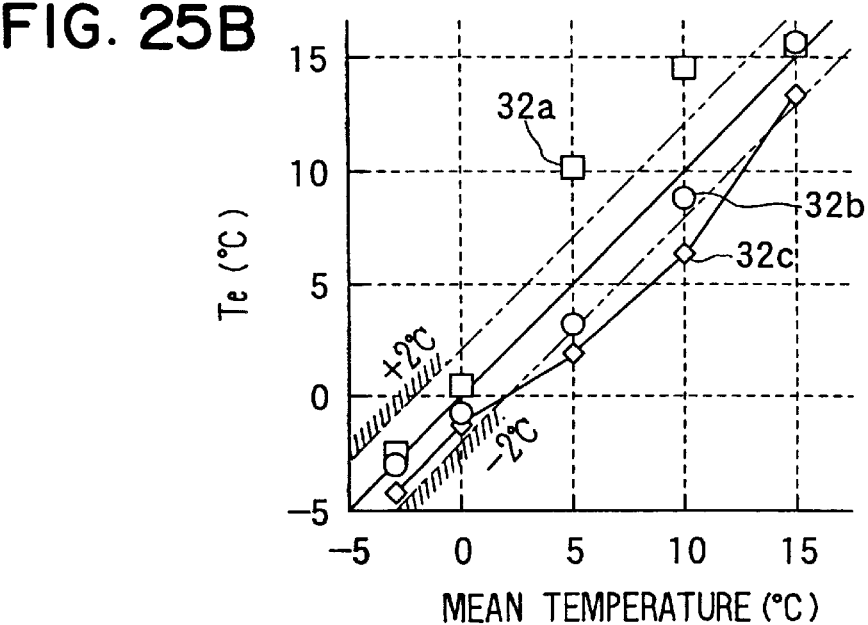

FIG. 25B shows experimental data showing a relationship between actual value (Te) of the evaporator air outlet temperature detected by the temperature sensor 32 disposed at different positions 32a, 32b, 32c as shown in FIG. 25A, and mean value (mean temperature) of the evaporator air outlet temperature. In FIGS. 25A, 25B, the experimental conditions are the same as those for FIG. 23E. That is, the evaporator passage opening degree due to the bypass door 17 corresponds to the fully close position of the lower side of the evaporator 9 shown in FIG. 23A during the cold-storing mode, and is varied between the initial evaporator passage opening degree of ¼ and fully open opening degree of 4/4 during the cold-releasing mode.

In the experiment of FIGS. 25A, 25B, three different positions 32a, 32b, 32c immediately behind the air outlet of the evaporator 9 are set as the arrangement positions of the temperature sensor 32. As shown in FIG. 25A, the arrangement position 32a is at an upper side, the arrangement position 32b is at a vertically middle position, and the arrangement position 32c is at a lower side, relative to the heat-exchanging core part of the evaporator 9 within the air-conditioning case 10. The arrangement position 32b at the vertically middle position of the heat-exchanging core part of the evaporator 9 is positioned slightly above the bypass door 17, as mentioned before.

As the experimental results in FIG. 25B, when a temperature sensor 32 is disposed in the arrangement position 32b slightly above the bypass door 17, it is possible to detect a temperature Te extremely close (within ±2° C.) to the mean temperature of the evaporator air outlet temperature by using only one temperature sensor 32. That is, it is possible to suppress the variation in the evaporator air outlet temperature Te by setting the initial evaporator passage opening degree by the bypass door 17, and it is possible to detect an evaporator air outlet temperature Te approximately equal to the mean value of the evaporator air outlet temperature with a single temperature sensor 32.

Seventh Preferred Embodiment

Figure 26:
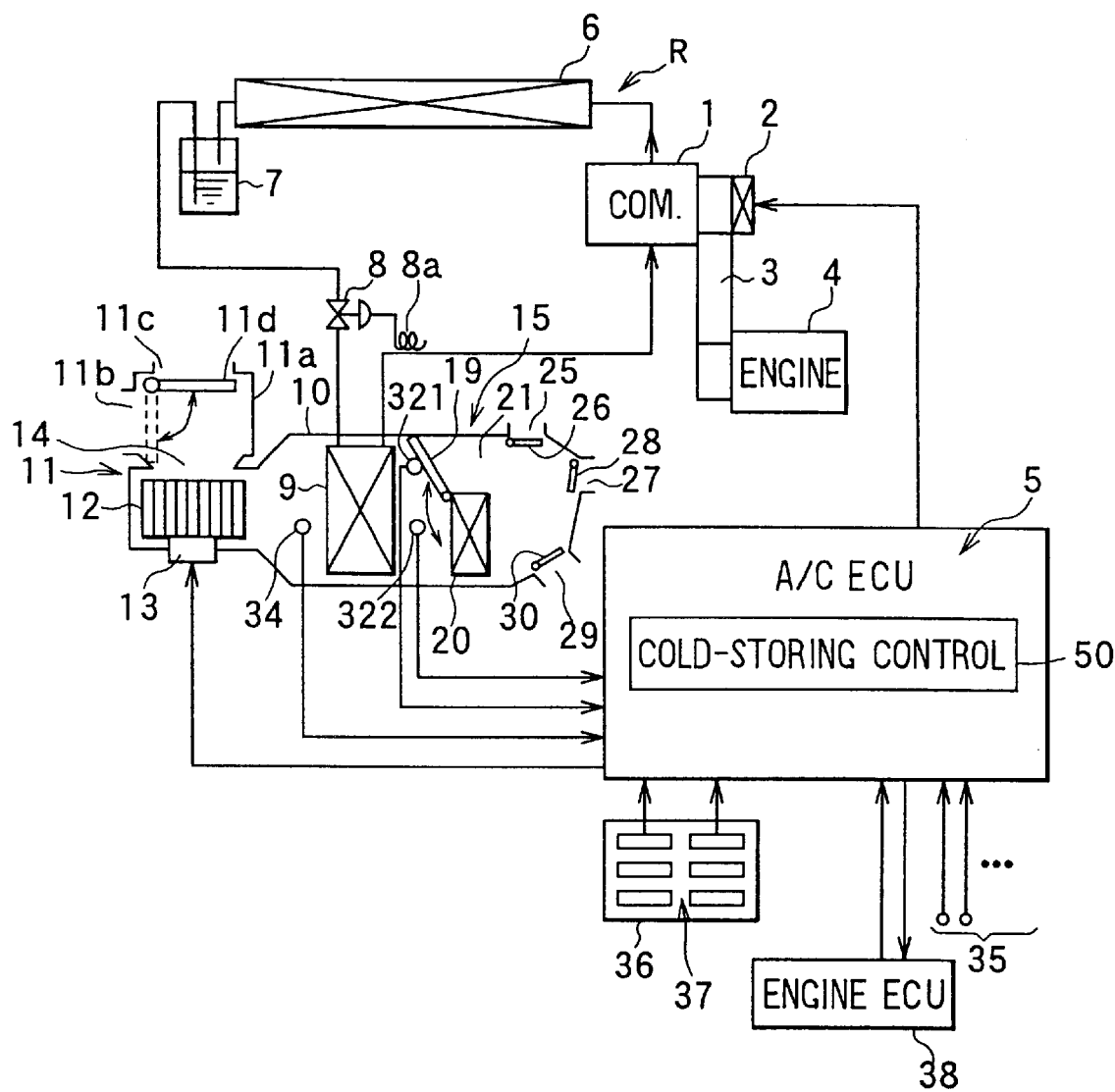
FIG. 26 is a schematic diagram showing a vehicle air-conditioning system according to a seventh preferred embodiment of the present invention.

FIG. 26 is a schematic view of the construction of a vehicle air-conditioning apparatus according to a seventh preferred embodiment of the present invention. The same parts as parts in FIG. 1 have been given the same reference numerals and will not be described again here.

An inside/outside air switching box 11a is disposed on the intake air side of the blower 11, and an inside air port 11b and an outside air port 11c of the inside/outside air switching box 11a are opened and closed by an inside/outside air switching door 11d. Air from inside the passenger compartment (inside air) or air from outside the vehicle (outside air) sucked through the inside/outside air switching box 11a is blown by the blower 11 into the air-conditioning case 10.

In the seventh preferred embodiment, within the air-conditioning case 10, the first bypass passage 16 and the bypass door 17 of the first preferred embodiment are not provided. Only a bypass passage 21 positioned to one side of the hot water type heater core 20 and an air-mixing door 19 for adjusting the flow proportions of air passing through the heater core 20 and air passing through the bypass passage 21 are provided.

In a plurality of locations (for example, two locations) immediately behind the air outlet of the evaporator 9 within the air-conditioning case 10, there are provided evaporator air outlet temperature sensors (evaporator cooling degree detecting means) 321, 322 consisting of thermistors. The evaporator air outlet temperature sensors 321, 322 detect air temperatures in plural predetermined locations immediately behind the air outlet of the evaporator 9 to determine the state of formation of frost in the evaporator 9. Also, inside the air-conditioning case 10, an evaporator intake air temperature sensor 34 consisting of a thermistor for detecting the intake air temperature of the evaporator 9 is disposed on the air intake side of the evaporator 9.

Detection signals from these sensors 321, 322 and 34 are inputted into the air-conditioning ECU 5, together with the detection signals from the sensor group 35 detecting an inside air temperature, an outside air temperature, a solar radiation, and a hot water temperature and so on and the operation control signals from the control switches 37 of the air-conditioning control panel 36.

At high cooling load, the air-conditioning ECU 5 of the seventh preferred embodiment outputs to the vehicle engine ECU 38 a signal prohibiting stoppage of the vehicle engine 4 (that is, a signal requesting that the vehicle engine 4 continues to be operated during vehicle halts).

Figure 27:
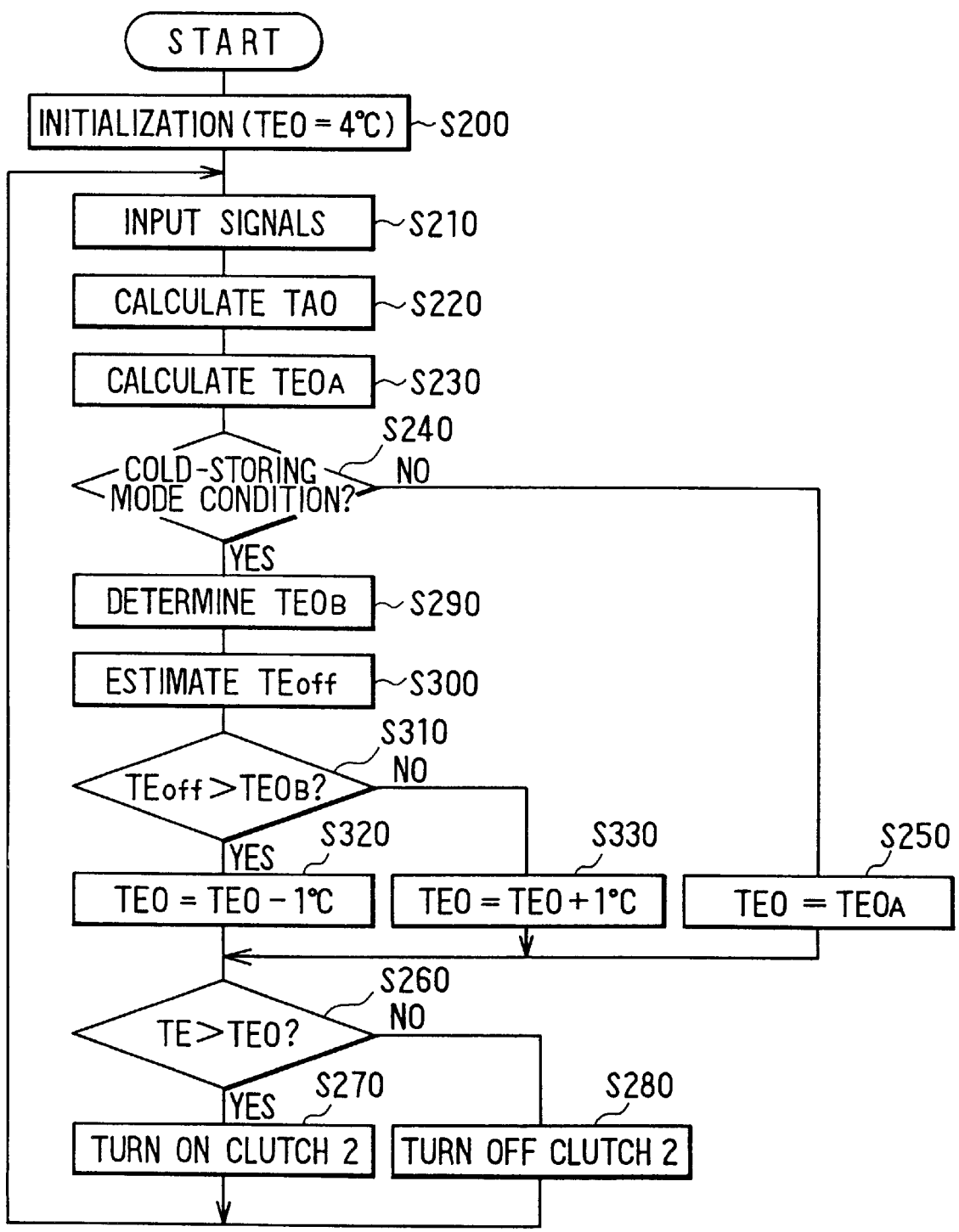
FIG. 27 is a flow diagram showing an operation control according to the seventh embodiment.

The operation of the vehicle air-conditioning system according to the seventh preferred embodiment will now be described. The flow diagram of FIG. 27 shows control processing executed by the microcomputer of the air-conditioning ECU 5. When the ignition switch (not shown) of the vehicle engine 4 is turned on and also an AUTO switch among the control switches 37 of the air-conditioning control panel 36 is turned on, the control routine of FIG. 27 is started. First, the target evaporator air outlet temperature TEO is initialized to 4° C. at step S200, and signals from the sensors and switches are input at step S210.

Then, at step S220, a target outlet temperature TAO (hereinafter, referred to as "TAO") of air blown into the passenger compartment is calculated (determined) on the basis of the foregoing expression Exp. 1. Here, TAO is the target air temperature necessary to maintain the passenger compartment at a set temperature set by a passenger in the passenger compartment.

At the following step S220, a normal target evaporator air outlet temperature $TEO_A$ during the normal mode is calculated. Determination of the target evaporator air outlet temperature $TEO_A$ is carried out on the basis of a first target evaporator air outlet temperature $TEO_{A1}$ and a second target evaporator air outlet temperature $TEO_{A2}$, which will be discussed next.

Figure 28:
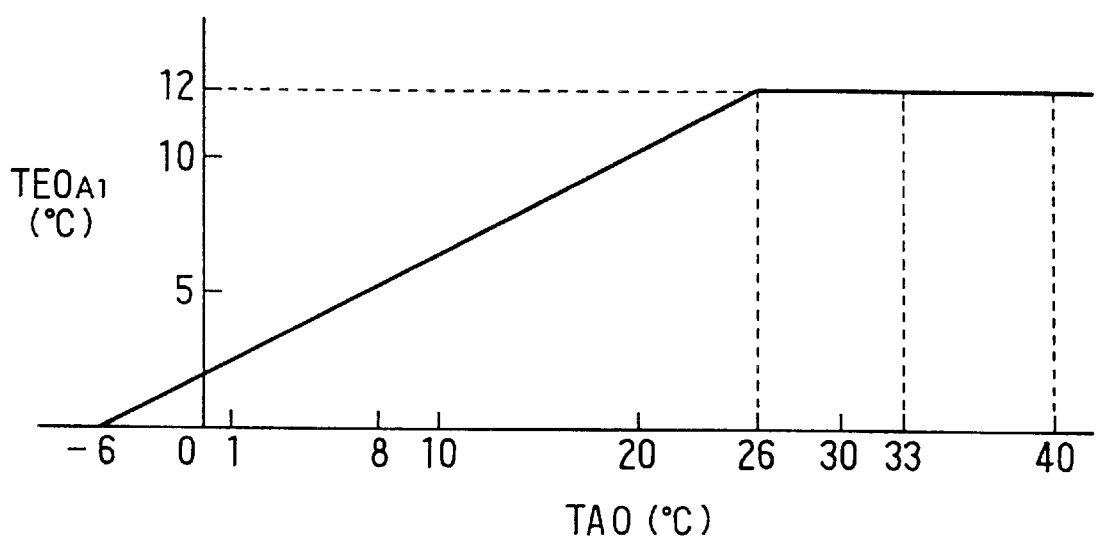
FIG. 28 is a graph showing the relationship between a first target evaporator air outlet temperature TEOA1 and a target outlet temperature TAO of air blown into a passenger compartment, according to the seventh embodiment.
Figure 29:
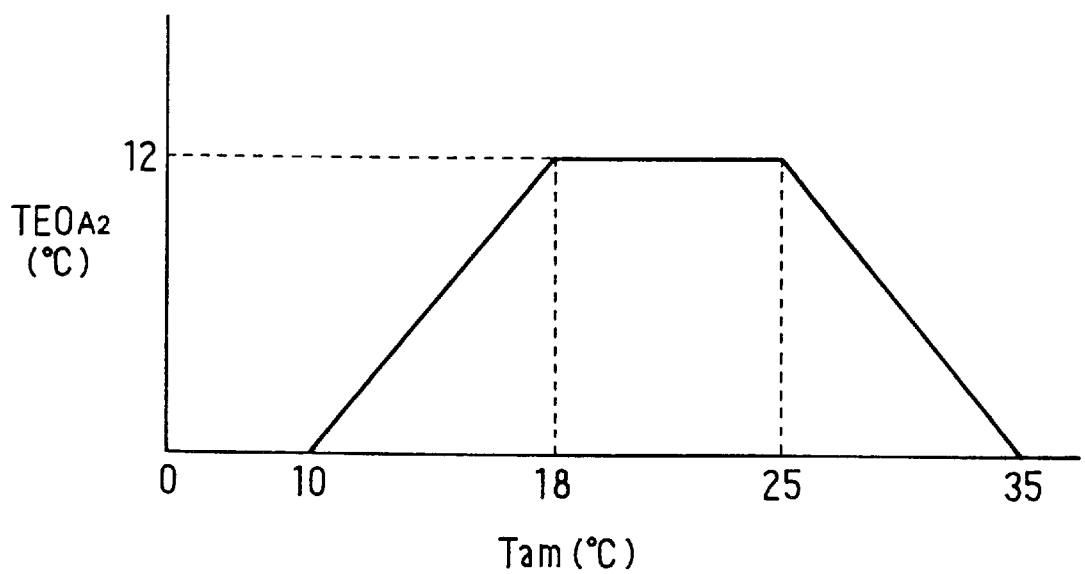
FIG. 29 is a graph showing the relationship between a second target evaporator air outlet temperature TEOA2 and an outside air temperature Tam, according to the seventh embodiment.

First, the first target evaporator air outlet temperature $TEO_{A1}$ is determined based on the map shown in FIG. 28 (the same characteristic as that of FIG. 3). Then, the second target evaporator air outlet temperature $TEO_{A2}$ is determined based on the map shown in FIG. 29 (the same characteristic as that of FIG. 4).

Then, among the first target evaporator air outlet temperature $TEO_{A1}$=f(TAO) and the second target evaporator air outlet temperature $TEO_{A2}$=f(Tam), the lower temperature is finally set as the normal target evaporator air outlet temperature $TEO_A$ at step S230.

Processing then proceeds to step S240 and determines whether or not conditions permit the execution of a cold-storing mode for performing cold-storing control of condensed water condensing on the evaporator 9. That is, at step S240, it is determined whether or not it is in a cold-storing mode condition. Here, cold-storing control carried out in the cold-storing mode is for controlling the amount of cold stored in condensed water on the evaporator 9 while the vehicle engine 4 is operated, in advance preparation for the next time when the vehicle engine is stopped when the vehicle is halted temporarily for example at a traffic signal.

More specifically, to increase the amount of cold stored in water condensed on the evaporator 9, it is necessary either to lower the temperature of the condensed water by lowering the evaporator temperature or to increase the quantity of the condensed water. Here, to increase the amount of cold stored in the condensed water effectively, it is preferable to cool the condensed water to below freezing point and to store cold therein in the form of latent heat.

In the preferred embodiment, the cold-storing mode is executed when none of the following three conditions applies. That is, as shown at steps S1410 through S1430 in FIG. 30, when none of the conditions of [1] the vehicle is traveling at high speed at step S1410, [2] frosting of the evaporator 9 is reached to a predetermined limit level (i.e., limit level frost) at step S1420, and [3] the cooling load on the system is high at step S1430, applies, execution of the cold-storing mode is permitted. However, if any one of the conditions [1] through [3] does apply, then execution of the cold-storing mode is prohibited.

That is, at the high-speed travel of the vehicle, because it can be expected that the frequency of vehicle halts will be low, there is no need for cold-storing control to be carried out in preparation for a vehicle engine stoppage during a vehicle halt. When frosting of the evaporator 9 is progressed to a predetermined limit level, the cold-storing mode is not executed to prevent a reduction of the evaporator cooling performance caused by further frosting of the evaporator 9. Further, when frosting is reached to a predetermined limit level, the amount of cold stored in frozen condensed water has already increased, and therefore, it is unnecessary for the cold-storing mode to be executed. Even if the cold-storing mode is executed when the cooling load is high, the air temperature blown into the passenger compartment would rise quickly and the cooling feeling is deteriorated immediately after an engine stoppage. Therefore, in the high cooling load, engine stoppage itself is canceled and the cold-storing mode during the operation of the engine 4 also is not executed.

Figure 30:
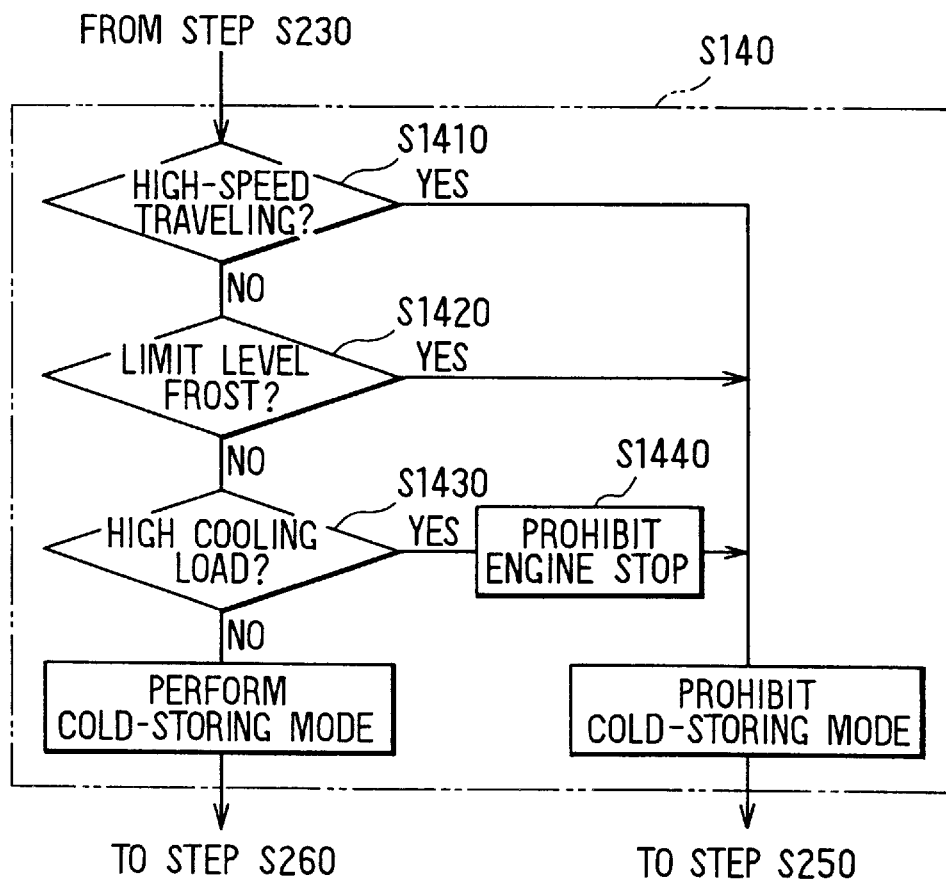
FIG. 30 is a detail flow diagram of a main step in FIG. 27.

In the determination of high-speed travelling carried out at step S1410 of FIG. 30, the vehicle is determined to be traveling at high speed when for example the vehicle speed>70 km/h or the engine speed>2500 rpm. A high-speed travel determination can also be made from map information of a car navigation system.

The determination of frosting of the evaporator 9 carried out at step S1420 is performed in the following way. Frosting on the evaporator 9 occurs locally, and the local frosting progressively spreads. In areas where frosting is occurred, the flow of air is restricted and the evaporator air outlet temperature becomes lower. Therefore, a temperature difference generates in air blown from the evaporator 9 between areas where frosting has occurred and areas where frosting has not occurred. In view of this, it can be determined that frosting of the evaporator 9 is reached to a predetermined limit level when the difference in the detected temperatures of the evaporator air outlet temperature sensors 321, 322 mounted in different locations is above a predetermined value (for example 5° C.).

Here, the precision of the determination of the frosting limit level of the evaporator 9 may be raised by carrying out the determination using an AND condition such as that the difference in the detected temperatures of the evaporator air outlet temperature sensors 321, 322 mounted in different locations is above a predetermined value and furthermore the temperature difference above a predetermined value is continued for a predetermined time (for example three minutes). In addition to the determination condition, the further determination condition that the detected temperature of at least one of the temperature sensors 321, 322 is 0° C. may be added.

In the high cooling load determination carried out at step S1430, the cooling load is determined to be high when the temperature difference (TE-TEO) between the actual evaporator air outlet temperature TE and the target evaporator air outlet temperature TEO is above a predetermined value (for example 5° C.). The actual evaporator air outlet temperature TE is the average value of the detected temperatures of the evaporator air outlet temperature sensors 321, 322.

When at step S1430 it is determined that the cooling load is high, a command signal prohibiting engine stoppage (requesting running of the engine) is outputted to the vehicle engine ECU 38 at step S1440. Even when the vehicle halts when the engine stoppage prohibiting command signal is issued, because the vehicle engine ECU 38 does not stop the engine 4, the compressor 1 continues to operate and thereby a sudden rise in the passenger compartment temperature caused by stoppage of the compressor 1 at a time of high cooling load is prevented and discomfort of passengers is avoided.

When it is not in the cold-storing mode condition at step S240, processing proceeds to step S250 and sets the target evaporator air outlet temperature TEO to the normal target evaporator air outlet temperature $TEO_A$. In the following step S260, the target evaporator air outlet temperature TEO and the actual evaporator air outlet temperature TE are compared. When TE>TEO, processing proceeds to step S270 and switches on the electromagnetic clutch 2 to operate the compressor 1. Conversely, when TE≦TEO, processing proceeds to step S280 and switches off the electromagnetic clutch 2 and thereby stops the compressor 1.

On the other hand, when at step S240 none of the conditions [1] through [3] apply and it is in the cold-storing mode condition, processing proceeds to step S290 and determines a target evaporator air outlet temperature $TEO_B$ after engine stoppage.

Figure 31:
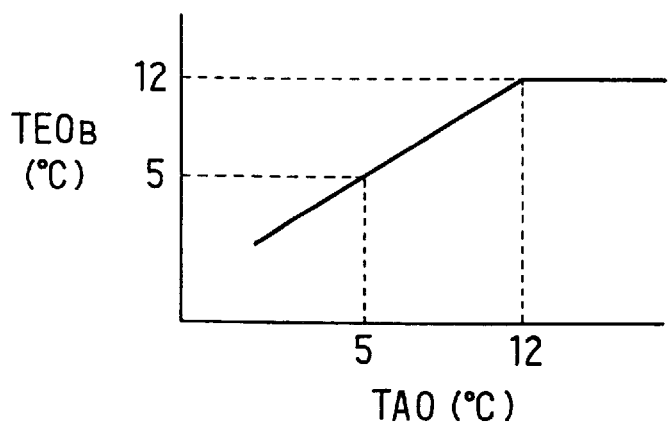
FIG. 31 is a graph showing the relationship between TEOB and the target outlet temperature TAO, according to the seventh embodiment.

Specifically, the target evaporator air outlet temperature $TEO_B$ after engine stoppage is a target evaporator air outlet temperature after the elapsing a predetermined time (for example 1 minute) from engine (compressor) stoppage, and is determined on the basis of TAO as shown by the map in FIG. 31. In FIG. 31, $TEO_B$ rises with TAO until TAO reaches a predetermined temperature (12° C.), and $TEO_B$ is fixed at 12° C. in an area of TAO above 12° C.

The characteristic of FIG. 31 is merely an example, and alternatively for example $TEO_B$ may be made constant at 12° C., or $TEO_B$ may be set to TAO−1° C. Thus, various changes can be made to the specific method by which $TEO_B$ is determined. For example, the target evaporator air outlet temperature $TEO_B$ after engine stoppage can be determined within a range such that the cooling feeling after the elapsing of a predetermined time (for example 1 minute) from engine (compressor) stoppage is not lost. The reason for making the predetermined time from engine (compressor) stoppage 1 minute by way of example here is that on average the temporary stop time (engine stop time) at traffic signals and the like is about 1 minute.

Processing then proceeds to step S300 and estimates an evaporator air outlet temperature after engine stoppage $TE_{off}$. As the evaporator air outlet temperature $TE_{off}$ after engine stoppage, the evaporator air outlet temperature after the elapsing of a predetermined time (for example 1 minute) from engine stoppage is estimated for example on the basis of evaporator intake air conditions (temperature, humidity) and flow amount during engine running at the present time and the evaporator air outlet temperature TE at the present time.

Figure 32:
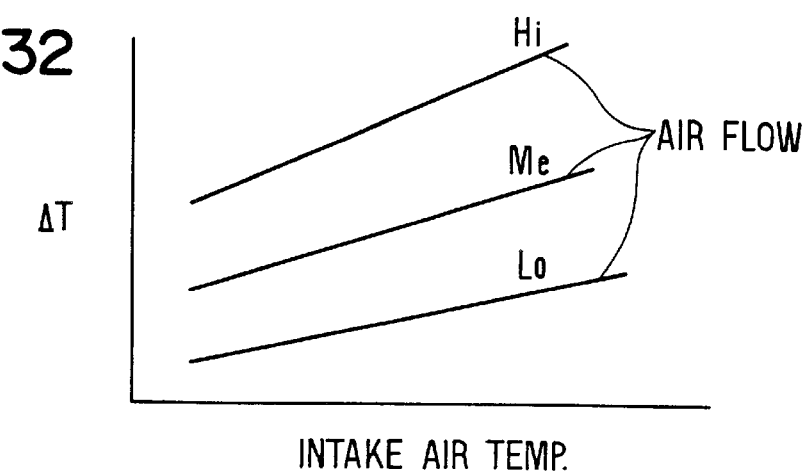
FIG. 32 is a characteristic view for estimating an evaporator air outlet temperature after engine stoppage, according to the seventh embodiment.

Specifically, the evaporator air outlet temperature after engine stoppage $TE_{off}$ is estimated on the basis of the following expression Exp. 17 and the map of FIG. 32.

$$TE_{off} = \text{present } TE + \Delta T \quad\quad\quad\quad \text{Exp. 17}$$

Here, ΔT is determined as shown in the map of FIG. 32 on the basis of the evaporator intake air temperature and flow amount of air by the blower 11, and is increased as the evaporator intake air temperature and the flow amount of air increase.

Processing then proceeds to step S310 in FIG. 27 and compares the target evaporator air outlet temperature after engine stoppage $TEO_B$ with the evaporator air outlet temperature after engine stoppage $TE_{off}$. When $TE_{off} > TEO_B$, processing proceeds to step S320 and corrects TEO to TEO−1° C. Conversely, when $TE_{off} \leq TEO_B$, processing proceeds to step S330 and corrects TEO to TEO+1° C.

As the computation of steps S320 and S330, the first time after starting of the control routine of FIG. 27, because TEO is set at 4° C. in the initialization of step S100, the computation 4° C.±1° C. is carried out. Further, from the second time onward, the computation of applying ±1° C. to the present TEO is carried out.

Then, at steps S260 through S280, on/off control of the electromagnetic clutch 2 (and hence the compressor 1) is carried out on the basis of the comparison of the TEO computed at steps S320 and S330 and the actual evaporator air outlet temperature TE.

As will be understood from the foregoing description, in the seventh embodiment, the cold-storing mode is executed by the steps S290 through S330 for setting the target evaporator air outlet temperature TEO and the steps S260 through S280 for on/off controlling the compressor 1.

When the vehicle is halted for example at a traffic signal, when the vehicle engine ECU 38 determines that the vehicle is halted based on the speed signal of the engine 4, the vehicle speed signal or a brake signal or the like, the vehicle engine ECU 38 automatically stops the engine 4, for example by stopping fuel injection, except when a command signal prohibiting stoppage of the engine because the cooling load is high has been issued (at step S1440 of FIG. 30).

Consequently, when the vehicle halts, the compressor 1 of the refrigerant cycle also inevitably stops. However, the air-conditioning ECU 5 continues its functions other than compressor control, such as flow amount control and outlet air temperature control, in the same way as when the vehicle is traveling.

Thus, when the engine 4 stops because the vehicle halts, the compressor 1 also stops. However, while the vehicle is traveling, in advance, when it is estimated that the evaporator air outlet temperature after engine stoppage $TE_{off}$ will exceed the target evaporator air outlet temperature after engine stoppage $TEO_B$, the target evaporator air outlet temperature TEO is lowered to a predetermined value α (for example 1° C.) at step S320 to lower the temperature of water condensed on the evaporator 9 and raise the amount of the condensed water. Therefore, the amount of cold stored in condensed water on the evaporator 9 is increased. As a result, when the engine 4 stops, an action of cooling of conditioned air can be obtained through the releasing of cold stored in the condensed water on the evaporator 9, and the evaporator air outlet temperature after engine stoppage $TE_{off}$ can thereby be kept below the target evaporator air outlet temperature after engine stoppage $TEO_B$ to suppress deterioration of the cooling feeling experienced by the passenger in the passenger compartment after the engine is stopped.

In the seventh embodiment of the present invention, the time for which the engine stops during vehicle halts is assumed to be 1 minute. Therefore, when the engine stoppage time becomes longer than 1 minute, the evaporator air outlet temperature after engine stoppage $TE_{off}$ will rise above the target evaporator air outlet temperature after engine stoppage $TEO_B$. However, the only way of dealing with the situation is to start the engine 4 and operate the compressor 1.

Accordingly, when the engine stoppage time becomes longer after the engine stops and consequently the evaporator air outlet temperature after engine stoppage $TE_{off}$ rises above the target evaporator air outlet temperature after engine stoppage $TEO_B$, a command signal requesting starting of the engine 4 may be outputted from the air-conditioning side so that the engine 4 is restarted. When the compressor 1 is restarted, the cooling action of the evaporator 9 restarts and a deterioration in the cooling feeling is thereby prevented.

Also, when a driver performs an accelerating operation from the halted state, the vehicle engine ECU 38 automatically starts the vehicle engine 4 on the basis of an accelerator signal or the like and thereby restarts the compressor 1.

Eighth Preferred Embodiment

In the abode-described seventh embodiment of the present invention, a necessary amount of cold stored in water condensed on the evaporator 9 is secured during engine running in advance of any engine stoppage by controlling the temperature of water condensed on the evaporator 9. That is, the behavior (temperature rise) of an evaporator air outlet temperature $TE_{off}$ after stoppage of the vehicle engine 4 (that is, stoppage of the compressor 1) is estimated (step S300) during engine running (during compressor running) and the target evaporator air outlet temperature TEO during engine running is corrected accordingly (steps S320, S330).

Figure 33:
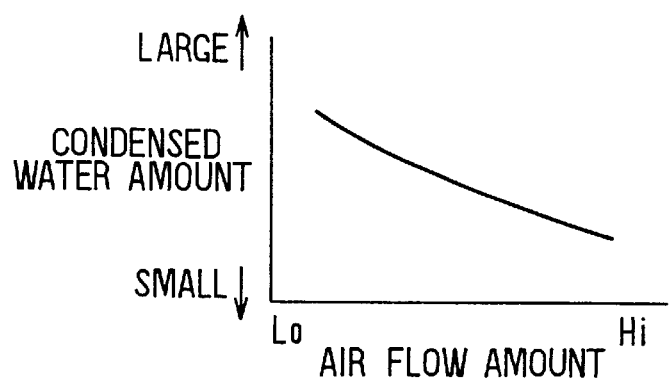
FIG. 33 is a graph showing the relationship between an air flow amount blown by a blower and an amount of condensed water on an evaporator, according to an eighth preferred embodiment of the present invention.

With respect to this, in the following eighth preferred embodiment, a necessary amount of cold stored in water condensed on the evaporator 9 is secured during engine running in advance of any engine stoppage by an increased amount of water condensed on the evaporator 9, and the amount of water condensed on the evaporator 9 is secured by adjustment of the flow amount of air blown by the blower 11. That is, as shown in FIG. 33, there is a correlation between the amount of condensed water on the evaporator 9 and the flow amount of air blown by the blower 11. As shown in FIG. 33, the lower the air flow amount is, the less condensed water blown off from the evaporator 9 by the flow pressure of air becomes, and the greater the amount of condensed water held on the evaporator 9 becomes.

Figure 34:
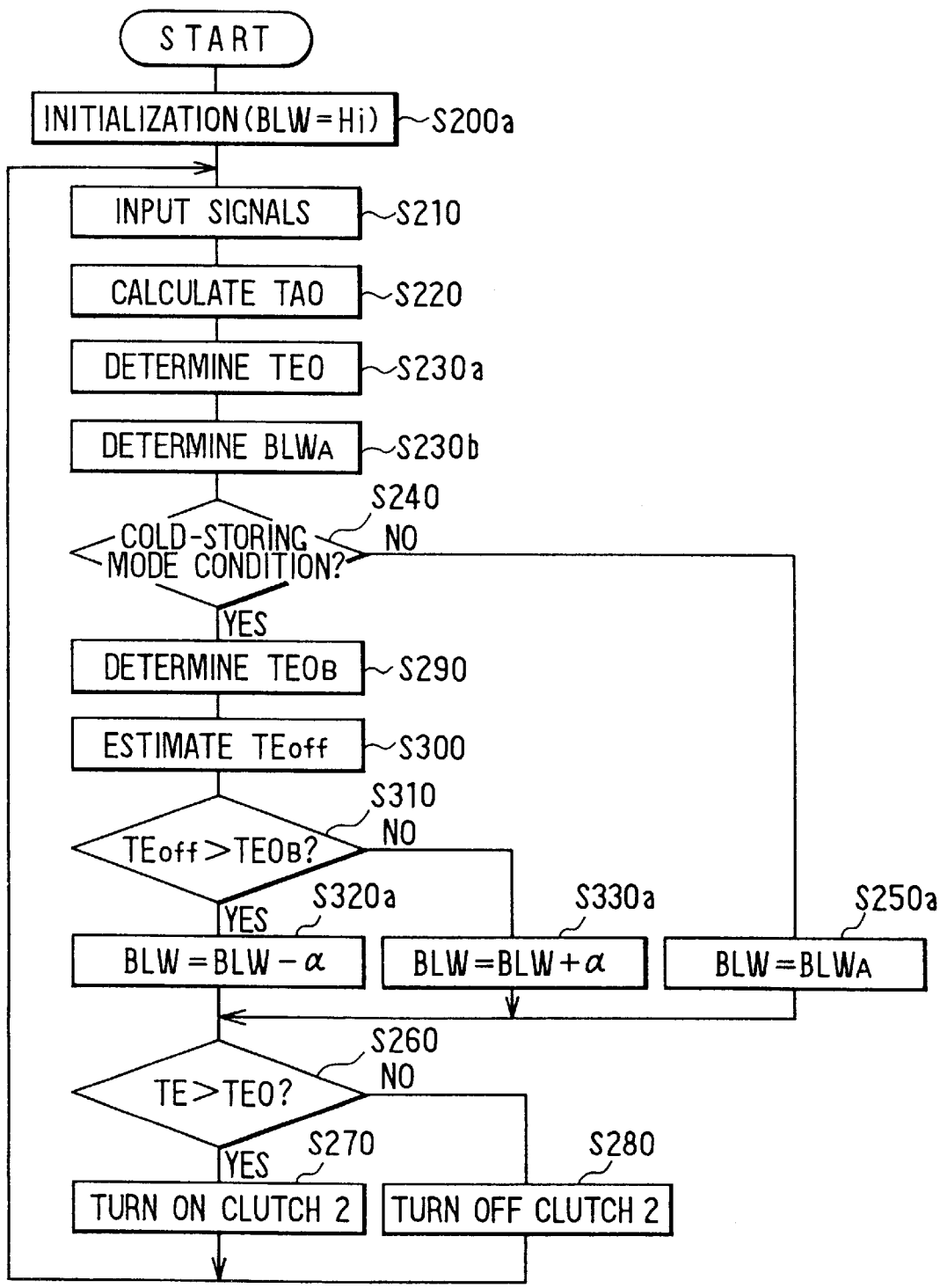
FIG. 34 is a flow diagram showing an operation control according to the eighth embodiment.

Accordingly, in the eighth embodiment of the present invention, the flow amount of air blown by the blower 11 is controlled as shown in the flow diagram of FIG. 34. That is, at step S320a, a target air flow amount BLW of the blower 11 is adjusted to BLW−α to increase the amount of condensed water. Further, at step S330a, to decrease the amount of condensed water, the target air flow amount BLW of the blower 11 is adjusted to BLW+α.

When it is estimated that the evaporator air outlet temperature after engine stoppage $TE_{off}$ will exceed the target evaporator air outlet temperature after engine stoppage $TEO_B$, the target air flow amount BLW is reduced to increase the amount of water condensed on the evaporator 9 and thereby increase the amount of cold stored in condensed water on the evaporator 9. Thus, when the engine 4 is stopped, an action of cooling air can be obtained through a releasing of cold stored in condensed water on the evaporator 9, and it is thereby possible to keep the evaporator air outlet temperature after engine stoppage $TE_{off}$ within the target evaporator air outlet temperature after engine stoppage $TEO_B$ and suppress any deterioration in cooling feeling during the engine stoppage.

In FIG. 34, the steps similar to those in FIG. 27 are indicated with the same step numbers, and steps in which the flow diagram of FIG. 34 differs from FIG. 27 will now be briefly explained. At step S200a, the target air flow amount BLW is initialized to a maximum level Hi. At step S230a, the target evaporator air outlet temperature TEO is determined. The target evaporator air outlet temperature TEO is determined by the same method as the normal target evaporator air outlet temperature $TEO_A$ in the above-described first preferred embodiment.

Figure 35:
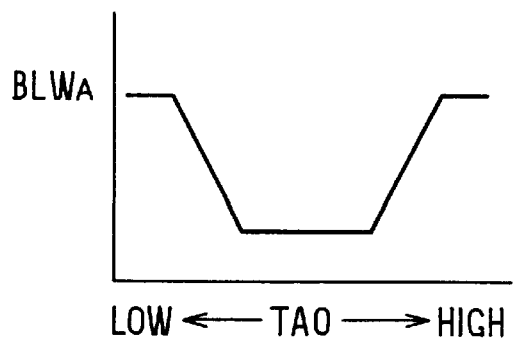
FIG. 35 is a graph showing the relationship between a target air flow amount BLWA and the target outlet temperature TAO of air blown into the passenger compartment, according to the eighth embodiment.

At step S230b, a normal target air flow amount $BLW_A$ is determined on the basis of TAO as shown in FIG. 35. At step S250a, the target air flow amount BLW is set to the normal target air flow amount $BLW_A$. The other steps are the same as steps in FIG. 27.

Correction control of the target air flow amount BLW according to the eighth preferred embodiment may be performed in combination with correction control of the target evaporator air outlet temperature TEO according to the seventh preferred embodiment.

Ninth Preferred Embodiment

In the above-described seventh and eighth preferred embodiments, a necessary temperature or amount of cold stored in water condensed on the evaporator 9 is secured during vehicle travel in advance of any stoppage by the behavior (temperature rise) of an evaporator air outlet temperature $TE_{off}$ after stoppage of the vehicle engine 4 (that is, stoppage of the compressor 1) being estimated during engine running.

Figure 36:
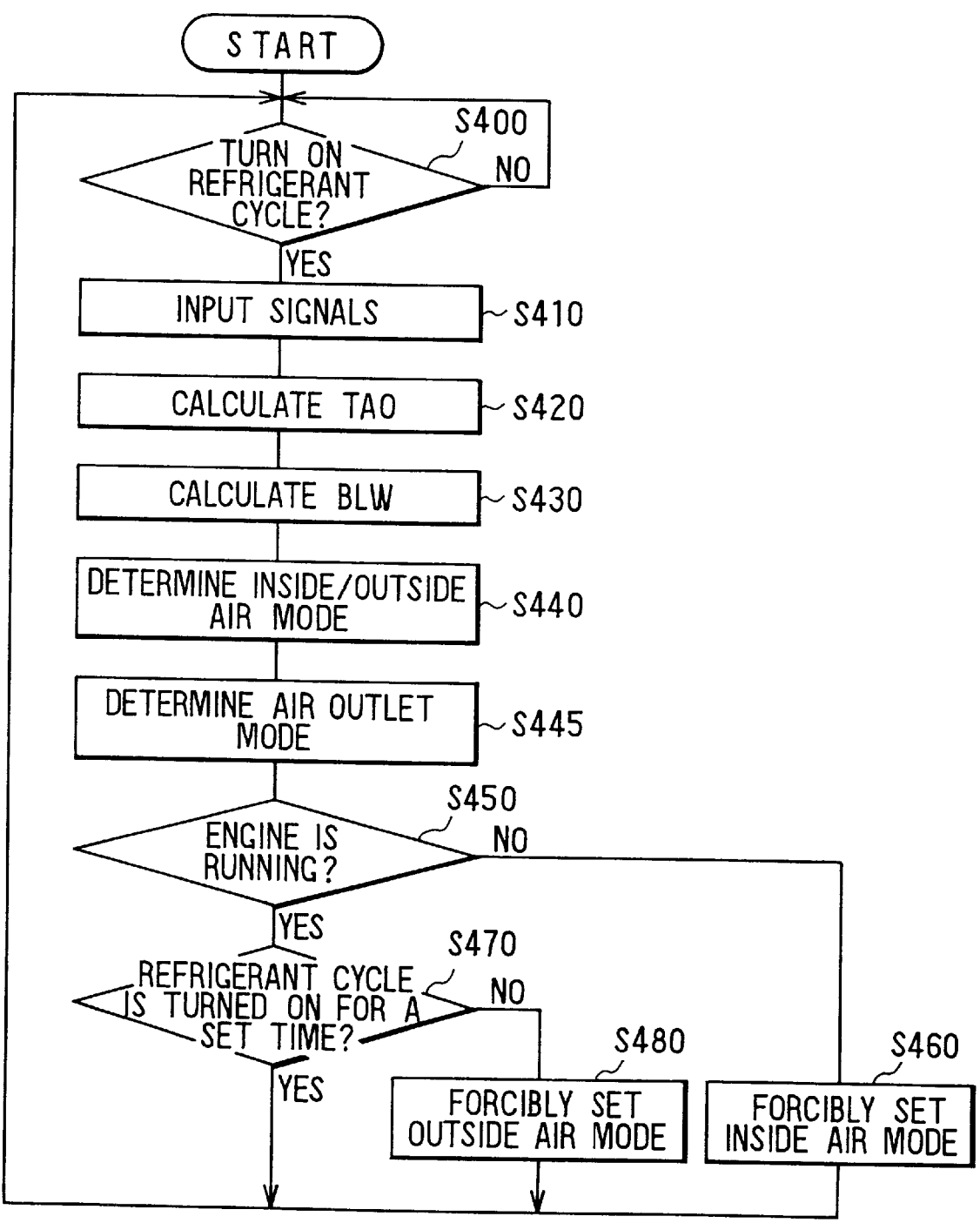
FIG. 36 is a flow diagram showing an operation control according to a ninth preferred embodiment of the present invention.

With respect to this, in the following ninth preferred embodiment of the present invention, the inside/outside air introduction mode is controlled in accordance with the operation state of the engine 4 and the state of formation of condensed water on the evaporator 9. FIG. 36 is a flow diagram showing the ninth preferred embodiment. Firstly, at step S400, it is determined whether or not the refrigerant cycle R of the air-conditioning system is turned on (has been started). Specifically, the starting of the refrigerant cycle R is determined on the basis of whether or not the air-conditioning switch (compressor switch) among the control switches 37 of the air-conditioning control panel 36 is turned on.

When the refrigerant cycle R is turned on, signals from the various sensors and switches are input at step 410. The step S410 is the same as step S210 in FIGS. 27 and 34.

Figure 37:
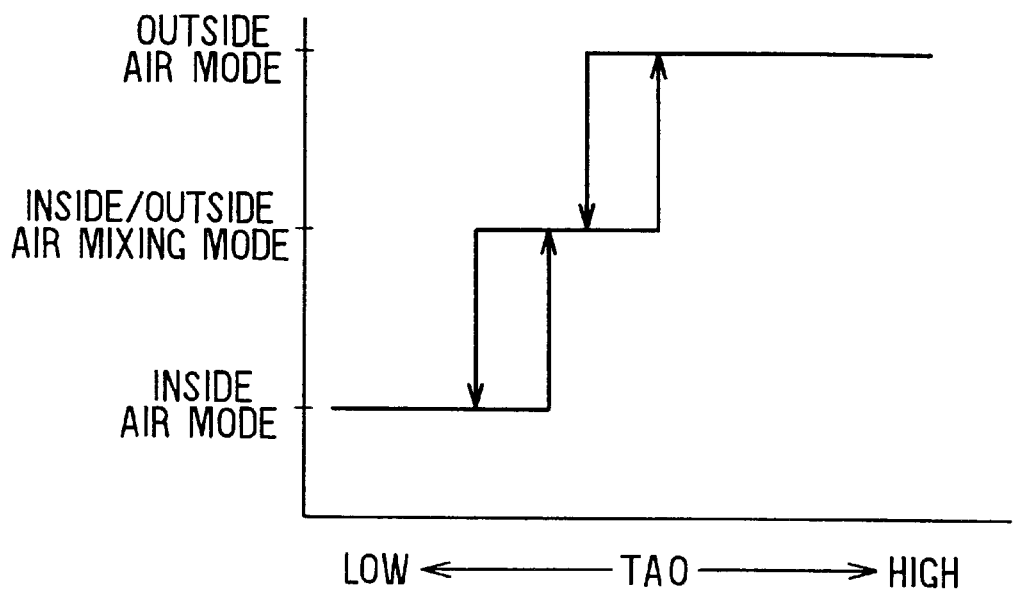
FIG. 37 is a graph showing the relationship between an inside/outside air mode and the target outlet temperature TAO, according to the ninth embodiment.

In the following step S420, a target outlet temperature TAO is calculated in the same way as at step S220 in FIGS. 27 and 34. Then, at step S430, a target air flow amount BLW is calculated. The target air flow amount BLW is determined on the basis of TAO using the same characteristic as that of $BLW_A$ in FIG. 35. Then, at step S440, an inside/outside air mode is determined. The inside/outside air mode is also determined on the basis of the TAO, as shown in FIG. 37. FIG. 37 shows an example of a characteristic for determining the inside/outside air mode. That is, when the TAO is on the low-temperature side (maximum cooling side), the inside air mode is selected. When the TAO is on the high-temperature side (maximum heating side), the outside air mode is selected. Further, when the TAO is in an intermediate temperature area, an inside/outside air mixed mode is selected.

Figure 38:
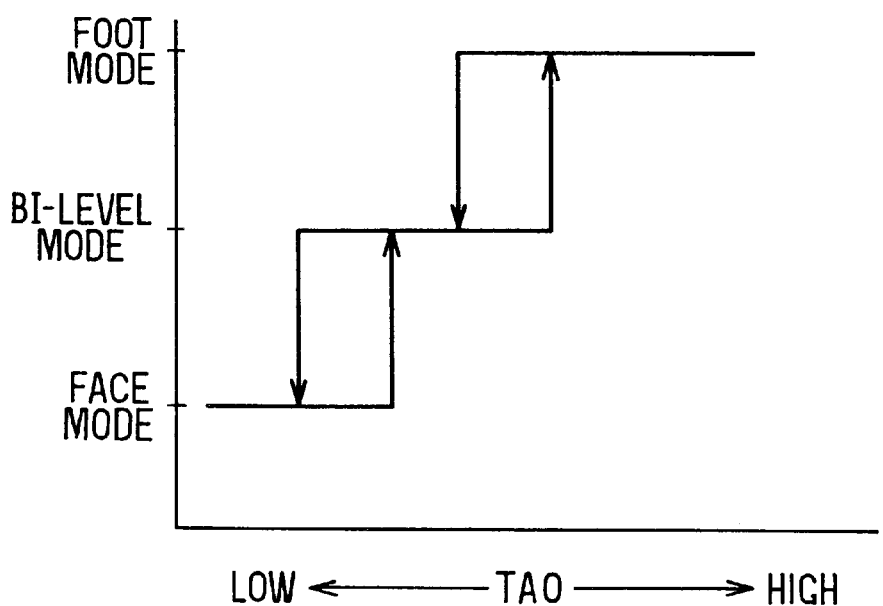
FIG. 38 is a graph showing the relationship between an air outlet mode and the target outlet temperature TAO, according to the ninth embodiment.

Then, at step S445, the air outlet mode is determined on the basis of the TAO as shown in FIG. 38. That is, when the TAO is on the low-temperature side, a face mode, wherein air is blown from the face opening 27, is selected. When the TAO is in an intermediate area, a bi-level mode, wherein air is blown simultaneously from the face opening 27 and the foot opening 29, is selected. Further, when the TAO is in on a high-temperature side, a foot mode, wherein air is blown from the foot opening 29, is selected.

Then, at step S450, it is determined whether or not the engine 4 is running (whether the vehicle is traveling). For example, when the vehicle speed<10 km/h and the engine speed<100 rpm, it is determined that the engine is stopped (is not operated), and processing proceeds to step S460 and forcibly sets the inside air mode. That is, irrespective of the inside/outside air mode determined at step S440, the inside/outside air switching door 11d is forcibly operated to a position in which it introduces inside air (the position in which it is shown with solid lines in FIG. 26), whereby inside air only is introduced into the air-conditioning case 10.

When the engine 4 is running (and the compressor is running), processing proceeds to step S470 and determines whether or not the refrigerant cycle R has been turned on continuously for a predetermined time (for example, 5 minutes). The determination at step S470 is for assessing how much condensed water is held on the evaporator 9. Immediately after starting of the refrigerant cycle R, the evaporator 9 is dry and the amount of condensed water held on the evaporator 9 is nil.

Accordingly, when the refrigerant cycle R has been on for less than the predetermined set time (e.g., five minutes), processing proceeds to step S480 and forcibly sets the inside/outside air mode to the outside air mode. That is, irrespective of the inside/outside air mode determined at step S440, the inside/outside air switching door 11d is forcibly operated to a position in which it introduces outside air only (the position in which it is shown with dashed lines in FIG. 26), whereby outside air only is introduced into the air-conditioning case 10.

The forced outside air mode performed at step S480 is continued for five minutes, to accumulate a quantity of condensed water on the evaporator 9. That is, condensed water can be accumulated more quickly by the dehumidifying action of the evaporator 9 by introducing outside air, which contains unlimited moisture, than by condensing the limited amount of moisture contained in inside air from inside the passenger compartment. After the five minutes for which the outside air mode is forcibly invoked by step S470, the inside/outside air mode determined at step S440 is selected.

In summer cooling, there is normally the relationship that the inside air temperature<the outside air temperature. Therefore, by forcibly setting the inside/outside air mode to the full inside air mode at step S460 when the engine is stopped, it is possible to reduce the cooling load of when the engine is stopped and more effectively suppress rising of the temperature of air blown into the passenger compartment during engine stoppages.

In FIG. 36, to simplify the explanation, on/off control of the compressor 1 is not shown. However, in the ninth preferred embodiment also, the operation of the compressor 1 is on/off controlled on the basis of a comparison of the target evaporator air outlet temperature TEO with the actual evaporator air outlet temperature TE.

In the ninth preferred embodiment described above, during engine stoppages, an inside air mode wherein only inside air is introduced is forcibly set at step S460; however, instead of this, a mainly inside air mode, wherein the proportion of inside air introduced is high, may be set. Similarly, in the ninth preferred embodiment as described above, an outside air mode wherein only outside air is introduced is forcibly set at step S480; however, instead of this, a mainly outside air mode, wherein the proportion of outside air introduced is high, may be set.

Further, in the determination of the inside/outside air mode at step S460, the inside air temperature and the outside air temperature may be compared and whichever of the inside air and the outside air is the cooler then selected and introduced into the air-conditioning case 10 during the engine stoppage.

Further, in the determination of the inside/outside air mode at step S460, the inside air temperature and the outside air temperature may be compared and, when the temperature difference between them is above a predetermined value, the flow proportion of whichever of the inside air and the outside air is the cooler then made larger than during engine running.

Further, in the determination of the inside/outside air mode at step S460, the inside air temperature and the outside air temperature may be compared and, when the temperature difference between them is below a predetermined value, whichever of the inside air and the outside air has the lower humidity then selected and introduced into the air-conditioning case 10.

Tenth Preferred Embodiment

Figure 39:
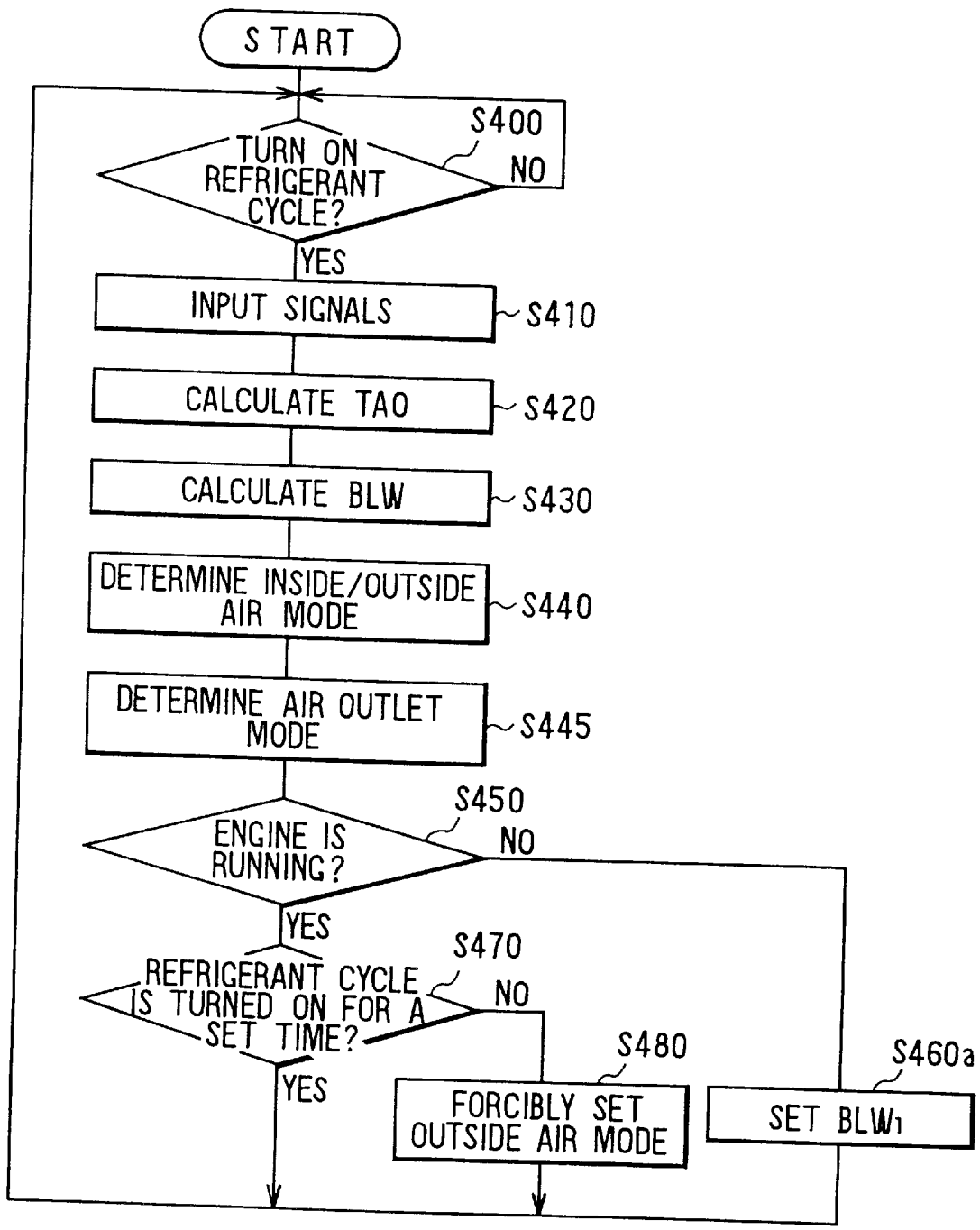
FIG. 39 is a flow diagram showing an operation control according to a tenth preferred embodiment of the present invention.
Figure 40A:
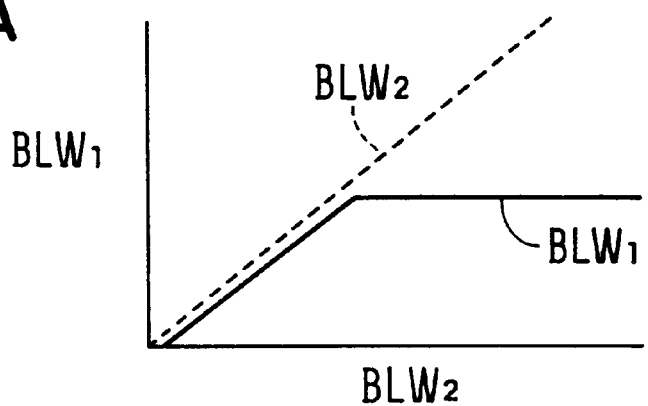
FIGS. 40A, 40B, 40C are graphs showing the relationship between a target air flow amount $BLW_1$ when the engine is stopped and a target air flow amount $BLW_2$ of immediately before the engine is stopped, according to the tenth embodiment.
Figure 40B:
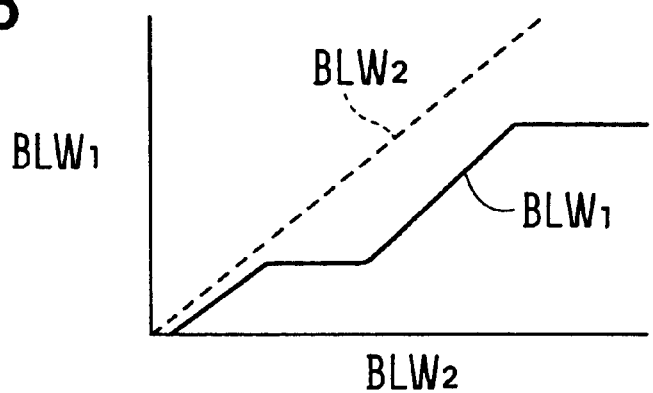
Figure 40C:
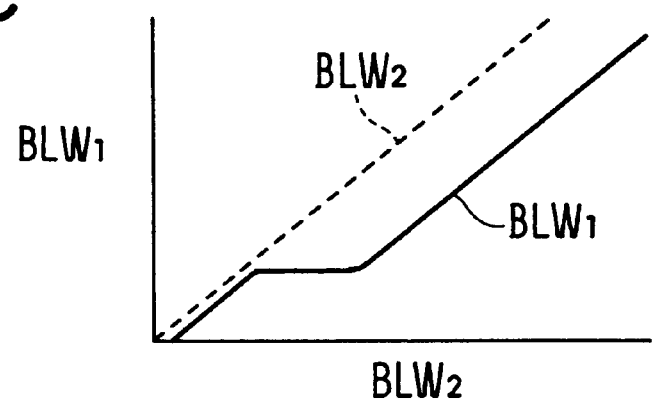

FIG. 39 is a flow diagram showing a tenth preferred embodiment of the present invention, wherein instead of the inside/outside air mode setting carried out at step S460 in the ninth preferred embodiment, a target air flow amount $BLW_1$ of when the engine 4 is stopped is set at step S460a. In FIG. 39, the other steps are similar to the steps in FIG. 36, and the explanation thereof is omitted. The target air flow amount $BLW_1$ of when the engine is stopped is set as shown in FIGS. 40A through 40C to be equal to or less than a target air flow amount $BLW_2$ of immediately before the engine is stopped ($BLW_1 \leq BLW_2$). That is, for small values of the target air flow amount $BLW_2$ of immediately before the engine is stopped, $BLW_1$ is made equal to $BLW_2$. Further, for large values of the target air flow amount $BLW_2$ of immediately before the engine is stopped, $BLW_1$ is made less than $BLW_2$ and the flow amount of air blown by the blower 11 is thus reduced. Therefore, the cooling load during engine stoppages is reduced and rising of the temperature of air blown into the passenger compartment during engine stoppages can be suppressed.

The ninth and tenth preferred embodiments may be combined, so that the inside air mode is set during engine stoppages, and at the same time, the target air flow amount $BLW_1$ of when the engine is stopped is set to the relationship $BLW_1 \leq BLW_2$ to further reduce the cooling load during engine stoppages.

Also, the inside/outside air mode control and control for setting a target air flow amount $BLW_1$ of when the engine is stopped according to the ninth and tenth preferred embodiments may be combined with the seventh and eighth preferred embodiments.

Eleventh Preferred Embodiment

In a vehicle air-conditioning system, when fluctuations in cooling load caused by solar radiation, outlet air temperature and passenger numbers and so on are large, and when the cooling load is large, the evaporator air outlet temperature TE is not decreased below 0° C. and consequently water condensed on the evaporator 9 cannot be frozen even when the compressor 1 is operated continuously.

To overcome this, in the eleventh preferred embodiment of the present invention, during engine running, a special measure for reducing the cooling load is taken to reduce the temperature of water condensed on the evaporator 9 and actively freeze the condensed water. Thus, it is possible to increase the amount of cold stored per unit mass of the condensed water and to cool air in the cold-releasing mode when the engine is stopped by utilizing not only sensible heat of the condensed water but also latent heat of melting.

Figure 41:
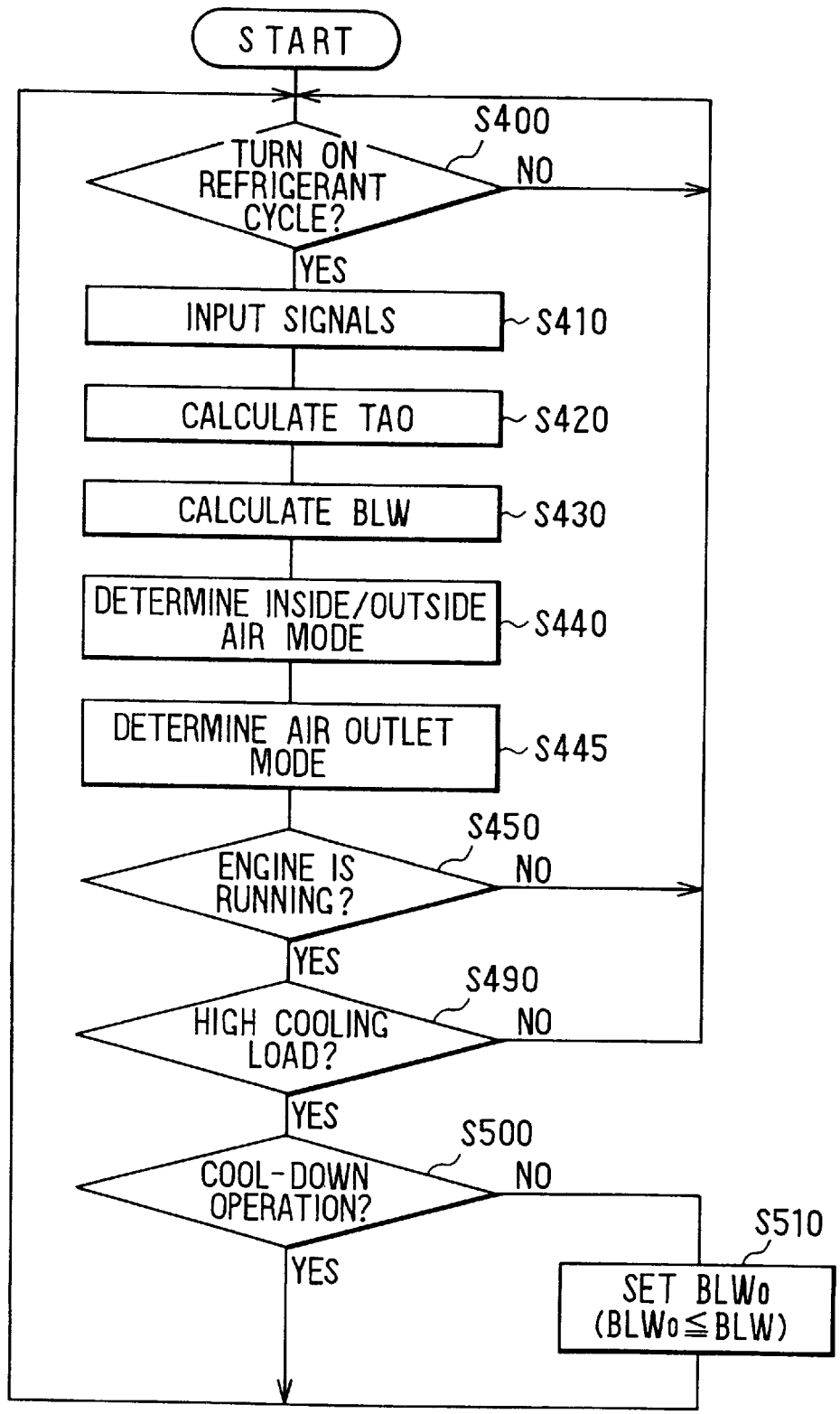
FIG. 41 is a flow diagram showing an operation control according to an eleventh preferred embodiment of the present invention.
Figure 42A:
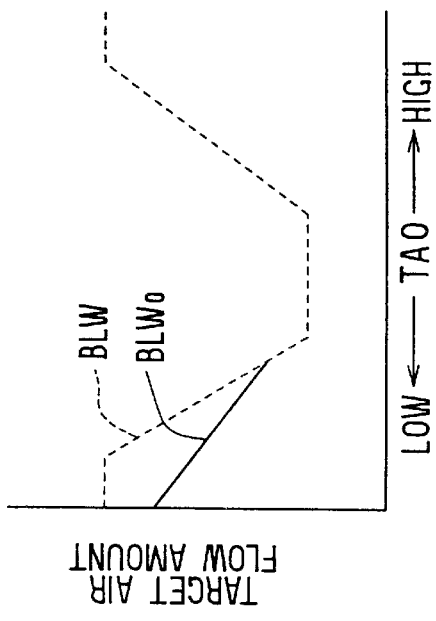
FIGS. 42A, 42B, 42C, 42D are graphs showing the relationship between a target air flow amount $BLW_0$ in a high cooling load and a target air flow amount BLW in a normal control, according to the eleventh embodiment.
Figure 42B:
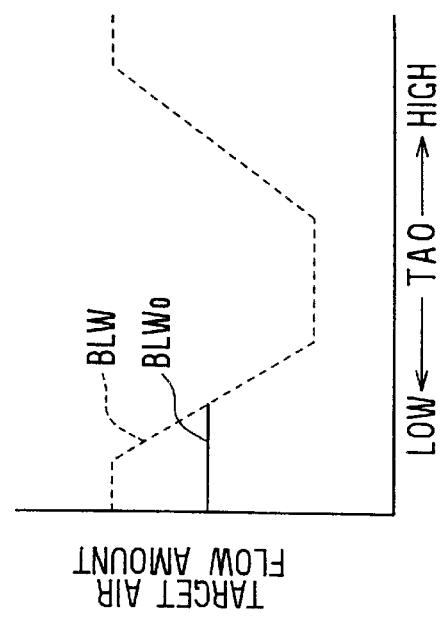
Figure 42C:
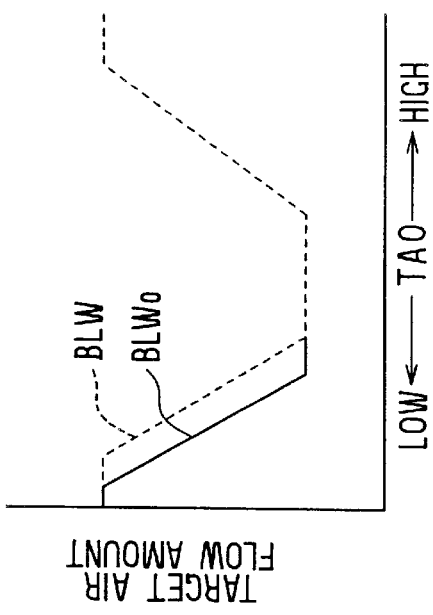
Figure 42D:
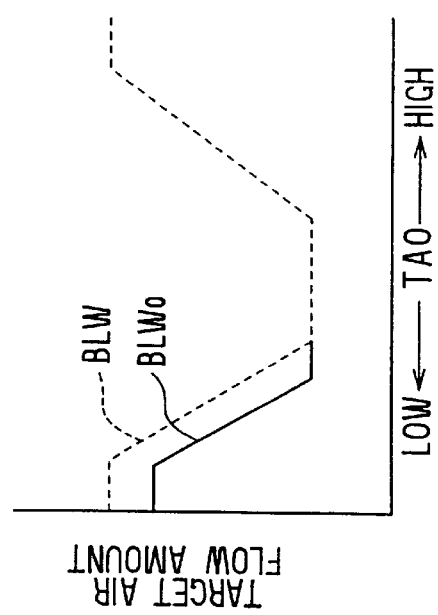

FIG. 41 is a flow diagram of the eleventh preferred embodiment, in which steps S400 through S450 are the same as in FIG. 36 and FIG. 39. When the engine is running, processing proceeds from to step S450 to step S490 and determines whether the cooling load is high. The determination at step S490 can be carried out for example on the basis of the target outlet temperature TAO of air blown into the passenger compartment. Here, the cooling load is determined to be high when TAO is lower than −20° C.

When the cooling load is high, processing proceeds to step S500 and determines whether or not cool-down operation is in progress. Here, cool-down operation is a state immediately after starting of the refrigerant cycle R, wherein the temperature inside the passenger compartment is greatly higher than the set temperature and it is necessary for the temperature of the passenger compartment to be lowered rapidly toward the set temperature. The determination of the cool-down state can also be carried out on the basis of the target outlet temperature TAO. That is, the cool-down operation is determined to be in progress when TAO is for example lower than −30° C.

If the cool-down operation is in progress, processing returns to step S400 and controls the flow amount of air blown by the blower 11 to the target air flow amount BLW calculated at step S430. Thus, the flow amount of air blown by the blower 11 becomes that during the normal control, and cool-down performance for the passenger compartment is not decreased.

On the other hand, when the cool-down operation is not in progress, i.e. in high cooling load immediately after the end of cool-down operation, processing proceeds from step S500 to step S510 and sets the target air flow amount of the blower 11 to a $BLW_0$, smaller than the BLW of normal control calculated at step S430 ($BLW_0 \leq BLW$).

Here, FIGS. 42A through 42D show examples of specific methods for determining the $BLW_0$ at step S510. In FIGS. 42A–42D, in a low-temperature area of TAO (i.e. a cooling region) following the end of cool-down operation, the $BLW_0$ is made smaller than BLW in various patterns.

By specially setting a $BLW_0$ smaller than the target air flow amount BLW of normal control when TAO is in the low-temperature region following the end of cool-down like this, it is possible to reduce the cooling load. Thus, when the cold-storing mode of the seventh preferred embodiment (for example, correction of the target evaporator air outlet temperature to the low-temperature side) is executed during engine running, the evaporator temperature can be lowered to freeze the condensed water even when the cooling load is high.

That is, according to the eleventh preferred embodiment of the present invention, by employing a special measure to lower the cooling load, rather than cooling performance, it is possible to give priority to lowering the evaporator temperature and thereby cause condensed water to freeze on the evaporator 9.

At step S510 of FIG. 41, to increase the effect of reducing the cooling load, reduction of the target air flow amount and forcible setting of the inside air mode may be combined.

Further, at step S510, instead of a reduction in the target air flow amount, reduction of the cooling load may be carried out by the bi-level mode being forcibly set as the air outlet mode and the inside air mode being forcibly set as the inside/outside air mode. That is, in a vehicle air-conditioning system, normally, because the foot opening 29 and the inside air port 11b are disposed relatively close to each other, it is possible for cool air blown out from the foot opening 29 in the bi-level mode to be taken in again through the inside air port 11b, whereupon the intake air temperature into the evaporator 9 falls and the cooling load is reduced.

At step S510, instead of a reduction in the target air flow amount, the inside air temperature and the outside air temperature may be compared and, when the difference between the two is greater than a predetermined value, the air having the lower temperature of the two then introduced exclusively or in an increased proportion.

Thus, various load-reduction measures for when the cooling load is high can be employed.

Also, when the cooling load is high, the refrigerant evaporation pressure (cycle low pressure) in the evaporator 9 of the refrigerant cycle R may be reduced, and the refrigerant evaporation temperature is thereby forcibly lowered to below 0° C. to promote the freezing of condensed water on the evaporator 9. That is, as pressure-reducing means of the refrigerant cycle R, instead of the expansion valve 8, an electric expansion valve whose valve opening degree is controlled electrically in association with the temperature and pressure of the refrigerant at the refrigerant outlet of the evaporator 9 may be used. In this case, by the opening degree of the electric expansion valve being forcibly reduced during high cooling load to an opening degree smaller than during the normal control, the high-low pressure difference of the refrigerant cycle R can be increased, and the cycle low pressure can be reduced.

In the eleventh preferred embodiment of the present invention, the cooling load determination and cool-down determination of steps S490 and S500 can be carried out on the basis of the difference between the temperature of the inside air and the set temperature of the passenger compartment, instead of the TAO. These cooling load and cool-down determinations can also be carried out on the basis of for example the outside air temperature or the evaporator intake air temperature or the air flow amount. Further, as mentioned above with reference to step S1430 of FIG. 30, a cooling load determination may be performed on the basis of the temperature difference (TE-TEO) between the actual evaporator air outlet temperature TE and the target evaporator air outlet temperature TEO.

In the foregoing seventh through eleventh preferred embodiments of the present invention, the evaporator air outlet temperature is controlled by on/off operation control of the compressor 1; however, it is also known practice in vehicle air-conditioning systems for the evaporator air outlet temperature to be controlled by capacity control of the compressor 1, and the present invention can be also applied in the same way to the kind of compressor capacity control type system. That is, it is possible to improve the cooling feeling for the passengers during engine stoppages, by using compressor capacity control to control the evaporator air outlet temperature and thereby control the amount of cold stored in water condensed on the evaporator 9.

Further, in the seventh through eleventh preferred embodiments, the evaporator air outlet temperature is detected by evaporator air outlet temperature sensors 321 and 322 to detect the evaporator cooling degree. However, the evaporator cooling degree may alternatively be detected by detecting for example the fin surface temperature of the evaporator 9, the refrigerant temperature of the evaporator 9 or the refrigerant evaporation pressure.

Also, to prevent hunting in the on/off operation control of the compressor 1 and so on, it is preferable for hysteresis to be provided in the steps for determining the evaporator air outlet temperature and the like.

Twelfth Preferred Embodiment

In the following twelfth preferred embodiment of the present invention, when a vehicle halts to wait at a traffic signal or the like and the engine 4 is stopped, the compressor 1 also stops and the evaporator temperature rises and the temperature of air blown into the passenger compartment rises. Therefore, there is the problem that the cooling feeling for the passengers of the vehicle is lost. Also, sometimes, water condensed on the evaporator 9 dries up due to the rise in the evaporator temperature, and the results in an unpleasant odor, originating in mold or the like on the surface of the evaporator 9, arising.

In view of these points, it is an object of the following twelfth preferred embodiment to suppress deterioration in the cooling feeling experienced by vehicle passengers when the compressor 1 is unavoidably stopped because the vehicle engine 4 has stopped.

Figure 43:
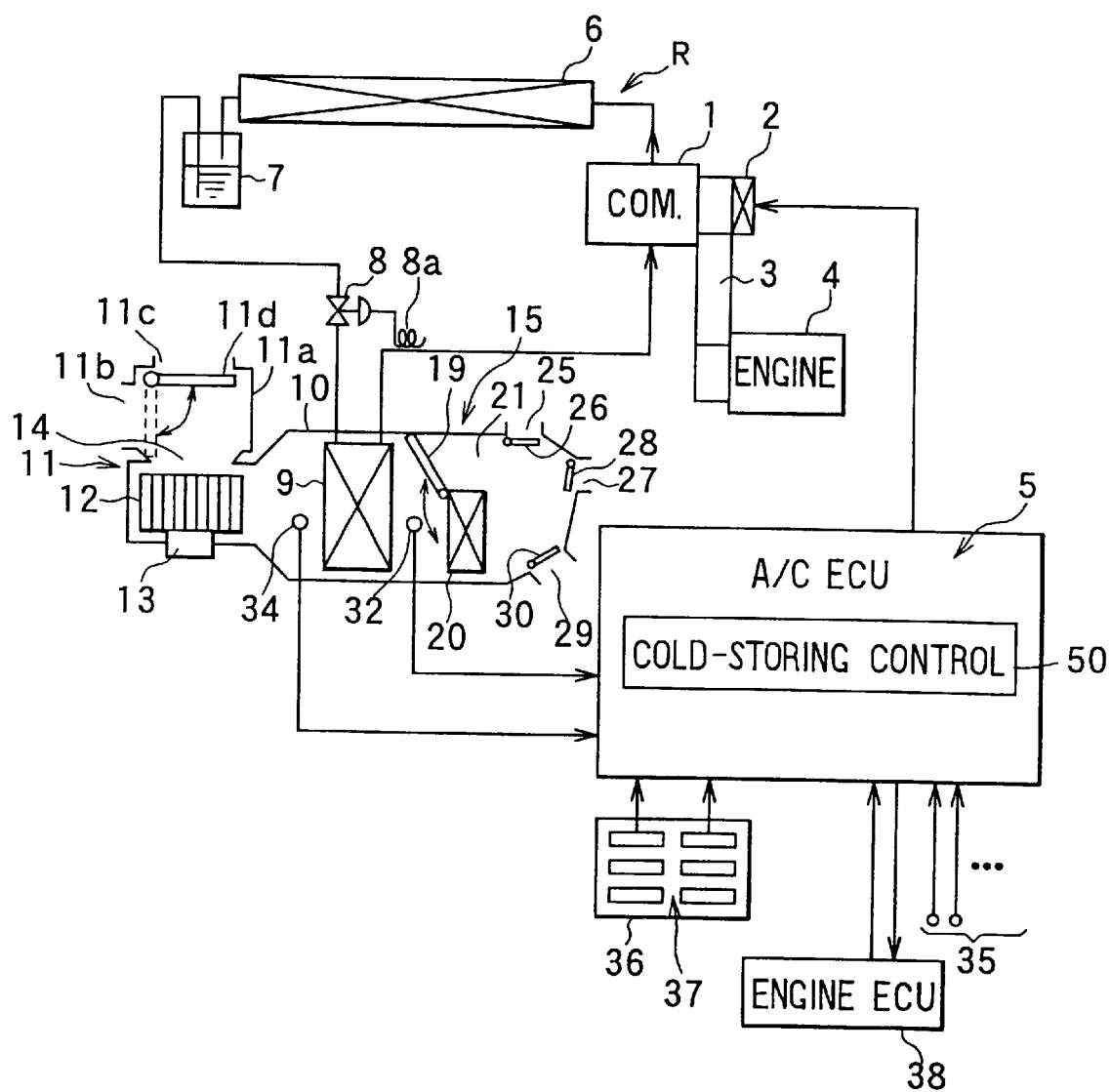
FIG. 43 is a schematic diagram showing a vehicle air-conditioning system according to a twelfth preferred embodiment of the present invention.

FIG. 43 is a schematic view of the overall construction of a vehicle air-conditioning system according to the twelfth preferred embodiment of the present invention. FIG. 43 is substantially the same as FIG. 26 of the seventh preferred embodiment, but differs in the point that, in a position immediately behind the evaporator 9 inside the air-conditioning case 10, an evaporator air outlet temperature sensor (evaporator cooling degree detecting means) 32 consisting of a thermistor is provided in one location only.

Figure 44:
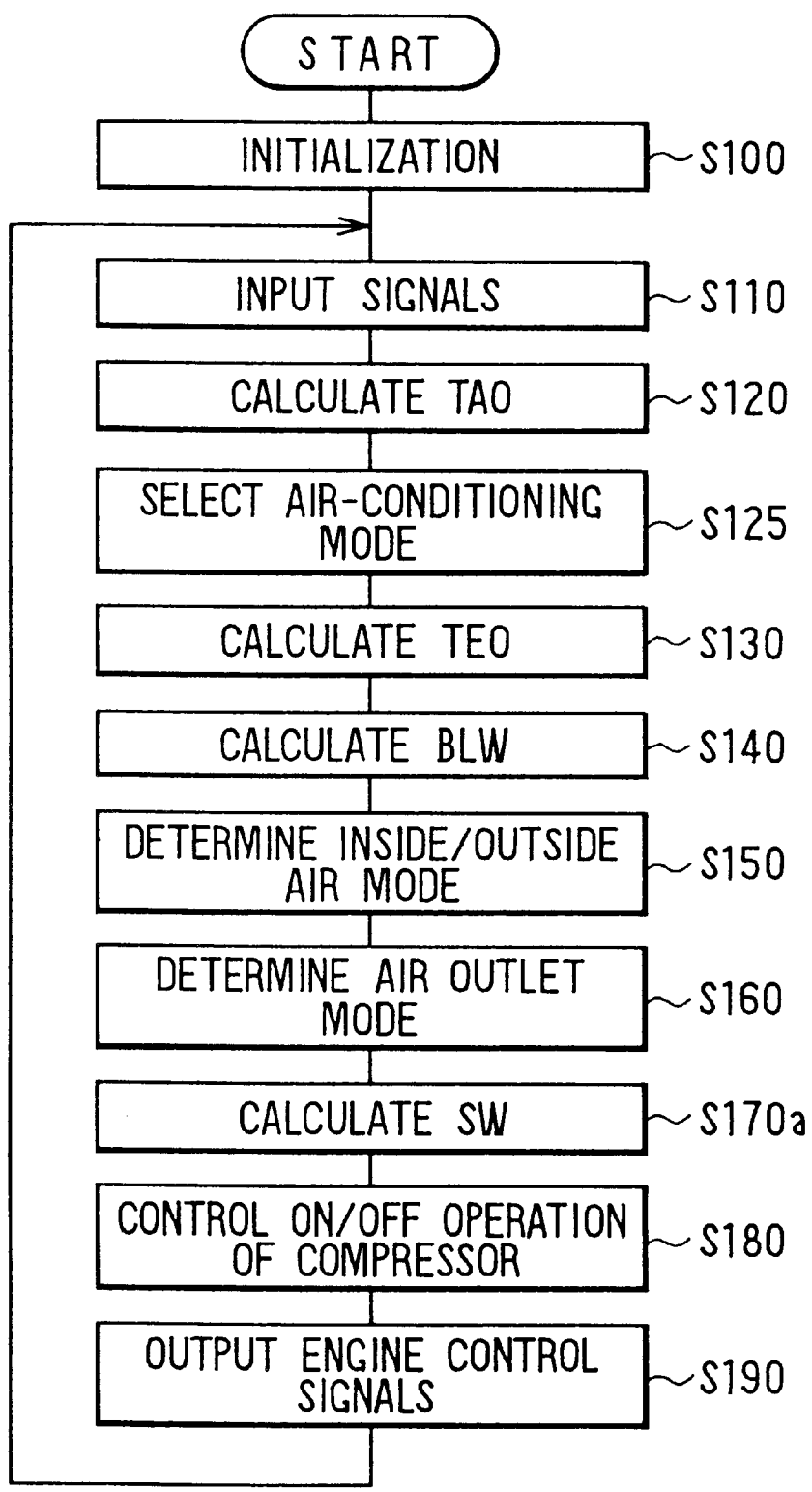
FIG. 44 is a flow diagram showing an operation control according to the twelfth embodiment.

FIG. 44 is a flow diagram of air-conditioning control in the twelfth preferred embodiment and is substantially the same as FIG. 2 of the first preferred embodiment, the only difference being at step S170a. That is, in the twelfth preferred embodiment of the present invention, because as shown in FIG. 43 the vehicle air-conditioning system does not have a first bypass passage 16 and a bypass door 17, it is only necessary to calculate an opening degree SW for the air-mixing door 19 at step S170a. The other steps are the same as in FIG. 2.

The operation of the vehicle air-conditioning system according to the twelfth preferred embodiment will now be described. In the control routine of FIG. 44, in the same way as in FIG. 2, the initialization of step S100, the signal inputting of step S110 and the calculation of a target outlet temperature (TAO) of step S120 are carried out, and then at step S125 the air-conditioning mode is selected to be either the cold-storing mode, the cold-releasing mode or the normal mode.

In the twelfth embodiment of the present invention, if the engine 4 (and the compressor 1) is running, the normal mode is selected only when a condition prohibiting the cold-storing mode is determined. At all other times when the engine 4 (and the compressor 1) is running, the cold-storing mode is selected. On the other hand, when the engine 4 stops during air-conditioning operation (operation of the blower 11) and the compressor 1 stops, the cold-releasing mode is selected.

Next, at step S130, a target evaporator air outlet temperature TEO is calculated. That is, in the normal mode, a TEO for the normal mode is calculated on the basis of the first target evaporator air outlet temperature $TEO_1$ of FIG. 3 and the second target evaporator air outlet temperature $TEO_2$ of FIG. 4. In the cold-storing mode, a TEO below freezing point (for example, −2° C. to −1° C.) for cold-storing is calculated.

Next, the calculation of an air-blowing amount (i.e., air flow amount) BLW of step S140, the inside/outside air mode determination of step S150, and the air outlet mode determination of step S160 are carried out. Then, at step S170a, a target, opening degree SW of the air-mixing door 19 is calculated on the basis of the following expression Exp. 18.

$$SW=[(TAO-Te)/(Tw-Te)]\times 100\ (\%) \qquad \text{Exp. 18}$$

Here, Tw is the hot water temperature of the heater core 20, and Te is the temperature of air blown from the evaporator 9. The operating position of the air-mixing door 19 is controlled by an output of the air-conditioning ECU 5 so that the target opening degree SW is obtained.

Then, at step S180, the target evaporator air outlet temperature TEO and the actual evaporator air outlet temperature Te are compared and the compressor is on/off controlled accordingly. That is, when the evaporator air outlet temperature Te is below the target evaporator air outlet temperature TEO, the air-conditioning ECU 5 cuts off the current to the electromagnetic clutch 2 and thereby stops the compressor 1. Conversely, when the evaporator air outlet temperature Te is higher than the target evaporator air outlet temperature TEO, the air-conditioning ECU 5 supplies current to the electromagnetic clutch 2 and thereby operates the compressor 1.

Thus, the evaporator air outlet temperature Te is kept at the target evaporator air outlet temperature TEO. That is, in the normal mode, control of the cooling capacity of the evaporator 9 and prevention of frosting of the evaporator 9 can be carried out. Also, in the cold-storing mode, the evaporator air outlet temperature Te can be controlled to a temperature below freezing point (for example −2° C. to −1° C.) to freeze water condensed on the evaporator 9 and thereby store cold in the form of latent heat.

Figure 45:
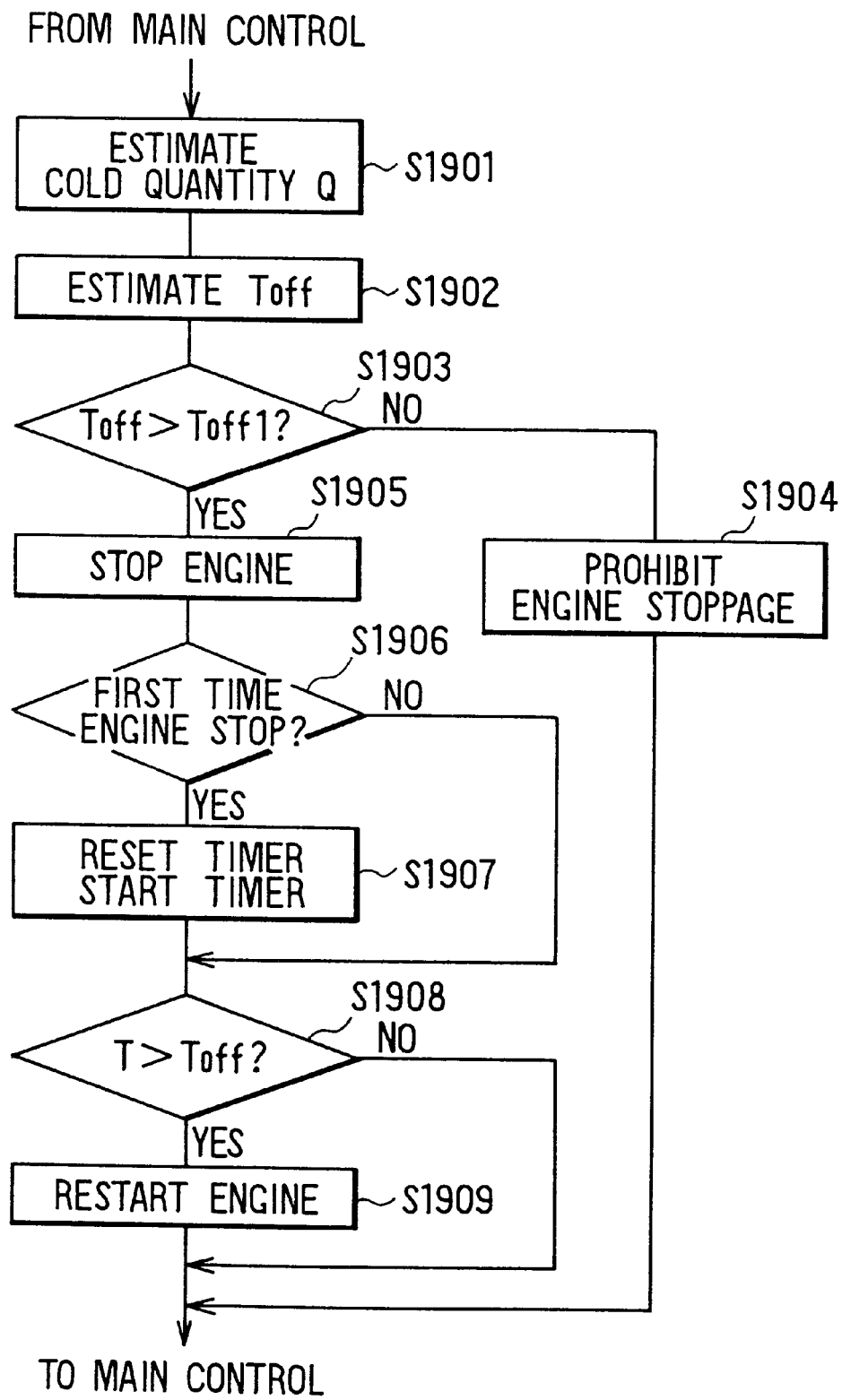
FIG. 45 is a detail flow diagram of a main step in FIG. 44.

Next, processing proceeds to step S190 and outputs an engine control signal on the basis of air-conditioning side conditions. The details of the step S190 are explained as shown in FIG. 45. In FIG. 45, first, at step S1901, during engine running (during vehicle travel), a cold quantity Q stored in condensed water on the evaporator 9 is estimated.

Specifically, during engine running (during vehicle travel), the compressor 1 is running and the quantity of cold Q stored in water condensed on the evaporator 9 can be estimated on the basis of the actual evaporator air outlet temperature Te detected by the temperature sensor 32. That is, the lower the actual evaporator air outlet temperature Te is, the larger the cold quantity Q stored in condensed water is.

In particular, during engine running (during vehicle travel), if a cold-storing control mode where the evaporator air outlet temperature Te is below 0° C. is set and water condensing on the evaporator is thereby made to freeze, cold can be stored in the form of latent heat, and the cold quantity Q stored in condensed water can be increased greatly.

Also, the greater the amount of water held on the evaporator 9 is the larger the cold quantity Q stored in condensed water becomes. Therefore, when the cold quantity Q stored in condensed water is estimated by the conditions not only the evaporator air outlet temperature Te but also the flow amount of air entering the evaporator 9 and the intake air states (temperature and humidity), which correlate to the amount of condensed water held on the evaporator 9, it is possible to increase the accuracy of the estimate of the cold quantity Q stored in condensed water. For example, because there is the relationship that if the flow amount of intake air increases then the amount of condensed water held in the evaporator 9 decreases due to a rise in the flow pressure of air acting on the condensed water on the evaporator 9, the amount of condensed water held on the evaporator 9 and the air flow amount are in an inversely proportional relationship. Further, if the humidity of the intake air rises then the amount of water condensing in the evaporator 9 increases, and the quantity of condensed water held on the evaporator 9 consequently increases.

Figure 46:
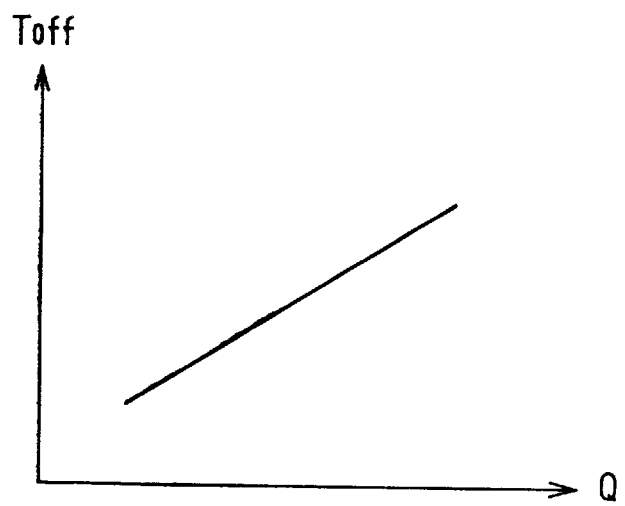
FIG. 46 is a graph showing the relationship between a cold-storing quantity Q of condensed water and an engine stop possible time Toff, according to the twelfth embodiment.

Next, at step S1902, a possible engine stoppage time Toff for vehicle halts is estimated on the basis of the cold quantity Q stored in condensed water of the evaporator 9. Here, the possible engine stoppage time Toff is the time for which the evaporator air outlet temperature Te can be kept below a predetermined temperature (for example 12° C.) at which a cooling feeling can be maintained by the cold quantity Q stored in condensed water after the engine 4 is stopped (that is, after the compressor is stopped). Accordingly, the possible engine stoppage time Toff can be determined using a relationship wherein it is proportional to the cold quantity Q stored in condensed water of the evaporator 9, as shown in FIG. 46.

Then, at step S1903, a preset shortest engine stoppage time Toff1 (for example, 20 seconds) and the possible engine stoppage time Toff are compared. When the possible engine stoppage time Toff is shorter than the preset shortest engine stoppage time Toff1, processing proceeds to step S1904 and requests a prohibition of engine stoppage. That is, a control signal for prohibiting engine stoppage is outputted from the air-conditioning ECU 5 to the vehicle engine ECU 38 so that the engine 4 keeps running and the compressor 1 keeps running even when the vehicle halts.

As a result, it is possible to prevent discomforting of passengers and deterioration of the fuel economy of the engine 4 caused by stopping and starting of the engine 4 and the compressor 1 being repeated in a short time. That is, because a large quantity of fuel is consumed during starting of the engine 4 in a case of an extremely short engine stoppage of 20 seconds or less, it is preferable for the engine 4 not to be stopped and instead to continue to operate in an idling state from the point of view of fuel consumption.

On the other hand, when the possible engine stoppage time Toff is longer than the shortest engine stoppage time Toff1 at step S1903, processing proceeds to step S1905, and the air-conditioning ECU 5 outputs to the vehicle engine ECU 38 a control signal permitting stoppage of the engine. Accordingly, when the engine stoppage conditions on the vehicle side are satisfied in a vehicle halt, the vehicle engine ECU 38 receives the control signal for permitting engine stoppage from the air-conditioning side and stops the engine 4.

Then, at step S1906, it is determined whether or not the operation of the engine 4 is shifted from the running state to the stopped state in first time. When the time is the first time the engine is shifted from the running state to the stopped state at step S1906, processing proceeds to step S1907 and resets a timer to 0 and starts the timer. That is, with the timer, timing of an elapsed time T from when the engine is stopped is started.

Then, at step S1908, it is determined whether or not the elapsed time T since engine stoppage is exceeded to the possible engine stoppage time Toff. When the elapsed time T is within the possible engine stoppage time Toff, the engine stoppage is continued. When the elapsed time T exceeds Toff, processing proceeds to step S1909 and outputs to the vehicle engine ECU 38 a control signal for requesting that the engine be restarted. On the basis of this, even if the vehicle is still halted, the vehicle engine ECU 38 automatically restarts the engine 4 at step S1909.

As will be understood from the foregoing explanation, according the twelfth preferred embodiment of the present invention, a possible engine stoppage time Toff is determined on the basis of the cold quantity Q stored in condensed water as shown in FIG. 46 in advance during engine running, and the engine 4 is only stopped for the duration of the possible engine stoppage time Toff when the vehicle halts. Therefore, it is possible for air blown through the evaporator 9 to be cooled by a cold-releasing (cooling) action using the cold quantity Q stored in condensed water and for deterioration of the cooling feeling to be prevented for the entire duration of the engine stoppage. Further, because the engine 4 is automatically restarted after the possible engine stoppage time Toff elapses, the compressor 1 is restored to its running state and a cooling effect is obtained with a normal cooling action of evaporating refrigerant in the evaporator 9.

Modifications to Twelfth Preferred Embodiment

The twelfth preferred embodiment can be modified in various ways. For example, in the twelfth preferred embodiment, the possible engine stoppage time Toff is estimated on the basis of the cold quantity Q stored in condensed water when the engine is running. However, for example, a condensed water dry-up time Tdry for the evaporator 9 after engine stoppage may be estimated during engine running, and the possible engine stoppage time Toff is estimated on the basis of the condensed water dry-up time Tdry.

That is, it is known that when the condensed water on the evaporator 9 dries up due to a temperature rise, an unpleasant odor originating in mold or the like on the surface of the evaporator 9 may arise. The above-mentioned condensed water dry-up time Tdry becomes longer, when the evaporator air outlet temperature Te, the evaporator intake air temperature Ti and the air-blowing amount (i.e., air flow amount) BLW become lower.

Therefore, the condensed water dry-up time Tdry can be estimated during engine running on the basis of Te, Ti and BLW, and the possible engine stoppage time Toff is determined so as to be slightly shorter than the condensed water dry-up time Tdry.

Also, the time Tte from engine stoppage until the evaporator air outlet temperature Te rises to a predetermined maximum temperature until which the cooling feeling is not deteriorated becomes larger, when the evaporator air outlet temperature Te, the evaporator intake air temperature Ti and the air flow amount BLW during engine running are lowered. Therefore, the possible engine stoppage time Tdry may alternatively be determined on the basis of the time Tte.

Further, both the condensed water dry-up time Tdry and the time Tte determined by the rise of the evaporator air outlet temperature Te may be estimated during engine running, and the possible engine stoppage time Toff may be determined on the basis of the shorter of these two times Tdry, Tte.

Further, a possible engine stoppage time based on the cold quantity Q stored in condensed water, the condensed water dry-up time Tdry and the time Tte determined by the rise of the evaporator air outlet temperature Te may be estimated during engine running, and the possible engine stoppage time Toff may be determined on the basis of the shortest time among these three times.

At steps S1903 and S1904 in the flow diagram of FIG. 45, when the possible engine stoppage time Toff is shorter than the shortest engine stoppage time Toff1, a control signal prohibiting engine stoppage is outputted, so that the engine 4 is kept running even if the vehicle halts. However, the control at steps S1903, S1904 may be omitted, and engine stoppage may be carried out even for short times. In the case, because the engine stoppage is short, from the point of view of cooling feeling there is no problem.

Also, besides the engine 4, it is possible to provide an electric motor (not shown) for driving the compressor 1 and adopt hybrid drive whereby the compressor 1 can be driven by either the engine 4 or the electric motor. In the case, when the engine 4 has stopped and the engine stoppage time T is exceeded to the possible engine stoppage time Toff, operation of the electric motor may be requested to start the compressor 1 at step S1909, instead of restarting of the engine being requested.

Thus, it can also be said that the possible engine stoppage time Toff is the possible compressor stoppage time.

In the case of the above-mentioned hybrid drive, if a motor/generator is used as the electric motor, the motor/generator can be driven by the engine 4 and made to act as a battery charging generator during engine running, and can be used to drive the compressor 1 during engine stoppages.

Thirteenth Preferred Embodiment

Similarly to the foregoing twelfth preferred embodiment of the present invention, the following thirteenth preferred embodiment relates to the determination of a condition for restarting the compressor 1 by an engine operation request (or an electric motor operation request) after the compressor 1 has stopped due to an engine stoppage.

Figure 47:
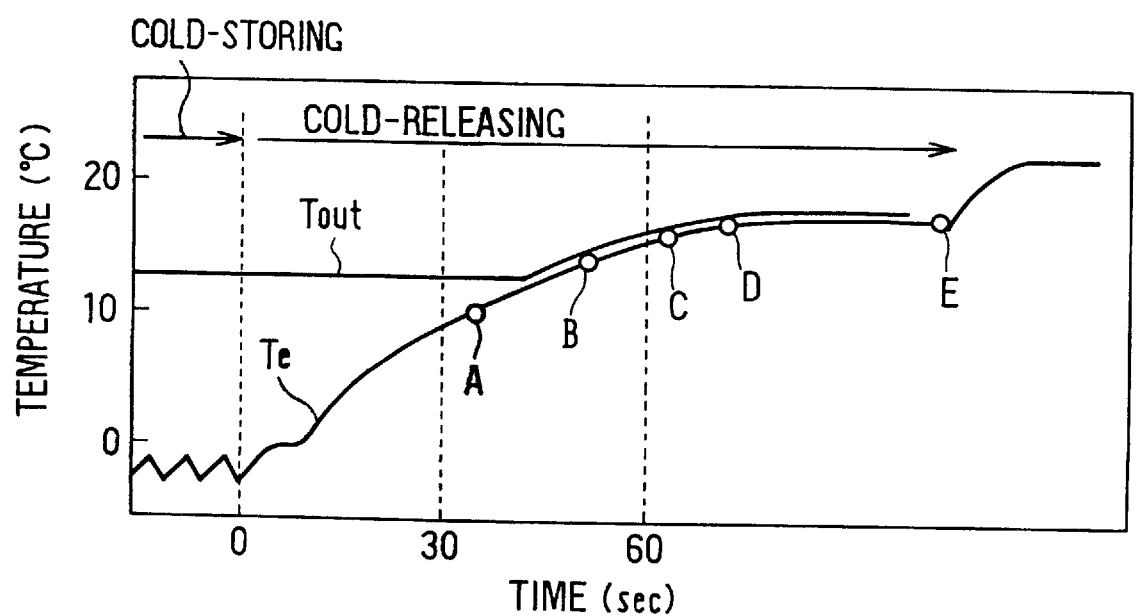
FIG. 47 is a view for explaining a subject of a thirteenth preferred embodiment of the present invention.
Figure 48:
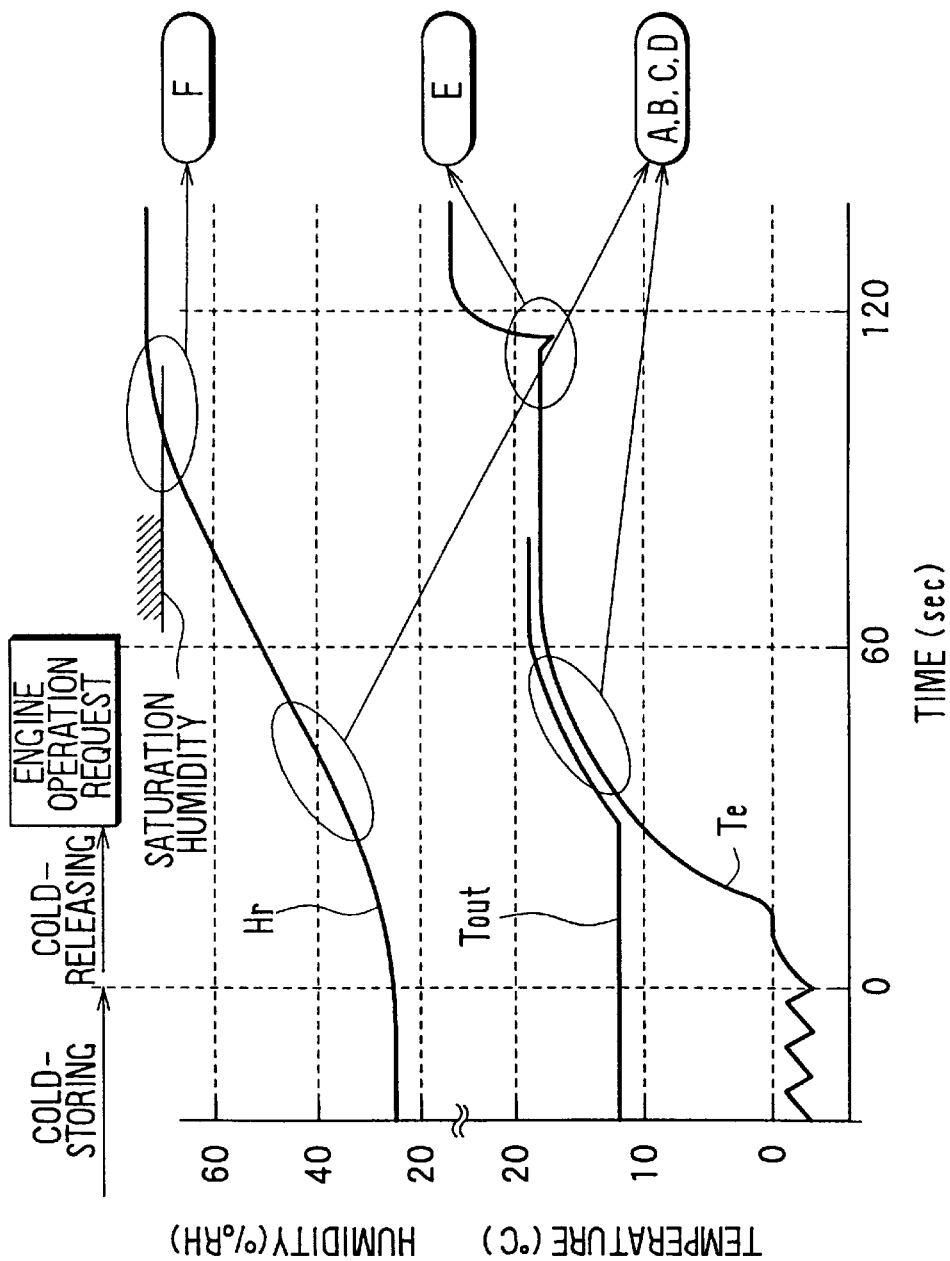
FIG. 48 is a view for explaining operation of the thirteenth embodiment.

FIGS. 47 and 48 show experimental data gathered by the present inventors. FIG. 47 shows changes of air temperature Tout blown into the passenger compartment and evaporator air outlet temperature Te in the cold-releasing mode, and FIG. 48 shows changes of air temperature Tout blown into the passenger compartment, passenger compartment humidity Hr and evaporator air outlet temperature Te in the cold-releasing mode. In FIGS. 47 and 48, when the compressor 1 stops due to an engine stoppage during a vehicle halt and the cold-releasing mode starts, the evaporator air outlet temperature Te rises and consequently the passenger compartment humidity Hr also starts to rise.

A passenger of the passenger compartment of the vehicle firstly senses a change in the passenger compartment humidity (mugginess due to the rising humidity) at the area "A" shown in FIG. 47. Then, when the air temperature Tout blown into the passenger compartment rises above the target outlet temperature TAO due to the rising of the evaporator air outlet temperature Te, the passenger senses a temperature change at the area "B" shown in FIG. 47. After that, the passenger feels a sense of discomfort due to the humidity rise (a sense that it is humid) at the area "C" shown in FIG. 47, and then feels a sense of discomfort due to the temperature rise (a sense that it is hot) at the area "D" shown in FIG. 47. Finally, in the course of the evaporator temperature rising further and the condensed water thereon drying up, an odor is noticed at the area "E" in FIGS. 47, 48. In FIG. 48, areas shown by "A", "B", "C", "D" approximately respectively correspond to those in FIG. 47. On the other hand, immediately after the start of cooling (at a time of cooldown) when the outside air temperature is high, the sense of it being hot is felt before the sense of it being humid. Also, as shown in FIG. 48, when the passenger compartment humidity Hr rises to a glass saturation humidity, fogging of the vehicle windows occurs in the area shown by "F" in FIG. 48. Further, in FIGS. 47, 48, the outside air temperature is 30° C., and the solar radiation amount entering the passenger compartment is 500 W/m$^2$, In the thirteenth preferred embodiment, an upper limit value TE of the evaporator air outlet temperature Te in the cold-releasing mode is calculated based on heat load conditions. In this case, when the limit TE rises above the actual evaporator air outlet temperature Te, the compressor 1 is restarted with an engine operation request (or an electric motor operation request).

Here, the limit TE refers to a perception limit point temperature below which passengers do not sense a change of humidity, a change of temperature, or fogging due to the rising of the evaporator air outlet temperature Te in the cold-releasing mode.

Figure 49:
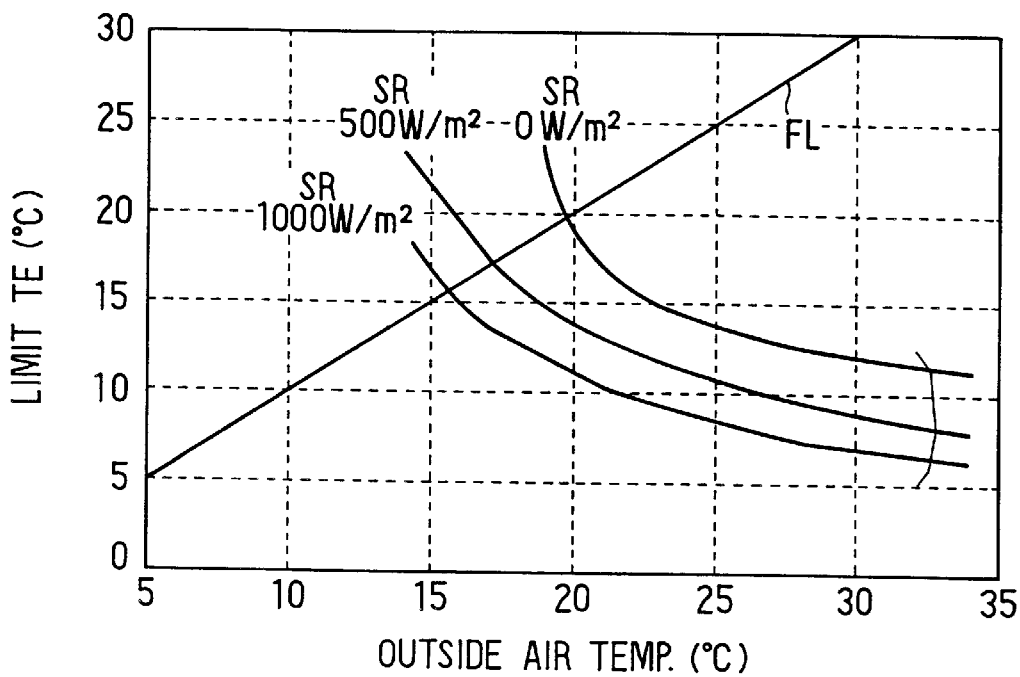
FIG. 49 is a view for explaining a control example according to the thirteenth embodiment.

FIG. 49 is a specific example of a map for determining the limit TE of the evaporator air outlet temperature Te. The higher the heat load, that is, the greater the solar radiation (SR) level and the higher the outside air temperature, the more readily a humidity change, a temperature change and an odor are sensed, and thus the lower the limit TE becomes.

Also, because the glass saturation humidity falls as the outside air temperature decreases, a limit TE determined by the fogging limit (shown by the graph "FL) also falls with the outside air temperature. Consequently, when the outside air temperature is below 20° C., the limit TE of the evaporator air outlet temperature Te may sometimes be determined by the fogging limit (FL).

Figure 50:
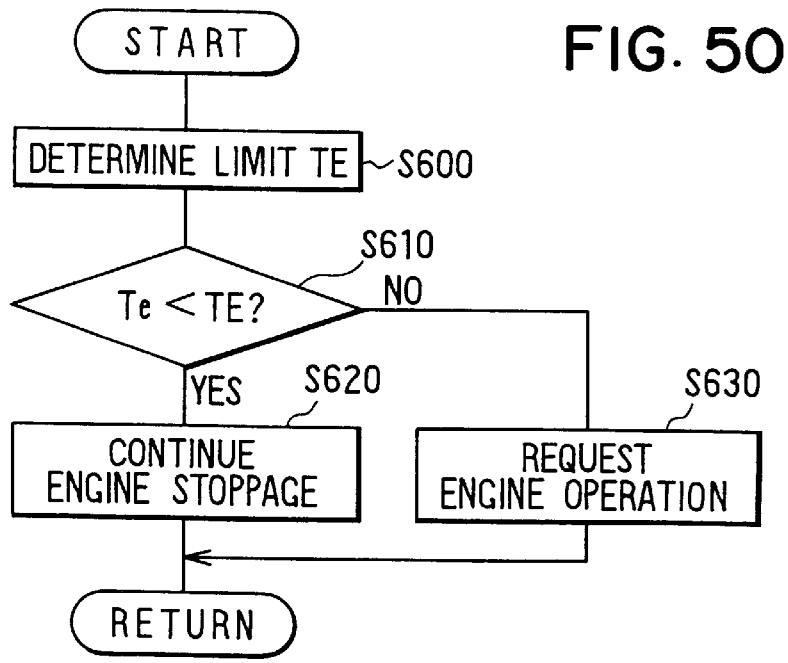
FIG. 50 is a flow diagram showing a main operation control according to the thirteenth embodiment.

FIG. 50 shows a control example according to the thirteenth preferred embodiment of the present invention. When the engine 4 stops and the cold-releasing mode is started, a limit TE of the evaporator air outlet temperature Te is determined at step S600 from the map of FIG. 49. Then, at step S610, it is determined whether or not the actual evaporator air outlet temperature Te is lower than the limit TE. When the actual evaporator air outlet temperature Te is lower than the limit TE, processing proceeds to step S620 and continues with the stoppage of the engine 4.

On the other hand, when time has elapsed since the start of the cold-releasing mode and the actual evaporator air outlet temperature Te becomes above the limit TE, processing proceeds from step S610 to step S630 and a request for operation of the engine 4 is output into the vehicle engine ECU 38 and thereby causes the engine 4 to start and the compressor 1 to restart. Thus, in the cold-releasing mode, it is possible to restart the normal cooling action provided by operation of the compressor 1 before a passenger feels a sense of hotness or humidity or notice an odor or fogging of the vehicle windows.

Fourteenth Preferred Embodiment

In the cold-releasing mode where air-conditioning is carried out after the engine is stopped, because the compressor is also stopped, the evaporator temperature gradually rises and the dehumidification effected by the evaporator falls, and consequently the humidity in the passenger compartment rises. Also, in the cold-releasing mode, because condensed water that had until now been frozen melts and air is humidified by the melting water, the humidity in the passenger compartment rises further. Consequently, in this case, a phenomenon of the windshields tending to fog up occurs. Further, due to the rising of the passenger compartment humidity, the cooling feeling is deteriorated by a sense of humidity (mugginess due to humidity).

In view of these points, it is an object of the following fourteenth preferred embodiment of the present invention to improve the passenger compartment dehumidification performance.

Figure 51:
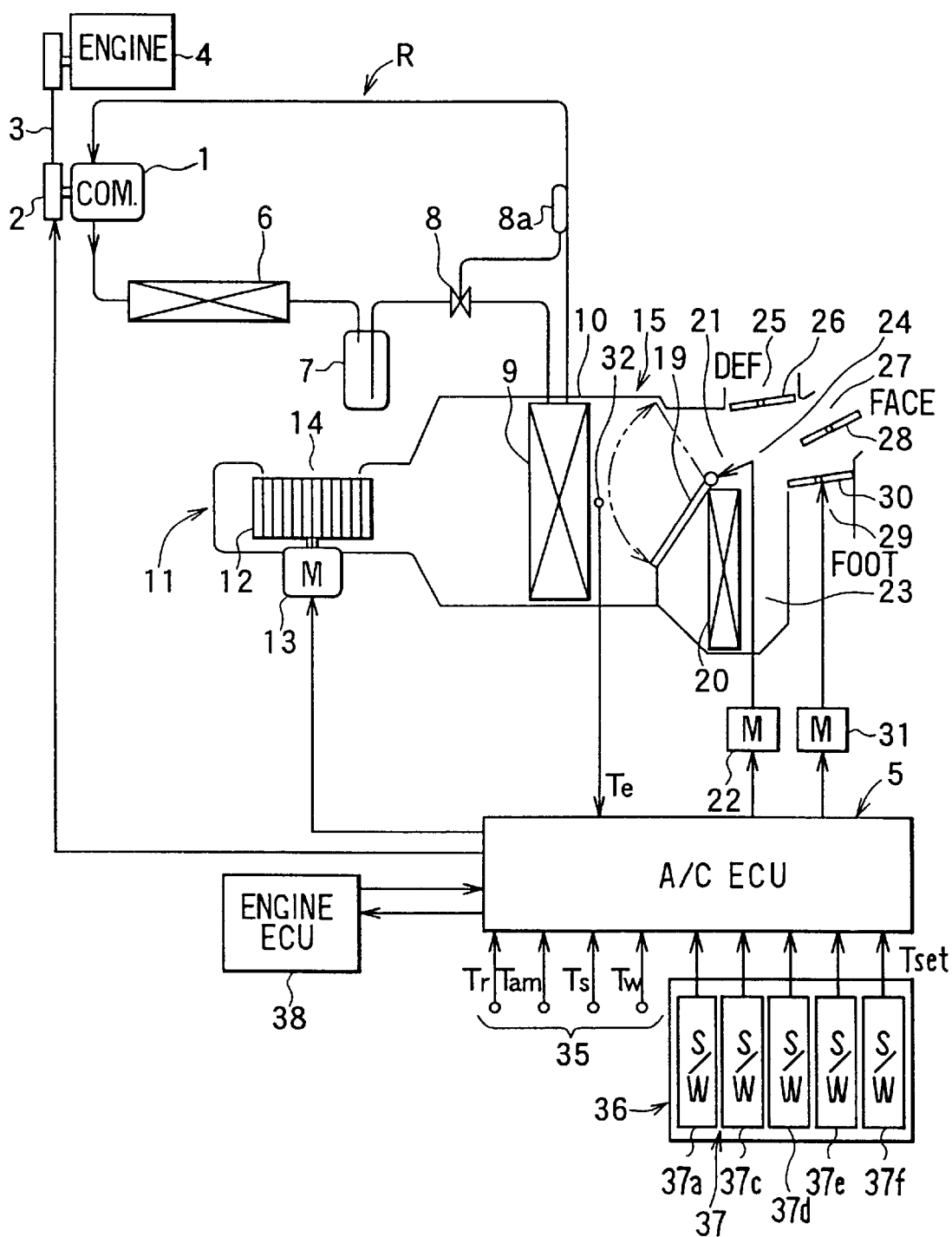
FIG. 51 is a schematic diagram showing a vehicle air-conditioning system according to a fourteenth preferred embodiment of the present invention.
Figure 52:
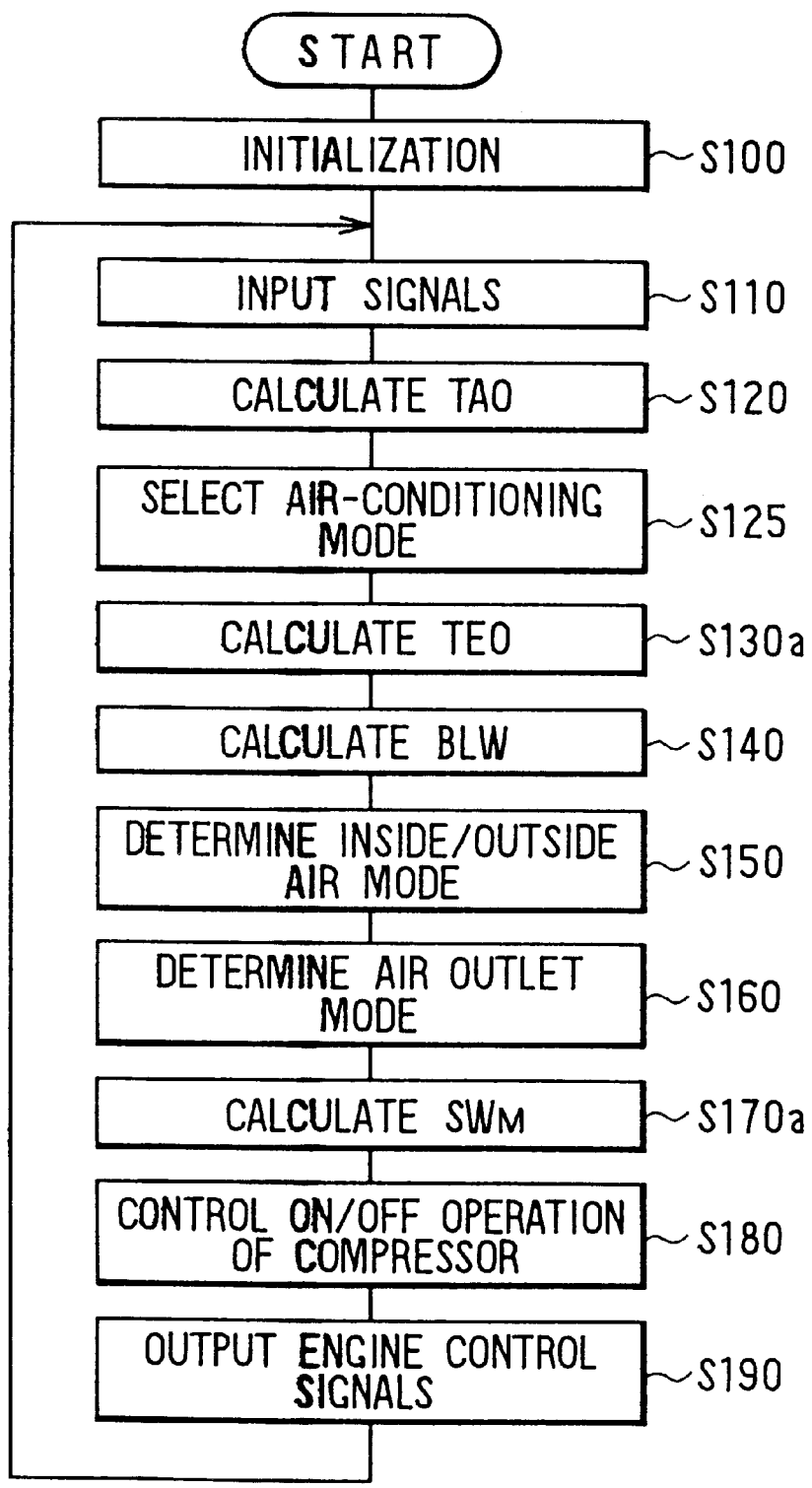
FIG. 52 is a flow diagram showing an operation control according to the fourteenth embodiment.

FIG. 51 is a schematic view of the construction of the fourteenth preferred embodiment, and is equivalent to a view obtained by removing the first bypass passage 16 and the bypass door 17 from FIG. 1. FIG. 52 is a flow diagram of overall air-conditioning control in the fourteenth preferred embodiment and is similar to FIG. 2.

The air-conditioning ECU 5 of FIG. 51 estimates the amount of water condensed on the evaporator 9 or the behavior of the evaporator air outlet temperature after engine stoppage or the like during running of the engine 4, and outputs a signal permitting or prohibiting stoppage of the engine 4 based on the result of the estimation, or outputs a signal requesting restarting of the engine 4 based on rising of the evaporator air outlet temperature or a need for dehumidification of air inside the passenger compartment after stoppage of the engine 4.

The operation of the vehicle air-conditioning system according to the fourteenth preferred embodiment will now be described. The flow diagram of FIG. 52 schematically shows control processing executed by the microcomputer of the air-conditioning ECU 5. The control routine of FIG. 52 starts, when the air flow switch 37c (or an AUTO switch) among the control switches 37 of the air-conditioning control panel 36 is turned on when the ignition switch of the engine 4 is switched on and power is supplied to the air-conditioning ECU 5. An initialization at step S100 is carried out once only, while the control of steps S110 through S190 is carried out repeatedly.

First, at step S100, initialization of flags and timers and so on is carried out. Then, at step S110, detection signals from the sensor 32 and the sensor group 35, control signals from the control switches 37, and vehicle operation signals from the vehicle engine ECU 38 are input.

Then, at step S120, a target outlet temperature TAO of air blown into the passenger compartment is calculated.

The target outlet temperature TAO is the temperature necessary to maintain the passenger compartment at a set temperature Tset with the temperature setting switch 37a, and is calculated on the basis of the foregoing expression Exp. 1.

At step S125 the air-conditioning mode is selected to be either the cold-storing mode, the cold-releasing mode or the normal mode. Specifically, selection of the cold-storing mode and the normal mode during running of the engine 4 (and the compressor 1) can for example be carried out on the basis of the above-mentioned target outlet temperature TAO.

That is, the target outlet temperature TAO is in a low region such as below −20° C. at times such as during cool-down of the passenger compartment immediately after the start of cooling, when the passenger compartment temperature must be lowered rapidly toward the set temperature Tset, or when the cooling load is high like when the outside air temperature is high and furthermore there are many passengers in the vehicle. When the TAO is in a low region below the predetermined value, to give priority to cooling performance, the execution of the cold-storing mode is prohibited and the normal mode is selected. On the other hand, when the target outlet temperature TAO is in a region above −20° C., the cold-storing mode is selected.

During air-conditioning operation (during operation of the blower 11), when the engine 4 stops and the compressor 1 consequently stops, the cold-releasing mode is selected.

At step S1801 described later, when it is determined that dehumidification of the passenger compartment is necessary, for the following reasons, the normal mode is selected. That is, because it is necessary for the evaporator air outlet temperature Te (the temperature of the evaporator 9) to be kept low to carry out dehumidification of the passenger compartment, it is necessary for the engine 4 to be operated so that the compressor 1 can be operated. Also, in this case, the cold-releasing mode after the engine is stopped, is not executed. If the cold-storing mode, wherein the target evaporator air outlet temperature TEO is set low, is executed in this case, the amount of condensed water freezing on the surface of the evaporator 9 would become excessive and obstruct the flow of air flowing through the evaporator 9.

Then, at step S130a, a target evaporator air outlet temperature TEO is calculated. During the normal mode, a target evaporator air outlet temperature $TEO_A$ for the normal mode is determined. The target evaporator air outlet temperature $TEO_A$ for the normal mode is calculated on the basis of the first target evaporator air outlet temperature $TEO_{A1}$ of FIG. 28 and the second target evaporator air outlet temperature $TEO_{A2}$ of FIG. 29.

That is, during engine running in the normal mode, among the first target evaporator air outlet temperature $TEO_{A1}=f(TAO_A)$ and the second target evaporator air outlet temperature $TEO_{A2}=f(T_{am})$, the lower temperature is finally set as the target evaporator air outlet temperature $TEO_A$. Further, at step S1801 as mentioned below, when it is determined that dehumidification of the passenger compartment is necessary, the normal mode is also selected. Further, at step S1801 in FIG. 53, when it is determined that dehumidification of the passenger compartment is necessary and the normal mode is then selected, in order to increase the dehumidification capacity of the evaporator 9, the third target evaporator air outlet temperature $TEO_{A3}$ having been previously set at a low temperature (e.g., 3° C.) is finally set as the target evaporator air outlet temperature $TEO_A$.

During the cold-storing mode, on the other hand, a target evaporator air outlet temperature for cold-storing $TEO_B$ is determined. The $TEO_B$ is a predetermined temperature below freezing point Tf (for example −2° C. to −1° C.). Thus, during the cold-storing mode, water condensed on the evaporator 9 is cooled to the temperature below freezing point Tf to be frozen.

After the calculation of TEO at step S130a has been finished, processing proceeds to step S140 and calculates a target flow amount BLW of air blown by the blower 11 based on the above-mentioned TAO. The method for calculating the target air flow amount BLW is known. That is, on the high-temperature side (maximum heating side) and the low-temperature side (maximum cooling side) of TAO, the target air flow amount is made large. On the other hand, at medium temperatures of TAO, the target air flow amount BLW is made small (see FIG. 35). The speed of the fan driving motor 13 of the blower 11 is controlled by an output of the air-conditioning ECU 5 so that the target air flow amount BLW is obtained.

Then, at step S150, an inside/outside air mode is determined in correspondence with TAO. The inside/outside air mode is switched (see FIG. 37) in a known fashion from an all inside air mode to an inside/outside air mixing mode and then to an all outside air mode as TAO rises from the low temperature side to the high temperature side, and the position of an inside/outside air door (not shown) is controlled by an output of the air-conditioning ECU 5 so that the inside/outside air mode is obtained.

Then, at step S160, an air outlet mode is determined in correspondence with TAO. The air outlet mode is switched (see FIG. 38) in a known fashion from a face mode to a bi-level mode to a foot mode as TAO rises from the low temperature side to the high temperature side, and the positions of the air outlet mode doors 26, 28 and 30 are controlled by the air-conditioning ECU 5 through the electric driving device 31 so that the selected air outlet mode is obtained.

Then, at step S170a, a target opening degree $SW_M$ of the air-mixing door 19 is calculated, and an opening degree of the air-mixing door 19 is determined. The target opening degree $SW_M$ of the air-mixing door 19 is expressed as a percentage, where the maximum cooling position of the air-mixing door 19 (the position in which it is shown with solid lines in FIG. 51) is set to 0% and the maximum heating position of the air-mixing door 19 (the position in which it is shown with broken lines in FIG. 51) is set to 100%.

Processing then proceeds to step S180, and the target evaporator air outlet temperature TEO ($TEO_A$ or $TEO_B$) and the actual evaporator air outlet temperature Te are compared, and on/off control of the compressor 1 is performed accordingly. That is, when the evaporator air outlet temperature Te is below the target evaporator air outlet temperature TEO, the air-conditioning ECU 5 cuts off current to the electromagnetic clutch 2 and thereby stops the compressor 1. Conversely, when the evaporator air outlet temperature Te is above the target evaporator air outlet temperature TEO, the air-conditioning ECU 5 supplies current to the electromagnetic clutch 2 and thereby operates the compressor 1. Thus, the evaporator air outlet temperature Te is kept at the target evaporator air outlet temperature TEO.

In the cold-storing mode, the target evaporator air outlet temperature TEO is lowered to $TEO_B$ (the predetermined value below freezing point Tf) to freeze condensed water on the evaporator 9 and thereby increase the amount of cold stored in the condensed water of the evaporator 9.

Processing then proceeds to step S190, and outputs engine control signals (signals of the above-mentioned stoppage permission or stoppage prohibition of the engine 4 and of a restart request after stoppage of the engine 4) on the basis of conditions on the air-conditioning side.

The engine control according to the fourteenth embodiment of the present invention will now be described with reference to FIG. 53.

First, at step S1911, it is determined whether or not dehumidification of air within the passenger compartment is necessary. Specifically, when a passenger operates an air outlet mode switch 37c on the air-conditioning control panel 36 and the defroster mode is set (i.e. when the defroster switch has been pressed), it is determined that defogging of the windshield is necessary, and therefore, it is also determined that dehumidification is necessary. Alternatively, even if the air outlet mode is not the defroster mode, when the outside air temperature Tam detected by the outside air temperature sensor of the sensor group 35 is below a predetermined temperature Tam1 (for example 10° C.), the vehicle windshields are liable to fog up, and it is determined that dehumidification is necessary.

Figure 53:
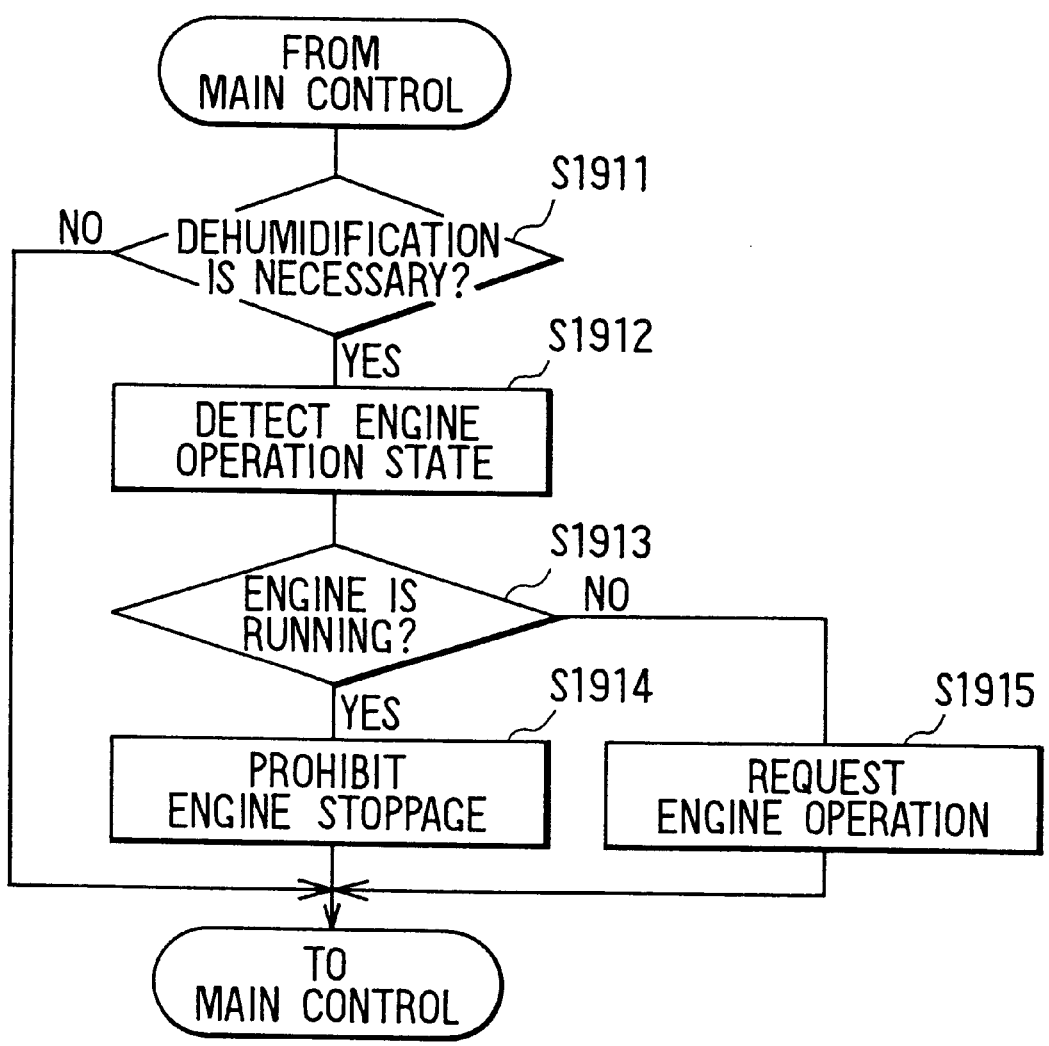
FIG. 53 is a detail flow diagram of a main step in FIG. 52.

Step S1911 in FIG. 53 constitutes dehumidification necessity determining means. When it is determined that dehumidification is necessary at step S1911, processing proceeds to step S1912 and detects the operation state of the engine 4. Then, at step S1913, it is determined whether or not the engine 4 is running. The determination at step S1913 can be performed on the basis of whether or not the vehicle speed signal or the engine speed signal inputted from the vehicle engine ECU 38 is above a predetermined value.

When at step S1913 it is determined that the engine 4 is running, processing proceeds to step S1914 and outputs an engine stoppage prohibiting signal. Accordingly, even when the engine stoppage conditions on the vehicle side are satisfied during a vehicle halt, the vehicle engine ECU 38 receives the control signal for prohibiting engine stoppage from the air-conditioning side and does not stop the operation of the engine 4.

On the other hand, when at step S1913 it is determined that the engine 4 is stopped, processing proceeds to step S1915 and outputs an engine restart request signal. Accordingly, notwithstanding that the vehicle is halted, the vehicle engine ECU 38 automatically starts the operation of the engine 4.

After the engine control signal outputting step S190, processing returns to step S110 in FIG. 52 and thereafter repeats the control of the subsequent steps S110 through S190. As explained above with reference to step S120 in FIG. 52, when it is determined at step S1911 (the dehumidification necessity determining means) that dehumidification is necessary, air-conditioning is carried out in the normal mode.

As will be understood from the above, in the dehumidification necessity determining means at step S1911, when it is determined that dehumidification of the passenger compartment is necessary, the engine 4 is forcibly started and air-conditioning is carried out in the normal mode in accordance with an engine control signal based on air-conditioning side conditions.

That is, while the vehicle is traveling and the cold-storing mode is executed, when it is determined that dehumidification of the passenger compartment is necessary, the cold-storing mode is canceled and the normal mode is performed. In the case, even if the vehicle halts to wait for a traffic signal or the like, stopping of the engine 4 is not carried out and air-conditioning in the normal mode continues. Also, while the vehicle is halted and the cold-releasing mode is executed, when it is determined that dehumidification of the passenger compartment is necessary, the cold-releasing mode is canceled, the engine 4 is started and the normal mode is executed.

Thus, when dehumidification is necessary in conditions in which fogging of the windshields is liable to occur, stopping of the engine 4 is not carried out, or if the engine 4 is stopped it is restarted, and the normal mode is executed. Thus, the compressor 1 is operated, and the temperature of the evaporator 9 is lowered. As a result, the dehumidifying capability of the evaporator 9 can be proposed, sufficiently dehumidified air can be blown into the passenger compartment, and fogging of the windshield can be prevented.

Modifications to Fourteenth Preferred Embodiment

In the foregoing fourteenth preferred embodiment of the present invention, the first bypass passage 16 and the bypass door 17 of FIG. 1 are not provided. However, the invention of the fourteenth preferred embodiment can be applied to a vehicle air-conditioning system having a first bypass passage 16 and a bypass door 17 as shown in FIG. 1.

With the construction of FIG. 1, because the flow amount of air passing through the evaporator 9 decreases by the flow amount of air passing through the first bypass passage 16 in the cold-storing mode, the cooling capacity required in the evaporator 9 is reduced and compressor driving power can effectively be saved. Further, in the cold-releasing mode, it possible to extend the time for which cold stored in water condensed on the evaporator 9 is released, by reducing the flow amount of air passing through the evaporator 9.

However, from the point of view of dehumidifying air blown into the passenger compartment, because air bypassing the evaporator 9 while passing through the first bypass passage 16 is not dehumidified by the evaporator 9, dehumidification of air blown into the passenger compartment may be insufficient.

In this case, at step S170a, a target opening degree $SW_M$ of the air-mixing door 19 and a target opening degree $SW_B$ of the bypass door 17 are calculated. In the above-mentioned dehumidification necessity determining means at step S1911, when it is determined that dehumidification is necessary, the target opening degree $SW_B$ of the bypass door 17 is set to zero (the fully closed position of the first bypass passage 16) at step S170a.

Thus, when it is determined by the dehumidification necessity determining means at step S1911 that dehumidification is necessary, the normal mode of the fourteenth preferred embodiment is executed (the engine 4 is operated) firstly, and then the first bypass passage 16 is fully closed by the bypass door 17.

Consequently, by performing the normal mode, the temperature of the evaporator 9 is decreased and the dehumidifying effect of the evaporator 9 is increased. Further, all air blown by the blower 11 passes through the evaporator 9 and is dehumidified by the evaporator 9, and thereby the dehumidification effect of air blown into the passenger compartment is effectively increased. Thus, sufficiently dehumidified air can be blown into the passenger compartment, and the defrosting performance of the windshield is thereby improved.

The fourteenth preferred embodiment of the present invention can also be modified in various other ways. For example, in the fourteenth preferred embodiment described above, at step S1911, dehumidification is determined to be necessary when the air outlet mode is the defroster mode (when the defroster switch has been pushed) or when the outside air temperature Tam detected by the outside air temperature sensor is below a predetermined temperature Tam1 (for example 10° C.). However, at step S1911, it may be determined that dehumidification of the passenger compartment is necessary whenever prevailing conditions are liable to cause fogging of the windshields.

For example, even when the air outlet mode is not the defroster mode but rather another air outlet mode such as a foot mode or a foot/defroster mode, because air is blown in a certain proportion from the defroster opening, the necessity of dehumidification of the passenger compartment may be determined on the basis of the condition that one of these air outlet modes has been selected. Further, a humidity sensor for detecting the humidity inside the passenger compartment may be provided, and it is determined that dehumidification is necessary when the humidity inside the passenger compartment is above a predetermined humidity.

Further, a glass temperature sensor for detecting a windshield temperature may be provided, and it may be determined that dehumidification is necessary when the temperature of the windshield is below a predetermined temperature. Further, because the inside air mode wherein inside air is recirculated through the air-conditioning system, is more liable to cause fogging of the windshields than the outside air mode wherein outside air is introduced into the passenger compartment, it may be determined that dehumidification is necessary when air-conditioning is performed in the inside air mode.

Also, the different conditions mentioned above may be combined freely, so that for example it is determined that dehumidification of the passenger compartment is necessary when the outside air temperature Tam is below a predetermined temperature Tam1 (for example, 10° C.) and furthermore the passenger compartment humidity is above a predetermined humidity.

In the fourteenth preferred embodiment described above, the cold-storing mode is set automatically on the basis of the target outlet temperature TAO. However, the normal mode may be set during running of the engine 4 (and the compressor 1) only when it is determined that a condition for prohibiting the cold-storing mode is determined, and the cold-storing mode may be set at all other times. Further, a cold-storing switch for setting a cold-storing mode may be provided as one of the control switches 37 of the air-conditioning control panel 36, and the operation of the cold-storing mode is decided on the basis of the position of the cold-storing switch. However, even when the cold-storing switch is turned on, when it has been determined by the dehumidification necessity determining means at step S1911 that dehumidification of the passenger compartment is necessary, the cold-storing mode is canceled and the normal mode is executed.

Also, in the above-described fourteenth preferred embodiment of the present invention, during the cold-storing mode, the target evaporator air outlet temperature TEO is lowered to a low temperature below freezing point such as −2° C. to achieve an improvement in cold-storing effect. However, during the cold-storing mode, the target evaporator air outlet temperature TEO may be lowered to a temperature (for example 1° C.) lower than its minimum temperature (for example 3° C.) during the normal control but higher than 0° C. to achieve an improvement in cold-storing effect.

Fifteenth Preferred Embodiment

A fifteenth preferred embodiment of the present invention will now be described.

In the cold-releasing mode during a vehicle halt, when cooling operation of the passenger compartment is performed by releasing of cold stored in frozen water on the evaporator 9, because the evaporator air outlet temperature Te gradually rises as the condensed water melts and increases in temperature, the temperature of air blown into the passenger compartment eventually rises above the target outlet temperature TAO, and the cooling effect for the passenger compartment falls. Consequently, there is a limit to the time for which the cold-releasing mode can be executed.

During travel within city areas, over 80% of vehicle halts at traffic signals and the like are of less than 1 minute in duration, and for the reason the time for which the cooling operation of the passenger compartment during the cold-releasing mode is carried out is normally set to 1 minute. When the time for performing the cold-releasing mode reaches 1 minute, the engine 4 is restarted and the compressor 1 is operated.

Further, depending on the operating state of the compressor 1 during vehicle travel, the vehicle may stop at a time when the compressor is stopped, and the time for which the cold-releasing mode can be maintained during a vehicle halt (the time until the engine is restarted) is greatly affected by whether the compressor 1 is operating or stopped when the vehicle halts. That is, when the vehicle halts with the compressor 1 stopped and just when the evaporator air outlet temperature is risen to the upper limit of a target temperature range, the time for which the cold-releasing mode can be maintained is short and the engine 4 restarts while the vehicle is still necessarily halted for the traffic signal. Consequently, in city areas where the vehicle starting and stopping is repeated frequently, the engine is restarted frequently and its fuel consumption increases.

It is therefore an object of the following fifteenth preferred embodiment of the present invention to save engine power by extending the time for which cooling operation can be continued in the cold-releasing mode during engine stoppages (compressor stoppages).

A schematic view of a vehicle air-conditioning system according to the fifteenth preferred embodiment is similar to that of FIG. 51. The air-conditioning ECU 5 is connected to the vehicle engine ECU 38, and a rotation speed signal of the engine 4, a vehicle speed signal and a brake signal and so on are inputted from the vehicle engine ECU 38 into the air-conditioning ECU 5. In the fifteenth embodiment of the present invention, on the basis of these signals, the air-conditioning ECU 5 performs a determination of whether or not the vehicle is going to halt.

The vehicle engine ECU 38 performs overall control of fuel injection quantity to the vehicle engine 4 and ignition timing and the like on the basis of signals from a sensor group (not shown) for detecting operating conditions of the vehicle engine 4. Also, in an eco-run vehicle or hybrid vehicle to which the invention of the fifteenth embodiment can be preferably applied, when it is determined that the vehicle is stationary based on the rotation speed signal of the vehicle engine 4, the vehicle speed signal and a brake signal or the like, the vehicle engine ECU 38 automatically stops the vehicle engine 4 for example by stopping fuel injection.

Further, when the vehicle shifts from a stationary state to an advancing state by a driving operation of a driver, the vehicle engine ECU 38 determines the advancing state of the vehicle on the basis of an accelerator signal or the like and automatically starts the operation of the vehicle engine 4. The air-conditioning ECU 5 estimates an amount of cold stored in the condensed water on the evaporator 9 during running of the vehicle engine 4 or the behavior of the evaporator air outlet temperature when the vehicle engine has been stopped. As a result, the air-conditioning ECU 5 outputs a signal permitting or prohibiting stoppage of the vehicle engine 4, or outputs a signal requesting restarting of the vehicle engine 4 on the basis of a rise in the evaporator air outlet temperature Te after the vehicle engine 4 is stopped.

Figure 54:
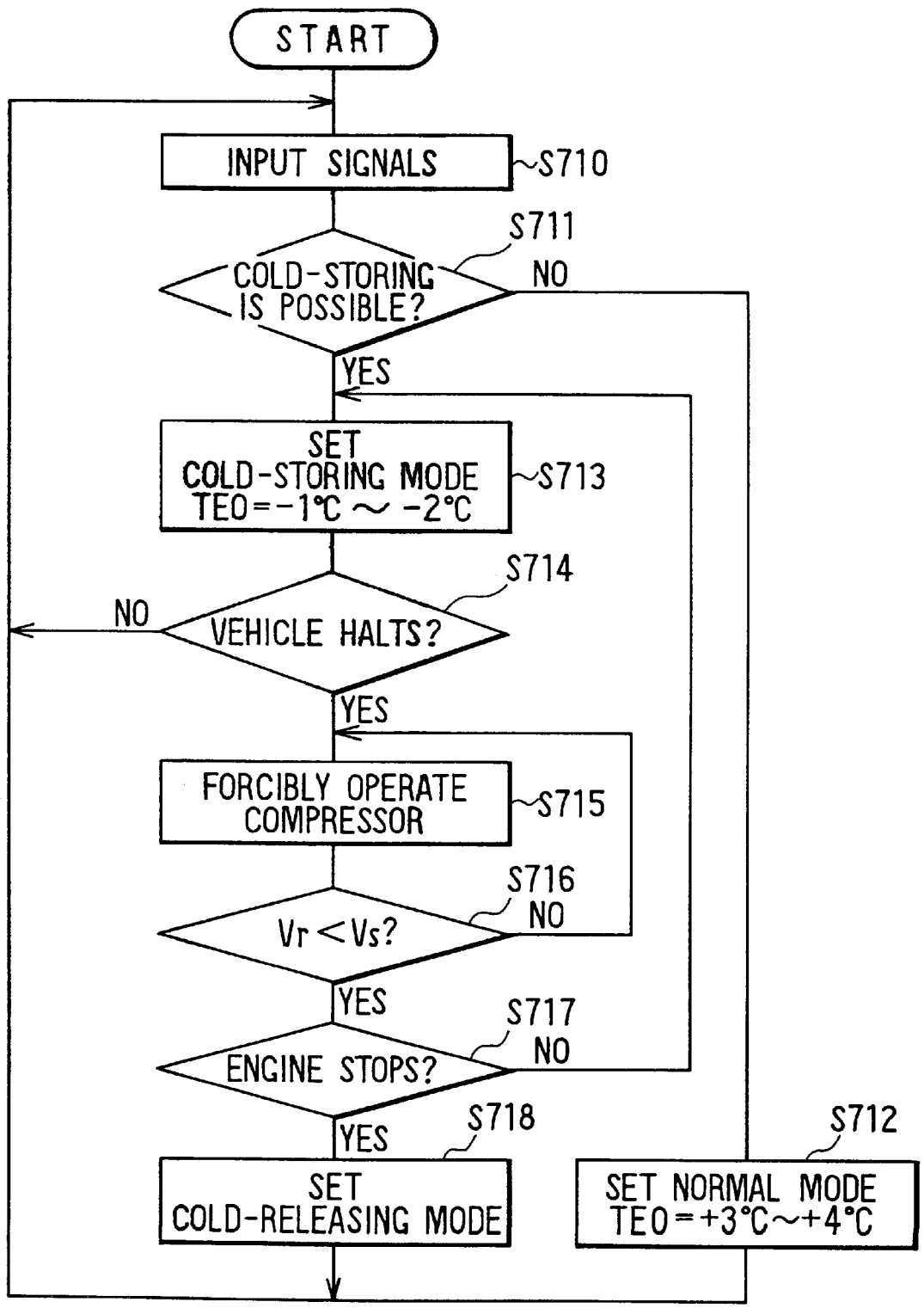
FIG. 54 is a flow diagram showing an operation control according to a fifteenth preferred embodiment of the present invention.

The operation of the vehicle air-conditioning system according to the fifteenth preferred embodiment of the present invention will now be described. The flow diagram of FIG. 54 schematically shows control processing executed by the microcomputer of the air-conditioning ECU 5. The control routine of FIG. 54 starts when an air flow amount switch (or an AUTO switch) among the control switches 37 of the air-conditioning control panel 36 is turned on, when an ignition switch of the vehicle engine 4 is turned on and power is supplied to the air-conditioning ECU 5.

First, at step S710 in FIG. 54, detection signals from the temperature sensor 32 and the sensor group 35, control signals from the control switches 37, and vehicle operation signals from the vehicle engine ECU 38 are inputted.

Then, a target outlet temperature TAO of air blown into the passenger compartment and a target evaporator air outlet temperature TEO are calculated. First, the target outlet temperature TAO of air blown into the passenger compartment is calculated using the foregoing expression Exp. 1. The target outlet temperature TAO is the air temperature necessary to maintain the passenger compartment at a set temperature Tset.

Then, a first target evaporator air outlet temperature $TEO_A$ (first target value) is calculated on the basis of a target outlet temperature dependent temperature $TEO_{A1}$ and an outside air temperature dependent temperature $TEO_{A2}$.

Specifically, the target outlet temperature dependent temperature $TEO_{A1}$ is determined on the basis of a map (the foregoing FIG. 13) stored in ROM of the microcomputer so that the higher the TAO becomes, the higher the target outlet temperature dependent temperature $TEO_{A1}$ becomes. Thus, it can be written that $TEO_{A1}=f(TAO)$. In the fifteenth embodiment of the present invention, $TEO_{A1}$ has an upper limit of 12° C.

The outside air temperature dependent temperature $TEO_{A2}$ is also determined on the basis of a map (the foregoing FIG. 14) stored in ROM of the microcomputer. The outside air temperature dependent temperature $TEO_{A2}$ is determined in accordance with the outside air temperature Tam. Thus it can be written that $TEO_{A2}=f(Tam)$.

Then, in the normal mode (not the cold-storing mode) during engine running, among the target outlet temperature dependent temperature $TEO_{A1}=f(TAO)$ and the outside air temperature dependent temperature $TEO_{A2}=f(Tam)$, the lower temperature is finally set as the first target evaporator air outlet temperature $TEO_A$.

Then, at step S711, it is determined whether or not a cold-storing mode for performing a control of cold storing quantity of condensed water on the evaporator 9 is possible. Here, cold-storing control carried out in the cold-storing mode refers to controlling the amount of cold stored in the condensed water on the evaporator 9 while the vehicle engine is running in advance preparation for the next time the vehicle engine is stopped because the vehicle is halted temporarily for example at a traffic signal. Specifically, to increase the amount of cold stored in the condensed water on the evaporator 9, it is necessary either to lower the temperature of the condensed water by lowering the evaporator temperature or to increase the quantity of the condensed water. Here, to increase the amount of cold stored in the condensed water effectively, it is preferable to cool the condensed water to below freezing point so that the condensed water is frozen and cold is stored in the condensed water in the form of latent heat.

In the fifteenth embodiment of the present invention, the cold-storing mode is performed when none of the following three conditions applies (satisfies). That is, when none of the conditions of [1] the vehicle is traveling at high speed, [2] frosting of the evaporator 9 is reached to a predetermined limit level, and [3] the cooling load on the system is high, applies, execution of the cold-storing mode is permitted. However, if any one of the conditions [1] through [3] does apply, execution of the cold-storing mode is prohibited.

That is, when the vehicle is in a high-speed travel, it can be expected that the frequency of vehicle halts will be low. When frosting of the evaporator 9 has progressed to a predetermined limit level, to prevent a reduction of the evaporator cooling performance caused by further frosting of the evaporator 9, the cold-storing mode is not performed. Further, when the cooling load for the passenger compartment is high, because the temperature of air blown into the passenger compartment would rise quickly and cause the cooling feeling to deteriorate in an engine stoppage even if the cold-storing mode is performed beforehand, engine stoppage itself is canceled and the cold-storing mode during engine running also is not executed.

When it is determined that the cold-storing mode is impossible at step S711, processing proceeds to step S712 and executes the normal mode and sets the target evaporator air outlet temperature TEO to the first target evaporator air outlet temperature $TEO_A$. The target evaporator air outlet temperature TEO and the actual evaporator air outlet temperature Te are compared, and the electromagnetic clutch 2 is switched on to operate the compressor 1 when Te>TEO. Conversely, when Te≦TEO, the electromagnetic clutch 2 is switched off to stop the compressor 1. More specifically, to prevent hunting of the compressor on/off operation, hysteresis of 1° C. is provided in the determination, so that for example the compressor 1 is operated at Te≧4° C., and the compressor 1 is stopped at Te≦3° C.

When it is determined that the cold-storing mode is possible, processing proceeds to step S713 and determines a second target evaporator air outlet temperature $TEO_B$ (second target value). The $TEO_B$ is determined within a range such that the cooling feeling after the elapsing of a predetermined time (for example, 1 minute) from engine (compressor) stoppage is not lost. Specifically, the $TEO_B$ is set to a predetermined temperature below freezing point Tf (for example −2° C.). During the cold-storing mode, the target evaporator air outlet temperature TEO is set to the second target evaporator air outlet temperature $TEO_B$. The reason for making the predetermined time from engine stoppage 1 minute by way of example here is that on average the temporary stop time (engine stop time) at traffic signals and the like is about 1 minute.

Figure 55:
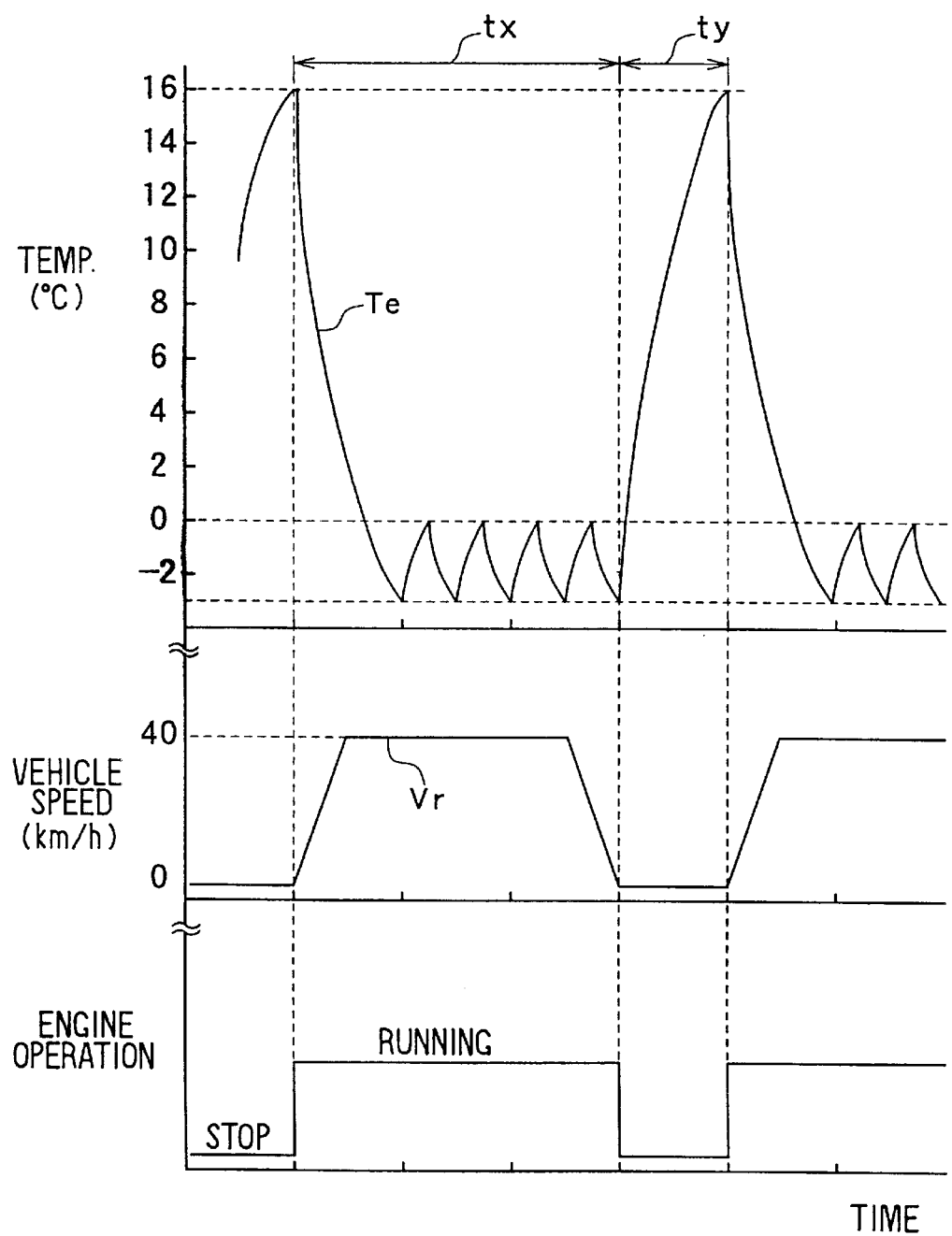
FIG. 55 is a characteristic view showing the relationship between an evaporator air outlet temperature Te, a vehicle speed and an engine operation state, according to the fifteenth embodiment.

Next, in the same way as when the cold-storing mode is prohibited as described above, the target evaporator air outlet temperature TEO and the actual evaporator air outlet temperature Te are compared when Te>TEO, the electromagnetic clutch 2 is switched on to operate the compressor 1. Conversely, when Te≦TEO, the electromagnetic clutch 2 is switched off to stop the compressor 1. Specifically, to prevent hunting of the compressor on/off operation, for example the compressor 1 is operated at Te≧−1° C., and the compressor 1 is stopped at Te≦−2° C. In practice, there is some delay between the compressor 1 being started or stopped and the evaporator air outlet temperature Te changing. As shown in FIG. 55, when the compressor 1 is operated at Te≧−1° C. and is stopped at Te≦−2° C. during an engine-running time tx, the evaporator air outlet temperature Te fluctuates between 0° C. and −3° C. Thus, water condensed on the evaporator 9 can be cooled to the temperature below freezing point Tf and thus frozen, whereby the cold-storing mode is performed. In both the normal mode and the cold-storing mode, the temperature of air blown into the passenger compartment is adjusted to approach the target outlet temperature TAO by the operation of the air-mixing door 19.

Next, processing proceeds to step S714 (vehicle halt predicting means), and predicts whether or not the vehicle is going to halt. Specifically, the prediction is carried out on the basis of the detected values of the vehicle speed signal and the brake signal and so on inputted into the air-conditioning ECU 5, in accordance with the following conditions.

That is, in the fifteenth embodiment of the present invention, if both of the two conditions of [1] the vehicle speed is below 40 km/h and [2] the brake pedal of the vehicle is depressed are satisfied, it is determined that the vehicle is going to halt. These conditions are just an example of vehicle stopping determination conditions. For example, a signal from an acceleration sensor may be inputted into the air-conditioning ECU 5 and it then determined that the vehicle is going to halt when the two conditions of [1] the vehicle speed is below 40 km/h and [2] there has been a sudden decrease in speed due to deceleration due to engine braking or the like is satisfied.

Figure 56:
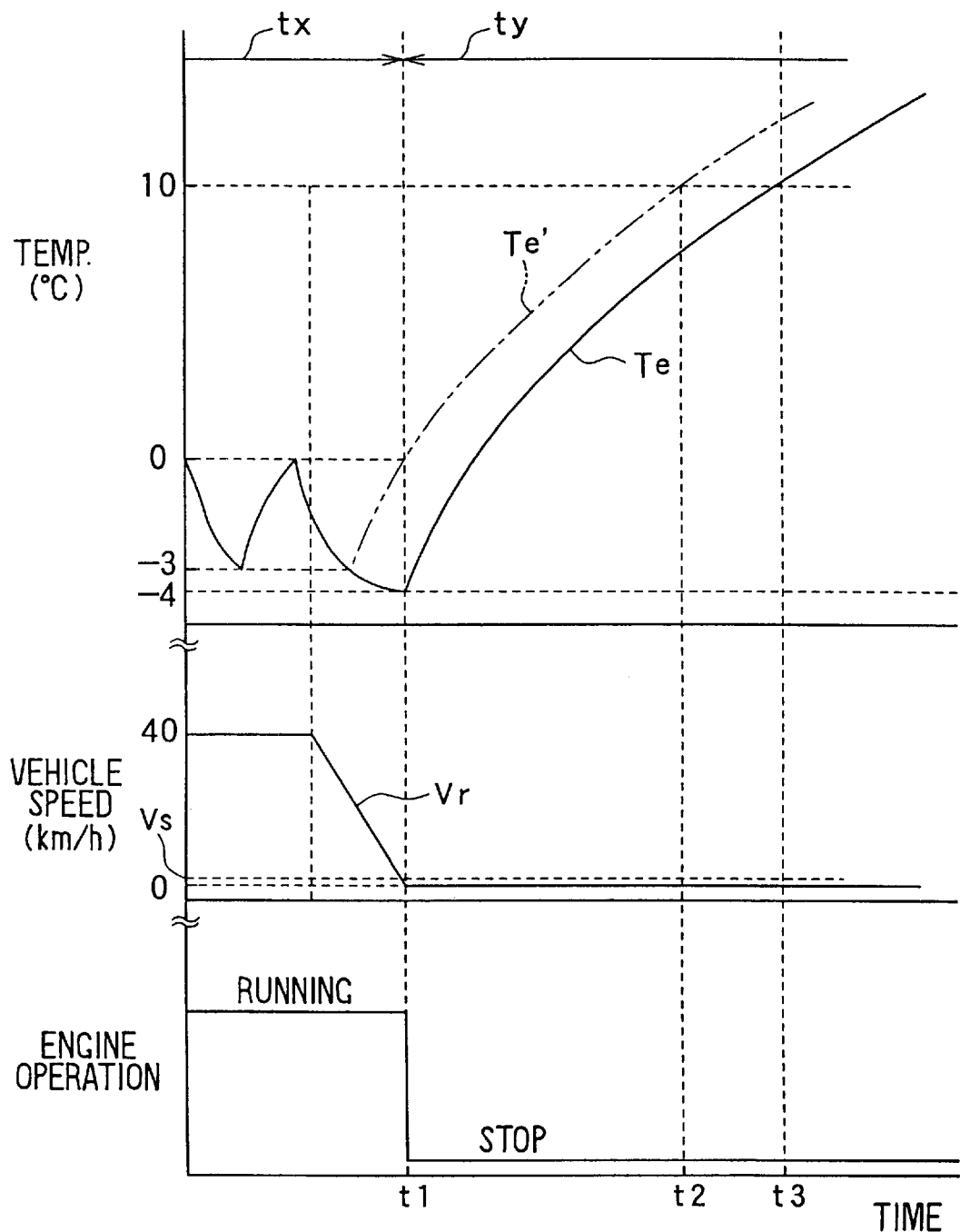
FIG. 56 is a characteristic view showing the relationship between the evaporator air outlet temperature Te, the vehicle speed and the engine operation state, after an operation control in FIG. 54 is performed, according to the fifteenth embodiment.

When it is predicted/determined at step S714 that the vehicle is going to halt (vehicle halts), processing proceeds to step S715 and carries out forced compressor operation control. That is, at step S715, the compressor 1 is forcibly operated by keeping the electromagnetic clutch 2 to be turned on, even when the actual evaporator air outlet temperature Te is below the target evaporator air outlet temperature TEO. Thus, as shown in FIG. 56, the evaporator air outlet temperature Te can be decreased to a lower temperature at a cold-releasing mode start time t1, which will be further discussed later.

On the other hand, when it is not determined at step S714 that the vehicle is going to halt, processing returns to step S710 and determines whether the cold-storing mode can be executed.

Then, at step S716, it is determined whether or not the vehicle speed Vr detected with the vehicle speed sensor signal is lower than a predetermined speed Vs (for example 5–8 km/h).

When it is determined that the vehicle speed Vr is equal to or larger than the predetermined speed Vs, processing returns to step S715 and continues the forced compressor operation control. When the vehicle speed Vr is below the predetermined speed Vs, the forced compressor operation control is canceled. Therefore, it can prevent the evaporator air outlet temperature Te falling more than necessary due to the forced compressor operation being continued when the vehicle continues to travel at a low speed, for example due to traffic, after it is determined at step S714 that the vehicle is going to halt and forced compressor operation control has been executed at step S715.

Then, at step S717, it is determined whether or not the vehicle has halted and the engine is stopped. In the fifteenth embodiment of the present invention, when the vehicle has been halted, the vehicle engine ECU 38 automatically stops the engine 4, for example by stopping fuel injection.

When it is determined that the engine 4 is not stopped, processing returns to step S713 and executes the cold-storing mode. On the other hand, when it is determined that the engine 4 is stopped, processing proceeds to step S718 and performs the cold-releasing mode.

That is, in the fifteenth embodiment of the present invention, when the vehicle halts, the compressor 1 of the refrigerant cycle also inevitably stops and consequently the cooling effect of the evaporator 9 provided by latent heat of evaporation of refrigerant in the refrigerant cycle R stops. However, as shown in FIG. 56, because water condensed on the evaporator is frozen and the amount of cold stored in the water is thereby increased during the period "tx" while the engine is running, the cold stored in water condensed on the evaporator (latent heat of melting of water and sensible heat of water) can be utilized to obtain the cooling action of the evaporator 9 during the engine stoppage period "ty".

During the cold-releasing mode, when the evaporator air outlet temperature Te rises above the target outlet temperature TAO of air blown into the passenger compartment due to the engine stoppage time becoming extended, an instruction signal for requesting restarting of the engine is outputted from the air-conditioning side, and the engine 4 is automatically started. In the fifteenth preferred embodiment of the present invention, because the engine stoppage time "ty" when vehicle halts is set to 1 minute, when the engine stoppage time is longer than 1 minute, the engine 4 is started and the compressor 1 starts. Thus, the compressor 1 is restarted and the cooling action due to the operation of the evaporator 9 is restarted.

When the controls at steps S714 and S715 are not executed and the forced compressor operation control of the fifteenth embodiment is not carried out, the cold-releasing mode may be started, after the compressor 1 has already stopped and the evaporator air outlet temperature Te' has already consequently risen (for example to 0° C.), as shown by the broken line in FIG. 56. In this case, the evaporator air outlet temperature Te' rises to 10° C. at the time t2, that is, in forty seconds from the cold-releasing mode start time t1. Consequently, the time for which the passenger compartment can be cooled by using the cold-releasing mode while the engine 4 is still stopped is short, and the engine 4 soon starts and fuel economy deteriorates.

According to the fifteenth embodiment of the present invention, the forced compressor operation control is carried out at step S714, when it is predicted that the vehicle is going to halt in the cold-storing mode. In this case, because the compressor 1 is forcibly operated even if Te≦−3° C. as shown by the solid line in FIG. 56, the evaporator outlet air temperature Te is lowered to −4° C. when the vehicle halts. When the cold-releasing mode is executed from here where Te is lowered to −4° C., the evaporator air outlet temperature Te does not reach 10° C. until the time t3, that is, in sixty seconds from the cold-releasing mode starting time t1.

Thus, the evaporator air outlet temperature Te can be prevented from rising above the target outlet temperature TAO while the vehicle is halted at a traffic signal or the like. Therefore, the passenger compartment can be cooled sufficiently while the engine 4 (and the compressor 1) is stopped, and starting of the engine 4 during vehicle halts at traffic signals and the like (when engine power for driving the vehicle is not needed) can be prevented. As a result, it is possible to enhance the effect of improving fuel consumption which is the object of vehicles which automatically stop their engines during vehicle halts.

From when it is determined at step S716 that the vehicle speed Vr is below the predetermined speed Vs until the vehicle actually stops, the forced compressor operation control is canceled and the cold-storing mode is executed, and control wherein the compressor 1 is started at Te≧−1° C. and is stopped at Te≦−2° C. is carried out. However, because the predetermined speed Vs is the low speed of 5–8 km/h, when the vehicle is stopped (when processing proceeds to step S718), the evaporator air outlet temperature Te hardly rises and is still a low temperature when the cold-releasing mode is started, since the execution of the cold-storing mode has only been carried out for an almost negligible short time.

Modifications of Fifteenth Preferred Embodiment

In the fifteenth preferred embodiment described above, when at step S714 in FIG. 54 it is predicted that the vehicle is going to halt, the compressor 1 is forcibly operated at step S715; however, instead of the forced compressor operation control, the following kind of control may be carried out.

The on/off operation of the compressor 1 is performed according to the result of comparing the target evaporator air outlet temperature TEO (for example −2° C.) with the evaporator air outlet temperature Te. That is, the compressor 1 is operated when Te>TEO, and is stopped when $T_e$≦TEO.

Thus, in the modification example of the fifteenth embodiment, when at step S714 in FIG. 54 it has been determined by the vehicle halt predicting means that the vehicle is going to halt, a third target evaporator air outlet temperature $TEO_C$ (third target value, for example, −5° C.), which is a temperature lower than the second target evaporator air outlet temperature $TEO_B$ (second target value, for example −2° C.), is set. Then, at step S715, the target evaporator air outlet temperature TEO is set to the third target evaporator air outlet temperature $TEO_C$, and the operation of the compressor 1 is on/off controlled according to the result of comparing the third target evaporator air outlet temperature $TEO_C$ (the above-mentioned −5° C.) with the actual evaporator air outlet temperature Te. Here, the compressor 1 is operated when Te>TEO ($TEO_C$), and is stopped when Te≦TEO ($TEO_C$).

Thus, the compressor 1 can be on/off controlled with the target evaporator air outlet temperature TEO reset to a lower temperature ($TEO_C$) compared to the fifteenth preferred embodiment, when it is predicted that the vehicle is going to halt in the cold-storing mode. Therefore, similarly to the forced compressor operation control at step S715 in FIG. 54, it is possible to set the evaporator air outlet temperature Te to a lower temperature at the start time t1 of the cold-releasing mode, and thereby obtain the same effect as in the fifteenth preferred embodiment.

Another modification example of the fifteenth preferred embodiment will now be described. In the modification example, a variable capacity type compressor, whose capacity can be changed freely, is used as the compressor 1.

In this case, in the above-described normal mode control of step S712 in FIG. 54, the capacity of the compressor 1 can be controlled so that the evaporator air outlet temperature Te approaches the first target evaporator air outlet temperature $TEO_A$ during running of the engine 4.

Then, in the cold-storing mode at step S713, a second target evaporator air outlet temperature $TEO_B$, lower than the first target evaporator air outlet temperature $TEO_A$, is set, and the capacity of the compressor 1 can be controlled so that the evaporator air outlet temperature Te approaches the second target evaporator air outlet temperature $TEO_B$ during running of the engine 4.

When at step S714 it is predicted by the vehicle halt predicting means that the vehicle is going to halt, compressor capacity control for increasing the capacity of the compressor 1 is performed and the compressor 1 is forcibly operated with a large capacity at step S715. As a result, the cooling capacity of the refrigerant cycle R rises and the evaporator air outlet temperature Te is lowered.

With the construction of the modified example also, it is possible to set the evaporator air outlet temperature Te to a low temperature at the start time t1 of the cold-releasing mode, and thereby it is possible to obtain the same effect as in the fifteenth preferred embodiment.

Sixteenth Preferred Embodiment

The following sixteenth preferred embodiment relates to a refrigerant cycle apparatus wherein a cold-storing function is added to an evaporator for air-conditioning, and can be preferably applied to a vehicle air-conditioning system. First, a subject of the sixteenth preferred embodiment of the present invention will be explained.

To increase the amount of cold stored in the condensed water on the evaporator, it is effective to cool the condensed water to below freezing point and thus freeze it and store cold in the form of latent heat while the engine 4 is running.

In a vehicle air-conditioning system, a temperature type expansion valve is used as a pressure-reducing device for reducing the pressure of refrigerant supplied to the evaporator of the refrigerant cycle. The expansion valve adjusts the flow of refrigerant so as to maintain the degree of superheating of the refrigerant at a refrigerant outlet of the evaporator at a predetermined value. Thus, refrigerant is evaporated uniformly throughout the whole evaporator and the temperature distribution of air blown from the evaporator is kept to be uniform.

To freeze water condensed on the evaporator, it is necessary to lower the evaporator temperature to a temperature below freezing point, and therefore, it is necessary for the refrigerant pressure after the expansion valve pressure reduction, that is, the refrigerant evaporation pressure, to be lowered to a pressure corresponding to a temperature below freezing point.

However, since the expansion valve adjusts the refrigerant flow amount (valve opening degree) so as to maintain the degree of superheating of the refrigerant at the refrigerant outlet of the evaporator at a predetermined value, it is necessary for the capability of the cycle to be increased, for example by an increase in the size of the compressor, so that the refrigerant evaporation pressure is lowered while the refrigerant flow adjusting action is maintained. Therefore, in a system having restrictions on its installation space and compressor drive power and so on, the measure of increasing the capability of the cycle is difficult to realize.

It is therefore an object of the sixteenth preferred embodiment of the present invention to provide a refrigerant cycle apparatus with which the evaporator temperature can be lowered to a temperature below freezing point to execute a cold-storing function without increasing the capability of the refrigerant cycle.

Figure 57:
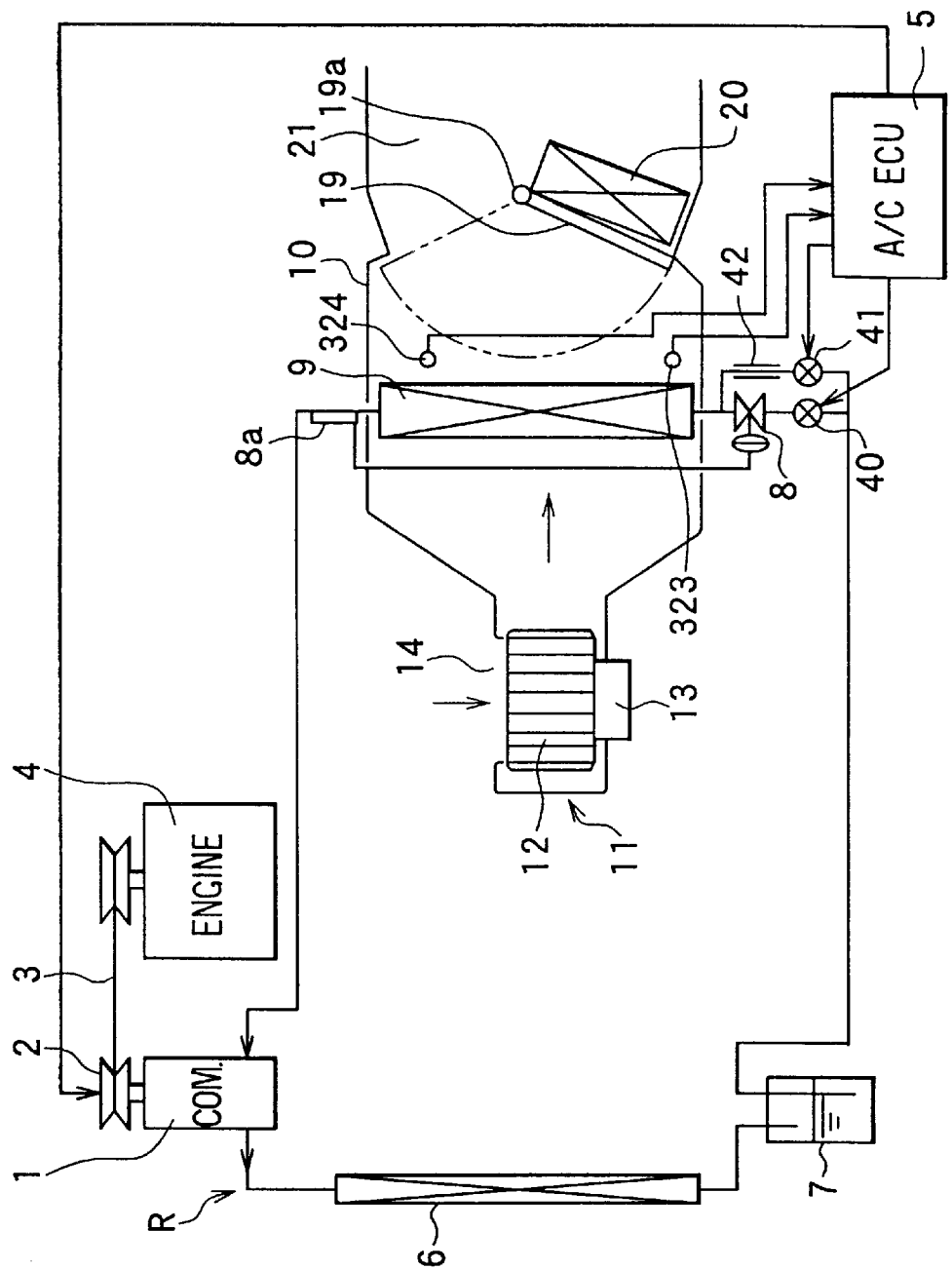
FIG. 57 is a schematic diagram showing a vehicle air-conditioning system according to a sixteenth preferred embodiment of the present invention.

FIG. 57 is a schematic view of the overall construction of a vehicle air-conditioning system according to the sixteenth preferred embodiment of the present invention. A refrigerant cycle R of the vehicle air-conditioning system has a compressor 1 for taking in, compressing and discharging refrigerant. The compressor 1 has an electromagnetic clutch 2 for power switching, and power from a vehicle engine 4 is transmitted to the compressor 1 via the electromagnetic clutch 2 and a belt 3.

Electric current supplying to the electromagnetic clutch 2 is controlled and is switched by an air-conditioning electronic control unit (ECU) 5, which will be further discussed later. When current is passed through the electromagnetic clutch 2, the electromagnetic clutch 2 engages and drives the compressor 1. Conversely, when the current to the electromagnetic clutch 2 is cut off, the electromagnetic clutch 2 disengages and the operation of the compressor 1 stops.

High-temperature, high-pressure superheated gas refrigerant discharged from the compressor 1 flows into a condenser 6, and refrigerant is heat-exchanged with outside air blown by a cooling fan (not shown) in the condenser 6 to be cooled and condensed. Refrigerant condensed in the condenser 6 then flows into a receiver 7, gas and liquid components of refrigerant are separated inside the receiver 7, and excess refrigerant (liquid refrigerant) of the refrigerant cycle R is stored in the receiver 7.

Liquid refrigerant from the receiver 7 is reduced in pressure to a low pressure by an expansion valve (pressure-reducing means) 8 to become in a low-pressure gas/liquid two-phase state. Refrigerant from the expansion valve 8 flows into an evaporator (i.e., heat exchanger for cooling) 9. The evaporator 9 is disposed inside an air-conditioning case 10 of the vehicle air-conditioning system, and low-pressure refrigerant flowing into the evaporator 9 absorbs heat from air inside the air-conditioning case 10 and evaporates. The expansion valve 8 is a temperature type expansion valve having a temperature-sensing part 8a for sensing the temperature of the refrigerant at the outlet of the evaporator 9, and adjusts its valve opening degree (refrigerant flow) so that the degree of superheating of the refrigerant at the outlet of the evaporator 9 is kept at a predetermined value.

The refrigerant outlet of the evaporator 9 is connected to the intake side (suction side) of the compressor 1. An electromagnetic valve for cooling (first valve) 40 is connected to a refrigerant inlet side of the expansion valve 8, and a series refrigerant circuit consisting of an electromagnetic valve for cold-storing (second valve) 41 and a fixed throttle 42 is connected in parallel with the series circuit formed by the electromagnetic valve for cooling 40 and the expansion valve 8. In the sixteenth embodiment, the two electromagnetic valves 40, 41 constitute a valve unit for switching the pressure-reducing device. The fixed throttle 42 can be formed by an orifice or a capillary tube or the like. The above-mentioned components make up a closed circuit of a refrigerant cycle.

A blower 11 is disposed in the air-conditioning case 10 on the upstream air side of the evaporator 9 and has a centrifugal blower fan 12 and a driving motor 13 for driving the blower fan 12. Air from inside the passenger compartment (inside air) of the vehicle and/or air from outside the passenger compartment (outside air) is introduced into a suction port 14 of the centrifugal blower fan 12 through an inside/outside air switching box (not shown), and air blown by the centrifugal blower fan 12 flows into a space inside the air-conditioning case 10 upstream of the evaporator 9.

The evaporator 9 has an ordinary core part including cross-sectionally flat tubes made of thin-sheet aluminum and corrugated fins joined to outer faces of these tubes. Air flowing through the core part of the evaporator 9 in the left-right direction of FIG. 57 is cooled by the evaporator 9.

Within the air-conditioning case 10, an air-mixing door 19 is disposed on the downstream air side of the evaporator 9. A hot water type heater core (heat exchanger for heating) 20 for heating air with hot water (engine-cooling water) from the vehicle engine 4 as a heat source is disposed on the downstream air side of the air-mixing door 19. A bypass passage 21 is formed above the hot water type heater core 20. The bypass passage 21 is for allowing air (cool air) to bypass the hot water type heater core 20.

The air-mixing door 19 is a plate-like door rotatable around a pivot shaft 19a. The air-mixing door 19 adjusts the flow proportions of air passing through the hot water type heater core 20 and air passing through the bypass passage 21, to control temperature of air blown into the passenger compartment. That is, in the sixteenth embodiment, the air-mixing door 19 constitutes a temperature adjusting unit.

Warm air from the hot water type heater core 20 and cool air from the bypass passage 21 are mixed on a downstream air side of the hot water type heater core 20 to obtain conditioned air having a desired temperature, and the conditioned air is blown into the passenger compartment through an air outlet mode switching part (see FIG. 51). That is, conditioned air having a desired temperature passes through a defroster opening, a face opening and a foot opening positioned at the downstream air end of the air-conditioning case 10 and is blown toward the inside of the front windshield of the vehicle, and the upper part and the feet area of a passenger in a passenger compartment of the vehicle.

The electronic control part of the vehicle air-conditioning system according to the sixteenth preferred embodiment will be described. First and second evaporator air outlet temperature sensors (evaporator cooling degree detecting means) 323, 324 consisting of thermistors are disposed in positions inside the air-conditioning case 10 immediately behind the air outlet of the evaporator 9 to detect the evaporator air outlet temperature. Here, the first evaporator air outlet temperature sensor 323 is disposed on the refrigerant inlet side (a cold-storing part, where ice is formed) of the evaporator 9 and detects a cold-storing side air temperature TEi.

The second evaporator air outlet temperature sensor 324 is disposed on the refrigerant outlet side (where ice is generally not formed) of the evaporator 9 and detects an air-flowing side air temperature TEa. Because water condensing on the evaporator 9 tends to collect on the lower side, the refrigerant inlet side (the cold-storing part, where ice is formed) of the evaporator 9 is disposed in the lower side of the air-conditioning case 10 and the refrigerant outlet side (the part where ice is generally not formed) of the evaporator 9 is disposed in the upper side of the air-conditioning case 10. The temperatures TEi, TEa detected by the evaporator air outlet temperature sensors 323, 324 are each inputted into the air-conditioning ECU 5.

The air-conditioning ECU 5 is made up of a microcomputer and so on. Detection signals from a sensor group (see FIG. 51) detecting an inside air temperature Tr, an outside air temperature Tam, a solar radiation Ts and a hot water temperature Tw, and control signals such as a temperature setting signal Tset from control switches (see FIG. 51) provided in an air-conditioning control panel (not shown) mounted in the dash board, are inputted into the air-conditioning ECU 5 for air-conditioning control along with the detection signals of the sensors 323, 324.

Figure 58:
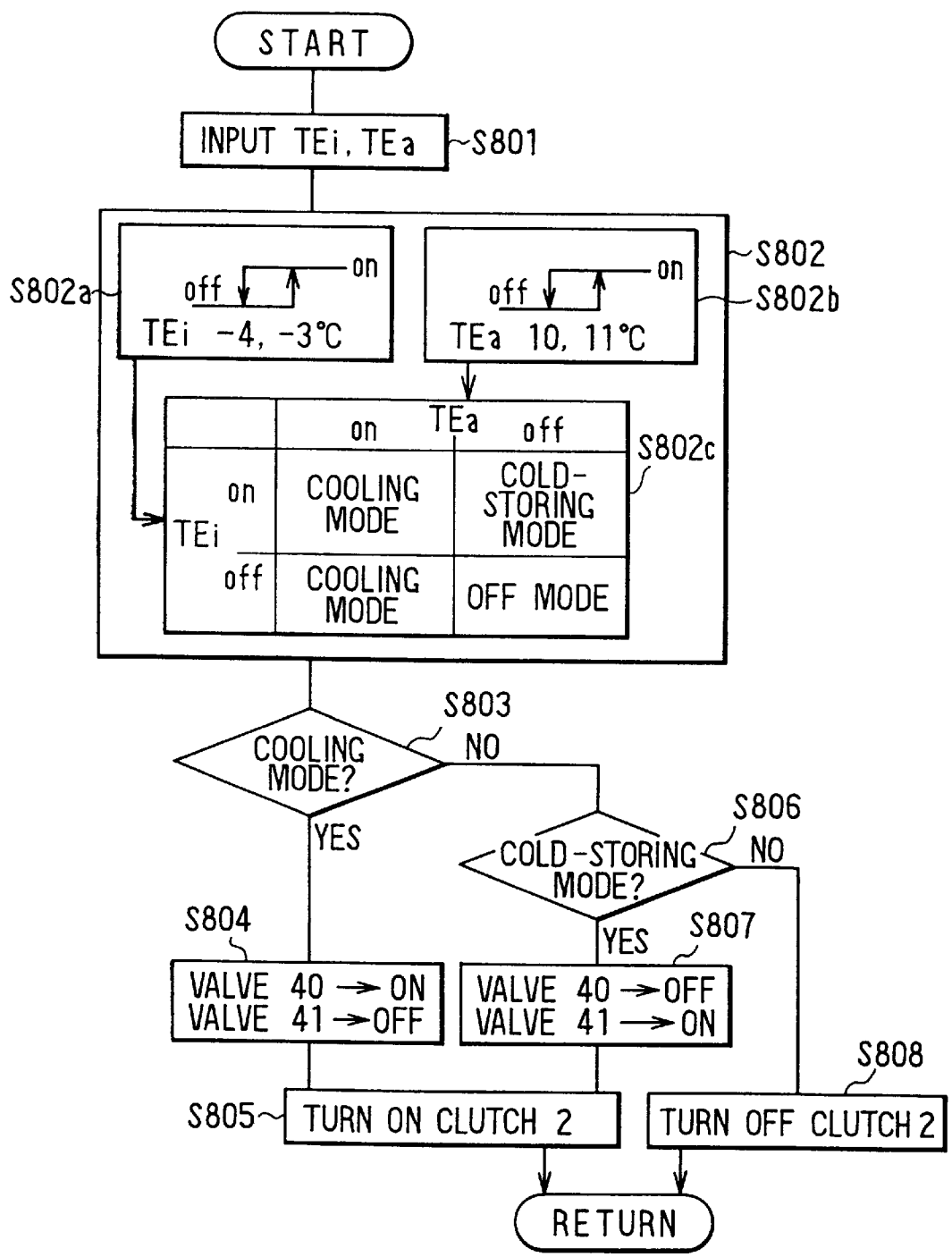
FIG. 58 is a flow diagram showing an operation control according to the sixteenth embodiment.

The operation of the air-conditioning ECU 5 according to the sixteenth preferred embodiment will now be explained, with reference to FIG. 58 which shows a control routine executed by the air-conditioning ECU 5. At step S801, the cold-storing side air temperature TEi and the air-flowing side air temperature TEa are inputted. Next, at step S802, an operating mode of the refrigerant cycle is determined.

That is, at step S802a within step S802, the cold-storing side air temperature TEi and a first set temperature T1 (for example, −3° C.) and a second set temperature T2 (for example, −4° C.) are compared, and an on/off determination signal is outputted on the basis of the comparison as shown at step S802a.

Similarly, at step S802b, the air-flowing side air temperature TEa and a third set temperature T3 (for example, 11° C.) and a fourth set temperature T4 (for example 10° C.) are compared and an on/off determination signal is outputted on the basis of the comparison as shown at step S802a.

Then, processing proceeds to step S802c, and determines the operating mode of the refrigerant cycle to be either a cooling mode, a cold-storing mode or an OFF mode on the basis of the on/off determination signal of the cold-storing side air temperature TEi and the on/off determination signal of the air-flowing side air temperature TEa. Processing then proceeds to step S803 and determines whether the refrigerant cycle is in the cooling mode. When the refrigerant cycle is in the cooling mode, processing proceeds to step S804 and the electromagnetic valve for cooling 40 is turned on and the electromagnetic valve for cold-storing 41 is turned off, and then proceeds to step S805 so that the electromagnetic clutch 2 is turned on.

Consequently, in the cooling mode, refrigerant reduced in pressure by the expansion valve 8 flows into the evaporator 9 and the expansion valve 8 adjusts the refrigerant flow (valve opening degree) so as to maintain the degree of superheating of the refrigerant at the refrigerant outlet of the evaporator 9 at a predetermined value.

When the determination of step S803 is not the cooling mode, processing proceeds to step S806 and determines whether or not the refrigerant cycle is in the cold-storing mode. When the refrigerant cycle is in the cold-storing mode, processing proceeds to step S807 and turns off the electromagnetic valve for cooling 40 and turns on the electromagnetic valve for cold-storing 41 at step S807, and then proceeds to step S805 and turns on the electromagnetic clutch 2. Consequently, in the cold-storing mode, refrigerant reduced in pressure by the fixed throttle 42 flows into the evaporator 9.

Here, the amount of throttling (pressure-reduction) effected by the fixed throttle 42 is so set that the evaporation pressure of refrigerant decompressed by the fixed throttle 42 falls to a pressure corresponding to an evaporation temperature below freezing point. Consequently, in the cold-storing mode, on the refrigerant inlet side of the evaporator 9, that is, the part through which gas/liquid two-phase refrigerant having just been reduced in pressure flows, by means of an evaporation temperature below freezing point, air can be cooled to a temperature below freezing point. On the refrigerant outlet side of the evaporator 9, on the other hand, that is, the part through which superheated gas refrigerant having just evaporated flows, because there is no absorption of latent heat of evaporation, the temperature of air passing through the refrigerant outlet side part becomes in a plus-side temperature.

At step S802c within step S802, when the OFF mode is selected, processing proceeds from step S806 to step S808 and turns off the electromagnetic clutch 2, whereupon the compressor 1 stops.

Figure 59A:
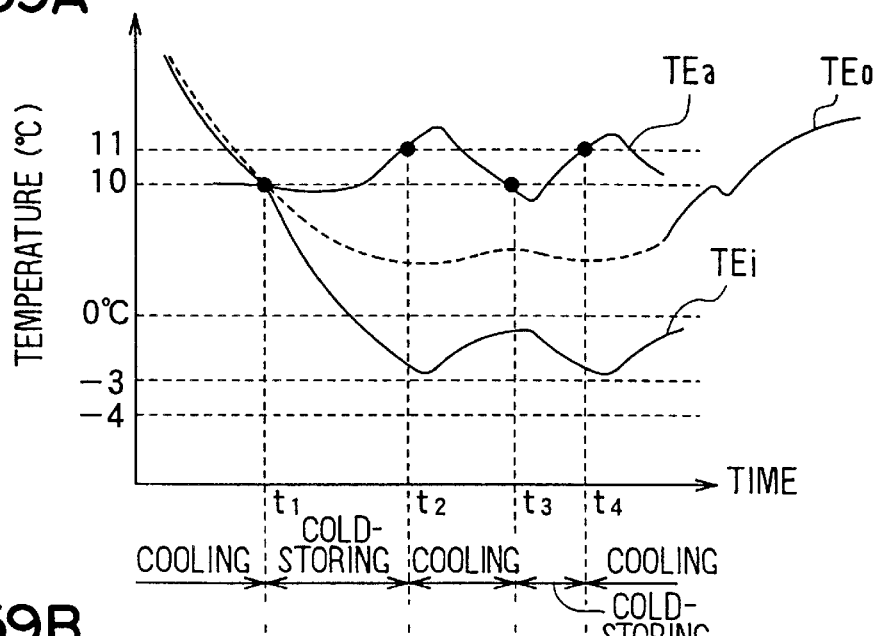
FIGS. 59A, 59B, 59C are views for explaining operation according to the sixteenth embodiment.
Figure 59B:
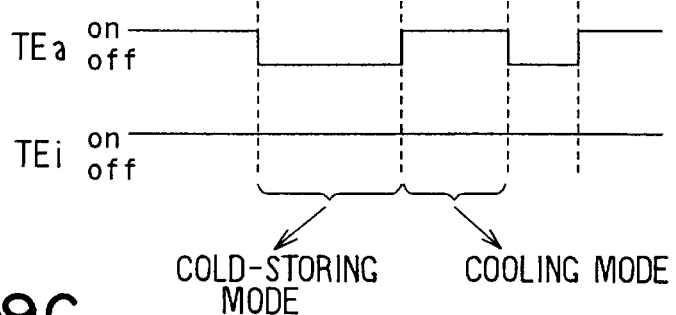
Figure 59C:
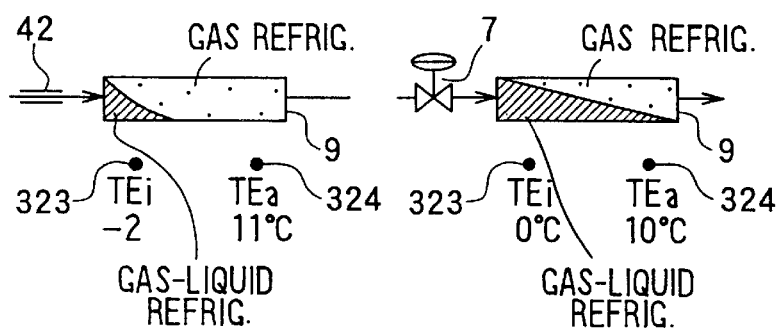

FIGS. 59A through 59C are views illustrating the operation of the refrigerant cycle according to the sixteenth embodiment. In FIG. 59A, the vertical axis is evaporator air outlet temperature and the horizontal axis is elapsed time from cycle start-up. After cycle start-up, the on/off determination signal of the air-flowing side air temperature TEa changes over at times t1, t2, t3 and t4 and switches between the cold-storing mode and the cooling mode. In FIGS. 59A through 59C, a case wherein the determination signal of the cold-storing side air temperature TEi remains an ON signal is shown.

FIG. 59C shows the gas/liquid state of the refrigerant in the evaporator 9, the air-flowing side air temperature TEa and the cold-storing side air temperature TEi for the cold-storing mode and for the cooling mode, respectively.

During the cold-storing mode, in the refrigerant inlet side part of the evaporator 9, through which gas/liquid two-phase refrigerant having just been press-reduced flows, the evaporation pressure is forcibly lowered by the throttling action of the fixed throttle 42 and an evaporation temperature below freezing point can be obtained. Thus, it is possible to freeze water condensed on the evaporator 9 and thereby performs a cold-storing function without necessitating an increase in the capability of the cycle and hence an increase in the size of the compressor 1.

In FIG. 59A, TEo is the average of the air-flowing side air temperature TEa and the cold-storing side air temperature TEi. The temperature of air blown into the passenger compartment can be controlled by the opening degree of the air-mixing door 19 being set on the basis of the average temperature TEo.

The foregoing is the operation of the sixteenth preferred embodiment when the vehicle engine 4 is running. On the other hand, when the vehicle temporarily stops for a traffic signal or the like and the vehicle engine 4 is stopped, because the compressor 1 also inevitably stops, the cooling action of the evaporator 9 of the refrigerant cycle R stops. However, because condensed water on the evaporator 9 has been frozen in advance during engine running, the cold stored in the condensed water (latent heat of melting of water and sensible heat of water) can be utilized to obtain a cooling action of the evaporator 9 while the engine is stopped.

The time for which vehicles temporarily stop at traffic signals and the like is normally about one minute. Therefore, if the time is short, utilizing cold stored in water condensed on the evaporator 9, it is possible for cooling to continue at a level such that there is no deterioration in cooling feeling.

Because the cooling action at times of vehicle halt is effected by cold being released from cold stored in condensed water on the evaporator 9, the state of the air-conditioning system can be called a cold-releasing mode. Control of the temperature of air blown into the passenger compartment in the cold-releasing mode can be carried out by the opening degree of the air-mixing door 19 being set on the basis of the average temperature TEo in the same way as when the vehicle engine 4 is running.

Seventeenth Preferred Embodiment

Figure 60:
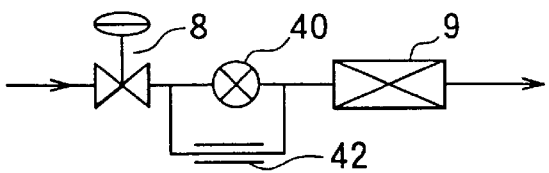
FIG. 60 is a view showing a part of a refrigerant cycle according to a seventeenth preferred embodiment of the present invention.

FIG. 60 shows a seventeenth preferred embodiment of the present invention, wherein a parallel circuit consisting of an electromagnetic valve 40 and a fixed throttle 42 is connected to a downstream refrigerant side of an expansion valve 8. In the cooling mode, the electromagnetic valve 40 is opened and the refrigerant is reduced in pressure by the expansion valve 8. On the other hand, in the cold-storing mode, the electromagnetic valve 40 is closed and the refrigerant is reduced to an amply low pressure by the fixed throttle 42. Thus, the seventeenth preferred embodiment can provide an effect equivalent to that of the sixteenth preferred embodiment while using just the one electromagnetic valve 40 as the valve means for pressure-reducing device switching. The other portions of the seventeenth embodiment are similar to those in the sixteenth embodiment, and the explanation thereof is omitted.

Eighteenth Preferred Embodiment

Figure 61:
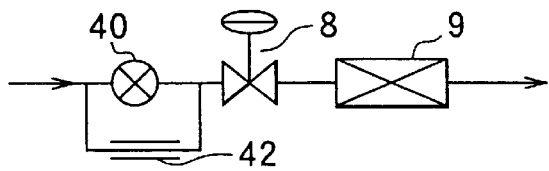
FIG. 61 is a view showing a part of a refrigerant cycle according to an eighteenth preferred embodiment of the present invention.

FIG. 61 shows an eighteenth preferred embodiment of the present invention, wherein the parallel circuit consisting of the electromagnetic valve 40 and the fixed throttle 42 is connected to an upstream refrigerant side of the expansion valve 8. In other respects, the eighteenth preferred embodiment is the same as the seventeenth preferred embodiment.

Nineteenth Preferred Embodiment

Figure 62:
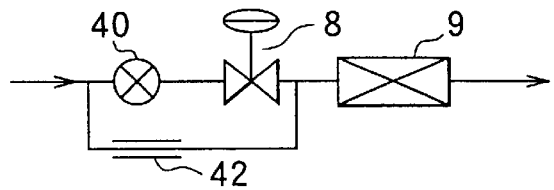
FIG. 62 is a view showing a part of a refrigerant cycle according to a nineteenth preferred embodiment of the present invention.

FIG. 62 shows a nineteenth preferred embodiment of the present invention, wherein the electromagnetic valve 40 is connected to an upstream refrigerant side of the expansion valve 8, and the fixed throttle 42 is connected in parallel with the series circuit consisting of the expansion valve 8 and the electromagnetic valve 40. The other portions are the same as the seventeenth and eighteenth preferred embodiments. In the nineteenth preferred embodiment, the electromagnetic valve 40 may alternatively be connected to the downstream refrigerant side of the expansion valve 8.

Twentieth Preferred Embodiment

Figure 63:
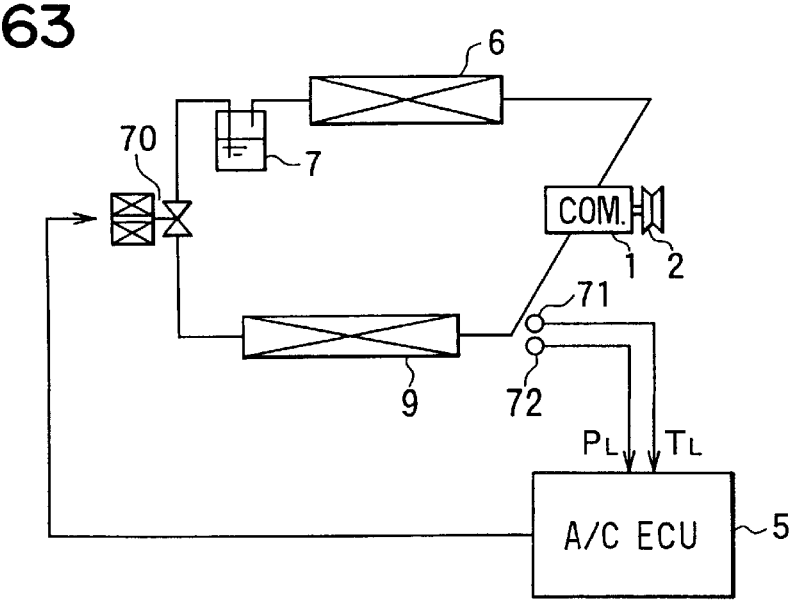
FIG. 63 is a schematic view showing a refrigerant cycle system according to a twentieth preferred embodiment of the present invention.
Figure 64:
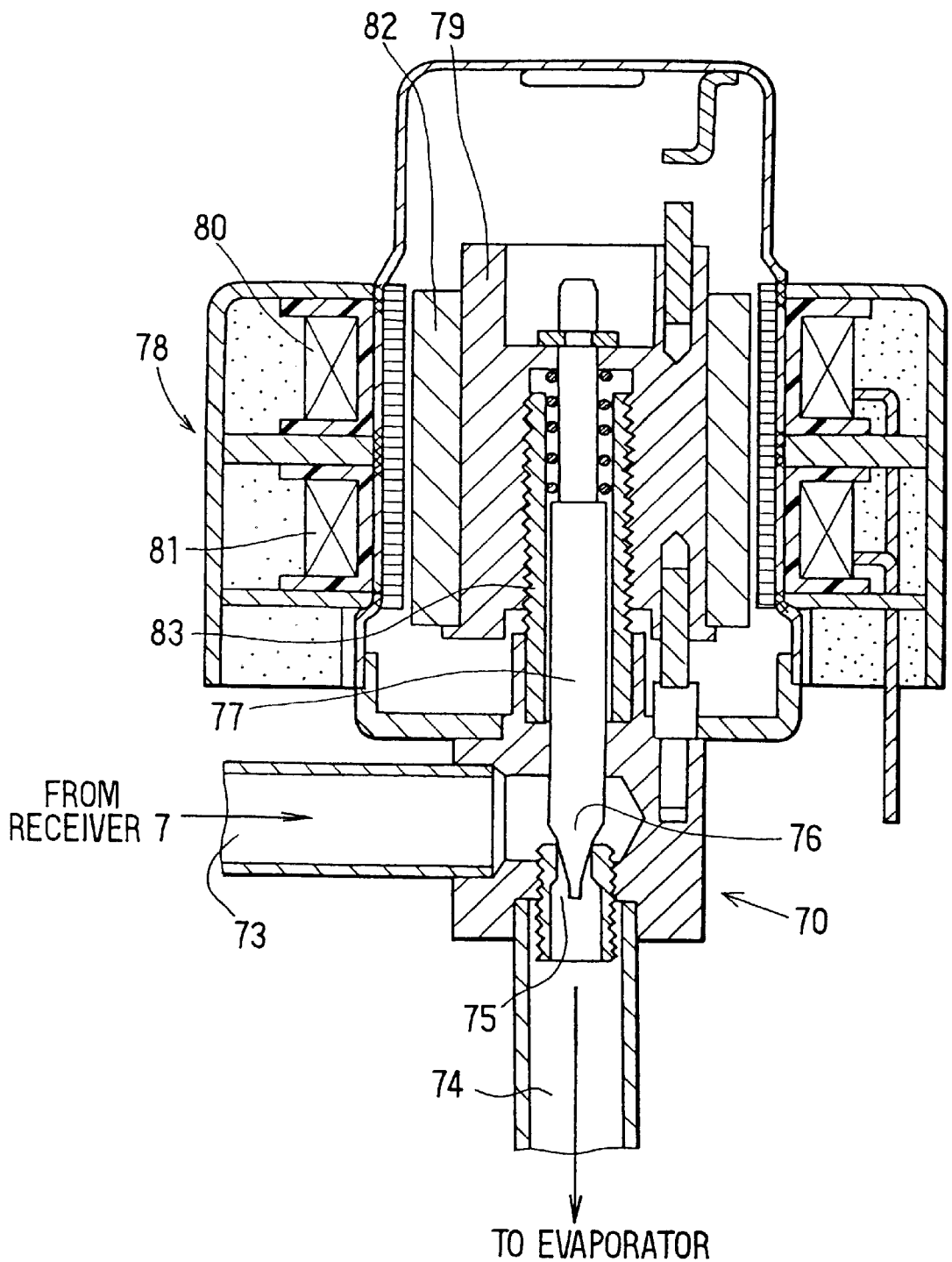
FIG. 64 is a schematic sectional view showing an electromagnetic expansion valve used in the twentieth embodiment.
Figure 65:
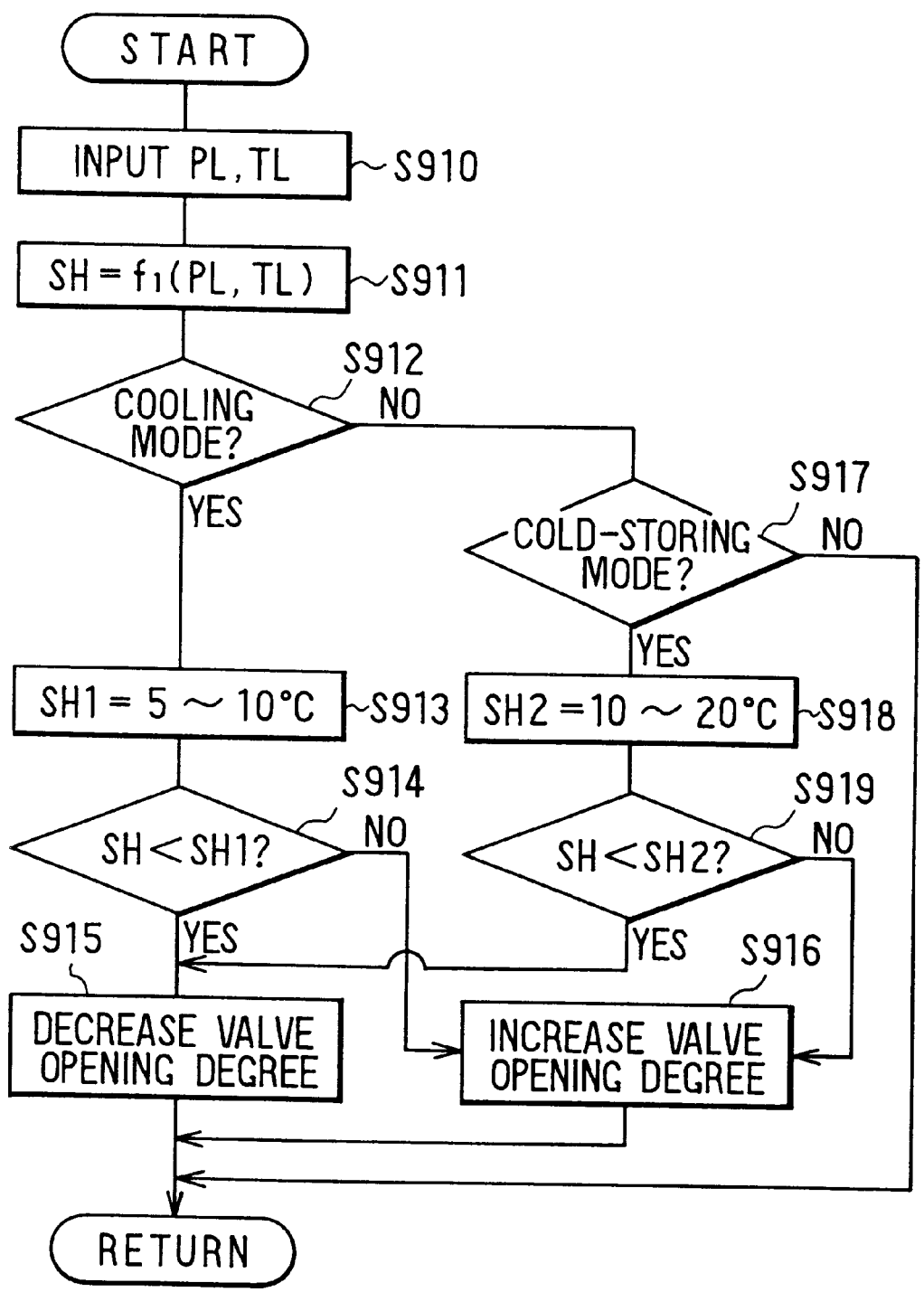
FIG. 65 is a flow diagram showing an operation control according to the twentieth embodiment.

FIGS. 63 through 65 show a twentieth preferred embodiment of the present invention. As shown in FIG. 63, an electromagnetic expansion valve 70 is used as the pressure-reducing device of the refrigerant cycle. In the cold-storing mode, a cold-storing function is executed by the opening degree of the electromagnetic expansion valve 70 being forcibly controlled to a smaller opening degree than in the cooling mode.

To control the electromagnetic expansion valve 70, a temperature sensor 71 and a pressure sensor 72 are disposed at a refrigerant outlet side of the evaporator 9. The temperature sensor 71 inputs an evaporator outlet refrigerant temperature TL and the pressure sensor 72 inputs an evaporator outlet pressure PL into the air-conditioning ECU 5.

FIG. 64 shows a specific structure of the electromagnetic expansion valve 70. A throttle passage 75 is provided between a refrigerant inlet 73 through which refrigerant from the receiver 7 flows in and a refrigerant outlet 74 through which refrigerant flows out to the evaporator 9, and the opening degree of the throttle passage 75 is adjusted by a valve member 76. The valve member 76 is formed integrally with an actuator shaft 77. The valve member 76 and the actuator shaft 77 are driven by the rotor 79 of a stepping motor 78.

The stepping motor 78 has excitation coils 80, 81, and electromagnetic attraction and repulsion between magnetic poles created by these excitation coils 80, 81 and magnetic poles (N poles, S poles) of permanent magnets 82 of the rotor 79 generate a rotating force onto the rotor 79. The rotation of the rotor 79 is converted into axial displacement of the rotor 79 by a screw thread mating the rotor 79 with a fixed support member 83; and therefore, the actuator shaft 77 and the valve member 76 displace axially together with the rotor 79. Thus, the opening degree of the throttle passage 75 can be adjusted by the valve member 76. Here, the amount of axial displacement of the valve member 76 (and hence the opening degree of the throttle passage 75) can be determined by a number of pulses inputted to the excitation coils 80, 81.

FIG. 65 shows a control program of the electromagnetic expansion valve 70 according to the twentieth preferred embodiment. First, at step S910, the evaporator outlet refrigerant temperature TL from the temperature sensor 71 and the evaporator outlet refrigerant pressure PL from the pressure sensor 72 are inputted. Next, at step S911, the actual superheating degree SH of refrigerant at the outlet of the evaporator 9 is calculated on the basis of the TL and PL.

At step S912, it is determined whether or not the operating mode of the refrigerant cycle is the cooling mode. The determination can be made in the same way as at step S803 in FIG. 58. When the operating mode is the cooling mode, processing proceeds to step S913 and sets a target superheating degree for the cooling mode SH1 to a somewhat low value (5–10° C.).

Then, at step S914, the actual superheating degree SH and the target superheating degree for the cooling mode SH1 are compared. When the actual superheating degree SH is smaller than the target superheating degree for the cooling mode SH1, at step S915 the opening degree of the valve member 76 (FIG. 64) is reduced. On the other hand, when the actual superheating degree SH is equal to or larger than the target superheating degree for the cooling mode SH1, the opening degree of the valve member 76 is increased at step S916.

By adjusting the valve opening degree of the valve member 76 (the opening degree of the throttle passage 75), it is possible to maintain the actual superheating degree SH of refrigerant at the outlet of the evaporator 9 at the target superheating degree SH1.

On the other hand, when the operating mode is not the cooling mode, processing proceeds from step S912 to step S917 and determines whether or not it is the cold-storing mode. When it is the cold-storing mode, processing proceeds to step S918 and sets a target superheating degree for the cold-storing mode SH2 to a somewhat high value (10–20° C.). Then, at step S919, the actual superheating degree SH and the target superheating degree for the cold-storing mode SH2 are compared. When the actual superheating degree SH is smaller than the target superheating degree for the cold-storing mode SH2, the opening degree of the valve member 76 is reduced at step S915. Conversely, when the actual superheating degree SH is larger than the target superheating degree for the cold-storing mode SH2, the opening degree of the valve member 76 is increased at step S916.

By adjusting the opening degree of the valve member 76 (the opening degree of the throttle passage 75) in the way, it is possible to maintain the actual superheating degree SH of refrigerant at the outlet of the evaporator 9 at the target superheating degree SH2.

Here, because the target superheating degree for the cold-storing mode SH2 is set to a somewhat high value (10 to 20° C.) and the valve opening degree of the electromagnetic expansion valve 70 is thereby forcibly controlled to a smaller opening degree than in the cooling mode, the refrigerant pressure after the electromagnetic expansion valve 70 can be lowered to a pressure necessary for freezing water condensed on the evaporator 9.

In the twentieth preferred embodiment as described above, during the cooling mode and the cold-storing mode, a target superheating degree SH1 and a target superheating degree SH2 are respectively set to control the valve opening degree of the electromagnetic expansion valve 70. However, alternatively, during the cold-storing mode, the setting of the target superheating degree SH2 may be abandoned and the valve opening degree of the electromagnetic expansion valve 70 may be controlled to an opening degree corresponding to a predetermined proportion (for example 80%) of that in the cooling mode.

In the case, because control of the superheating degree of refrigerant at the outlet of the evaporator 9 is not carried out in the cold-storing mode, it is preferable for the cold-storing mode to be canceled and the cooling mode invoked when the actual superheating degree SH of refrigerant at the outlet of the evaporator 9 rises to a predetermined value (for example 20° C.). In the way, it is possible to prevent the cooling capacity from falling drastically in the cold-storing mode due to the superheating degree of refrigerant at the outlet of the evaporator rising to an excessive value.

Twenty-first Preferred Embodiment

Figure 66:
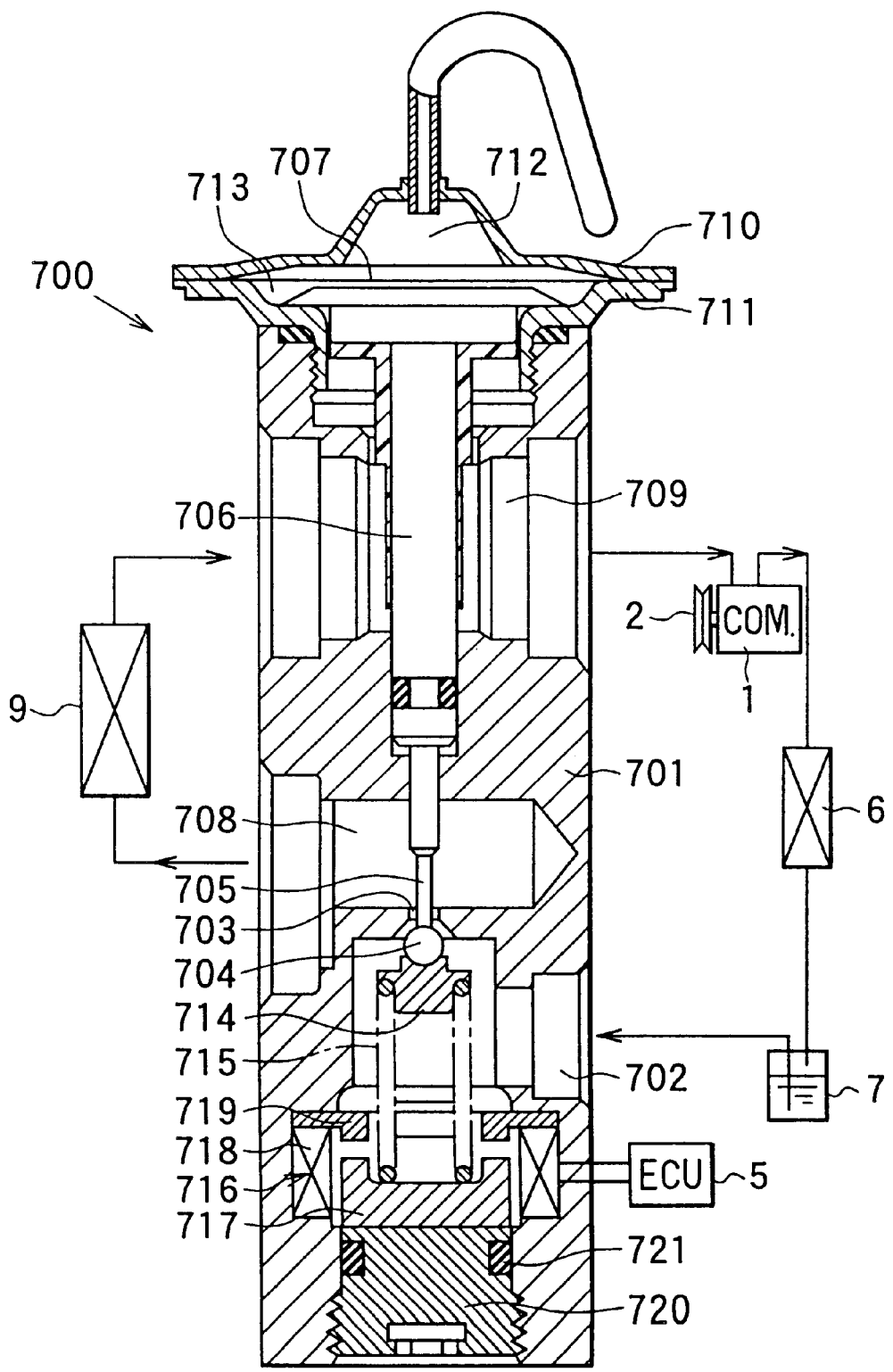
FIG. 66 is a schematic sectional view showing a thermal expansion valve used in a twenty-first preferred embodiment of the present invention.

FIG. 66 shows a twenty-first preferred embodiment of the invention, in which a thermal type expansion valve 700 is used as the pressure-reducing device of the refrigerant cycle, and an auxiliary drive mechanism for forcibly controlling the valve opening degree of the thermal type expansion valve 700 in the cold-storing mode to a smaller opening degree than in the cooling mode is provided into the thermal type expansion valve 700.

First, the construction of the thermal type expansion valve 700 will be briefly described with reference to FIG. 66. As shown in FIG. 66, a refrigerant inlet 702 of a main case 701 made of aluminum communicates with a throttle passage 703, and the opening degree of the throttle passage 703 is adjusted by a spherical valve member 704. The spherical valve member 704 is displaced by displacement of a diaphragm 707 through a valve rod 705 and a temperature-sensing rod 706 so that the opening degree of the throttle passage 703 is adjusted.

Low-temperature low-pressure gas/liquid two-phase refrigerant reduced in pressure while passing through the throttle passage 703 flows through a refrigerant outflow passage 708 to the refrigerant inlet of the evaporator 9. Gas refrigerant evaporated in the evaporator 9 passes through an evaporator outlet side passage 709 and is sucked into the inlet port of the compressor 1. The temperature-sensing rod 706 is made of a metal having good thermal conductivity such as aluminum, and constitutes temperature-sensing means for sensing the temperature of superheated gas refrigerant flowing through the evaporator outlet side passage 709.

The upper end of the temperature-sensing rod 706 abuts with the diaphragm (pressure-responsive member) 707, which is disposed on the top face of the main case 701. Consequently, when the diaphragm 707 displaces in the vertical direction, in response to the displacement, the valve member 704 is also displaced by way of the cylindrical temperature-sensing rod 706 and the valve rod 705. In the twenty-first embodiment of the present invention, the valve rod 705 and the temperature-sensing rod 706 constitute a displacement transmitting member.

The periphery of the diaphragm 707 is supported by being clamped between upper and lower case members 710, 711. A space inside the case members 710, 711 is divided by the diaphragm 707 into an upper side chamber (first pressure chamber) 712 and a lower side chamber 713 (second pressure chamber). The upper side chamber 712 is a sealed space and is filled with refrigerant gas of the same type as the refrigerant circulating in the refrigerant cycle. The superheated gas refrigerant temperature at the evaporator outlet sensed by the temperature-sensing rod 706 is conducted to the sealed-in gas through the diaphragm 707, which is made of metal, and the sealed-in gas exhibits pressure changes corresponding to the superheated gas refrigerant temperature.

The lower side chamber 713 communicates with the evaporator outlet side passage 709 through a gap around the temperature-sensing rod 706, and the refrigerant pressure in the evaporator outlet side passage 709 is thus introduced into the lower side chamber 713.

The valve member 704 is supported by a supporting member 714, and the spring force of a coil spring (spring means) 715 acts on the valve member 704 by way of the supporting member 714. The lower end of the coil spring 715 is supported by a moving plunger 717 of an electromagnetic solenoid mechanism 716. The electromagnetic solenoid mechanism 716 constitutes an auxiliary drive mechanism of the valve member 704. When electrical current is passed through an electromagnetic coil 718, an electromagnetic attracting force is created between the moving plunger 717 and a fixed magnetic pole member 719, and the moving plunger 717 is attracted toward the fixed magnetic pole member 719.

An adjusting nut 720 is screwed into a threaded hole in the bottom of the main case 701, and a sealing o-ring 721 is fitted around the adjusting nut 720 and air tightly seals any gap between the adjusting nut 720 and the threaded hole. By adjusting the position to which the adjusting nut 720 is tightened, it is possible to adjust the installation load of the coil spring 715.

The operation of the thermal type expansion valve 700 according to the twenty-first embodiment will now be explained. FIG. 66 shows the state of the thermal type expansion valve 700 in the cooling mode. That is, during the cooling mode, the moving plunger 717 is away from the fixed magnetic pole member 719 and is supported on the upper face of the adjusting nut 720.

In the state, the installation load of the coil spring 715 is set so that a superheating degree appropriate to the cooling mode is obtained. Therefore, in the cooling mode, the valve opening degree of the thermal type expansion valve 700 is adjusted in the same way as in a normal valve and the superheating degree of the refrigerant at the evaporator outlet is thereby controlled to a predetermined value (for example 5° C. to 10° C.).

On the other hand, when the cold-storing mode is selected, the air-conditioning ECU 5 passes a current through the electromagnetic coil 718 of the electromagnetic solenoid mechanism 716 so that an electromagnetic attraction is created between the moving plunger 717 and the fixed magnetic pole member 719 and the moving plunger 717 is attracted toward the fixed magnetic pole member 719.

As a result, because the coil spring 715 is compressed and the installation load of the coil spring 715 increases, the opening degree of the valve member 704 is decreased. Therefore, it is possible to lower the refrigerant pressure by the throttle passage 703 to a pressure necessary for freezing water condensed on the evaporator 9.

Figure 67:
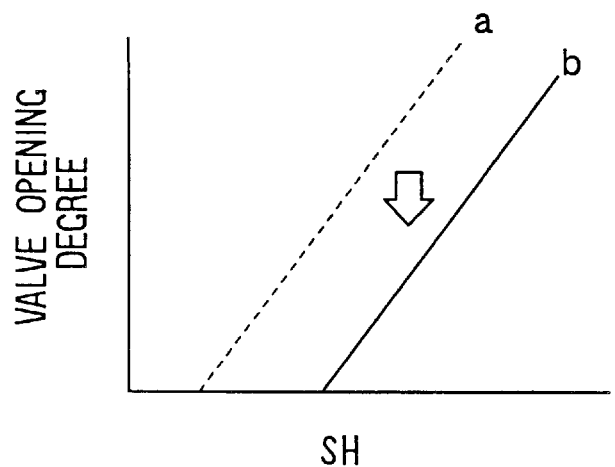
FIG. 67 is a characteristic view of the thermal expansion valve, showing the relationship between a valve opening degree and a refrigerant superheating degree SH, according to the twenty-first embodiment.

FIG. 67 shows a control characteristic of the valve opening degree of the thermal type expansion valve 700 of the twenty-first embodiment. The dashed line "a" is the valve opening degree characteristic for the cooling mode, wherein no current is passed through the electromagnetic coil 718 of the electromagnetic solenoid mechanism 716, and the solid line "b" is the valve opening degree characteristic for the cold-storing mode, wherein a current is passed through the electromagnetic coil 718 of the electromagnetic solenoid mechanism 716.

Twenty-second Preferred Embodiment

Figure 68:
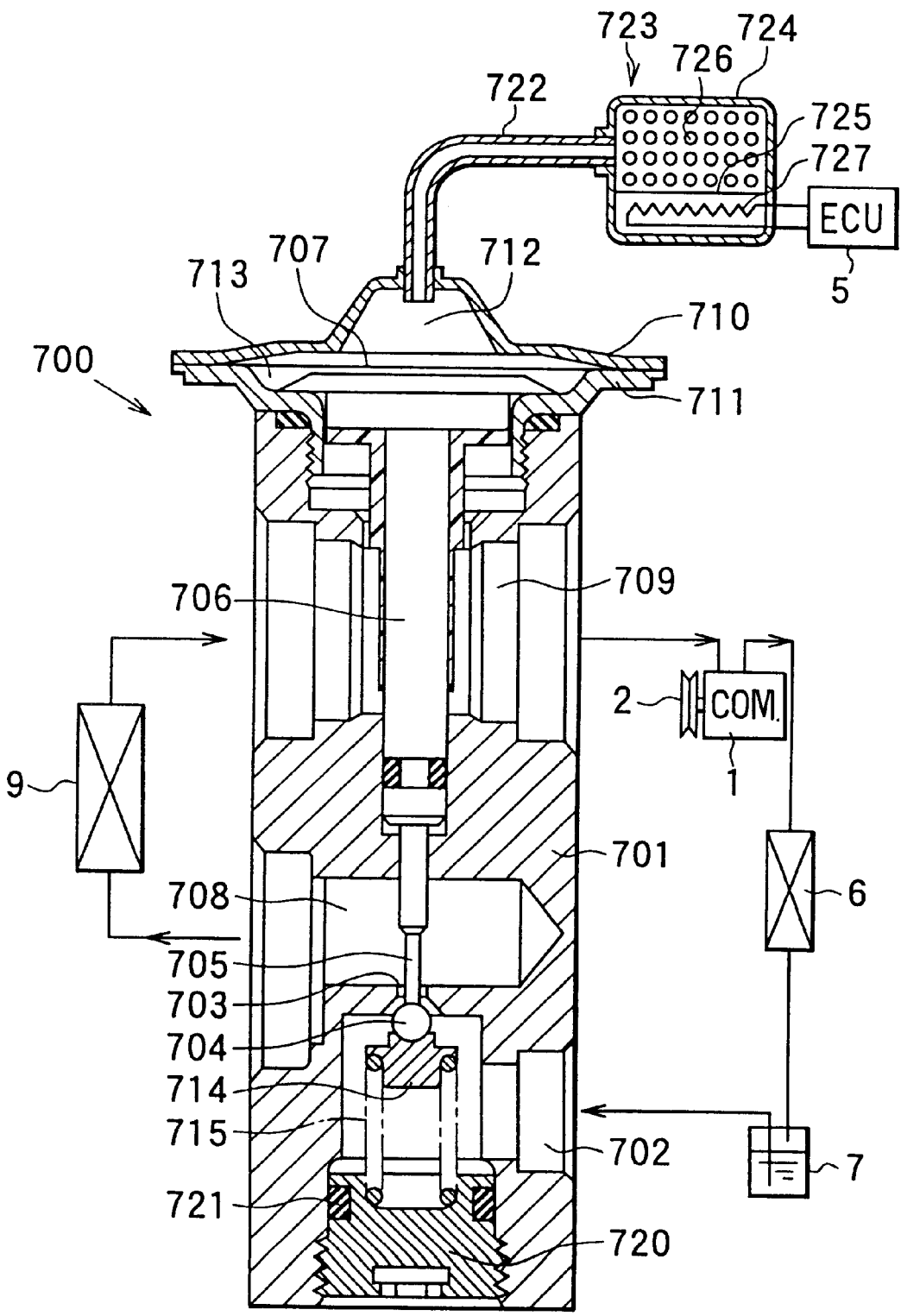
FIG. 68 is a schematic sectional view showing a thermal expansion valve used in a twenty-second preferred embodiment of the present invention.

FIG. 68 shows a thermal type expansion valve according to a twenty-second preferred embodiment of the present invention. In the twenty-second preferred embodiment, a thermal type expansion valve 700 is also used as the pressure-reducing device of the refrigerant cycle. In the above-described twenty-first preferred embodiment, an electromagnetic solenoid mechanism 716 is used as the auxiliary drive mechanism for forcibly controlling the valve opening degree of the thermal type expansion valve 700 in the cold-storing mode to a smaller opening degree than in the cooling mode. However, in the twenty-second preferred embodiment, a pressure adjusting mechanism 723 using heating of an adsorbent is used.

That is, an adsorbent vessel 724 of the pressure adjusting mechanism 723 is connected by a capillary tube 722 to the upper side chamber (first pressure chamber) 712 of the diaphragm 707. The inside of the adsorbent vessel 724 is partitioned by a partitioning plate 725, an adsorbent 726 is contained on the upper side of the partitioning plate 725, and an electric heater 727 is contained on the lower side of the partitioning plate 725.

Here, the adsorbent 726 for example consists of granular activated carbon and can adsorb the refrigerant gas with which the inside of the upper side chamber 712 is filled. The adsorbent 726 has the characteristic that when it is heated and rises in temperature it releases adsorbed gas, and conversely when it falls in temperature it adsorbs refrigerant gas.

Therefore, in the cooling mode, when electrical power is supplied to the electric heater 727 by the air-conditioning ECU 5, because the electric heater 727 generates heat and the temperature of the adsorbent 726 rises, the adsorbent 726 releases absorbed gas and the pressure of the upper side chamber 712 rises. As a result, the opening degree of the valve member 704 increases and consequently the valve opening degree characteristic for the cooling mode shown by the dashed line "a" in FIG. 67 is obtained.

In the cold-storing mode, on the other hand, the air-conditioning ECU 5 cuts off the current to the electric heater 727, the temperature of the adsorbent 726 falls, the adsorbent 726 adsorbs refrigerant gas, and the pressure of the pressure sensor 72 falls. As a result, the opening degree of the valve member 704 decreases and the opening degree characteristic for the cold-storing mode shown by the solid line "b" in FIG. 67 is obtained.

Modifications to Sixteenth through Twenty-second Preferred Embodiments

The foregoing sixteenth through twenty-second preferred embodiments can be modified in various ways. For example, instead of the fixed throttle 42 used in the sixteenth preferred embodiment, a constant pressure expansion valve which opens when the downstream side pressure falls to a predetermined value may alternatively be used.

Although in the foregoing preferred embodiments the cold-storing function is executed by water condensing on the evaporator 9 being made to freeze, alternatively a cold-storing pack filled with a cold-storing substance (water or the like) may be disposed around the evaporator 9 so that the cold-storing pack is made to freeze instead.

Twenty-third Preferred Embodiment

The following twenty-third preferred embodiment relates to an improvement to the calculation method applied to the detected value of the temperature sensor 32 (see for example FIG. 1) for detecting the evaporator cooling degree. Firstly, a particular subject of the twenty-third embodiment will be explained.

Figure 69:
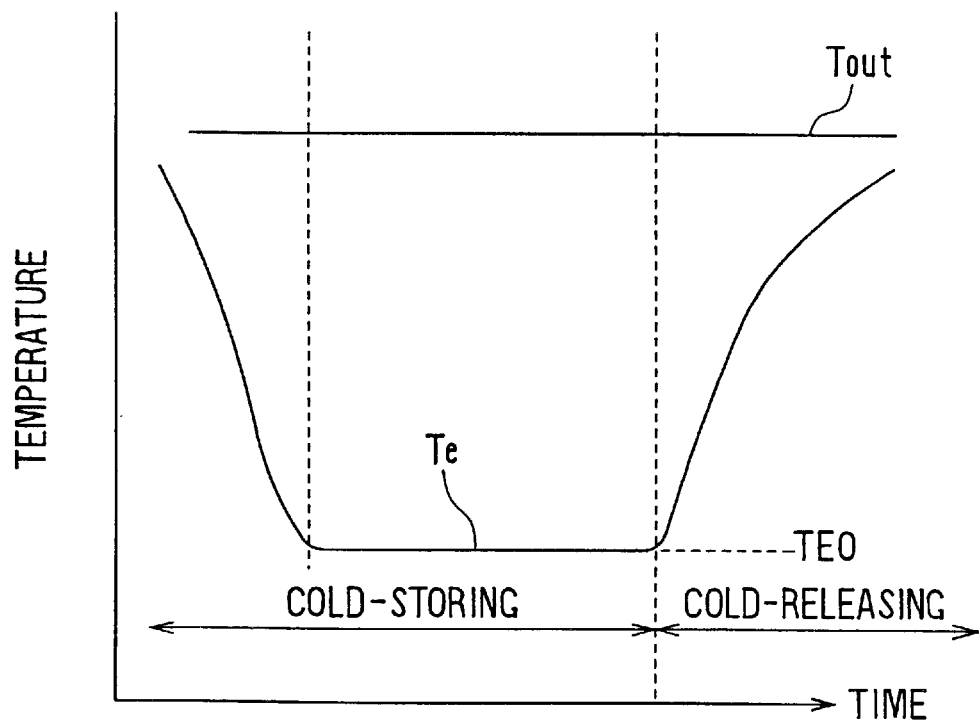
FIG. 69 is a characteristic view for explaining a subject of a twenty-third preferred embodiment of the present invention.

FIG. 69 shows a fluctuation of the evaporator air outlet temperature Te which accompanies switching between the cold-storing mode and the cold-releasing mode. In the cold storing mode, once the evaporator air outlet temperature Te is reached to the target evaporator air outlet temperature TEO for cold-storing, thereafter the fluctuation of the evaporator air outlet temperature Te is very small. However, when the switch from the cold-storing mode to the cold-releasing mode is made, the evaporator 9 itself ceases to absorb any heat and air passing therethrough is only cooled by latent heat of ice and sensible heat of water on the evaporator 9. Because the sensible heat of water is much less than the latent heat of ice, when the ice melts and air is only cooled by sensible heat of water, the evaporator air outlet temperature Te starts to rise steeply.

Because the fluctuation of the evaporator air outlet temperature Te thus is larger in the cold-releasing mode compared to the cold-storing mode, to carry out temperature control of air blown into the passenger compartment in the cold-releasing mode, it is necessary to raise the temperature-measuring responsiveness of the temperature sensor 32. Thus, the heat capacity of the temperature-measuring part of the temperature sensor 32, which is a thermistor, is made small to reduce its time constant. Here, the time constant is the time (in seconds) taken for a change in the sensor output value to reach a predetermined proportion of the change in the temperature of the atmosphere around the sensor by which it was caused.

However, when the time constant of the temperature sensor 32 is simply reduced, in the cold-storing mode during which fluctuations of the evaporator air outlet temperature Te are very small, the frequency with which the compressor 1 is turned on and off increases sharply, adversely affecting the durability of the electromagnetic clutch 2 and so on.

It is therefore an object of the twenty-third embodiment to calculate suitably a temperature corresponding the evaporator cooling degree both in the cold-storing mode and the cold-releasing mode.

Figure 70:
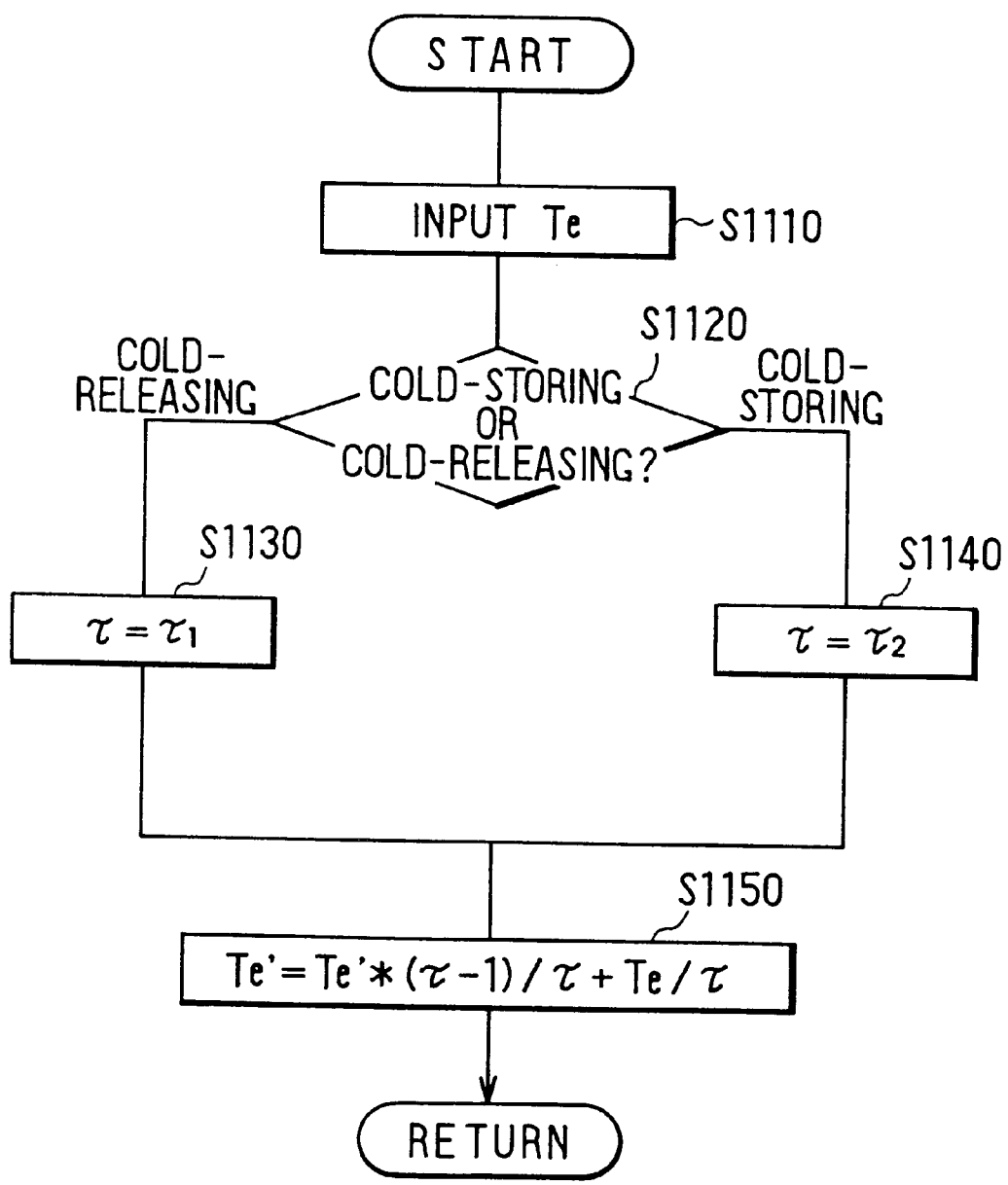
FIG. 70 is a flow diagram showing a main operation control according to the twenty-third embodiment.

FIG. 70 is a control flow diagram for calculating the evaporator air outlet temperature Te according to the twenty-third embodiment, and is a control routine executed at step S110 of for example FIG. 2.

At step S1110 in FIG. 70, the detected temperature Te of the temperature sensor 32 is inputted. Then, at step S1120, it is determined whether the operating mode is the cold-storing mode or the cold-releasing mode. When it is in the cold-releasing mode, processing proceeds to step S1130 and sets the time constant τ of the temperature sensor 32 to τ=τ1. When it is in the cold-storing mode, processing moves to step S1140 and sets the time constant τ of the temperature sensor 32 to τ=τ2. Here, τ1<τ2.

Then, at step S1150, a computed (apparent) evaporator air outlet temperature Te' is calculated using the following expression Exp. 19.

$$Te'=Te'*(\tau-1)/\tau+Te/\tau \qquad \text{Exp. 19}$$

A calculated value for Te' is stored from the previous time, and the stored value is used in the calculation of Te' for the next time. Te is the present detected temperature of the temperature sensor 32.

In the twenty-third preferred embodiment, all control based on the evaporator air outlet temperature, that is, compressor on/off control in the cold-storing mode (control of the amount of cold stored in condensed water) and control of the temperature of air blown into the passenger compartment in the cold-releasing mode and so on, is carried out on the basis of the above-mentioned calculated value Te'.

Here, as a specific example of the calculation of Te', if the previous calculated value Te' is 3° C. and the detected temperature Te the time is 1° C., then:

if the time constant τ=2, then $T_e'=3*(2-1)/2+1/2=2°$ C.

and if the time constant τ2=10, then $T_e'=3*(10-1)/10+1/10=2.8°$ C.

By switching the time constant τ of the temperature sensor 32 between the cold-storing mode and the cold-releasing mode and calculating a computed (apparent) evaporator air outlet temperature Te' using a smaller time constant τ1 in the cold-releasing mode, it is possible to follow rapid changes in the actual evaporator air outlet temperature Te in the cold-releasing mode with good responsiveness and thereby keep control lag in the air temperature of the passenger compartment to a minimum.

On the other hand, in the cold-storing mode, by calculating a computed (apparent) evaporator air outlet temperature Te' using a larger time constant τ2, it is possible to slow the responsiveness to changes in the actual evaporator air outlet temperature Te and suppress any increase in the frequency with which the compressor 1 is turned on and off. As a result, it is possible to improve the durability of the electromagnetic clutch 2 and the like.

Because the evaporator air outlet temperature Te falls relatively rapidly immediately after the start of the cold-storing mode, as shown in FIG. 69, it may be preferable to distinguish a stable period from the period immediately following the start of the cold-storing mode and make the time constant τ of the temperature sensor 32 smaller in the period immediately following the start of the cold-storing mode than in the stable period of the cold-storing mode.

Twenty-fourth Preferred Embodiment

In all of the foregoing embodiments, a cold-releasing mode wherein air is cooled using cold stored in water condensed on the evaporator 9 is executed to achieve an improvement in the cooling feeling for vehicle passengers during stoppages of the compressor 1 accompanying vehicle engine 4 stoppages at traffic signals and the like. However, the present invention can also be used to achieve an improvement in cooling feeling in cases where the compressor 1 is temporarily stopped on the basis of a request from the vehicle engine 4 side. In the following twenty-fourth embodiment, the present invention is applied to a vehicle air-conditioning system which carries out the kind of compressor control.

Figure 71:
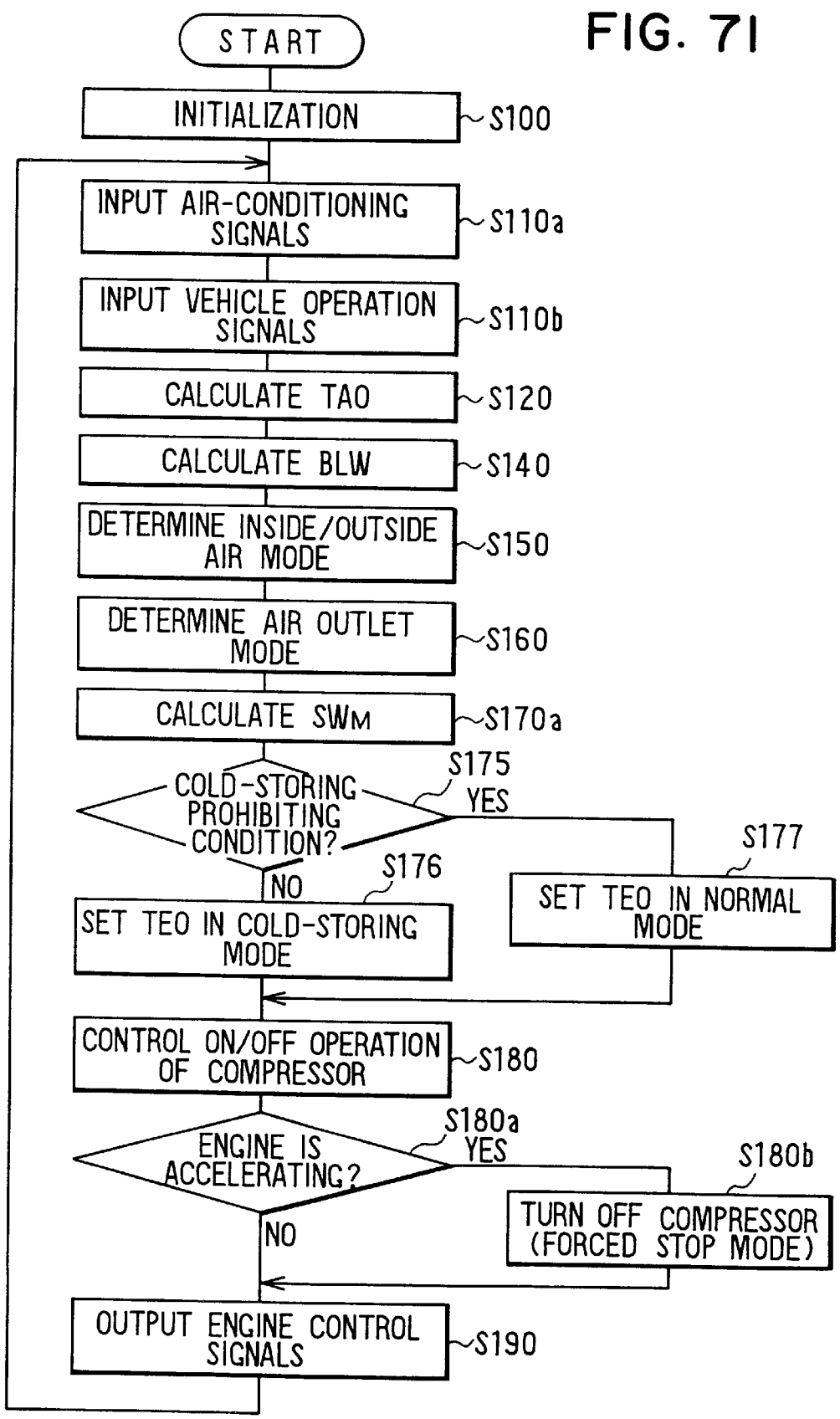
FIG. 71 is a flow diagram showing an operation control according to a twenty-fourth preferred embodiment of the present invention.

The overall system of the twenty-fourth preferred embodiment may be the same as that of FIG. 1. FIG. 71 is a control flow diagram of the vehicle air conditioning system according to the twenty-fourth embodiment and is similar to FIG. 2. The steps similar to steps in FIG. 2 is indicated with the same reference numerals as in FIG. 2 and will not be explained again here.

At step S110a in FIG. 71, detection signals from the sensors 32, 33 and the sensor group 35 and control signals from the control switches 37 (air-conditioning signals) are inputted. Then, at step S110b, vehicle operation signals from the vehicle engine ECU 38 are inputted. Further, at step S175, it is determined whether or not a condition for prohibiting the cold-storing mode is established. That is, at step S175, it is determined whether or not the system is in a cold-storing prohibiting condition. The determination can be made for example in the same way as in FIG. 30, so that when any of the conditions [1] the vehicle is traveling at high speed, [2] frosting of the evaporator 9 reaches a predetermined limit level and [3] the cooling load on the system is high applies, it is determined that a condition prohibiting the cold-storing mode is set and processing proceeds to step S177. At step S177, a normal target evaporator air outlet temperature TEO (for example, +3° C. to 4° C.) is set.

On the other hand, when none of the conditions [1] through [3] applies, it is determined that no condition prohibiting the cold-storing mode is established, and processing proceeds to step S176 and sets a target evaporator air outlet temperature TEO for cold-storing (for example, −1° C. to −2° C.).

Then, at step S180, on/off control of the compressor 1 is carried out so that the actual evaporator air outlet temperature Te approaches either the normal target evaporator air outlet temperature TEO (for example, +3° C. to 4° C.) or the target evaporator air outlet temperature TEO for cold-storing (for example, −1° C. to −2° C.).

Then, at step S180a, on the basis of for example an increase in the throttle opening degree of the vehicle engine 4, it is determined whether the engine 4 is accelerating. When the engine 4 is accelerating, at step S180b the compressor 1 is temporarily stopped. Therefore, it is possible to remove the compressor 1 driving load and thereby improve the acceleration of the vehicle engine 4.

Thus, the compressor 1 may be temporarily stopped even while the vehicle engine 4 is running, on the basis of a request from the vehicle engine 4 side. To distinguish the stopped state of the compressor 1 from a compressor stoppage arising from the on/off control of step S180, step S180b is referred to as the forced stop mode of the compressor 1.

According to the twenty-fourth embodiment of the present invention, when none of the cold-storing mode prohibiting conditions is established, the cold-storing mode is executed and cold is thereby stored in water condensed on the evaporator 9 constantly. Therefore, even if the compressor 1 is temporarily stopped for example to improve the acceleration of the vehicle engine 4, a cold-releasing mode using cold stored in condensed water can be executed during the forced stop mode of the compressor 1, and a good cooling feeling for the passenger can be maintained.

Twenty-fifth Preferred Embodiment

When condensed water on the evaporator 9 is frozen and the cold-storing mode is continued in a long time so that the cold-storing amount of the condensed water is increased, frosting on the evaporator 9 is extremely performed. Therefore, the amount of air passing through the evaporator 9 is decreased, and cooling performance of the evaporator 9 is decreased.

Therefore, an object of the twenty-fifth embodiment is for preventing a decrease of the cooling performance of the evaporator 9 due to the extremely frosting on the evaporator 9. Thus, a prohibiting control for prohibiting the cold-storing mode is set similarly to that at step S240 in FIGS. 27, 30.

Figure 72:
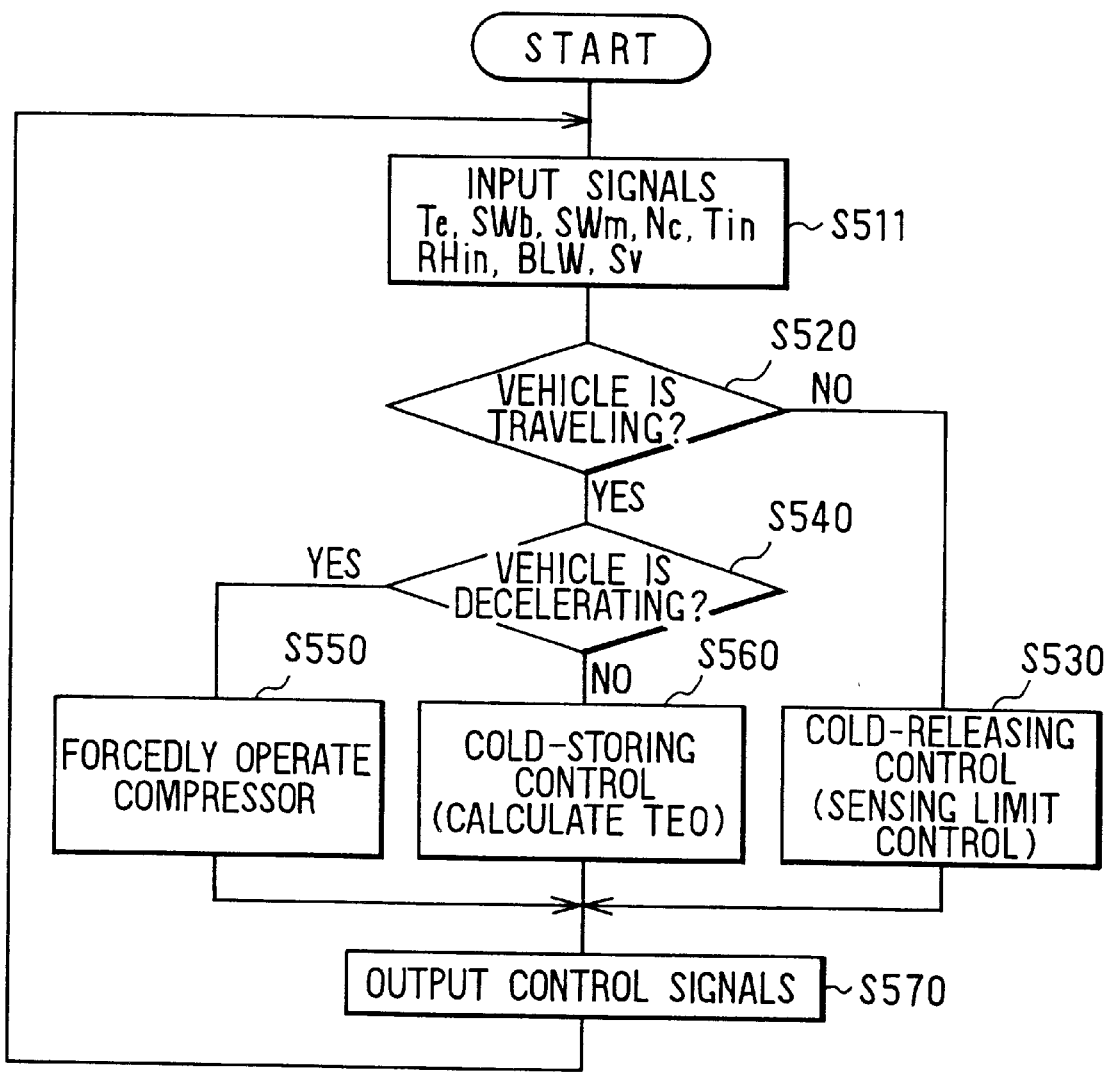
FIG. 72 is a flow diagram showing an operation control according to a twenty-fifth preferred embodiment of the present invention.
Figure 73:
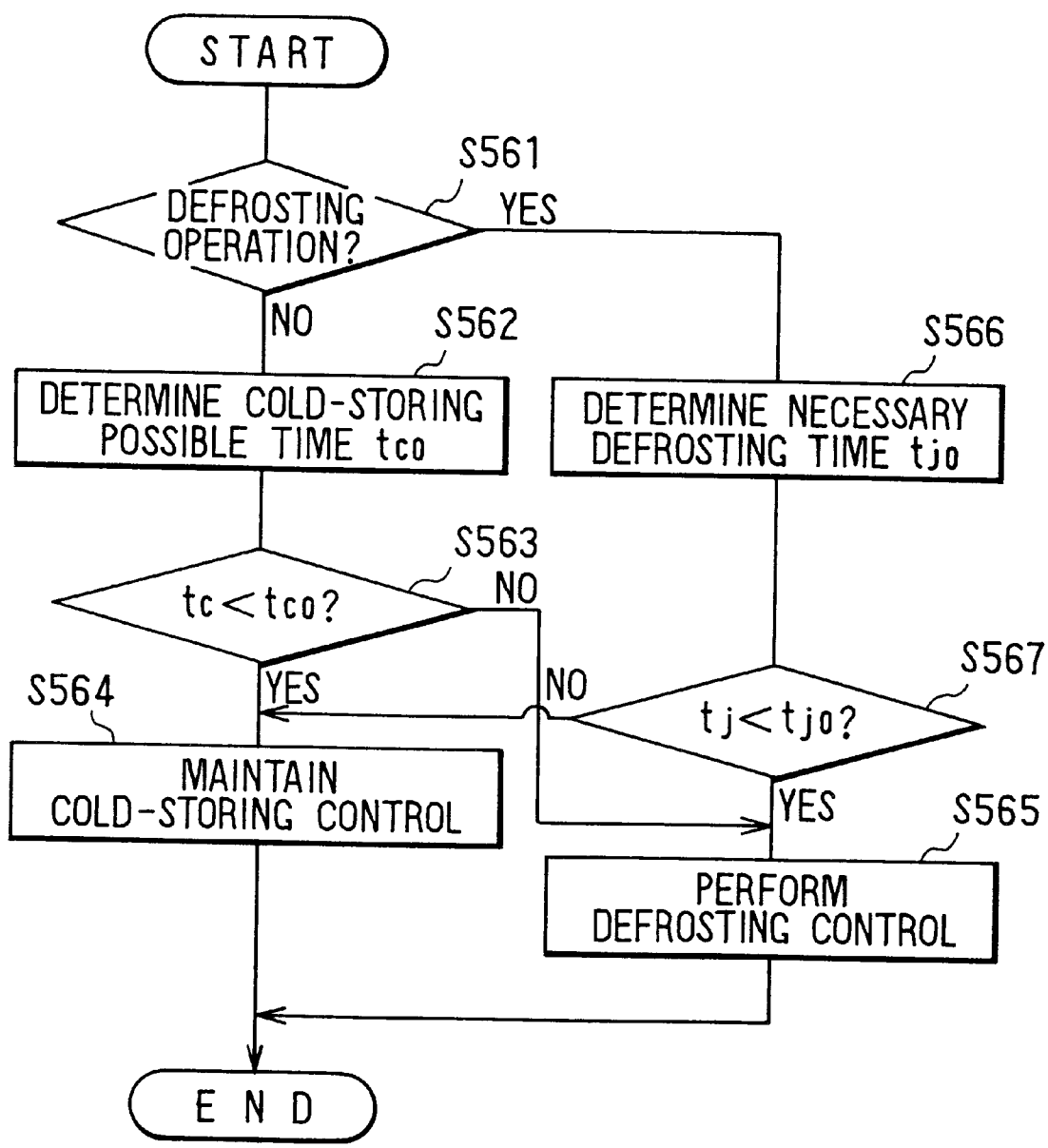
FIG. 73 is a detail flow diagram showing a cold-storing control in FIG. 72.

The overall air-conditioning system of the twenty-fifth embodiment is similar to that in FIGS. 1, 18, and the explanation thereof is omitted. FIG. 72 is a flow diagram showing a control of the vehicle air-conditioning system according to the twenty-fifth embodiment of the present invention. FIG. 73 is a detail flow diagram of step S560 in FIG. 72.

At step S511 in FIG. 72, air-conditioning signals and vehicle operation signals are input similarly to steps S110a, S110b in FIG. 71. At step S511 in FIG. 72, Te is an evaporator air outlet temperature, SWb is an opening degree of the bypass door 17, SWm is an opening degree of the air-mixing door 19, Nc is a rotation speed of the compressor 1, Tin is air temperature sucked into the evaporator 9, RHin is air humidity sucked into the evaporator 9, BLW is voltage applied to the driving motor 13 of the blower 11, and Sv is a vehicle speed. The air humidity RHin sucked into the evaporator 9 is detected by a humidity sensor (not shown) disposed in an air suction passage of the evaporator 9. On the other hand, the air temperature Tin sucked into the evaporator 9 may be calculated from outside air temperature detected by the outside air temperature sensor and inside air temperature detected by the inside air temperature sensor.

Next, at step S520, it is determined whether or not the vehicle is traveling based on signals such as the vehicle speed Sv. When the vehicle is not traveling, that is, when the vehicle is stopped, the operation of the vehicle engine 4 is stopped, and the compressor 1 is stopped. Thereafter, at step S530, cold-releasing control is performed so that cooling operation is performed by using cold stored in condensed water on the evaporator 9 until a sensing limit at which a passenger in the passenger compartment senses a hot sense, a humidity sense, a smelling sense or a fogging sense. After the sensing limit reaches, the vehicle engine 4 is restarted, the compressor 1 is restarted, and cooling operation due to the evaporator 9 is restarted. As examples of the sensing limit control is described above in the thirteenth embodiment of the present invention as shown in FIGS. 47–50.

On the other hand, when it is determined that the vehicle is traveling at step S520 in FIG. 72, it is determined whether or not the vehicle is decelerating at step S540. When the vehicle is decelerated, the electromagnetic clutch 2 of the compressor 1 is forcibly turned on, and the compressor 1 is forcibly operated.

Thus, during the vehicle decelerating, the amount of cold stored in the condensed water of the evaporator 9 can be increased beforehand for a next vehicle stop. During the vehicle decelerating, when the compressor 1 is forcibly turned on, the driving load of the compressor 1 is increased, and engine-brake effect can be effectively obtained. The forcibly operation of the compressor 1 is similar to that at step S715 in FIG. 54 according to the above-described fifteenth embodiment.

On the other hand, when the vehicle is not decelerated at step S540, control of the cold-storing mode is performed at step S560. The control of the cold-storing mode is described in detail in FIG. 73. Next, at step S570, control signals from steps S530, S550, S560 are outputted.

Here, the control of the cold-storing mode according to the twenty-fifth embodiment will be described with reference to FIG. 73. First, at step S561, it is determined whether or not the system performs defrosting operation. During the defrosting operation, the cooling degree of the evaporator 9 is set so that the evaporator temperature is increased to a level where the frozen condensed water is melted while the target evaporator air outlet temperature TEO is set to a normal TEO (e.g., 3–4° C.). When the defrosting operation is performed at step S561, a necessary defrosting time tjo is determined at step S566. The necessary defrosting time tjo is determined mainly based on the evaporator air outlet temperature Te indicating the cooling degree of the evaporator 9 and the state of air sucked into the evaporator 9. Specific determination method of the necessary defrosting time tjo is described later. Next, at step S567, it is determined whether or not a defrosting time tj is shorter than the necessary defrosting time tjo. Here, the defrosting time tj is a time for which the frozen condensed water is continuously melted (defrosted) while the target evaporator air outlet temperature TEO is set to the normal TEO (e.g., 3–4° C.). When the defrosting time tj is shorter than the necessary defrosting time tjo, defrosting operation control is performed at step S565. On the other hand, when the defrosting time tj is longer than the necessary defrosting time tjo, the cold-storing control is restarted at step S564.

On the other hand, when the defrosting operation of the evaporator 9 is not performed at step S561, a cold-storing possible time tco is determined at step S562. The cold-storing possible time tco is determined mainly based on the evaporator air outlet temperature Te indicating the cooling degree of the evaporator 9 and the state (e.g., temperature, humidity) of air sucked into the evaporator 9. Specific determination method of the cold-storing possible time tco is described later.

Next, at step S563, it is determined whether or not a cold-storing operation time tc is shorter than the cold-storing possible time tco. The cold-storing operation time Tc is a time for which the cooling degree of the evaporator 9 is continuously maintained at a degree where the condensed water can be frozen while the target evaporator air outlet temperature TEO is set to the cold-storing TEO (e.g., −1° C.−−2° C.).

When the cold-storing operation time tc is shorter than the cold-storing possible time tco at step S563, the cold-storing control is maintained at step S564. That is, the cold-storing mode for freezing the condensed water is performed while the target evaporator air outlet temperature TEO is set to the cold-storing TEO (e.g., −1° C.−−2° C.).

On the other hand, when the cold-storing operation time tc is longer than the cold-storing possible time tco at step S563, defrosting operation control for defrosting the evaporator 9 is performed at step S565 until a predetermined cooling degree while the target evaporator air outlet temperature TEO is set to the normal TEO (e.g., 3–4° C.). The normal TEO is the lower temperature among the first and second target air outlet temperatures determined by the maps in FIGS. 28, 29.

Figure 74:
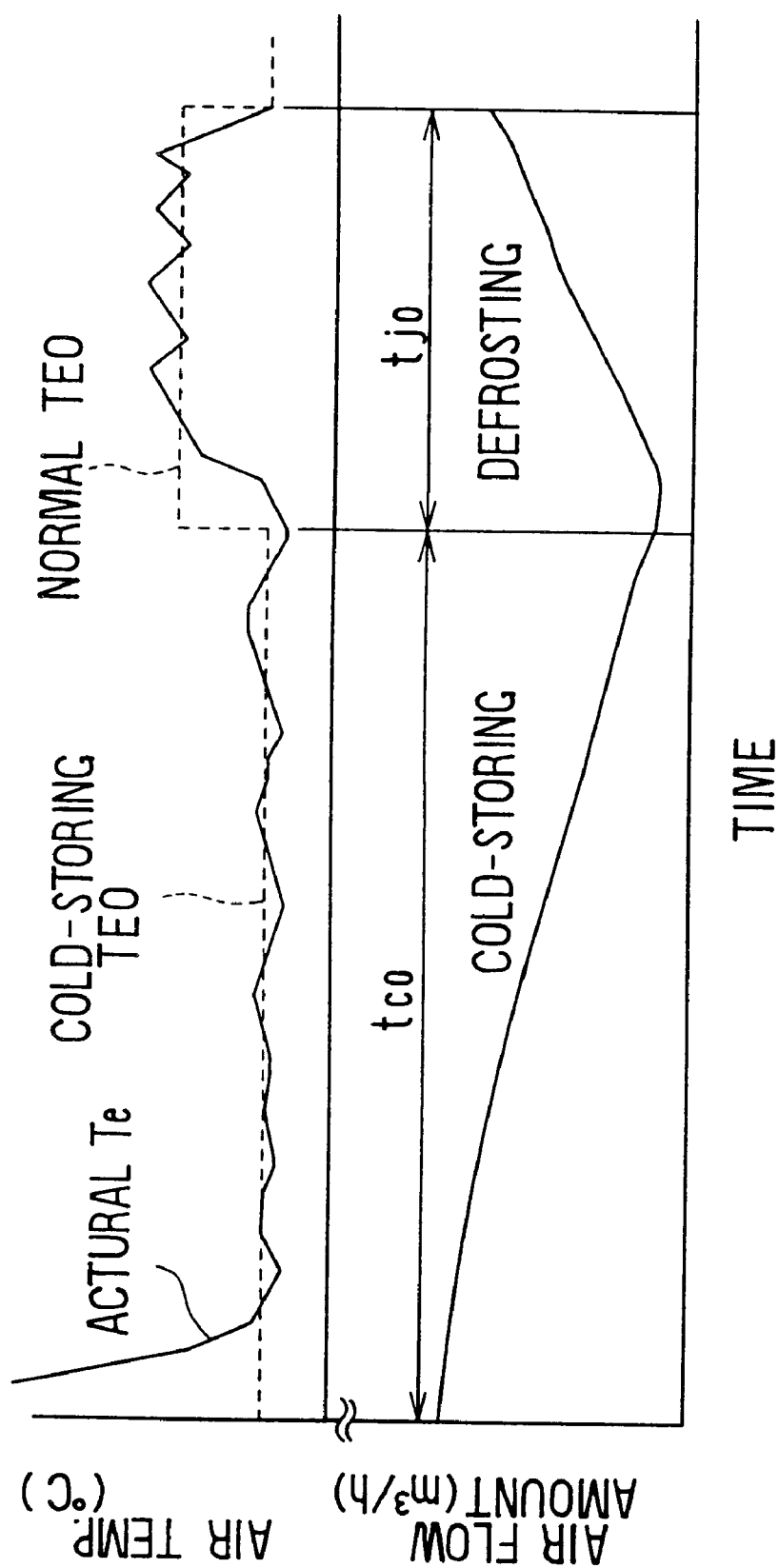
FIG. 74 is a view for explaining operation in the cold-storing control of FIG. 73.

FIG. 74 is a view for explaining operation according to the twenty-fifth embodiment of the present invention. That is, during the cold-storing mode within the cold-storing possible time tco, the air flow amount passing through the evaporator 9 is gradually decreased. Further, during the defrosting mode within the necessary defrosting time tjo, the air flow amount passing through the evaporator 9 is gradually increased to an original level.

Figure 75:
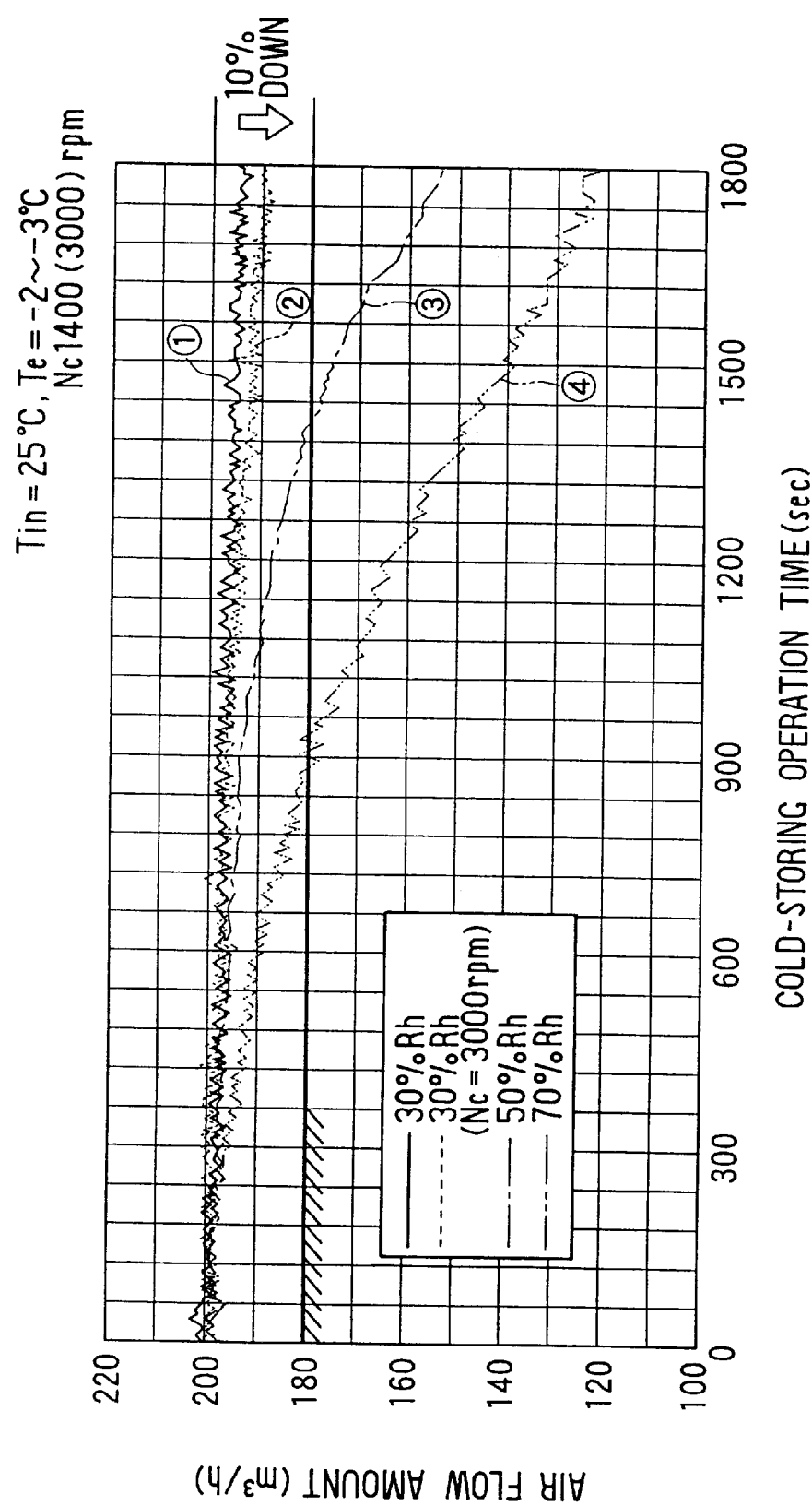
FIG. 75 is a graph showing the relationship between a cold-storing operation time and an air flow amount passing through an evaporator, according to the twenty-fifth embodiment.

Next, the determination of the cold-storing possible time tco will be now described. FIG. 75 shows an air flow amount passing through the evaporator 9 when the state (e.g., humidity) of air sucked into the evaporator 9 is different. In FIG. 75, line ① shows a case where the air humidity RHin sucked into the evaporator 9 is 30%, line ② shows a case where the air humidity RHin sucked into the evaporator 9 is 30% and the rotation speed Ne of the compressor 1 is 3000 rpm (high rotation speed), line ③ shows a case where the air humidity RHin sucked into the evaporator 9 is 50%, and line ④ shows a case where the air humidity RHin sucked into the evaporator 9 is 70%. In any case shown by lines ①, ③, ④, the rotation speed Nc of the compressor 1 is 1400 rpm. Here, the air humidity RHin sucked into the evaporator 9 is a relative humidity.

As shown by the lines ①, ②, ③, ④ in FIG. 75, as the air humidity RHin sucked into the evaporator 9 is increased, the amount of condensed water on the evaporator 9 is increased, the frosting of the condensed water on the evaporator 9 is facilitated, and the air flow amount passing through the evaporator 9 is greatly decreased. Therefore, when the air humidity RHin sucked into the evaporator 9 is 70%, the air flow amount passing through the evaporator 9 is decreased by 10% at the cold-storing operation time of 900 seconds.

Figure 76:
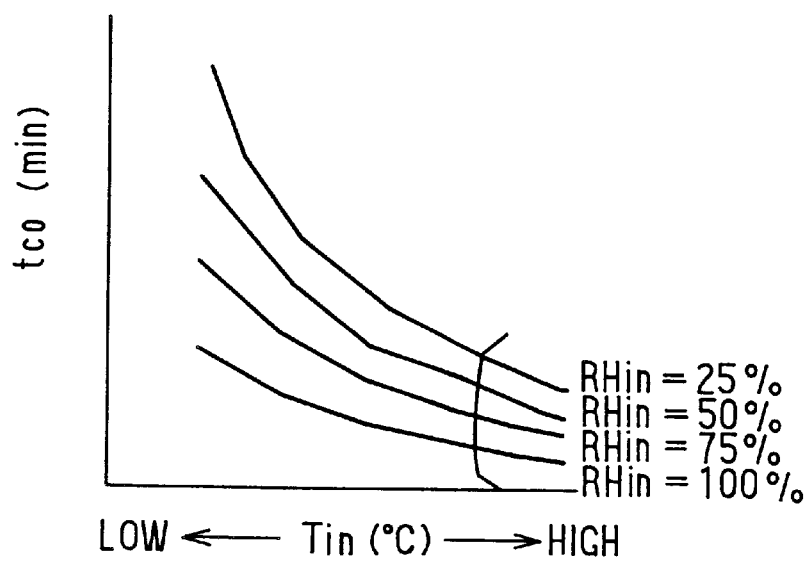
FIG. 76 is a characteristic view showing the relationship between a cold-storing possible time tco, an air humidity RHin and an air temperature Tin sucked into an evaporator, according to the twenty-fifth embodiment.

FIG. 76 shows the relationship between the air humidity RHin sucked into the evaporator 9, the air temperature Tin sucked into the evaporator 9 and the cold-storing possible time tco. Because the amount of the condensed water of the evaporator 9 is increased as the air humidity RHin and air temperature Tin sucked into the evaporator 9 increase, the cold-storing possible time tco becomes shorter as the air humidity RHin and air temperature Tin sucked into the evaporator increase, as shown in FIG. 76.

On the other hand, as the air flow amount passing through the evaporator 9 increases, the amount of condensed water generated on the evaporator 9 increases. Therefore, the cold-storing possible time tco is set to be shorter as the air flow amount (blower voltage) passing through the evaporator 9 increases.

Figure 77:
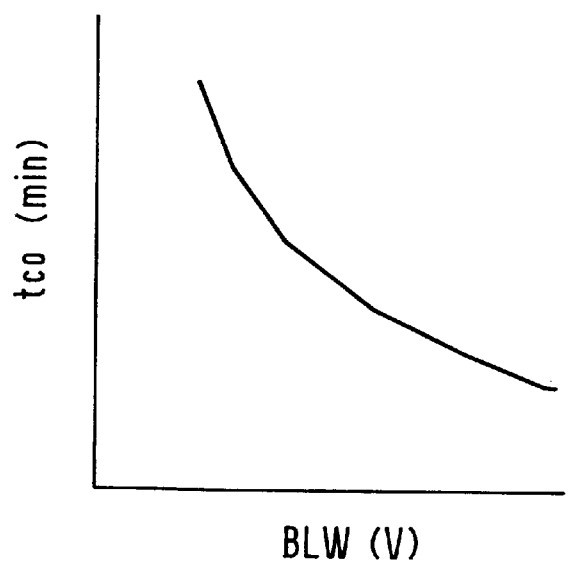
FIG. 77 is a characteristic view showing the relationship between the cold-storing possible time tco and a voltage BLW applied to a blower motor, according to the twenty-fifth embodiment.

The air flow amount passing through the evaporator 9 is relative to the air amount blown by the blower 11, the air amount blown by the blower 11 is relative to the rotation speed of the motor 13 of the blower 11, and the rotation speed of the motor 13 is depended on voltage applied to the motor 13. Therefore, as shown in FIG. 77, the cold-storing possible time tco becomes shorter as the voltage BLW applied to the motor 13 of the blower 11 increases.

Further, the air flow amount passing through the evaporator 9 is also changed by the opening degree SWb of the bypass door 17 and the opening degree SWm of the air-mixing door 19. That is, as shown in FIG. 78A, as the bypass door 17 is moved toward the COOL position side, the opening degree SWb of the bypass door 17 becomes smaller so that the air flow amount passing through the evaporator 9 increases.

Figure 78A:
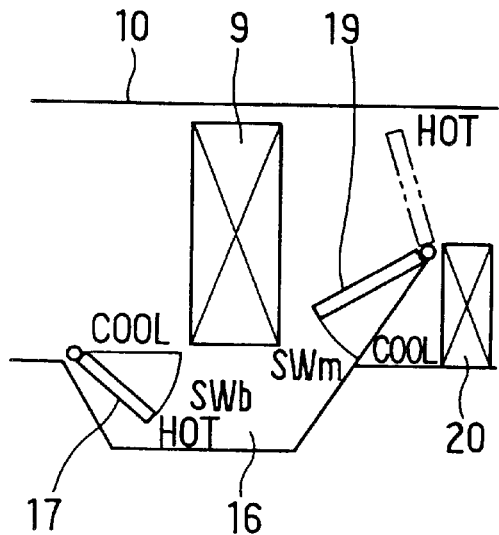
FIG. 78A is a view for explaining operation positions of a bypass door and an air-mixing door.
Figure 78B:
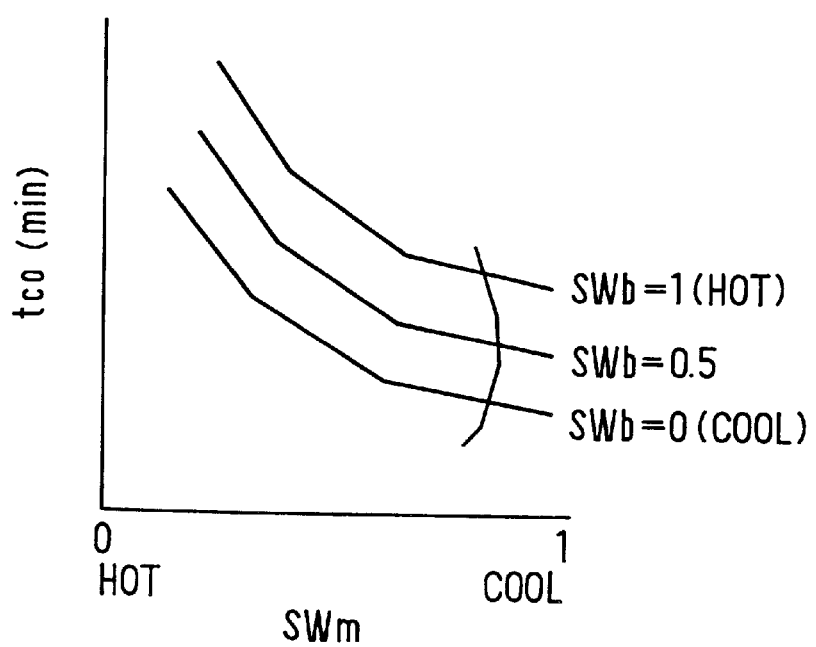
FIG. 78B is a characteristic view showing the relationship between the cold-storing possible time tco and door opening degrees of the bypass door and the air mixing door, according to the twenty-fifth embodiment.

Further, as shown in FIG. 78A, as the air mixing door 19 is moved toward the COOL position side, the opening degree SWm of the air mixing door 19 becomes larger and air flow resistance becomes smaller, so that the air flow amount passing through the evaporator 9 increases. Thus, as shown in FIG. 78B, as the opening degree SWb of the bypass door 17 becomes smaller or as the opening degree SWm of the air-mixing door 19 becomes larger, the cold-storing possible time tco becomes shorter.

Figure 79:
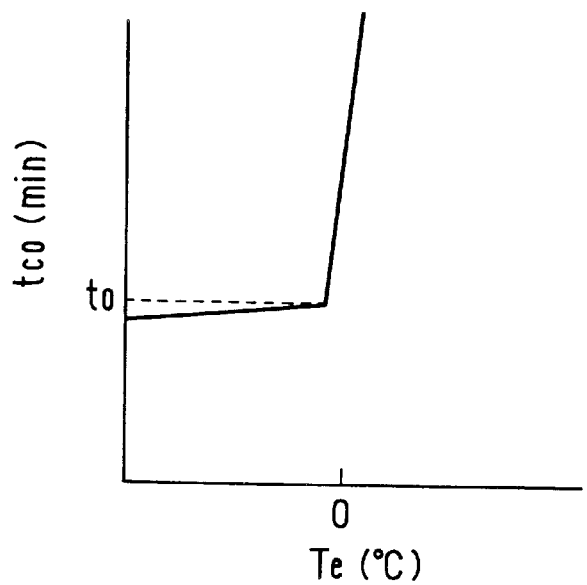
FIG. 79 is a characteristic view showing the relationship between the cold-storing possible time tco and an evaporator air outlet temperature te, according to the twenty-fifth embodiment.

FIG. 79 shows the relationship between the evaporator air outlet temperature Te and the cold-storing possible time tco. As shown in FIG. 79, when the evaporator air outlet temperature Te is higher than 0° C., because the defrosting of the evaporator 9 is not necessary, the cold-storing possible time is quickly increased. On the other hand, when the evaporator air outlet temperature Te is lower than 0° C., the cold-storing possible time tco gradually becomes shorter as the evaporator air outlet temperature Te decreases.

Figure 80:
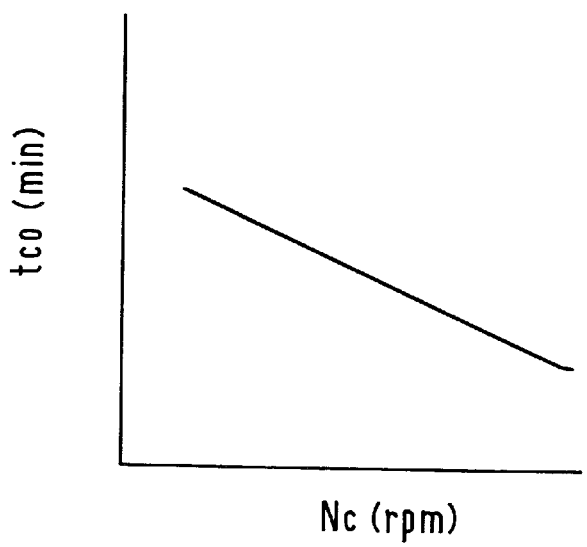
FIG. 80 is a characteristic view showing the relationship between the cold-storing possible time tco and an average compressor rotation speed Nc, according to the twenty-fifth embodiment.

FIG. 80 shows the relationship between an average rotation speed Nc of the compressor 1 and cold-storing possible time tco. As the average rotation speed Nc of the compressor 1 increases, the amount of refrigerant circulating in the refrigerant cycle increases, and the evaporator air outlet temperature Te due to the operation of the compressor 1 readily decreases. Therefore, when the operation of the compressor 1 is switched to control the evaporator air outlet temperature Te, over-moving amount toward a low temperature side of the evaporator air outlet temperature Te becomes larger as the compressor 1 operates with a high rotation speed. Thus, as shown in FIG. 80, the cold-storing possible time tco becomes shorter as the average rotation speed Nc of the compressor 1 becomes higher.

As described above, according to the twenty-fifth embodiment of the present invention, the air conditions to be sucked into the evaporator 9, such as air temperature, air humidity and air flow amount are calculated, and respective cold-storing possible time tco is determined based on the air conditions, the evaporator air outlet temperature Te and the average rotation speed Nc. Finally, the cold-storing possible time tco is calculated from the respective cold-storing possible time by a predetermined function.

According to the calculation method of the twenty-fifth embodiment, the cold-storing possible time tco can be set to accurately correspond an air amount decrease due to the frozen condensed water of the evaporator 9. Therefore, by setting the timing for starting the defrosting control of the evaporator 9 based on the cold-storing possible time tco, the defrosting control of the evaporator 9 can be started when air amount is decreased to a predetermined level due to the frozen condensed water, while the operation condition of the refrigerant cycle is not changed.

Thus, it can prevent the air amount passing through the evaporator 9 from being greatly decreased due to the frosting of the evaporator 9, while it can prevent cold-storing from being insufficient due to an earliest start timing of the defrosting control.

Figure 81:
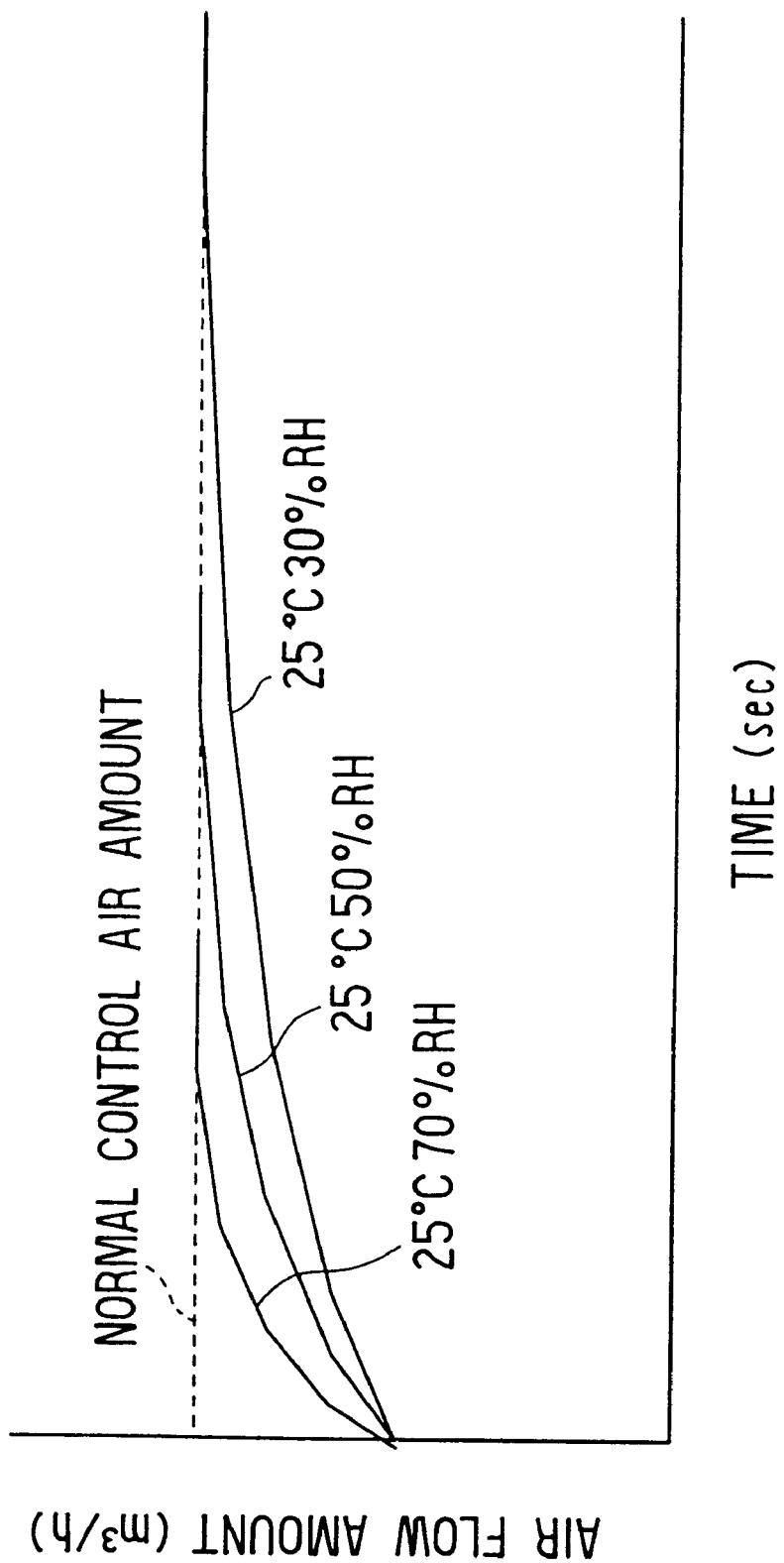
FIG. 81 is a characteristic view showing the relationship between an air flow amount passing through the evaporator and an air humidity sucked into the evaporator during a defrosting operation of the evaporator, according to the twenty-fifth embodiment.

Next, the determination of the necessary defrosting time tjo at step S566 in FIG. 73 will be described in detail. FIG. 81 shows a change of the air flow amount passing through the evaporator 9 after the defrosting operation is started, when the state (humidity) of air sucked into the evaporator 9 is changed. Because an entire heat quantity of air sucked into the evaporator 9 is increased as the air humidity sucked into the evaporator 9 increases, the melting speed of the frozen condensed water of the evaporator 9 becomes larger, and the air flow amount passing through the evaporator 9 is quickly increased, as shown in FIG. 81.

Figure 82:
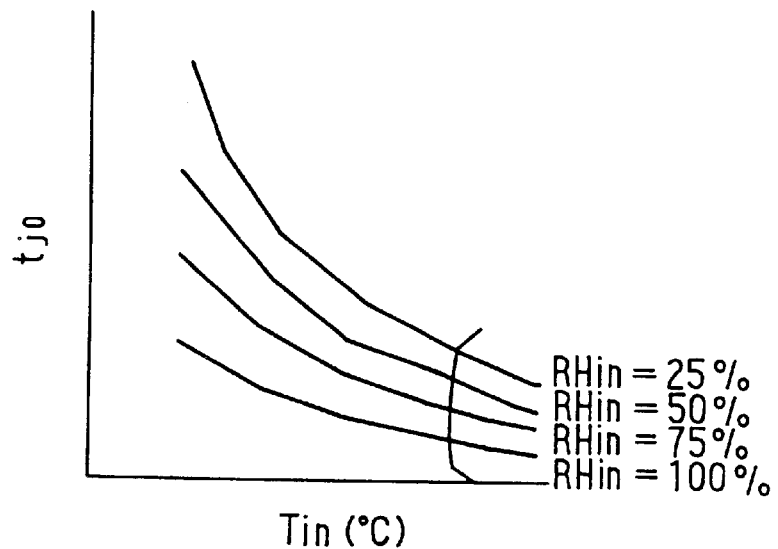
FIG. 82 is a characteristic view showing the relationship between a necessary defrosting time tjo, the air humidity RHin and the air temperature Tin sucked into the evaporator, according to the twenty-fifth embodiment.

FIG. 82 shows the relationship between the air humidity RHin sucked into the evaporator 9, the air temperature Tin sucked into the evaporator 9, and the necessary defrosting time tjo. Because the melting speed of the frozen condensed water of the evaporator 9 becomes larger as the air humidity RHin and the air temperature Tin increase, the necessary defrosting time tjo becomes shorter as the air humidity RHin and air temperature Tin increase, as shown in FIG. 82.

Figure 83:
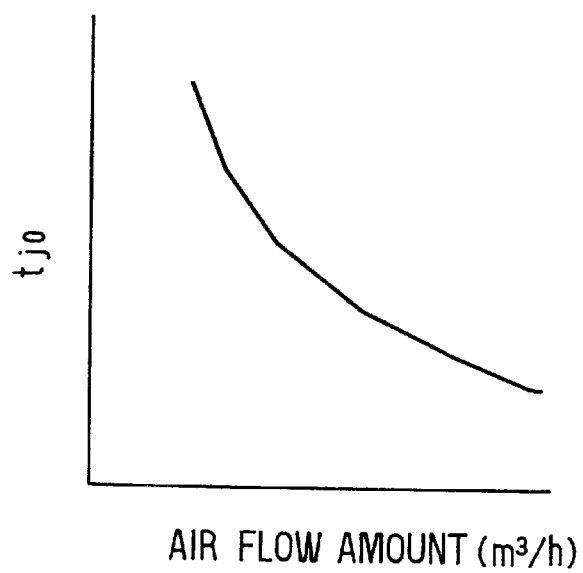
FIG. 83 is a characteristic view showing the relationship between the necessary defrosting time tjo and an air flow amount passing through the evaporator, according to the twenty-fifth embodiment.

Further, because the melting speed of the frozen condensed water of the evaporator 9 becomes larger as the air flow amount passing through the evaporator 9 increases, the necessary defrosting time tjo becomes shorter as the air flow amount passing through the evaporator 9 increases, as shown in FIG. 83. As described in FIG. 77, the air flow amount passing through the evaporator 9 is estimated by the voltage BLW applied to the motor of the blower 11. Therefore, the necessary defrosting time tjo may be set to be shorter as the voltage BLW applied to the motor of the blower 11 increases.

Figure 84A:
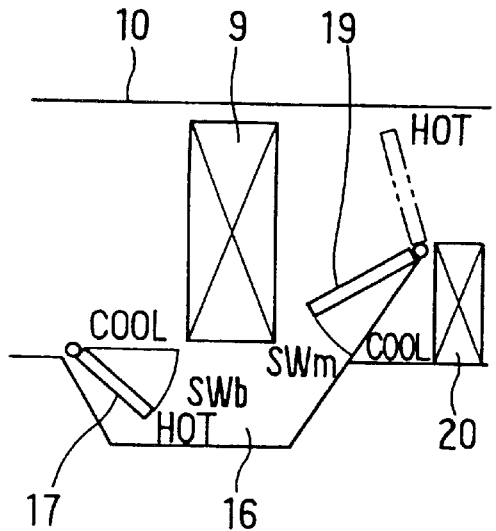
FIG. 84A is a view for explaining operation positions of the bypass door and the air-mixing door.
Figure 84B:
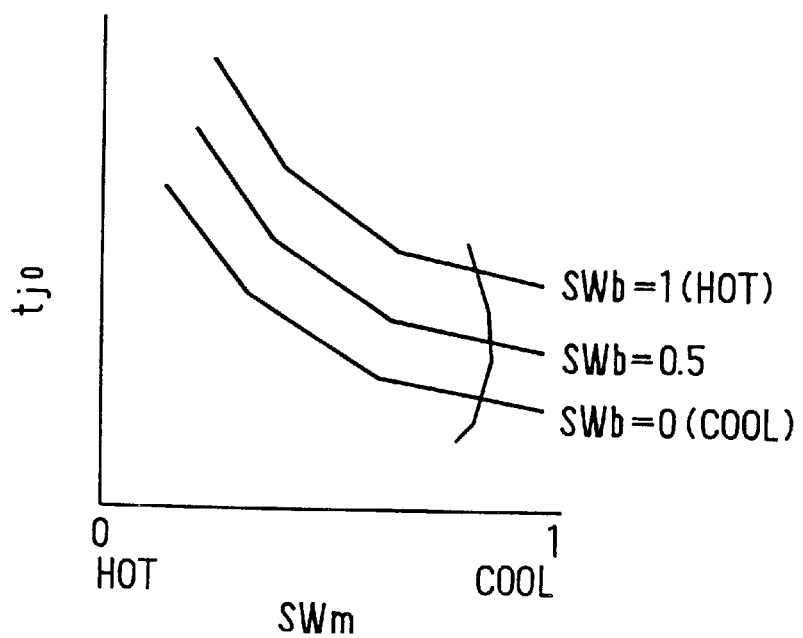
FIG. 84B is a characteristic view showing the relationship between the necessary defrosting time tjo and door opening degrees of the bypass door and the air mixing door, according to the twenty-fifth embodiment.

Further, as described in FIGS. 78A, 78B, the air flow amount passing through the evaporator 9 is also changed by the opening degree SWb of the bypass door 17 and the opening degree SWm of the air mixing door 19. Therefore, as shown in FIG. 84B, as the opening degree SWb of the bypass door 17 becomes smaller or as the opening degree SWm of the air-mixing door 19 becomes larger, the necessary defrosting time tjo becomes shorter.

Figure 85:
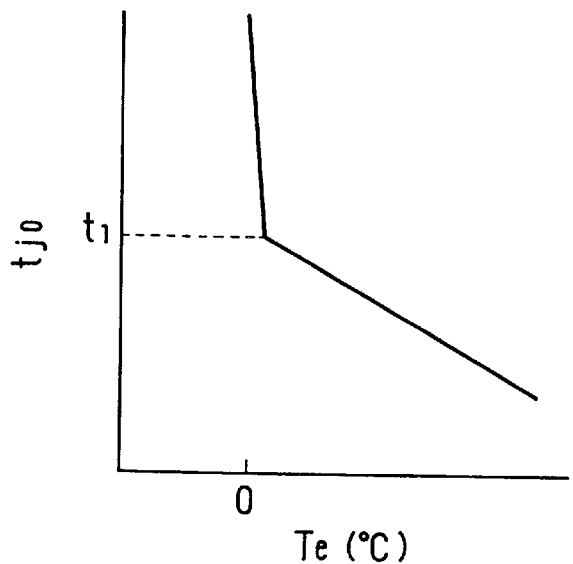
FIG. 85 is a characteristic view showing the relationship between the necessary defrosting time tjo and an evaporator air outlet temperature te, according to the twenty-fifth embodiment.

FIG. 85 shows the relationship between the evaporator air outlet temperature Te and the necessary defrosting time tjo. When the evaporator air outlet temperature Te is lower than 0° C., it is impossible to defrost the evaporator 9. Therefore, as shown in FIG. 85, in this case, the necessary defrosting time tjo is quickly increased. On the other hand, when the evaporator air outlet temperature Te is higher than 0° C., the necessary defrosting time tjo becomes gradually shorter from the a predetermined time t1, as the evaporator air outlet temperature Te increases.

As described above, according to the twenty-fifth embodiment of the present invention, air temperature, air humidity and air flow amount sucked into the evaporator 9 are respectively calculated as the air conditions to be sucked into the evaporator 9, and respective necessary defrosting time is determined based on the air conditions and the evaporator air outlet temperature Te. Finally, the necessary defrosting time tjo is calculated from the respective necessary defrosting time by a predetermined function.

According to the calculation method of the twenty-fifth embodiment, the necessary defrosting time tjo can be set to accurately correspond an air amount increase due to the melting state of the frozen condensed water of the evaporator 9. Therefore, by setting the timing for finishing the defrosting control of the evaporator 9 based on the necessary defrosting time tjo, the defrosting control of the evaporator 9 can be suitably finished even when the air state sucked into the evaporator 9 is changed.

Next, a modification of the twenty-fifth embodiment of the present invention will be described. As described above, the air state sucked into the evaporator 9 and the cooling degree (i.e., evaporator air outlet temperature Te) of the evaporator 9 are mainly affected to the frosting state of the evaporator 9. As compared with the air state sucked into the evaporator 9 and the cooling degree of the evaporator 9, the affection of the rotation speed of the compressor 1 is relatively small. Therefore, the cold-storing possible time tco may be determined without based on the rotation speed of the compressor 1.

As described above, for detecting the air humidity sucked into the evaporator 9, a humidity sensor is necessary. However, since the humidity sensor is generally expensive, a system without using a humidity sensor is required. As described in FIG. 26, inside air or/and outside air can be introduced into the air suction side of the blower 11 by the inside/outside air switching door 11d. The humidity of sucked air with the inside air and outside air switching is greatly changed. By the setting position of the inside/outside air switching door 11d, the humidity of the sucked air can be estimated (determined) and the humidity sensor may be omitted.

That is, in a temperature control area during an entire inside air mode, because dehumidified low-temperature air recirculates, air sucked into the evaporator 9 has a relative low humidity. For example, when the evaporator air outlet temperature Te is −2° C., although the humidity of air sucked into the evaporator 9 is changed with the number of passengers and a ventilation state and the like, the humidity of air sucked into the evaporator 9 is in a range of 20–40% when the inside air temperature Tr is 25° C.

On the other hand, during an outside air mode, the humidity of air sucked into the evaporator 9 is greatly changed with weather. Generally, the air humidity sucked into the evaporator 9 becomes lower during the inside air mode, as compared with the outside air mode. Further, during the outside air mode, as the outside air temperature increases, a temperature difference between the sucked air and the evaporator 9 is increased, and the dehumidifying amount of air in the evaporator 9 is increased.

Figure 86:
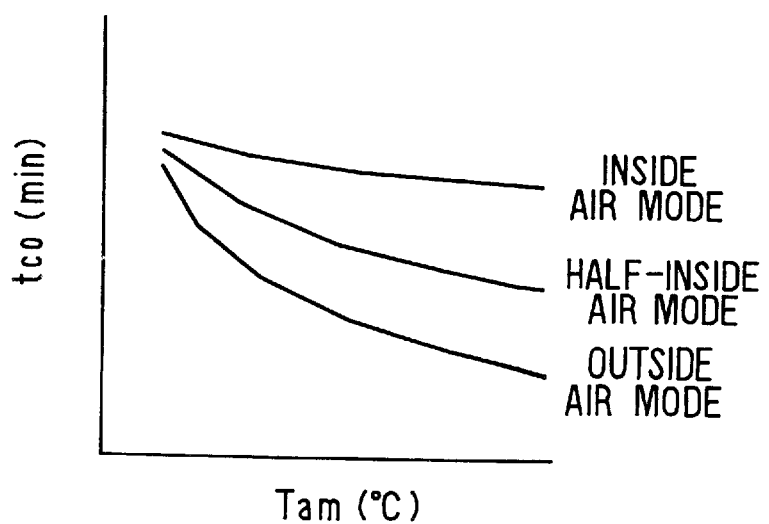
FIG. 86 is a characteristic view showing the relationship between the cold-storing possible time tco, an inside/outside air mode and an outside air temperature Tam, according to a modification of the twenty-fifth embodiment of the present invention.

Thus, as shown in FIG. 86, as the operation is switched in order of the inside air mode, the half inside air mode and the outside air mode, the rate of the outside air amount becomes larger, and the cold-storing possible time tco becomes shorter. As shown in FIG. 86, during the inside air mode, because the dehumidifying amount in the evaporator 9 is slightly changed by the variation in outside air temperature Tam, the cold-storing possible time tco is slightly changed with the outside air temperature Tam. Thus, during the inside air mode, the cold-storing possible time tco can be accurately determined without directly detecting the air humidity RHin sucked into the evaporator 9.

When the cold-storing possible time tco is determined based on the map of FIG. 86, the inside air temperature Tr and the outside air temperature Tam are input instead of the air temperature Tin sucked into the evaporator 9, at step S511 in FIG. 72. Further, instead of the air humidity RHin sucked into the evaporator 9, an inside/outside air mode signal may be inputted.

Further, in FIG. 80, the cold-storing possible time tco is determined based on the rotation speed Nc of the compressor 1. However, because the rotation speed of the vehicle engine 4 driving the compressor 1 and the vehicle speed are changed with the rotation speed of the compressor 1, the cold-storing possible time tco may be set to be shorter as the engine rotation speed or the vehicle speed increases.

Other Preferred Embodiments

In the preferred embodiments described above, the amount of cold stored in water condensed on the evaporator 9 is increased by lowering the evaporator air outlet temperature to below normal during a cold-storing mode and thereby lowering the temperature of the water or freezing it.

However, alternatively, in the cold-storing mode, the amount of cold stored in water condensed on the evaporator 9 may be increased by carrying out an operation to increase the quantity of water condensed on the evaporator 9. For example, the quantity of condensed water may be increased by forcibly introducing outside air as shown at step S480 in FIG. 36. Alternatively, a special tank for collecting water condensing on the evaporator 9 or rainwater may be provided in the vehicle, and the amount of water on the evaporator 9 is increased as necessary by water from the tank being supplied to an upper part of the evaporator 9 with a pump.

In the embodiments described above, control of the evaporator cooling degree (evaporator air outlet temperature) is carried out by means of on/off control of the compressor 1; however, it is also known practice to carry out control of the evaporator air outlet temperature Te by means of capacity control of the compressor 1, and the present invention can be similarly applied to an air-conditioning system of the compressor capacity control type.

For example, at step S180 in FIG. 2, instead of on/off control of the compressor 1, capacity control of the compressor 1 may be carried out to maintain the evaporator air outlet temperature Te at the target evaporator air outlet temperature TEO.

Among the embodiments described above, to detect the evaporator cooling degree, for example in the first preferred embodiment the evaporator air outlet temperature is detected by a temperature sensor 32, and in the second preferred embodiment the evaporator refrigerant temperature is detected by a temperature sensor 32. However, alternatively, the evaporator cooling degree may be detected by detecting a fin surface temperature or a refrigerant evaporation pressure or the like of the evaporator 9.

In the embodiments described above, the temperature adjusting unit for adjusting the temperature of air blown into the passenger compartment is constituted by an air mixing door 19 for adjusting the flow proportions of air passing through the hot water type heater core 20 and air passing through the bypass passage 21. However, alternatively, as the temperature adjusting unit, a hot water valve for adjusting the flow of hot water into the hot water type heater core 20 can be used, and the temperature of air blown into the passenger compartment is adjusted by adjusting the flow of hot water with the hot water valve.

Such changes and modifications are to be understood as being included within the scope of the present invention as defined in the appended claims.

What is claimed is:

1. An air-conditioning system for a vehicle having an engine and a passenger compartment, the system comprising:

an evaporator for cooling air to be blown into the passenger compartment;

a compressor driven by the engine, for compressing and discharging refrigerant having passed through the evaporator; and a control unit for controlling air-conditioning state of the passenger compartment, wherein:

when the engine operates, the control unit performs a cold-storing mode where cold quantity stored in condensed water on the evaporator is increased;

when the engine stops, the control unit performs a cold-releasing mode where air is cooled by cold released from the condensed water on the evaporator; and the control unit sets cooling degree of the evaporator to a low temperature side during the cold-storing mode, as compared with that during the other air-conditioning mode.

2. The air-conditioning system according to claim 1, wherein the control unit sets the cooling degree of the evaporator during the cold-storing mode at a predetermined degree in which the condensed water on the evaporator is frozen.

3. The air-conditioning system according to claim 1, wherein:

the control unit includes cooling degree detecting means for detecting cooling degree of the evaporator, and compressor operation control means for controlling operation of the compressor based on cooling degree detected by the cooling degree detecting means; and the control unit controls the cooling degree of the evaporator by controlling the operation of the compressor.

4. The air-conditioning system according to claim 3, wherein the operation of the compressor is controlled to be switched based on cooling degree detected by the cooling degree detecting means.

5. The air-conditioning system according to claim 3, wherein:

the compressor is a capacity variable compressor; and the capacity of the compressor is controlled based on cooling degree detected by the cooling degree detecting means.

6. An air-conditioning system for a vehicle having an engine and a passenger compartment, the system comprising:

an evaporator for cooling air to be blown into the passenger compartment;

a compressor driven by the engine, for compressing and discharging refrigerant having passed through the evaporator; and a control unit for controlling air-conditioning state of the passenger compartment, wherein:

when the engine operates, the control unit performs a cold-storing mode where cold quantity stored in condensed water on the evaporator is increased;

when the engine stops, the control unit performs a cold-releasing mode where air is cooled by cold released from the condensed water on the evaporator;

the control unit includes cooling degree detecting means for detecting cooling degree of the evaporator; and the control unit controls temperature of air to be blown into the passenger compartment based on the cooling degree of the evaporator, during the cold-releasing mode.

7. An air-conditioning system for a vehicle having an engine and a passenger compartment, the system comprising:

an evaporator for cooling air to be blown into the passenger compartment;

a compressor driven by the engine, for compressing and discharging refrigerant having passed through the evaporator; and a control unit for controlling air-conditioning state of the passenger compartment, wherein:

when the engine operates, the control unit performs a cold-storing mode where cold quantity stored in condensed water on the evaporator is increased;

when the engine stops, the control unit performs a cold-releasing mode where air is cooled by cold released from the condensed water on the evaporator;

the control unit includes cooling degree detecting means for detecting cooling degree of the evaporator; and the cooling degree detecting means is a temperature sensor disposed to detect temperature of refrigerant of the evaporator.

8. An air-conditioning system for a vehicle having an engine and a passenger compartment, the system comprising:

an evaporator for cooling air to be blown into the passenger compartment;

a compressor driven by the engine, for compressing and discharging refrigerant having passed through the evaporator; and a control unit for controlling air-conditioning state of the passenger compartment, wherein:

when the engine operates, the control unit performs a cold-storing mode where cold quantity stored in condensed water on the evaporator is increased;

when the engine stops, the control unit performs a cold-releasing mode where air is cooled by cold released from the condensed water on the evaporator;

the control unit includes cooling degree detecting means for detecting actual cooling degree of the evaporator, and first cooling degree calculating means for calculating cooling degree of the evaporator by a first predetermined time constant relative to a variation in the actual cooling degree of the evaporator during the cold-storing mode, and second cooling degree calculating means for calculating the cooling degree of the evaporator by a second predetermined time constant relative to a variation in the actual cooling degree of the evaporator during the cold-releasing mode, the first predetermined time constant being larger than the second predetermined time constant;

during the cold-storing mode, the control unit controls cold quantity stored in condensed water of the evaporator based on the cooling degree calculated by the first cooling degree calculating means; and during the cold-releasing mode, the control unit controls temperature of air blown into the passenger compartment based on the cooling degree calculated by the second cooling degree calculating means.

9. An air-conditioning system for a vehicle having a passenger compartment, the system comprising:

an air-conditioning case for forming an air passage through which air flows into the passenger compartment;

an evaporator for cooling air in the air passage, the evaporator being disposed in the air-conditioning case to form a bypass passage through which air bypasses the evaporator;

a bypass door for adjusting an opening degree of the bypass passage;

a compressor for compressing and discharging refrigerant having passed through the evaporator; and a control unit for controlling air-conditioning state of the passenger compartment, wherein:

when the compressor operates, the control unit performs a cold-storing mode where cold quantity stored in condensed water on the evaporator is increased; and during the cold-storing mode, the control unit adjusts temperature of air blown into the passenger compartment by adjusting the opening degree of the bypass passage by the bypass door.

10. The air-conditioning system according to claim 9, wherein:
the compressor is driven by an engine for driving the vehicle; and
the control unit performs a cold-releasing mode where air is cooled by cold released from condensed water of the evaporator, when the compressor is forcibly stopped based on a request of the engine.

11. The air-conditioning system according to claim 10, wherein the compressor is forcibly stopped when the engine of the vehicle stops.

12. The air-conditioning system according to claim 10, wherein:
the compressor is driven by the engine through a clutch unit; and
the compressor is forcibly stopped, when the clutch unit is turned off while the engine operates.

13. The air-conditioning system according to claim 9, further comprising:
a heating heat exchanger for heating air in the air passage, the heating heat exchanger being disposed in the air-conditioning case at a downstream air side of the evaporator; and
a temperature adjustment unit for adjusting temperature of air blown into the passenger compartment by adjusting a heating air amount in the heating heat exchanger, wherein:
the compressor is driven by an engine for driving the vehicle;
the control unit performs a cold-releasing mode where air is cooled by cold released from condensed water of the evaporator, when the compressor is forcibly stopped based on a request of the engine; and
during the cold-storing mode and the cold-releasing mode, the control unit controls the temperature of air blown into the passenger compartment by switching an operation mode between a first control mode in which the bypass door adjusts the opening degree of the bypass passage while the temperature adjustment unit is set at a maximum cooling position, and a second control mode in which the temperature adjustment unit adjusts the heating air amount in the heating heat exchanger while the bypass door is set at a fully opening position of the bypass passage.

14. The air-conditioning system according to claim 13, wherein:
the control unit includes cooling degree detecting means for detecting cooling degree of the evaporator, and bypass passage air temperature detecting means for detecting temperature of air passing through the bypass passage; and
during the cold-storing mode and the cold-releasing mode, the control unit switches the operation mode between the first control mode and the second control mode based on the cooling degree of the evaporator and the temperature of air passing through the bypass passage.

15. The air-conditioning system according to claim 14, wherein:
the control unit calculates a maximum temperature of mixed air obtained by mixing air passing through the evaporator and air passing through the bypass passage, based on the cooling degree of the evaporator and the temperature of air passing through the bypass passage;

the control unit controls the temperature of air blown into the passenger compartment by setting the first control mode, when the maximum temperature of the mixed air is higher than a target temperature of air blown into the passenger compartment; and
the control unit controls the temperature of air blown into the passenger compartment by setting the second control mode, when the maximum temperature of the mixed air is lower than the target temperature of air blown into the passenger compartment.

16. The air-conditioning system according to claim 13, wherein
when the operation mode is a normal mode except for the cold-storing mode and the cold-releasing mode, the control unit sets a third control mode in which the temperature of air blown into the passenger compartment is controlled by adjusting the heating air amount in the heating heat exchanger by the temperature adjustment unit while the bypass door is set at a fully closing position of the bypass passage.

17. The air-conditioning system according to claim 13, wherein:
when the compressor operates, the control unit controls operation of the compressor so that cooling degree of the evaporator becomes in a target value;
when cooling capacity of the evaporator is restricted, the control unit sets a power-saving mode in which driving power of the compressor is decreased by correcting the target valve to a high-temperature side; and
during the power-saving mode, the control unit controls the temperature of air blown into the passenger compartment by switching operation mode between the first control mode and the second control mode.

18. The air-conditioning system according to claim 16, wherein:
when it is necessary to increase amount of air passing through the evaporator during the cold-storing mode and the cold-releasing mode, the control unit sets a fourth control mode in which the bypass door adjusts the opening degree of the bypass passage while the temperature adjustment unit adjusts the heating air amount in the heating heat exchanger;
the control unit includes cooling degree detecting means for detecting cooling degree of the evaporator, bypass passage air temperature detecting means for detecting temperature of air passing through the bypass passage, and opening degree detecting means for detecting an opening degree of the bypass passage;
the control unit calculates temperature of mixed air obtained by mixing air passing through the evaporator and air passing through the bypass passage, based on the cooling degree of the evaporator, the temperature of air passing through the bypass passage and the opening degree of the bypass passage; and
during the second control mode, the third control mode and the fourth control mode, the temperature adjustment unit adjusts the heating air amount in the heating heat exchanger, based on the temperature of the mixed air.

19. The air-conditioning system according to claim 18, wherein the temperature (TM) of the mixed air is calculated using the following expression, $$TM=Te+[SW_B(T_B-Te)]/K$$

where, Te is the cooling degree of the evaporator, TB is the temperature of air passing through the bypass passage, SW$_B$ is the opening degree of the bypass passage, and K is a constant.

20. The air-conditioning system according to claim 19, wherein:

during an outside air mode where outside air is introduced into the air passage, the control unit detects temperature of outside air as the temperature of air passing through the bypass passage; and during an inside air mode where inside air is introduced into the air passage, the control unit detects temperature of inside air as the temperature of air passing through the bypass passage.

21. An air-conditioning system for a vehicle having a passenger compartment, the system comprising:

an evaporator for cooling air to be blown into the passenger compartment;

a compressor for compressing and discharging refrigerant having passed through the evaporator; and a control unit for controlling air-conditioning state of the passenger compartment, wherein:

when the compressor operates, the control unit performs a cold-storing mode in which cold quantity stored in condensed water on the evaporator is increased;

the control unit includes prohibiting determining means for determining a prohibiting condition of the cold-storing mode;

when the prohibiting condition of the cold-storing mode is determined while the compressor operates, the control unit stops the cold-storing mode; and when the vehicle is traveling at a speed higher than a predetermined speed, the prohibiting condition of the cold-storing mode is determined by the control unit.

22. An air-conditioning system for a vehicle having a passenger compartment and an engine, the system comprising:

an air-conditioning case for forming an air passage through which air flows into the passenger compartment;

an evaporator for cooling air in the air passage, the evaporator being disposed in the air-conditioning case;

a compressor for compressing and discharging refrigerant having passed through the evaporator;

a heating heat exchanger for heating air in the air passage, the heating heat exchanger being disposed in the air-conditioning case on a downstream air side of the evaporator;

a temperature adjustment unit for adjusting temperature of air to be blown into the passenger compartment at a target temperature; and a control unit for controlling air-conditioning state of the passenger compartment, wherein:

when the compressor operates, the control unit sets a cold-storing mode where cold stored in condensed water on the evaporator is increased;

when the compressor is forcibly stopped based on a request from the engine, the control unit sets a cold-releasing mode where air passing through the evaporator is cooled by cold released from condensed water of the evaporator; and the control unit includes correction means for correcting the target temperature of air blown into the passenger compartment to a low temperature side based on an increase of humidity of the passenger compartment.

23. The air-conditioning system according to claim 22, wherein the correction means corrects the target temperature of air blown into the passenger compartment based on both a correction due to the humidity of the passenger compartment and a correction due to a humidity changing rate of the passenger compartment.

24. The air-conditioning system according to claim 22, wherein:

the evaporator is disposed in the air-conditioning case to form a bypass passage through which air bypasses the evaporator; and the temperature adjustment unit includes a bypass door for adjusting an opening degree of the bypass passage, and a heating amount adjustment unit for adjusting an air-heating amount in the heating heat exchanger.

25. An air-conditioning system for a vehicle having an engine and a passenger compartment, the system comprising:

a refrigerant cycle having an evaporator for cooling air to be blown into the passenger compartment, and a compressor driven by the engine for compressing and discharging refrigerant having passed through the evaporator; and a control unit for controlling air-conditioning state of the passenger compartment, wherein:

the control unit includes cooling degree detecting means for detecting cooling degree of the evaporator, compressor operation control means for controlling operation of the compressor based on the cooling degree detected by the cooling degree detecting means, and estimating means for estimating a next cooling degree of the evaporator after the compressor is forcibly stopped based on the request of the engine, during the compressor operating; and during the compressor operating, the control unit controls cold quantity stored in condensed water of the evaporator based on the next cooling degree estimated from the estimating means.

26. The air-conditioning system according to claim 25, wherein the estimating means estimates the next cooling degree of the evaporator when the compressor is forcibly stopped, based on cooling degree of the evaporator and a condition of air sucked into the evaporator during the compressor operating.

27. The air-conditioning system according to claim 25, wherein the control unit controls cold quantity stored in condensed water of the evaporator, by correcting a target valve of the cooling degree of the evaporator based on the next cooling degree estimated from the estimating means.

28. The air-conditioning system according to claim 27, wherein:

during the compressor operating in the cold-storing mode, the control unit determines a next target value of the cooling degree of the evaporator after a predetermined time elapses after the compressor is forcibly stopped; and during the compressor operating in the cold-storing mode, the control unit corrects the target value of the cooling degree of the evaporator based on a comparison value between the next target value and the next cooling degree.

29. The air-conditioning system according to claim 25, wherein the control unit corrects a target flow amount of air to be blown into the evaporator based on the next cooling degree estimated from the estimating means, so that cold quantity stored in condensed water of the evaporator is controlled.

30. The air-conditioning system according to claim 25, wherein the control unit includes cold-storing determining means for determining whether or not the cold-storing mode is performed during the compressor operating.

31. The air-conditioning system according to claim 25, further comprising
   an inside/outside air switching door for switching air to be blown into the evaporator between inside air and outside air,
   wherein the inside/outside air switching door is set to an outside air mode where only outside air is introduced into the evaporator, during a predetermined time after the compressor starts.

32. The air-conditioning system according to claim 25, further comprising
   a blower for blowing air into the evaporator, wherein:
      during a forcibly stopping mode of the compressor, where the compressor is forcibly stopped from a request of the engine, air is blown by the blower with a first target air flow; and
      at an immediately before the forcibly stopping mode of the compressor, air is blown by the blower with a second target air flow which is equal to or larger than the first target air flow.

33. The air-conditioning system according to claim 25, further comprising
   a blower for blowing air into the evaporator, wherein:
      when the cold-storing mode is performed when the evaporator is operated with a cooling load larger than a predetermined load, air is blown by the blower with a cold-storing target air flow; and
      during a normal control mode, air is blown by the blower with a normal target air flow which is equal to or larger than the cold-storing target air flow.

34. The air-conditioning system according to claim 25, further comprising:
   an inside/outside air switching door for switching air to be blown into the evaporator between inside air and outside air; and
   an air outlet mode selecting door for selecting an air outlet mode for setting an air flow direction into the passenger compartment, wherein
      when the cold-storing mode is performed when the evaporator operates with a load higher than a predetermined load, the inside/outside air switching door sets an inside air mode where only inside air is blown into the evaporator, and the air outlet mode selecting door sets a bi-level mode where air is simultaneously blown toward an upper side and a lower side of the passenger compartment.

35. The air-conditioning system according to claim 25, wherein:
   the refrigerant cycle includes an electrical expansion valve for decompressing refrigerant flowing into the evaporator, and valve control means for electrically controlling a valve opening degree of the electrical expansion valve; and
   when the cold-storing mode is performed when the evaporator operates with a load higher than a predetermined load, the valve control means controls the valve opening degree of the electrical expansion valve to be smaller than that during a normal control mode.

36. An air-conditioning system for a vehicle having an engine and a passenger compartment, the system comprising:
   a refrigerant cycle having an evaporator for cooling air to be blown into the passenger compartment, and a compressor driven by the engine for compressing and discharging refrigerant having passed through the evaporator;
   an air-conditioning case for forming an air passage and for accommodating the evaporator; and
   a control unit for controlling air-conditioning state of the passenger compartment, wherein:
      when the compressor operates, the control unit performs a cold-storing mode where cold quantity stored in condensed water of the evaporator is increased;
      during a predetermined time after the refrigerant cycle starts, the control unit sets an outside air main mode where only outside air is introduced or outside air is mainly introduced into the air-conditioning case; and
      during a forcibly stopping mode of the compressor, where the compressor is forcibly stopped from a request of the engine, the control unit sets an inside air main mode where only inside air is introduced or inside air is mainly introduced into the air-conditioning case.

37. An air-conditioning system for a vehicle having an engine and a passenger compartment, the system comprising:
   a refrigerant cycle having an evaporator for cooling air to be blown into the passenger compartment, and a compressor driven by the engine for compressing and discharging refrigerant having passed through the evaporator;
   an air-conditioning case for forming an air passage and for accommodating the evaporator; and
   a control unit for controlling air-conditioning state of the passenger compartment, wherein:
      when the compressor operates, the control unit performs a cold-storing mode where cold quantity stored in condensed water of the evaporator is increased;
      the control unit includes inside/outside air introducing control means for setting an outside air main mode where only outside air is introduced or outside air is mainly introduced into the air-conditioning case during a predetermined time after the refrigerant cycle starts, and air flow control means for setting a first target air flow blown into the evaporator during a forcibly stopping mode of the compressor, where the compressor is forcibly stopped from a request of the engine; and
      the first target air flow is equal to or smaller than a second target air flow blown into the evaporator at an immediately before the forcibly stopping mode of the compressor.

38. An air-conditioning system for a vehicle having an engine and a passenger compartment, the system comprising:
   a refrigerant cycle having an evaporator for cooling air to be blown into the passenger compartment, and a compressor driven by a driving unit including the engine, for compressing and discharging refrigerant having passed through the evaporator; and
   a control unit for controlling air-conditioning state of the passenger compartment, wherein:
      when the compressor operates, the control unit performs a cold-storing mode where cold quantity stored in condensed water of the evaporator is increased;

during a forcibly stopping mode where the compressor is forcibly stopped from a request of the engine, the control unit performs a cold-releasing mode where air is cooled by cold released from condensed water of the evaporator;

the control unit includes first estimating means for estimating cold quantity stored in the condensed water of the evaporator during the compressor operating and second estimating means for estimating a stop possible time of the compressor based on the cold quantity estimated by the first estimating means; and in the forcibly stopping mode of the compressor, the compressor is stopped during the stop possible time, and control unit outputs a signal for requesting operation of the compressor to the driving unit after the stop possible time passes.

39. The air-conditioning system according to claim 38, wherein the first estimating means estimates the cold quantity stored in the condensed water of the evaporator based on at least cooling degree of the evaporator.

40. An air-conditioning system for a vehicle having an engine and a passenger compartment, the system comprising:

an evaporator for cooling air to be blown into the passenger compartment;

a compressor driven by a driving unit including the engine, for compressing and discharging refrigerant having passed through the evaporator; and a control unit for controlling air-conditioning state of the passenger compartment, wherein:

when the compressor operates, the control unit performs a cold-storing mode where cold quantity stored in condensed water of the evaporator is increased;

during a forcibly stopping mode where the compressor is forcibly stopped from a request of the engine, the control unit performs a cold-releasing mode where air is cooled by cold released from condensed water of the evaporator;

the control unit includes first estimating means for estimating a drying-finishing time of the condensed water of the evaporator in the forcibly stopping mode, during the compressor operating, and second estimating means for estimating a stop possible time of the compressor based on the drying finishing time; and in the forcibly stopping mode of the compressor, the compressor is stopped during the stop possible time, and the control unit outputs a signal for requesting operation of the compressor to the driving unit after the stop possible time passes.

41. The air-conditioning system according to claim 40, wherein the drying finishing time is estimated based on at least cooling degree of the evaporator.

42. An air-conditioning system for a vehicle having an engine and a passenger compartment, the system comprising:

an evaporator for cooling air to be blown into the passenger compartment;

a compressor driven by a driving unit including the engine, for compressing and discharging refrigerant having passed through the evaporator; and a control unit for controlling air-conditioning state of the passenger compartment, wherein:

when the compressor operates, the control unit performs a cold-storing mode where cold quantity stored in condensed water of the evaporator is increased;

during a forcibly stopping mode where the compressor is forcibly stopped from a request of the engine, the control unit performs a cold-releasing mode where air is cooled by cold released from condensed water of the evaporator;

the control unit includes first estimating means for estimating an operation time for which cooling degree of the evaporator is changed to a predetermined level in the forcibly stopping mode, during the compressor operating, and second estimating means for estimating a stop possible time of the compressor based on the operation time; and in the forcibly stopping mode, the compressor is stopped during the stop possible time, and the control unit outputs a signal for requesting restarting of the compressor to the driving unit after the stop possible time passes.

43. The air-conditioning system according to claim 42, wherein the operation time for which the cooling degree of the evaporator is changed to the predetermined level in the forcibly stopping mode is estimated based on at least cooling degree of the evaporator.

44. The air-conditioning system according to claim 43, wherein when the stop possible time is shorter than a predetermined time, the control unit prohibits the forcibly stopping mode of the compressor.

45. An air-conditioning system for a vehicle having an engine and a passenger compartment, the system comprising:

a refrigerant cycle having an evaporator for cooling air to be blown into the passenger compartment, and a compressor driven by a driving unit including the engine, for compressing and discharging refrigerant having passed through the evaporator; and a control unit for controlling air-conditioning state of the passenger compartment, wherein:

when the compressor operates, the control unit performs a cold-storing mode where cold quantity stored in condensed water of the evaporator is increased;

during a forcibly stopping mode where the compressor is forcibly stopped from a request of the engine, the control unit performs a cold-releasing mode where air is cooled by cold released from condensed water of the evaporator;

the control unit includes cooling degree calculating means for calculating a limit value of cooling degree of the evaporator in forcibly stopping mode, during the compressor operating;

only when cooling degree of the evaporator is lower than the limit value during the forcibly stopping mode, the compressor is stopped;

when the cooling degree of the evaporator is higher than the limit value during the forcibly stopping mode, the control unit outputs a signal for requesting operation of the compressor to the driving unit.

46. The air-conditioning system according to claim 45, wherein the limit value of the cooling degree of the evaporator is calculated based on a limit line map relative to a humidity sensing, a temperature sensing and a smelling sensing for a passenger in the passenger compartment, and fogging of a windshield of the vehicle.

47. An air-conditioning system for a vehicle having an engine and a passenger compartment, the system comprising:

an evaporator for cooling air to be blown into the passenger compartment;

a compressor driven by a driving unit including the engine, for compressing and discharging refrigerant having passed through the evaporator; and a control unit for controlling air-conditioning state of the passenger compartment, wherein:

when the compressor operates, the control unit performs a cold-storing mode where cold quantity stored in condensed water of the evaporator is increased;

during a forcibly stopping mode where the compressor is forcibly stopped from a request of the engine, the control unit performs a cold-releasing mode where air is cooled by cold released from condensed water of the evaporator;

the control unit includes dehumidification determining means for determining whether or not it is necessary to dehumidify air in the passenger compartment; and even during the forcibly stopping mode of the compressor, when the dehumidification determining means determines that it is necessary to dehumidify air in the passenger compartment, the control unit outputs a signal for requesting operation of the compressor to the driving unit.

48. The air-conditioning system according to claim 47, wherein when the dehumidification determining means determines that it is necessary to dehumidify air in the passenger compartment when the compressor operates, the control unit prohibits the forcibly stopping mode of the compressor.

49. The air-conditioning system according to claim 47, wherein when the dehumidification determining means determines that it is necessary to dehumidify air in the passenger compartment when the compressor operates, the control unit performs a normal mode where cold quantity stored in the condensed water of the evaporator is reduced as compared with that in the cold-storing mode.

50. The air-conditioning system according to claim 47, further comprising an air-conditioning case for forming an air passage including a bypass passage, through which air flows into the passenger compartment; and a bypass door for adjusting an opening degree of the bypass passage, wherein:

the evaporator is disposed in the air-conditioning case to form the bypass passage through which air bypasses the evaporator; and when the dehumidification determining means determines that it is necessary to dehumidify air in the passenger compartment, the bypass door closes the bypass passage.

51. The air-conditioning system according to claim 47, wherein during an air outlet mode where air is blown toward a windshield of the vehicle from a defroster opening, the dehumidification determining means determines that it is necessary to dehumidify air in the passenger compartment.

52. The air-conditioning system according to claim 47, wherein:

the control unit includes an outside air temperature sensor for detecting temperature of outside air; and when the temperature of outside air is lower than a predetermined temperature, the dehumidification determining means determines that it is necessary to dehumidify air in the passenger compartment.

53. An air-conditioning system for a vehicle having an engine and a passenger compartment, the system comprising:

an evaporator for cooling air to be blown into the passenger compartment;

a compressor driven by a driving unit including the engine, for compressing and discharging refrigerant having passed through the evaporator; and a control unit for controlling air-conditioning state of the passenger compartment, wherein:

when the compressor operates, the control unit performs a cold-storing mode where cold quantity stored in condensed water of the evaporator is increased;

during a forcibly stopping mode where the compressor is forcibly stopped from a request of the engine, the control unit performs a cold-releasing mode where air is cooled by cold released from condensed water of the evaporator;

the control unit includes vehicle stop determining means for estimating and determining whether or not the vehicle is to be stopped; and when the vehicle stop determining means determines that vehicle is to be stopped during the cold-storing mode, the control unit performs a forcibly operation mode where operation of the compressor is forcibly performed so that cooling degree of the evaporator is increased.

54. The air-conditioning system according to claim 53, wherein:

during the compressor operating, the control unit performs a normal mode where the operation of the compressor is controlled so that cooling degree of the evaporator becomes in a first target value; and during the cold-storing mode, the operation of the compressor is controlled so that the cooling degree of the compressor becomes in a second target value which corresponds to a temperature lower than that of the first target value.

55. The air-conditioning system according to claim 54, wherein when the vehicle is traveling with a speed lower than a predetermined speed, the control unit cancels the forcibly operating mode of the compressor, and controls the operation of the compressor so that the cooling degree of the evaporator becomes in the second target value.

56. The air-conditioning system according to claim 53, when the vehicle stop determining means estimates and determines that vehicle is to be stopped during the cold-storing mode, the control unit controls the operation of the compressor so that cooling degree of the evaporator is increased to a third target value which corresponds to a temperature lower than that of the second target value.

57. The air-conditioning system according to claim 53, wherein the vehicle stop determining means estimates and determines whether or not vehicle is to be stopped based on a vehicle speed signal and a vehicle brake signal.

58. An air-conditioning system for a vehicle having an engine and a passenger compartment, the system comprising:

an air-conditioning case for forming an air passage through which air flows into the passenger compartment;

an evaporator for cooling air in the air passage, the evaporator being disposed in the air-conditioning case to form a bypass passage through which air bypasses the evaporator;

a bypass door for adjusting an opening degree of the bypass passage;

a compressor for compressing and discharging refrigerant having passed through the evaporator, the compressor being driven by the engine; and a control unit for controlling air-conditioning state of the passenger compartment, wherein:

when the compressor operates, the control unit performs a cold-storing mode where cold stored in condensed water on the evaporator is increased;

during a forcibly stopping mode where the compressor is forcibly stopped from a request of the engine, the control unit performs a cold-releasing mode where air is cooled by cold released from condensed water of the evaporator;

during the cold-storing mode, the bypass door opens the bypass passage; and when the bypass door opens the bypass passage, the bypass door is operated to close a part of an air passage of the evaporator so than an air flow resistance is increased in the evaporator.

59. The air-conditioning system according to claim 58, wherein during the cold-releasing mode, the bypass door opens the bypass passage.

60. The air-conditioning system according to claim 59, wherein from a start time of the cold-releasing mode, the bypass door is operated to open a part of the air passage of the evaporator by a predetermined opening degree.

61. The air-conditioning system according to claim 58, wherein when the bypass door closes the part of the air passage of the evaporator in maximum, a predetermined clearance is provided between the bypass door and the evaporator.

62. The air-conditioning system according to claim 58, wherein:

the evaporator is disposed in the air-conditioning case vertically; and the bypass door is disposed in the air-conditioning case at a downstream air side of the evaporator.

63. The air-conditioning system according to claim 58, wherein the bypass door is disposed in the air-conditioning case at an upstream air side of the evaporator.

64. A refrigerant cycle system comprising:

an evaporator for cooling air passing therethrough;

a compressor for compressing and discharging refrigerant having passed through the evaporator;

a pressure-reducing unit for reducing pressure of refrigerant supplying into the evaporator; and a control unit for selectively setting a cooling mode where a cooling temperature of the evaporator is higher than a predetermined temperature, and a cold-storing mode where the cooling temperature of the evaporator is lower than the predetermined temperature, wherein during the cold-storing mode, the pressure-reducing unit increases a throttle amount as compared with a cooling mode.

65. The refrigerant cycle system according to claim 64, wherein the pressure-reducing unit includes a thermal expansion valve which adjusts a valve opening degree so that a super-heating degree of refrigerant at a refrigerant outlet of the evaporator is maintained at a predetermined degree during the cooling mode, and a fixed throttle which decreases pressure of refrigerant so that evaporation temperature of refrigerant is lower than freezing point during the cold-storing mode.

66. The refrigerant cycle system according to claim 64, wherein the pressure-reducing unit is an electrical expansion valve which electrically adjusts a valve opening degree; and during the cold-storing mode, the control unit controls the valve opening degree of the electrical expansion valve to be smaller than that during the cooling mode.

67. The refrigerant cycle system according to claim 64, wherein:

the pressure-reducing unit includes a thermal expansion valve which adjusts a valve opening degree so that a super-heating degree of refrigerant at a refrigerant outlet of the evaporator is maintained at a predetermined degree during the cooling mode, and a supplemental driving mechanism which adjusts the valve opening degree to be smaller during the cold-storing mode, as compared with the cooling mode.

68. The refrigerant cycle system according to claim 67, wherein the supplemental driving mechanism is an electromagnetic solenoid mechanism which applies force to the thermal expansion valve in a valve-closing direction.

69. The refrigerant cycle system according to claim 67, wherein:

the thermal expansion valve includes a valve body for opening and closing a refrigerant passage, a pressure-response member for driving the valve body, and a pressure chamber to which a pressure corresponding to refrigerant temperature at the refrigerant outlet of the evaporator is applied;

the pressure chamber applies force to the valve body through the pressure-response member in a valve-closing direction; and the supplementary driving mechanism is a pressure adjusting mechanism which adjusts pressure of the pressure chamber to be smaller during the cold-storing mode, as compared with the cooling mode.

70. The refrigerant cycle system according to claim 64, wherein:

the compressor is driven by a vehicle engine; and when the compressor operates, the control unit performs the cold-storing mode so that condensed water of the evaporator is frozen.

71. An air-conditioning system for a vehicle having a passenger compartment, the system comprising:

an evaporator for cooling air to be blown into the passenger compartment;

a compressor for compressing and discharging refrigerant having passed through the evaporator; and a control unit for controlling air-conditioning state of the passenger compartment, wherein:

when the compressor operates, the control unit performs a cold-storing mode where condensed water of the evaporator is frozen and cold quantity stored in condensed water of the evaporator is increased;

the control unit includes first time determining means for determining cold-storing possible time, based on cooling degree of the evaporator and air state sucked into the evaporator, for which the cold-storing mode is continuously performed; and when a time for which the cold-storing mode is performed elapses the cold-storing possible time, the control unit stops the cold-storing mode and performs a defrosting mode for defrosting the evaporator.

72. The air-conditioning system according to claim 71, wherein:

the control unit detects a humidity or a temperature of air sucked into the evaporator as the air state; and the control unit sets the cold-storing possible time to be shorter as the humidity or the temperature of air sucked into the evaporator becomes higher.

73. The air-conditioning system according to claim 71, wherein:

the control unit includes proportion determining means for determining a proportion between outside air and inside air to be introduced into the evaporator; and the control unit sets the cold-storing possible time to be shorter as a proportion of outside air becomes larger.

74. The air-conditioning system according to claim 71, wherein:

the control unit includes air-amount detecting means for detecting a signal relative to an air amount passing through the evaporator; and the control unit sets the cold-storing possible time to be shorter as the air amount passing through the evaporator increases.

75. The air-conditioning system according to claim 71, wherein:

the control unit includes rotation speed detecting means for detecting a signal relative to a rotation speed of the compressor; and the control unit sets the cold-storing possible time to be shorter as the rotation speed of the compressor becomes higher.

76. The air-conditioning system according to claim 71, wherein:

the control unit performs defrosting of the evaporator by setting a target air temperature blown from the evaporator to a temperature higher than 0° C.

77. The air-conditioning system according to claim 71, wherein:

the control unit includes second time determining means for determining a necessary defrosting time, based on cooling degree of the evaporator and air state sucked into the evaporator, for which the defrosting mode is continuously performed; and when a time for which the defrosting mode is performed elapses the necessary defrosting time, the control unit stops the defrosting mode for defrosting the evaporator.

* * * * *

UNITED STATES PATENT AND TRADEMARK OFFICE
CERTIFICATE OF CORRECTION

PATENT NO. : 6,330,909 B1
DATED : December 18, 2001
INVENTOR(S) : Koji Takahashi et al.

It is certified that error appears in the above-identified patent and that said Letters Patent is hereby corrected as shown below:

<u>Title page,</u>
Item [30], Foreign Application Priority Data, "Dec. 16, 1999" should be
-- Dec. 16, 1998 -- for (JP) 10-358154

Signed and Sealed this

Third Day of September, 2002

Attest:

Attesting Officer

JAMES E. ROGAN
Director of the United States Patent and Trademark Office